US011367899B2

(12) United States Patent
Tokuda et al.

(10) Patent No.: US 11,367,899 B2
(45) Date of Patent: Jun. 21, 2022

(54) NONAQUEOUS ELECTROLYTE FOR SECONDARY BATTERY AND NONAQUEOUS-ELECTROLYTE SECONDARY BATTERY EMPLOYING THE SAME

(71) Applicants: Mitsubishi Chemical Corporation, Chiyoda-ku (JP); MU IONIC SOLUTIONS CORPORATION, Chiyoda-ku (JP)

(72) Inventors: Hiroyuki Tokuda, Ibaraki (JP); Minoru Kotato, Ibaraki (JP); Shinichi Kinoshita, Ibaraki (JP)

(73) Assignees: Mitsubishi Chemical Corporation, Chiyoda-ku (JP); MU IONIC SOLUTIONS CORPORATION, Chiyoda-ku (JP)

(*) Notice: Subject to any disclaimer, the term of this patent is extended or adjusted under 35 U.S.C. 154(b) by 156 days.

(21) Appl. No.: 16/561,149

(22) Filed: Sep. 5, 2019

(65) Prior Publication Data

US 2019/0393553 A1    Dec. 26, 2019

Related U.S. Application Data

(62) Division of application No. 14/849,119, filed on Sep. 9, 2015, now Pat. No. 10,468,720, which is a division of application No. 13/846,254, filed on Mar. 18, 2013, now Pat. No. 9,853,326, which is a division of application No. 13/619,147, filed on Sep. 14, 2012, now Pat. No. 9,093,716, which is a division of application No. 12/594,513, filed as application No. PCT/JP2008/056803 on Apr. 4, 2008, now Pat. No. 9,281,541.

(30) Foreign Application Priority Data

| Apr. 5, 2007 | (JP) | 2007-099274 |
| Apr. 20, 2007 | (JP) | 2007-111931 |
| Apr. 20, 2007 | (JP) | 2007-111961 |
| Apr. 26, 2007 | (JP) | 2007-116442 |
| Apr. 26, 2007 | (JP) | 2007-116445 |
| Apr. 26, 2007 | (JP) | 2007-116450 |

(51) Int. Cl.
| *H01M 10/0567* | (2010.01) |
| *H01M 4/133* | (2010.01) |
| *H01M 4/134* | (2010.01) |
| *H01M 4/587* | (2010.01) |
| *H01M 10/0525* | (2010.01) |
| *H01M 10/0569* | (2010.01) |
| *H01M 10/052* | (2010.01) |
| *H01M 10/056* | (2010.01) |

(52) U.S. Cl.
CPC ....... *H01M 10/0567* (2013.01); *H01M 4/133* (2013.01); *H01M 4/134* (2013.01); *H01M 4/587* (2013.01); *H01M 10/052* (2013.01); *H01M 10/056* (2013.01); *H01M 10/0525* (2013.01); *H01M 10/0569* (2013.01); *H01M 2300/004* (2013.01); *H01M 2300/0025* (2013.01); *Y02E 60/10* (2013.01)

(58) Field of Classification Search
None
See application file for complete search history.

(56) References Cited

U.S. PATENT DOCUMENTS

| 5,580,684 A | 12/1996 | Yokoyama et al. |
| 5,754,393 A | 5/1998 | Hiratsuka et al. |
| 6,001,325 A | 12/1999 | Salmon et al. |
| 6,033,808 A | 3/2000 | Salmon et al. |
| 6,436,582 B1 | 8/2002 | Hamamoto et al. |
| 6,509,120 B1 | 1/2003 | Yoshimura et al. |
| 6,919,145 B1 | 7/2005 | Kotato et al. |
| 7,695,862 B2 | 4/2010 | Otsuki et al. |
| 2001/0044051 A1 | 11/2001 | Hamamoto et al. |
| 2002/0192564 A1 | 12/2002 | Ota et al. |
| 2004/0067418 A1 | 4/2004 | Kim et al. |
| 2004/0091786 A1 | 5/2004 | Unoki et al. |
| 2004/0096749 A1 | 5/2004 | Kim et al. |
| 2004/0191636 A1 | 9/2004 | Kida et al. |

(Continued)

FOREIGN PATENT DOCUMENTS

| CN | 1437777 A | 8/2003 |
| CN | 1181592 C | 12/2004 |

(Continued)

OTHER PUBLICATIONS

Office Action dated May 26, 2021 in corresponding Chinese Patent Application No. 201810132906.7 (with English Translation), 13 pages.

(Continued)

*Primary Examiner* — Laura Weiner
(74) *Attorney, Agent, or Firm* — Oblon, McClelland, Maier & Neustadt, L.L.P.

(57) ABSTRACT

An object is to provide a nonaqueous electrolyte and a nonaqueous-electrolyte secondary battery which have excellent discharge load characteristics and are excellent in high-temperature storability, cycle characteristics, high capacity, continuous-charge characteristics, storability, gas evolution inhibition during continuous charge, high-current-density charge/discharge characteristics, discharge load characteristics, etc. The object has been accomplished with a nonaqueous electrolyte which comprises: a monofluorophosphate and/or a difluorophosphate; and further a compound having a specific chemical structure or specific properties.

8 Claims, No Drawings

(56) References Cited

U.S. PATENT DOCUMENTS

| | | |
|---|---|---|
| 2005/0008939 A1 | 1/2005 | Ota et al. |
| 2005/0014071 A1 | 1/2005 | Noda et al. |
| 2005/0084765 A1 | 4/2005 | Lee et al. |
| 2005/0118512 A1 | 6/2005 | Onuki et al. |
| 2005/0191553 A1 | 9/2005 | Fujihara et al. |
| 2006/0024584 A1 | 2/2006 | Kim et al. |
| 2006/0046151 A1 | 3/2006 | Otsuki et al. |
| 2006/0068293 A1 | 3/2006 | Kim et al. |
| 2006/0088763 A1 | 4/2006 | Li et al. |
| 2006/0134527 A1 | 6/2006 | Amine et al. |
| 2006/0134528 A1 | 6/2006 | Ihara et al. |
| 2006/0177742 A1 | 8/2006 | Abe et al. |
| 2006/0286459 A1 | 12/2006 | Zhao et al. |
| 2007/0048607 A1 | 3/2007 | Nakashima et al. |
| 2007/0065726 A1 | 3/2007 | Yumoto et al. |
| 2007/0178379 A1 | 8/2007 | Tamura et al. |
| 2007/0298326 A1 | 12/2007 | Angell et al. |
| 2008/0102376 A1 | 5/2008 | Kato et al. |
| 2008/0286649 A1 | 11/2008 | Li et al. |
| 2008/0305402 A1 | 12/2008 | Kato et al. |
| 2010/0099031 A1 | 4/2010 | Kato et al. |
| 2011/0020712 A1 | 1/2011 | Angell et al. |
| 2011/0171519 A1 | 7/2011 | Kato et al. |
| 2012/0100435 A1 | 4/2012 | Kato et al. |
| 2012/0183864 A1 | 7/2012 | Abe et al. |
| 2012/0244425 A1 | 9/2012 | Tokuda |
| 2012/0308881 A1 | 12/2012 | Tokuda et al. |
| 2013/0337343 A1 | 12/2013 | Tokuda et al. |
| 2014/0335405 A1 | 11/2014 | Kato et al. |

FOREIGN PATENT DOCUMENTS

| | | |
|---|---|---|
| CN | 1653641 A | 8/2005 |
| CN | 1906796 A | 1/2007 |
| CN | 101438449 A | 5/2009 |
| EP | 0 825 664 A1 | 2/1998 |
| EP | 1 205 996 A1 | 5/2002 |
| EP | 1 394 888 A1 | 3/2004 |
| EP | 1 905 739 A1 | 4/2008 |
| JP | 08-250378 A | 9/1966 |
| JP | 1-286263 | 11/1989 |
| JP | 7-176322 | 7/1995 |
| JP | 7-230825 | 8/1995 |
| JP | 8-306591 | 11/1996 |
| JP | 09-161845 | 6/1997 |
| JP | 9-245832 | 9/1997 |
| JP | 10-50342 | 2/1998 |
| JP | 11-67270 | 3/1999 |
| JP | 2000-12078 | 1/2000 |
| JP | 2000-058118 | 2/2000 |
| JP | 2000-505042 | 4/2000 |
| JP | 2000-353545 A | 12/2000 |
| JP | 2001-6729 | 1/2001 |
| JP | 2002-83632 | 3/2002 |
| JP | 2002-343426 A | 11/2002 |
| JP | 2003-007336 | 1/2003 |
| JP | 2003-017119 | 1/2003 |
| JP | 2003-77534 | 3/2003 |
| JP | 2003-100342 A | 4/2003 |
| JP | 2003-217656 A | 7/2003 |
| JP | 2003-297421 A | 10/2003 |
| JP | 2004-31079 | 1/2004 |
| JP | 2004-87437 A | 3/2004 |
| JP | 2004-296389 | 10/2004 |
| JP | 2004-303437 | 10/2004 |
| JP | 2004-363077 | 12/2004 |
| JP | 2005-72003 | 3/2005 |
| JP | 2005-228511 | 8/2005 |
| JP | 2005-251456 | 9/2005 |
| JP | 2005-251738 | 9/2005 |
| JP | 2005-268094 | 9/2005 |
| JP | 2005-306619 | 11/2005 |
| JP | 2006-32300 A | 2/2006 |
| JP | 2006-86058 A | 3/2006 |
| JP | 2006-196250 | 7/2006 |
| JP | 2006-351337 | 12/2006 |
| JP | 2007-35617 | 2/2007 |
| JP | 2007-095363 | 4/2007 |
| JP | 2007-141830 | 6/2007 |
| JP | 2007-173180 | 7/2007 |
| JP | 2007-207483 | 8/2007 |
| JP | 2007-273394 | 10/2007 |
| KR | A-2002-0020699 | 3/2002 |
| KR | 10-2005-0091753 A | 9/2005 |
| KR | 10-2006-0035767 A | 4/2006 |
| KR | 10-2006-0075966 A | 7/2006 |
| KR | 10-2007-0031807 A | 3/2007 |
| WO | WO 99/18625 A2 | 4/1999 |
| WO | WO 99/18625 A3 | 4/1999 |
| WO | WO 2005/117175 A2 | 12/2005 |
| WO | WO 2005/117175 A3 | 12/2005 |
| WO | WO 2006/043538 A1 | 4/2006 |
| WO | WO 2006/078866 A2 | 7/2006 |
| WO | WO 2006/078866 A3 | 7/2006 |
| WO | WO 2006/088021 A1 | 8/2006 |
| WO | WO 2006/132372 A1 | 12/2006 |
| WO | WO 2006/137177 A1 | 12/2006 |

OTHER PUBLICATIONS

Combined Chinese Office Action and Search Report dated Jul. 28, 2020 in corresponding Chinese Patent Application No. 201810132906.7 (with English Translation), 17 pages.
Korean Office Action dated Feb. 28, 2020 in Patent Application No. 10-2018-7008256 (with English translation), 7 pages.
4. Electrolyte, Kikan Kagaku, Japan Scientific Societies Press, No. 49, p. 108. Published Dec. 31, 2001. ISBN 4-7622-2989 X.
Extended Search Report dated Nov. 18, 2011 in Europe Application No. 11169896.5.
Chinese Office Action dated Oct. 26, 2011, in Patent Application No. 200880011461.1 (with English-language translation).
Office Action dated Nov. 5, 2012 in Chinese Patent Application No. 20088011461.1 (with English-language translation).
Japanese Submission of Publications issued Apr. 7, 2011, in Patent Application No. 2007-116450 (with English-language translation).
Office Action dated Jul. 4, 2012 in Chinese Patent Application No. 200880011461.1 with English language translation.
Extended European Search Report dated Apr. 12, 2012 in Patent Application No. 12153834.2.
Communication pursuant to Article 94(2) EPC dated Aug. 29, 2014 in European Patent Application No. 11 188 812.9.
European Office Action dated Apr. 24, 2017 in Patent Application No. 13 156 071.6.
European Office Action dated Apr. 25, 2017 in Patent Application No. 11 169 896.5.
Extended European Search Report dated Jul. 11, 2011, in Patent Application No. 08739909.3.
Extended Search Report dated Jan. 17, 2012 in European Patent Application No. 11188812.9-2119.
Korean Office Action dated Apr. 27, 2017, in Patent Application No. 10-2017-7007940 (with English translation).
Combined Office Action and Search Report dated Aug. 2, 2017 in Chinese Patent Application No. 201610011878.4 (with English translation and English translation of categories of cited documents).
Combined Office Action and Search Report dated Nov. 2, 2016 in Chinese Patent Application No. 201510207936.6 (with English translation).
Decision of Reexamination dated Nov. 16, 2016 in Chinese Patent Application No. 20120059305.0 (with English translation).
Office Action dated Jun. 9, 2016 in Korean Patent Application No. 10-2015-7019150 (with English translation).
Office Action dated Apr. 27, 2016 in Chinese Patent Application No. 201210059305.0 (with English translation).
Office Action dated May 23, 2016 in Korean Patent Application No. 10-2015-70087813 (with English translation).
Partial European Search Report dated Sep. 1, 2011 in the corresponding European Patent Application No. 11169896.5.

(56) References Cited

OTHER PUBLICATIONS

Chinese Office Action dated Jan. 28, 2015 in Patent Application No. 200880011461.1 (with English translation).
Office Action dated Feb. 17, 2015 in Chinese Patent Application No. 201210059305.0 (with English language translation).
Korean Office Action dated Feb. 4, 2015 in Patent Application No. 10-2014-7036628 (with English translation).
A. Naji, et al., "New halogenated additives to propylene carbonate-based electrolytes for lithium-ion batteries" Electrochimica Acta, vol. 45, 2000, pp. 1893-1899.
Notification of Reason for Refusal dated Apr. 9, 2019, in Korean Patent Application No. 10-2018-7008256 filed Apr. 4, 2008 (with machine English translation).
Office Action dated Feb. 19, 2019, in Chinese Patent Application No. 201610011878.4 filed Apr. 4, 2008 (with English translation).
Decision 6$^{th}$ Department of Intellectual Property Trial and Appeal Board issued Oct. 31, 2018, in Korean Patent Application No. 10-2015-7008813 filed Apr. 4, 2004 (with English translation).
Combined Chinese Office Action and Search Report dated Sep. 28, 2018 in Patent Application No. 201710201105.7 (with English language translation).
Office Action dated Jun. 11, 2018 in Chinese Patent Application No. 201610011878.4 (with unedited computer generated English translation), 18 pages.
Office Action dated Sep. 26, 2017 in Chinese Patent Application No. 201510207936.6 (with English language translation).
European Office Action dated Jun. 23, 2017 in Patent Application No. 08 739 909.3.
European Office Action dated Jul. 5, 2017 in Patent Application No. 11 188 812.9.
Korean Office Action dated Nov. 21, 2016 in Patent Application No. 10-2015-7008813 (with English translation).
Japanese Office action dated Nov. 6, 2012 in corresponding Japanese Application No. 2007-116450 (with an English Translation).
Japanese Office action dated Nov. 6, 2012 in corresponding Japanese Application No. 2007-099274 (with an English Translation).
Japanese Office action dated Nov. 6, 2012 in corresponding Japanese Application No. 2007-116445 (with an English Translation).
Campion et al. "Thermal Decomposition of LiPF6-Based Electrolytes for Lithium-Ion Batteries", Journal of the Electrochemical Society (2005), 152(12), pp. A2327-A2334.
Office Action dated Jul. 13, 2016 in Korean Patent Application No. 10-2015-7033663 (with English translation).
Office Action dated Nov. 26, 2015 in Korean Patent Application No. 10-2015-7008813 (with English translation).
Office Action dated Jan. 18, 2016 in Korean Patent Application No. 10-2015-7033663 (with English translation).
Extended European Search Report dated Oct. 2, 2015 in Patent Application No. 15166034.7.
Office Action dated Aug. 19, 2015 in Korean Patent Application No. 10-2015-7019150 (with English translation).
Office Action dated Aug. 21, 2015 in Chinese Patent Application No. 201210059305.0 (with English translation).
Office Action dated Aug. 28, 2015 in Korean Patent Application No. 10-2014-7036628 (with English translation).
Japanese Office action dated Nov. 6, 2012 in corresponding Japanese Application No. 2007-111961 (with an English Translation).
Office Action dated Apr. 6, 2015 in Korean Patent Application No. 10-2009-7020547 (with English translation).
Office Action dated May 6, 2015 in Chinese Patent Application No. 201210059236.3 (with English language translation).
Office Action dated May 15, 2015 in Korean Patent Application No. 2015-7008813 (with English language translation).
Office Action dated Aug. 15, 2014 in Chinese Patent Application No. 200880011461.1 (with English language translation).
Combined Office Action and Search Report dated Jan. 20, 2014 in Chinese Application No. 201210059236.3 (with English translation and English translation of Category of Cited Documents).
Extended European Search Report dated Apr. 19, 2013, in European Patent Application No. 13156071.6.
Office Action dated Oct. 15, 2013 in Japanese Patent Application No. 2013-13642 (with English language translation).
Office Action dated Feb. 20, 2014 in Japanese Patent Application No. 2013-019674 (with English language translation).
Office Action dated Jul. 22, 2014 in Japanese Patent Application No. 2013-13642 (with English language translation).
Office Action dated Aug. 8, 2014 in Chinese Patent Application No. 201210059305.0 (with English language translation).
Office Action dated Oct. 29, 2014 in Korean Patent Application No. 2009-7020547 (with English language translation).
Combined Chinese Office Action and Search Report dated Nov. 3, 2014 in Patent Application No. 201210059236.3 (with English language translation and English translation of categories of cited documents).
Japanese Office Action dated Jun. 11, 2013, in Japan Patent Application No. 2007-111961 (with English translation).
Japanese Office Action dated Jul. 9, 2013, in Japan Patent Application No. 2007-116450 (with English translation).
Japanese Office Action dated Jul. 9, 2013, in Japan Patent Application No. 2012-279596 (with English translation).
European Office Action dated Mar. 20, 2014, in Application No. 11 169 896.5-1360.
European Office Action dated May 22, 2014, in Application No. 08 739 909.3-1360.
Chinese Office Action dated Dec. 6, 2013, in Application No. 201210059305.0 (with English translation).
Office Action dated Jul. 17, 2019, in Chinese Patent Application No. 201701201105.7 filed Apr. 4, 2008 (with English translation).
Office Action dated Jul. 15, 2021 in corresponding Korean Patent Application No. 10-2019-7000239 (with English Translation), 11 pages.
Office Action dated Nov. 26, 2021, in corresponding Korean Patent Application 10-2020-7015576 (with English-language Translation).
Office Action dated Nov. 26, 2021 in the corresponding Chinese patent application No. 201810132906.7 and its English machine translation.

NONAQUEOUS ELECTROLYTE FOR SECONDARY BATTERY AND NONAQUEOUS-ELECTROLYTE SECONDARY BATTERY EMPLOYING THE SAME

CROSS REFERENCE TO RELATED APPLICATIONS

The present application is a continuation of U.S. patent application Ser. No. 14/849,119, filed on Sep. 9, 2015, now U.S. Pat. No. 10,468,720, issued Nov. 5, 2019, which is a divisional of U.S. patent application Ser. No. 13/846,254, filed on Mar. 18, 2013, now U.S. Pat. No. 9,853,326, issued Dec. 26, 2017, which is a divisional of U.S. patent application Ser. No. 13/619,147, filed on Sep. 14, 2012, now U.S. Pat. No. 9,093,716, issued Jul. 28, 2015, which is a divisional of patent application Ser. No. 12/594,513, filed on Jan. 6, 2010, now U.S. Pat. No. 9,281,541, issued Mar. 8, 2016, which is a 35 U.S.C. § 371 national stage patent application of international patent application PCT/JP2008/056803, filed Apr. 4, 2008, which claims priority to the following Japanese patent applications: JP 2007-099274, filed Apr. 5, 2007; JP 2007-111931, filed Apr. 20, 2007; JP 2007-111961, filed Apr. 20, 2007; JP 2007-116442, filed Apr. 26, 2007; JP 2007-116445, filed Apr. 26, 2007; and JP 2007-116450, filed Apr. 26, 2007.

TECHNICAL FIELD

The present invention relates to a nonaqueous electrolyte for secondary battery and to secondary battery employing the electrolyte. More particularly, the invention relates to nonaqueous electrolyte which is for use in lithium secondary battery and contain a specific ingredient, and to lithium secondary battery employing the electrolyte.

BACKGROUND ART

<Nonaqueous Electrolyte 1 and Nonaqueous-Electrolyte Secondary Battery 1>

With the recent trend toward size reduction in electronic appliances, secondary batteries are increasingly required to have a higher capacity. Attention is hence focused on lithium secondary batteries (nonaqueous-electrolyte secondary batteries), which have a higher energy density than nickel-cadmium batteries and nickel-hydrogen batteries.

The electrolytes used in lithium secondary batteries are nonaqueous electrolytes prepared by dissolving an electrolyte such as $LiPF_6$, $LiBF_4$, $LiClO_4$, $LiCF_3SO_3$, $LiAsF_6$, $LiN(CF_3SO_2)_2$, or $LiCF_3(CF_2)_3SO_3$ in a nonaqueous solvent such as a cyclic carbonate, e.g., ethylene carbonate or propylene carbonate, an acyclic carbonate, e.g., dimethyl carbonate, diethyl carbonate, or ethyl methyl carbonate, a cyclic ester, e.g., γ-butyrolactone or γ-valerolactone, an acyclic ester, e.g., methyl acetate or methyl propionate, or the like.

First, various investigations have been made on nonaqueous solvents and electrolytes in order to improve the battery characteristics including load characteristics, cycle characteristics, and storability of such lithium secondary batteries. For example, patent document 1 includes a statement to the effect that when an electrolyte containing a vinylethylene carbonate compound is used, the decomposition of this electrolyte is minimized and a battery excellent in storability and cycle characteristics can be fabricated. Patent document 2 includes a statement to the effect that when an electrolyte containing propanesultone is used, recovery capacity after storage can be increased.

However, incorporation of such compounds has had a problem that although the incorporation has the effect of improving storability and cycle characteristics to some degree, a coating film having high resistance is formed on the negative-electrode side and this, in particular, reduces discharge load characteristics.

<Nonaqueous Electrolyte 2 and Nonaqueous-Electrolyte Secondary Battery 2>

Secondary, various investigations have been made on nonaqueous solvents and electrolytes for use in those nonaqueous electrolytes in order to improve the battery characteristics including load characteristics, cycle characteristics, and storability of those lithium secondary batteries. For example, use of a nonaqueous solvent having a higher permittivity and a lower coefficient of viscosity has various advantages, e.g., the resistance of the electrolyte can be reduced to a low value, as described in non-patent document 1. Furthermore, that nonaqueous solvent is thought to be capable of improving infiltration into the positive and negative electrodes. Use of that nonaqueous solvent is hence preferred.

However, solvents having a heteroelement-containing functional group (group constituting a framework) other than a carbonyl framework, such as ether compounds and nitrile compounds, which are one kind of preferred solvents from those standpoints have the following drawback. These solvents are electrochemically decomposed by an oxidation reaction at the positive electrode or by a reduction reaction at the negative electrode and are hence difficult to use. Practically, carbonic esters or carboxylic acid esters, such as enumerated above as examples, are used in combination. These solvents have a carbonyl group and have excellent oxidation resistance/reduction resistance.

On the other hand, patent document 1 includes a statement to the effect that when an electrolyte containing a vinylethylene carbonate compound is used, the decomposition of this electrolyte is minimized and a battery excellent in storability and cycle characteristics can be fabricated. Patent document 2 includes a statement to the effect that when an electrolyte containing propanesultone is used, recovery capacity after storage can be increased.

However, incorporation of such compounds has had the following problem although the incorporation has the effect of improving storability and cycle characteristics to some degree. When these compounds are used in order to sufficiently improve characteristics, a coating film having high resistance is formed on the negative-electrode side and this, in particular, reduces discharge load characteristics. Especially when those solvents which have a heteroelement-containing functional group (group constituting a framework) other than a carbonyl framework and have a high permittivity and a low viscosity are used, there has been a problem that the preferred characteristics are not imparted.

The desire for higher performances in nonaqueous-electrolyte secondary batteries is growing more and more, and it is desired to attain various characteristics including high capacity, high-temperature storability, continuous-charge characteristics, and cycle characteristics on a high level.

<Nonaqueous Electrolyte 3 and Nonaqueous-Electrolyte Secondary Battery 3>

Thirdly, various investigations have been made on nonaqueous solvents and electrolytes in order to improve the battery characteristics including load characteristics, cycle characteristics, and storability of such lithium secondary batteries. For example, patent document 3 includes a statement to the effect that when an electrolyte containing a phosphinic acid ester is used, a battery inhibited from deteriorating in battery performance during high-temperature storage or during continuous discharge can be fabricated. Patent document 4 proposes a secondary battery which has an excellent life in charge/discharge cycling at a voltage exceeding 4.2V and is fabricated using an electrolyte containing an organic compound having two or more cyano groups.

Especially when a battery is in the state of being continuously charged in which a slight current is permitted to always flow therethrough to keep the battery in a charged state in order to compensate for the self-discharge of the battery, then the electrodes are always in the state of having high activity. Because of this, the battery is apt to suffer accelerated deterioration in capacity or gas evolution is apt to occur due to the decomposition of the electrolyte. In particular, in the case of a battery having high capacity, there is a problem that since the space within this battery has a small volume, the internal pressure of the battery increases considerably even when a slight amount of a gas is evolved due to the decomposition of the electrolyte. With respect to continuous-charge characteristics, not only reduced capacity deterioration but also the inhibition of gas evolution are strongly desired.

However, the electrolytes containing the compounds described in patent document 3 and patent document 4 have been insufficient in the inhibition of gas evolution during continuous charge and in the inhibition of battery characteristics deterioration, although the electrolytes have the effect of improving cycle characteristics and storability to some degree.

<Nonaqueous Electrolyte 4 and Nonaqueous-Electrolyte Secondary Battery 4>

Fourthly, various investigations have been made on non-aqueous solvents and electrolytes in order to improve the battery characteristics including load characteristics, cycle characteristics, and storability of such nonaqueous-electrolyte batteries or to enhance the safety of such batteries during heating or at the time of short-circuiting. For example, sulfolane combines a high permittivity and high electrochemical oxidation stability even in nonaqueous solvents and a boiling point as high as 278° C., which is higher than those of ethylene carbonate and propylene carbonate. Sulfolane can hence be expected to contribute to an improvement in battery safety when used as a solvent. However, sulfolane has a melting point as high as 28° C. and there has been a problem that a battery employing sulfolane as a main solvent has impaired low-temperature characteristics. Furthermore, it is known that sulfolane has poor compatibility with graphite-based negative electrodes and that use of sulfolane as a main solvent results in a charge/discharge capacity lower than a theoretical capacity.

For example, patent document 5 discloses that in a nonaqueous-electrolyte secondary battery employing the electrolyte described therein, the electrolyte can be prevented from solidifying at low temperatures by using a mixed solvent composed of sulfolane and ethyl methyl carbonate.

Patent document 6 discloses that when sulfolane and γ-butyrolactone are used as main solvents and vinylethylene carbonate and vinylene carbonate are added thereto, then a coating film of satisfactory quality which has high lithium ion permeability is formed on the surface of the graphite-based negative electrode and an improved initial charge/discharge efficiency is obtained.

<Nonaqueous Electrolyte 5 and Nonaqueous-Electrolyte Secondary Battery 5>

Fifthly, many reports have been made on the addition of various additives to electrolytes for the purpose of improving initial capacity, rate characteristics, cycle characteristics, high-temperature storability, low-temperature characteristics, continuous-charge characteristics, self-discharge characteristics, overcharge-preventive properties, etc. For example, to add 1,4,8,11-tetraazacyclotetradecane has been reported as a technique for improving cycle characteristics (see patent document 7).

However, the desire for higher performances in nonaqueous-electrolyte secondary batteries is growing more and more, and it is desired to attain various characteristics including high capacity, high-temperature storability, continuous-charge characteristics, and cycle characteristics on a high level. For example, the prior-art technique disclosed in patent document 7, which is regarded therein as effective in improving cycle characteristics, has had a problem that this technique, when used alone, results in considerable gas evolution during continuous charge and in a considerable decrease in recovery capacity after a test, as will be shown later in a Reference Example.

<Nonaqueous Electrolyte 6 and Nonaqueous-Electrolyte Secondary Battery 6>

Sixthly, various investigations have been made on nonaqueous solvents and electrolytes in order to improve the battery characteristics including load characteristics, cycle characteristics, and storability of such lithium secondary batteries. For example, patent document 1 includes a statement to the effect that when an electrolyte containing a vinylethylene carbonate compound is used, the decomposition of this electrolyte is minimized and a battery excellent in storability and cycle characteristics can be fabricated. Patent document 2 includes a statement to the effect that when an electrolyte containing propanesultone is used, recovery capacity after storage can be increased.

However, incorporation of such compounds has had a problem that although the incorporation has the effect of improving storability and cycle characteristics to some degree, a coating film having high resistance is formed on the negative-electrode side and this, in particular, reduces discharge load characteristics.

Patent Document 1: JP-A-2001-006729
Patent Document 2: JP-A-10-050342
Patent Document 3: JP-A-2004-363077
Patent Document 4: JP-A-7-176322
Patent Document 5: JP-A-2000-012078
Patent Document 6: JP-A-2004-296389
Patent Document 7: JP-A-9-245832
Non-Patent Document 1: Kikan Kagaku Sōsetsu, No. 49, p. 108

DISCLOSURE OF THE INVENTION

Problems that the Invention is to Solve

<Nonaqueous Electrolyte 1 and Nonaqueous-Electrolyte Secondary Battery 1>

An object of the invention, which has been achieved in view of the background art described above, is to provide a nonaqueous electrolyte for secondary batteries which has excellent discharge load characteristics and is excellent in high-temperature storability and cycle characteristics.

<Nonaqueous Electrolyte 2 and Nonaqueous-Electrolyte Secondary Battery 2>

Another object of the invention, which has been achieved in view of the background art described above, is to provide another nonaqueous electrolyte which has excellent discharge load characteristics and is excellent in high-temperature storability and cycle characteristics.

<Nonaqueous Electrolyte 3 and Nonaqueous-Electrolyte Secondary Battery 3>

Still another object of the invention, which has been achieved in view of the background art described above, is to provide a nonaqueous electrolyte for secondary batteries which is excellent in cycle characteristics, storability, gas evolution inhibition during continuous charge, and battery characteristics.

<Nonaqueous Electrolyte 4 and Nonaqueous-Electrolyte Secondary Battery 4>

However, the recent desire for higher performances in batteries is growing more and more, and it is desired to attain high capacity, high output power, high-temperature storability, cycle characteristics, high safety, etc. on a high level.

In a nonaqueous-electrolyte secondary battery employing the electrolyte described in patent document 5, the reversibility of electrode reactions in initial charge/discharge was insufficient. This battery was hence insufficient in charge/discharge capacity and charge/discharge efficiency (see Comparative Example 1 for Nonaqueous Electrolyte 4). On the other hand, a nonaqueous-electrolyte secondary battery employing the electrolyte described in patent document 6 has had the following drawbacks. γ-butyrolactone, which is used as a main solvent in the electrolyte, has a coefficient of viscosity at 25° C. as high as 1.73 mPa·s, which is higher than those of low-molecular acyclic carbonates used as main solvents in common electrolytes (e.g., dimethyl carbonate, 0.59 mPa·s; diethyl carbonate, 0.75 mPa·s; ethyl methyl carbonate, 0.65 mPa·s). Because of this, the electrolyte as a whole had a high coefficient of viscosity and was unsatisfactory in charge/discharge efficiency at a high current density. In addition, γ-butyrolactone in a charged state has poor thermal stability and the battery has had a problem concerning charge/discharge characteristics after storage at a high temperature such as 85° C. (see Comparative Example 2 for Nonaqueous Electrolyte 4 and Comparative Example 3 for Nonaqueous Electrolyte 4).

Consequently, a further object of the invention is to eliminate the problem that high-current-density charge/discharge characteristics decrease when a nonaqueous electrolyte containing a cyclic sulfone compound is used and to provide a nonaqueous electrolyte capable of reconciling high battery performance with high safety. Still a further object is to provide a nonaqueous-electrolyte battery employing the electrolyte.

<Nonaqueous Electrolyte 5 and Nonaqueous-Electrolyte Secondary Battery 5>

Still further objects of the invention, which has been achieved in view of the background art described above, are to provide a nonaqueous electrolyte which maintains high capacity and imparts satisfactory continuous-charge characteristics and to provide a nonaqueous-electrolyte secondary battery.

<Nonaqueous Electrolyte 6 and Nonaqueous-Electrolyte Secondary Battery 6>

Still a further object of the invention, which has been achieved in view of the background art described above, is to provide a nonaqueous electrolyte for secondary batteries which has excellent discharge load characteristics and is excellent in high-temperature storability and cycle characteristics.

Means for Solving the Problems

<Nonaqueous Electrolyte 1 and Nonaqueous-Electrolyte Secondary Battery 1>

The present inventors diligently made investigations in view of the problems described above. As a result, they have found that a nonaqueous electrolyte which contains at least one carbonate having a halogen atom and to which a specific compound has been added can have excellent discharge load characteristics and can retain satisfactory high-temperature storability and satisfactory cycle characteristics. Invention 1 has been thus completed.

Namely, invention 1 resides in nonaqueous electrolyte 1 which is a nonaqueous electrolyte for use in a nonaqueous-electrolyte secondary battery comprising a negative electrode and a positive electrode which are capable of occluding and releasing ions and a nonaqueous electrolyte, and the nonaqueous electrolyte comprises: an electrolyte and a nonaqueous solvent, wherein the nonaqueous solvent comprises: a carbonate having a halogen atom; and a monofluorophosphate and/or a difluorophosphate.

Invention 1 further resides in nonaqueous-electrolyte secondary battery 1 which is a nonaqueous-electrolyte secondary battery comprising a negative electrode and a positive electrode which are capable of occluding/releasing lithium ions and a nonaqueous electrolyte, wherein the nonaqueous electrolyte is the nonaqueous electrolyte descried above.

<Nonaqueous Electrolyte 2 and Nonaqueous-Electrolyte Secondary Battery 2>

The inventors diligently made investigations in view of the problems described above. As a result, they have found that a nonaqueous electrolyte to which a specific compound has been added can have excellent discharge load characteristics and retains satisfactory high-temperature storability and satisfactory cycle characteristics even when a solvent which has a high permittivity and a low coefficient of viscosity and has a heteroelement-containing functional group other than a carbonyl group has been used therein. Invention 2 has been thus completed.

Namely, invention 2 resides in nonaqueous electrolyte 2 which is a nonaqueous electrolyte mainly comprising an electrolyte and a nonaqueous solvent dissolving the electrolyte, and the nonaqueous electrolyte comprises: a compound which is liquid at 25° C., has a permittivity of 5 or higher and a coefficient of viscosity of 0.6 cP or lower, and has a group constituting a heteroelement-containing framework (excluding carbonyl group); and further a monofluorophosphate and/or a difluorophosphate.

Invention 2 further resides in nonaqueous-electrolyte secondary battery 2 which is a nonaqueous-electrolyte secondary battery comprising a negative electrode and a positive electrode which are capable of occluding/releasing lithium ions and a nonaqueous electrolyte, wherein the nonaqueous electrolyte is the nonaqueous electrolyte described above.

<Nonaqueous Electrolyte 3 and Nonaqueous-Electrolyte Secondary Battery 3>

The inventors diligently made investigations in view of the problems described above. As a result, they have found that gas evolution inhibition during continuous charge and battery characteristics can be kept satisfactory when at least one compound selected from the group consisting of compounds represented by general formula (1), nitrile compounds, isocyanate compounds, phosphazene compounds, disulfonic acid ester compounds, sulfide compounds, disulfide compounds, acid anhydrides, lactone compounds having a substituent in the α-position, and compounds having a carbon-carbon triple bond is further added to a nonaqueous electrolyte containing a monofluorophosphate and/or a difluorophosphate. Invention 3 has been thus completed.

Namely, invention 3 provides nonaqueous electrolyte 3 which is a nonaqueous electrolyte mainly comprising an electrolyte and a nonaqueous solvent dissolving the electrolyte, and the nonaqueous electrolyte comprises: a monofluorophosphate and/or a difluorophosphate; and further at least one compound selected from the group consisting of compounds represented by the following general formula (1), nitrile compounds, isocyanate compounds, phosphazene compounds, disulfonic acid ester compounds, sulfide compounds, disulfide compounds, acid anhydrides, lactone compounds having a substituent in the α-position, and compounds having a carbon-carbon triple bond (the compound is hereinafter sometimes referred to as "compound A of the invention"):

[Chemical Formula-1]

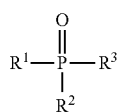

(1)

[wherein $R^1$, $R^2$, and $R^3$ each independently represent a fluorine atom, an alkyl group which has 1-12 carbon atoms and may be substituted with a fluorine atom, or an alkoxy group which has 1-12 carbon atoms and may be substituted with a fluorine atom].

Invention 3 further provides nonaqueous-electrolyte secondary battery 3 which is a nonaqueous-electrolyte secondary battery at least comprising a negative electrode and a positive electrode which are capable of occluding and releasing lithium ions and a nonaqueous electrolyte, wherein the nonaqueous electrolyte is the nonaqueous electrolyte described above.

<Nonaqueous Electrolyte 4 and Nonaqueous-Electrolyte Secondary Battery 4>

The inventors diligently made investigations in order to eliminate the problems described above. As a result, they have found that high-current-density charge/discharge characteristics can be inhibited from decreasing and high battery performance can be reconciled with high safety by using a compound having a coefficient of viscosity not higher than a certain upper limit together with a cyclic sulfone compound as a main solvent in a nonaqueous electrolyte and by further incorporating a specific compound. Invention 4 has been thus completed.

Namely, invention 4 resides in nonaqueous electrolyte 4 which is a nonaqueous electrolyte comprising an electrolyte and a nonaqueous solvent dissolving the electrolyte, the nonaqueous electrolyte comprising: a cyclic sulfone compound in an amount of 10-70% by volume based on the whole nonaqueous solvent; a compound having a coefficient of viscosity at 25° C. of 1.5 mPa·s or lower; and further at least one compound selected from the group consisting of carbonates having an unsaturated bond, carbonates having a halogen atom, monofluorophosphates, and difluorophosphates.

Invention 4 further resides in nonaqueous-electrolyte secondary battery 4 which is a nonaqueous-electrolyte secondary battery comprising a negative electrode and a positive electrode which are capable of occluding/releasing lithium ions and a nonaqueous electrolyte, wherein the nonaqueous electrolyte is the nonaqueous electrolyte described above.

<Nonaqueous Electrolyte 5 and Nonaqueous-Electrolyte Secondary Battery 5>

The inventors diligently made investigations in order to eliminate the problems described above. As a result, they have found that high-temperature continuous-charge characteristics are greatly improved while maintaining high capacity, by incorporating a cyclic polyamine compound and/or a cyclic polyamide compound into a nonaqueous electrolyte and optionally further adding a specific compound, e.g., an unsaturated carbonate. Invention 5 has been thus completed.

Namely, invention 5 resides in nonaqueous electrolyte 5 which is a nonaqueous electrolyte comprising a lithium salt and a nonaqueous organic solvent dissolving the lithium salt, wherein the nonaqueous organic solvent comprises: a cyclic polyamine compound and/or a cyclic polyamide compound; and further at least one compound selected from the group consisting of unsaturated carbonates, fluorine-containing carbonates, monofluorophosphates, and difluorophosphates. Hereinafter, this invention is referred to as "embodiment 5-1".

Invention 5 further resides in a nonaqueous electrolyte which comprises a lithium salt and a nonaqueous organic solvent dissolving the lithium salt, wherein the nonaqueous organic solvent comprises: a cyclic polyamine compound; and further a cyclic carbonate in an amount of from 5% by mass to 40% by mass based on the whole nonaqueous organic solvent. Hereinafter, this invention is referred to as "embodiment 5-2".

Invention 5 further resides in a nonaqueous electrolyte which comprises a lithium salt and a nonaqueous organic solvent dissolving the lithium salt, wherein the nonaqueous organic solvent comprises a cyclic polyamide compound. Hereinafter, this invention is referred to as "embodiment 5-3".

Invention 5 still further resides in nonaqueous-electrolyte secondary battery 5 characterized by employing any of the nonaqueous electrolytes described above.

<Nonaqueous Electrolyte 6 and Nonaqueous-Electrolyte Secondary Battery 6>

The inventors diligently made investigations in view of the problems described above. As a result, they have found that a nonaqueous electrolyte to which a specific disulfonylimide salt and a specific compound have been added can have excellent discharge load characteristics and retain satisfactory high-temperature storability and satisfactory cycle characteristics. Invention 6 has been thus completed.

Namely, invention 6 resides in nonaqueous electrolyte 6 which is a nonaqueous electrolyte mainly comprising an electrolyte and a nonaqueous solvent dissolving the electrolyte, the nonaqueous electrolyte comprising: at least one cyclic disulfonylimide salt represented by the following general formula (1); and further a monofluorophosphate and/or a difluorophosphate:

[Chemical Formula-2]

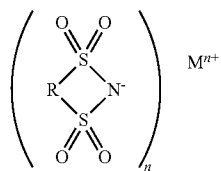

[wherein R represents an alkylene group which has 1-12 carbon atoms and may be substituted with an alkyl group, and the alkyl group and the alkylene group may be substituted with a fluorine atom; n is an integer of 1 to 3; and M is one or more metals selected from Group 1, Group 2, and Group 13 of the periodic table or a quaternary onium].

Invention 6 further resides in nonaqueous-electrolyte secondary battery 6 which is a nonaqueous-electrolyte secondary battery comprising a negative electrode and a positive electrode which are capable of occluding/releasing lithium ions and a nonaqueous electrolyte, wherein the nonaqueous electrolyte is the nonaqueous electrolyte described above.

Advantages of the Invention

<Nonaqueous Electrolyte 1 and Nonaqueous-Electrolyte Secondary Battery 1>

According to invention 1, nonaqueous electrolyte 1 for secondary batteries and nonaqueous-electrolyte secondary battery 1 can be provided, which are excellent in discharge load characteristics, high-temperature storability, and cycle characteristics.

<Nonaqueous Electrolyte 2 and Nonaqueous-Electrolyte Secondary Battery 2>

According to invention 2, nonaqueous electrolyte 2 and nonaqueous-electrolyte secondary battery 2 can be provided, which have excellent discharge load characteristics and are excellent in high-temperature storability and cycle characteristics.

<Nonaqueous Electrolyte 3 and Nonaqueous-Electrolyte Secondary Battery 3>

According to invention 3, nonaqueous electrolyte 3 and nonaqueous-electrolyte secondary battery 3 can be provided, which are excellent in cycle characteristics, storability, gas evolution inhibition during continuous charge, and battery characteristics.

<Nonaqueous Electrolyte 4 and Nonaqueous-Electrolyte Secondary Battery 4>

In invention 4, the solvent to be mixed with a cyclic sulfone compound has a coefficient of viscosity as low as 1.5 mPa·s or below and the nonaqueous electrolyte as a whole has a lower coefficient of viscosity than that according to patent document 6. High-current-density charge/discharge capacity can hence be prevented from decreasing. Namely, according to invention 4, nonaqueous-electrolyte battery 4 can be provided, which compares ordinary electrolytes in high capacity, high-current-density charge/discharge characteristics, and storability and has far higher safety than the general electrolytes. Consequently, not only size increase and performance advancement but also higher safety can be attained in nonaqueous-electrolyte batteries.

<Nonaqueous Electrolyte 5 and Nonaqueous-Electrolyte Secondary Battery 5>

According to invention 5, nonaqueous-electrolyte secondary battery 5 can be provided, which retains a high capacity and is excellent in continuous-charge characteristics, etc.

<Nonaqueous Electrolyte 6 and Nonaqueous-Electrolyte Secondary Battery 6>

According to invention 6, nonaqueous electrolyte 6 for secondary batteries and nonaqueous-electrolyte secondary battery 6 can be provided, which have excellent discharge load characteristics and are excellent also in high-temperature storability and cycle characteristics.

BEST MODE FOR CARRYING OUT THE INVENTION

Embodiments of the invention will be explained below in detail. The following explanations on constituent elements are for embodiments (typical embodiments) of the invention, and the invention should not be construed as being limited to the contents thereof. Various modifications of the invention can be made within the spirit of the invention.

<Nonaqueous Electrolyte 1 and Nonaqueous-Electrolyte Secondary Battery 1>

[1. Nonaqueous Electrolyte 1 for Secondary Battery]

Nonaqueous electrolyte 1 of the invention includes an electrolyte and a nonaqueous solvent which contains the electrolyte dissolved therein, like ordinary electrolytes.

<1-1. Electrolyte>

The electrolyte to be used in nonaqueous electrolyte 1 of the invention is not limited, and known ones for use as electrolytes in a target nonaqueous-electrolyte secondary battery can be employed and mixed at will. In the case where nonaqueous electrolyte 1 of the invention is to be used in nonaqueous-electrolyte secondary battery 1, the electrolyte preferably is one or more lithium salts.

Examples of the electrolyte include inorganic: lithium salts such as $LiClO_4$, $LiAsF_6$, $LiPF_6$, $Li_2CO_3$, and $LiBF_4$;

fluorine-containing organic lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$, $LiBF_2(CF_3)_2$, $LiBF_2(C_2F_5)_2$, $LiBF_2(CF_3SO_2)_2$, and $LiBF_2(C_2F_5SO_2)_2$;

dicarboxylic-containing acid complex lithium salts such as lithium bis(oxalato)borate, lithium tris(oxalato)phosphate, and lithium difluorooxalatoborate; and sodium salts or potassium salts such as $KPF_6$, $NaPF_6$, $NaBF_4$, and $CF_3SO_3Na$ and the like.

Preferred of these is $LiPF_6$, $LiBF_4$, $LiCF_3SO_3$, $LiN(CF_3SO_2)_2$, $LiN(C_2F_5SO_2)_2$, or lithium bis(oxalate)borate. Especially preferred is $LiPF_6$ or $LiBF_4$.

One electrolyte may be used alone, or any desired combination of two or more electrolytes may be used in any desired proportion. In particular, a combination of two specific inorganic lithium salts or a combination of an inorganic lithium salt and a fluorine-containing organic lithium salt is preferred because use of this combination is effective in inhibiting gas evolution during continuous charge or inhibiting deterioration through high-temperature storage.

It is especially preferred to use a combination of $LiPF_6$ and $LiBF_4$ or a combination of an inorganic lithium salt, e.g., $LiPF_6$ or $LiBF_4$, and a fluorine-containing organic lithium salt, e.g., $LiCF_3SO_3$, $LiN(CF_3SO_2)_2$, or $LiN(C_2F_5SO_2)_2$.

In the case where $LiPF_6$ and $LiBF_4$ are used in combination, it is preferred that the proportion of the $LiBF_4$ contained should be generally 0.01% by mass or higher and generally 20% by mass or lower based on all electrolytes. $LiBF_4$ has a low degree of dissociation, and too high proportions thereof may result in cases where nonaqueous electrolyte 1 has increased resistance.

On the other hand, in the case where an inorganic lithium salt, e.g., $LiPF_6$ or $LiBF_4$, and a fluorine-containing organic lithium salt, e.g., $LiCF_3SO_3$, $LiN(CF_3SO_2)_2$, or $LiN(C_2F_5SO_2)_2$, are used in combination, it is desirable that the proportion of the inorganic lithium salt in all lithium salts should be in the range of from generally 70% by mass to generally 99% by mass. Since fluorine-containing organic lithium salts generally have a higher molecular weight than inorganic lithium salts, too high proportions of the organic lithium salt in that combination results in a reduced proportion of the nonaqueous solvent in the whole nonaqueous electrolyte 1. There are hence cases where nonaqueous electrolyte 1 has increased resistance.

The lithium salt concentration in the final composition of nonaqueous electrolyte 1 of the invention may be any desired value unless this concentration value considerably lessens the effect of the invention. However, the lithium salt concentration therein is generally 0.5 mol/L or higher, preferably 0.6 mol/L or higher, more preferably 0.8 mol/L or higher, and is generally 3 mol/L or lower, preferably 2 mol/L or lower, more preferably 1.5 mol/L or lower. When the concentration thereof is too low, there are cases where nonaqueous electrolyte 1 has insufficient electrical conductivity. When the concentration thereof is too high, a viscosity increase occurs and this reduces electrical conductivity. There are hence cases where the nonaqueous-electrolyte secondary battery employing this nonaqueous electrolyte 1 of the invention has reduced performance.

Especially in the case where the nonaqueous solvent of nonaqueous electrolyte 1 consists mainly of one or more carbonate compounds such as alkylene carbonates or dialkyl carbonates, use of $LiPF_6$ in combination with $LiBF_4$ is preferred although $LiPF_6$ may be used alone. This is because use of that combination inhibits capacity from deteriorating with continuous charge. When these two salts are used in combination, the molar ratio of $LiBF_4$ to $LiPF_6$ is generally 0.005 or higher, preferably 0.01 or higher, especially preferably 0.05 or higher, and is generally 0.4 or lower, preferably 0.2 or lower. In case where the molar ratio thereof is too high, battery characteristics tend to decrease through high-temperature storage. Conversely, too low molar ratios thereof result in difficulties in obtaining the effect of inhibiting gas evolution during continuous charge or inhibiting capacity deterioration.

In the case where the nonaqueous solvent of nonaqueous electrolyte 1 includes at least 50% by volume cyclic carboxylic ester compound such as, e.g., γ-butyrolactone or γ-valerolactone, it is preferred that $LiBF_4$ should account for 50 mol % or more of all electrolytes.

<1-2. Carbonate Having Halogen Atom>

The "carbonate having a halogen atom" in invention 1 is not particularly limited so long as the carbonate has a halogen atom, and any desired such carbonate can be used. Preferred examples the "carbonate having a halogen atom" include cyclic carbonates having a halogen atom or acyclic carbonates having a halogen atom.

Examples of the halogen atoms include fluorine, chlorine, bromine, and iodine atoms. More preferred of these are fluorine atoms or chlorine atoms. Especially preferred are fluorine atoms. The number of halogen atoms possessed by the "carbonate having a halogen atom" per molecule is not particularly limited so long as the number thereof is 1 or larger. However, the number thereof is generally 10 or smaller, preferably 6 or smaller. In the case where the "carbonate having a halogen atom" has two or more halogen atoms per molecule, these atoms may be the same or different.

<1-2-1. Cyclic Carbonate>

The cyclic carbonate to be used as the "carbonate having a halogen atom" in invention 1 is explained below. The number of the atoms constituting the ring of the cyclic carbonate is generally 4 or larger, preferably 5 or larger, and the upper limit thereof is preferably 10 or smaller, especially preferably 8 or smaller. When the number thereof is outside the range, there are cases where this compound poses a problem concerning the chemical stability or industrial availability thereof. Examples of such cyclic carbonates in which the numbers of ring-constituting atoms are from 5 to 8 include ethylene carbonate, 1,3-propanediol carbonate, 1,4-butanediol carbonate, and 1,5-pentanediol carbonate, respectively. The cyclic carbonate may have a carbon-carbon unsaturated bond in the ring. Examples thereof include vinylene carbonate and cis-2-butene-1,4-diol carbonate and the like.

The cyclic carbonate may have one or more substituents each constituted of a hydrocarbon group. This hydrocarbon group is not limited in the kind thereof, and may be an aliphatic hydrocarbon group or an aromatic hydrocarbon group or may be a hydrocarbon group including these two kinds of groups bonded to each other. In the case of an aliphatic hydrocarbon group, this group may be an acyclic or cyclic group or may be a structure including an acyclic moiety and a cyclic moiety bonded thereto. In the case of an acyclic hydrocarbon group, this group may be linear or branched. The hydrocarbon group may be a saturated hydrocarbon group or may have an unsaturated bond.

Examples of the hydrocarbon group include alkyl groups, cycloalkyl groups, and hydrocarbon groups having an unsaturated bond (hereinafter suitably referred to as "unsaturated hydrocarbon groups").

Examples of the alkyl groups include methyl, ethyl, 1-propyl, 1-methylethyl, 1-butyl, 1-methylpropyl, 2-methylpropyl, and 1,1-dimethylethyl.

Preferred of these is methyl or ethyl and the like.

Examples of the cycloalkyl groups include cyclopentyl, 2-methylcyclopentyl, 3-methylcyclopentyl, 2,2-dimethylcyclopentyl, 2,3-dimethylcyclopentyl, 2,4-dimethylcyclopentyl, 2,5-dimethylcyclopentyl, 3,3-dimethylcyclopentyl, 3,4-dimethylcyclopentyl, 2-ethylcyclopentyl, 3-ethylcyclopentyl, cyclohexyl, 2-methylcyclohexyl, 3-methylcyclohexyl, 4-methylcyclohexyl, 2,2-dimethylcyclohexyl, 2,3-dimethylcyclohexyl, 2,4-dimethylcyclohexyl, 2,5-dimethylcyclohexyl, 2,6-dimethylcyclohexyl, 3,4-dimethylcyclohexyl, 3,5-dimethylcyclohexyl, 2-ethylcyclohexyl, 3-ethylcyclohexyl, 4-ethylcyclohexyl, bicyclo[3.2.1]oct-1-yl, and bicyclo[3.2.1]oct-2-yl and the like.

Preferred of these is cyclopentyl or cyclohexyl.

Examples of the unsaturated hydrocarbon groups include vinyl, 1-propen-1-yl, 1-propen-2-yl, allyl, crotyl, ethynyl, propargyl, phenyl, 2-methylphenyl, 3-methylphenyl, 4-methylphenyl, 2,3-dimethylphenyl, xylyl, phenylmethyl, 1-phenylethyl, 2-phenylethyl, diphenylmethyl, triphenylmethyl, and cinnamyl and the like.

Preferred of these is vinyl, allyl, phenyl, phenylmethyl, or 2-phenylethyl.

The hydrocarbon group may be substituted with one or more substituents. The kinds of the substituents are not limited unless the substituents considerably lessen the effects of invention 1. Examples of the substituents include hydroxyl groups, amino groups, nitro groups, cyano groups, carboxyl groups, ether groups, and aldehyde groups. The hydrocarbon group may have been bonded to the cyclic carbonate through an oxygen atom. In the case where the hydrocarbon group has two or more substituents, these substituents may be the same or different.

When any two or more of such hydrocarbon groups are compared, the hydrocarbon groups may be the same or different. When such hydrocarbon groups have a substituent, these substituted hydrocarbon groups including the substituents may be the same or different. Furthermore, any desired two or more of such hydrocarbon groups may be bonded to each other to form a cyclic structure.

The number of carbon atoms of the hydrocarbon group is generally 1 or larger and is generally 20 or smaller, preferably 10 or smaller, more preferably 6 or smaller. When the number of carbon atoms of the hydrocarbon group is too large, the number of moles per unit weight is too small and there are cases where various effects are reduced. In the case where the hydrocarbon group has substituents, the number of carbon atoms of the substituted hydrocarbon group including these substituents is generally within that range.

The cyclic carbonate having a halogen atom may be one which has halogen atoms directly bonded to carbon atoms constituting the cyclic structure or may be one which has halogen atoms bonded to the "substituent constituted of a hydrocarbon group" described above. Alternatively, the cyclic carbonate may be one which has halogen atoms respectively bonded to both of those.

In the case where the structure composed of the "substituent constituted of a hydrocarbon group" and a halogen atom bonded thereto is a halogenated alkyl group, examples thereof include monofluoromethyl, difluoromethyl, trifluoromethyl, 1-fluoroethyl, 2-fluoroethyl, 1,1-difluoroethyl, 1,2-difluoroethyl, 2,2-difluoroethyl, 2,2,2-trifluoroethyl, perfluoroethyl, monochloromethyl, dichloromethyl, trichloromethyl, 1-chloroethyl, 2-chloroethyl, 1,1-dichloroethyl, 1,2-dichloroethyl, 2,2-dichloroethyl, 2,2,2-trichloroethyl, and perchloroethyl and the like.

Preferred of these is monofluoromethyl, difluoromethyl, trifluoromethyl, 2,2-difluoroethyl, 2,2,2-trifluoroethyl, or perfluoroethyl.

In the case where the structure composed of the "substituent constituted of a hydrocarbon group" and a halogen atom bonded thereto is a halogenated cycloalkyl group, examples thereof include 1-fluorocyclopentyl, 2-fluorocyclopentyl, 3-fluorocyclopentyl, difluorocyclopentyl, trifluorocyclopentyl, 1-fluorocyclohexyl, 2-fluorocyclohexyl, 3-fluorocyclohexyl, 4-fluorocyclohexyl, difluorocyclohexyl, trifluorocyclohexyl, 1-chlorocyclopentyl, 2-chlorocyclopentyl, 3-chlorocyclopentyl, dichlorocyclopentyl, trichlorocyclopentyl, 1-chlorocyclohexyl, 2-chlorocyclohexyl, 3-chlorocyclohexyl, 4-chlorocyclohexyl, dichlorocyclohexyl, and trichlorocyclohexyl and the like.

Preferred of these is 1-fluorocyclopentyl, 2-fluorocyclopentyl, 3-fluorocyclopentyl, 1-fluorocyclohexyl, 2-fluorocyclohexyl, 3-fluorocyclohexyl, or 4-fluorocyclohexyl.

In the case where the structure composed of the "substituent constituted of a hydrocarbon group" and a halogen atom bonded thereto is a halogenated unsaturated hydrocarbon group, examples thereof include 1-fluorovinyl, 2-fluorovinyl, 1,2-difluorovinyl, perfluorovinyl, 1-fluoroallyl, 2-fluoroallyl, 3-fluoroallyl, 2-fluorophenyl, 3-fluorophenyl, 4-fluorophenyl, 2,3-difluorophenyl, 2,4-difluorophenyl, 2,5-difluorophenyl, 2,6-difluorophenyl, 3,4-difluorophenyl, 3,5-difluorophenyl, 1-fluoro-1-phenylmethyl, 1,1-difluoro-1-phenylmethyl, (2-fluorophenyl)methyl, (3-fluorophenyl) methyl, (4-fluorophenyl)methyl, (2-fluorophenyl) fluoromethyl, 1-fluoro-2-phenylethyl, 1,1-difluoro-2-phenylethyl, 1,2-fluoro-2-phenylethyl, 2-(2-fluorophenyl) ethyl, 2-(3-fluorophenyl)ethyl, 2-(4-fluorophenyl)ethyl, 1-fluoro-2-(2-fluorophenyl)ethyl, 1-fluoro-2-(2-fluorophenyl)ethyl, 1-chlorovinyl, 2-chlorovinyl, 1,2-dichlorovinyl, perchlorovinyl, 1-chloroallyl, 2-chloroallyl, 3-chloroallyl, 2-chlorophenyl, 3-chlorophenyl, 4-chlorophenyl, 2,3-dichlorophenyl, 2,4-dichlorophenyl, 2,5-dichlorophenyl, 2,6-dichlorophenyl, 3,4-dichlorophenyl, 1,5-dichlorophenyl, 1-chloro-1-phenylmethyl, 1,1-dichloro-1-phenylmethyl, (2-chlorophenyl)methyl, (3-chlorophenyl)methyl, (4-chlorophenyl)methyl, (2-chlorophenyl)chloromethyl, 1-chloro-2-phenylethyl, 1,1-dichloro-2-phenylethyl, 1,2-chloro-2-phenylethyl, 2-(2-chlorophenyl)ethyl, 2-(3-chlorophenyl) ethyl, 2-(4-chlorophenyl)ethyl, 1-chloro-2-(2-chlorophenyl) ethyl, and 1-chloro-2-(2-chlorophenyl)ethyl and the like.

Preferred of these is 2-fluorophenyl, 3-fluorophenyl, 4-fluorophenyl, 2,4-difluorophenyl, 3,5-difluorophenyl, 1-fluoro-1-phenylmethyl, (2-fluorophenyl)methyl, (4-fluorophenyl)methyl, (2-fluorophenyl)fluoromethyl, 1-fluoro-2-phenylethyl, 2-(2-fluorophenyl)ethyl, or 2-(4-fluorophenyl) ethyl.

Specific examples of such cyclic carbonates having a halogen atom include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4-fluoro-5-methylethylene carbonate, 4-chloro-5-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)ethylene carbonate, 4-(chloromethyl)ethylene carbonate, 4-(difluoromethyl)ethylene carbonate, 4-(dichloromethyl) ethylene carbonate, 4-(trifluoromethyl)ethylene carbonate, 4-(trichloromethyl)ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate, and 4,4-dichloro-5,5-dimethylethylene carbonate and the like.

Examples of the "cyclic carbonate having a halogen atom" which has a carbon-carbon unsaturated bond in the ring include fluorovinylene carbonate, 4-fluoro-5-methylvinylene carbonate, 4-fluoro-5-phenylvinylene carbonate, 4-(trifluoromethyl)vinylene carbonate, chlorovinylene carbonate, 4-chloro-5-methylvinylene carbonate, 4-chloro-5-phenylvinylene carbonate, and 4-(trichloromethyl)vinylene carbonate and the like.

Examples of the cyclic carbonate substituted with one or more hydrocarbon groups and having one or more carbon-carbon unsaturated bonds outside the ring include 4-fluoro-4-vinylethylene carbonate, 4-fluoro-5-vinylethylene carbonate, 4,4-difluoro-5-vinylethylene carbonate, 4,5-difluoro-4-vinylethylene carbonate, 4-chloro-5-vinylethylene carbonate, 4,4-dichloro-5-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro- 5-phenylethylene carbonate, 4,4-dichloro-5-phenylethylene carbonate, 4,5-dichloro-4-phenylethylene carbonate, 4,5-difluoro-4,5-diphenylethylene carbonate, 3,5-dichloro-4,5-diphenylethylene carbonate, 4-fluoro-5-vinylvinylene carbonate and, 4-chloro-5-vinylvinylene carbonate and the like.

Preferred of those cyclic carbonates having a halogen atom are the carbonates having a fluorine atom. In particular, fluoroethylene carbonate, 4,4-difluoroethylene carbonate, 4,5-difluoroethylene carbonate, 4-fluoro-4-methylethylene carbonate, 4-fluoro-5-methylethylene carbonate, 4-(fluoromethyl)-ethylene carbonate, or 4-(trifluoromethyl)-ethylene carbonate is more preferred from the standpoints of industrial availability and chemical stability.

The molecular weight of the cyclic carbonate having a halogen atom is not particularly limited, and may be any value unless the effects of invention 1 are considerably lessened thereby. However, the molecular weight thereof is generally 50 or higher, preferably 80 or higher, and is generally 250 or lower, preferably 150 or lower. When the cyclic carbonate has too high a molecular weight, this cyclic carbonate having a halogen atom has reduced solubility in nonaqueous electrolyte 1 and there are cases where it is difficult to sufficiently produce the effects of invention 1.

Processes for producing the cyclic carbonate having a halogen atom also are not particularly limited. The cyclic carbonate can be produced by a known process selected at will.

Any one of those cyclic carbonates having a halogen atom explained above may be contained alone in nonaqueous electrolyte 1 of the invention, or any desired combination of two or more of these may be contained in any desired proportion. The content of the cyclic carbonate(s) having a halogen atom is not particularly limited. However, the content thereof is generally from 0.001% by mass to 100% by mass.

It is thought that the cyclic carbonate having a halogen atom performs different functions according to the content thereof. Factors in this have not been elucidated in detail. Although the scope of invention 1 should not be construed as being limited by the factors, the following is thought. In the case where the cyclic carbonate having a halogen atom is used as an additive in an amount of from 0.001% by mass to 10% by mass based on the whole nonaqueous solvent, this cyclic carbonate is thought to decompose on the surface of the negative electrode to form a protective film for protecting the surface of the negative electrode. On the other hand, in the case where the cyclic carbonate having a halogen atom is used as a nonaqueous solvent in an amount of from 10% by mass to 100% by mass, this cyclic carbonate is thought to not only perform that function of an additive but also perform the function of improving the oxidation resistance of nonaqueous electrolyte 1.

In the case where the cyclic carbonate having a halogen atom is used as an additive, the content thereof is generally 0.001% by mass or higher, preferably 0.01% by mass or higher, and is generally 10% by mass or lower, preferably 5% by mass or lower, based on the whole nonaqueous solvent. When the content thereof is too low, there are cases where the formation of a negative-electrode coating film based on the reductional decomposition of the cyclic carbonate is insufficient, making it impossible to impart sufficient battery characteristics.

In the case where the cyclic carbonate having a halogen atom is used as a nonaqueous solvent, the content thereof is generally 10% by mass or higher, preferably 12% by mass or higher, most preferably 15% by mass or higher, and is generally 100% by mass or lower, preferably 80% by mass or lower, most preferably 50% by mass or lower, based on the whole nonaqueous solvent. When the content thereof is lower than the lower limit, there are cases where the oxidative decomposition of other components of nonaqueous electrolyte 1 which proceeds on the surface of the positive electrode is not inhibited to a desirable degree, making it impossible to produce the effects of invention 1. On the other hand, contents thereof higher than the upper limit result in an increased viscosity of the electrolyte and there are hence cases where the increased viscosity reduces various characteristics of the battery.

The cyclic carbonate having a halogen atom may be used as a mixture with the acyclic carbonate having a halogen atom which will be described later and/or the "nonaqueous solvent other than the carbonates having a halogen atom" which will be described later, in any desired proportion. Examples of combinations in the case of employing such a mixture include:

a cyclic carbonate having a halogen atom and a cyclic carbonate having no halogen atoms; a cyclic carbonate having a halogen atom and an acyclic carbonate having no halogen atoms; a cyclic carbonate having a halogen atom and an acyclic carbonate having a halogen atom; a cyclic carbonate having a halogen atom and a cyclic carboxylic acid ester; a cyclic carbonate having a halogen atom and an acyclic carboxylic acid ester; a cyclic carbonate having a halogen atom and a cyclic ether; a cyclic carbonate having a halogen atom and an acyclic ether; a cyclic carbonate having a halogen atom and a phosphorus-containing organic solvent; a cyclic carbonate having a halogen atom, a cyclic carbonate having no halogen atoms, and an acyclic carbonate having no halogen atoms; a cyclic carbonate having a halogen atom, a cyclic carbonate having no halogen atoms, and an acyclic carbonate having a halogen atom; a cyclic carbonate having a halogen atom, a cyclic carbonate having no halogen atoms, and a cyclic carboxylic acid ester; a cyclic carbonate having a halogen atom, a cyclic carbonate having no halogen atoms, and an acyclic carboxylic acid ester; a cyclic carbonate having a halogen atom, a cyclic carbonate having no halogen atoms, and a cyclic ether; a cyclic carbonate having a halogen atom, a cyclic carbonate having no halogen atoms, and an acyclic ether; a cyclic carbonate having a halogen atom, a cyclic carbonate having no halogen atoms, an acyclic carbonate having no halogen atoms, and an acyclic carbonate having a halogen atom; a cyclic carbonate having a halogen atom, a cyclic carbonate having no halogen atoms, a cyclic carboxylic acid ester, and an acyclic carbonate having no halogen atoms; a cyclic carbonate having a halogen atom, a cyclic carbonate having no halogen atoms, an acyclic carboxylic acid ester, and an acyclic carbonate having no halogen atoms; a cyclic carbonate having a halogen atom, a cyclic carbonate having no halogen atoms, a cyclic ether, and an acyclic carbonate having no halogen atoms; a cyclic carbonate having a halogen atom, a cyclic carbonate having no halogen atoms, an acyclic ether, and an acyclic carbonate having no halogen atoms;

a cyclic carbonate having a halogen atom, a cyclic carbonate having no halogen atoms, a phosphorus-containing organic solvent, and an acyclic carbonate having no halogen atoms;

a cyclic carbonate having a halogen atom, a cyclic carbonate having no halogen atoms, a cyclic carboxylic acid ester, and an acyclic carbonate having a halogen atom; a cyclic carbonate having a halogen atom, a cyclic carbonate having no halogen atoms, a cyclic carboxylic acid ester, and an acyclic carbonate having no halogen atoms; a cyclic carbonate having a halogen atom, a cyclic carbonate having no halogen atoms, a cyclic carboxylic acid ester, and an acyclic carboxylic acid ester; a cyclic carbonate having a halogen atom, a cyclic carbonate having no halogen atoms, a cyclic carboxylic acid ester, and a cyclic ether; a cyclic carbonate having a halogen atom, a cyclic carbonate having no halogen atoms, a cyclic carboxylic acid ester, and a phosphorus-containing organic solvent;

a cyclic carbonate having a halogen atom, a cyclic carbonate having no halogen atoms, a cyclic carboxylic acid ester, an acyclic carbonate having a halogen atom, and an acyclic carbonate having no halogen atoms; a cyclic carbonate having a halogen atom, a cyclic carbonate having no halogen atoms, a cyclic ether, an acyclic carbonate having a halogen atom, and an acyclic carbonate having no halogen atoms; and a cyclic carbonate having a halogen atom, a cyclic carbonate having no halogen atoms, a phosphorus-containing organic solvent, an acyclic carbonate having a halogen atom, and an acyclic carbonate having no halogen atoms and the like.

<1-2-2. Acyclic Carbonate>

The acyclic carbonate to be used as the "carbonate having a halogen atom" in invention 1 is explained below. The acyclic carbonate usually has two hydrocarbon groups, and these hydrocarbon groups may be the same or different. The number of carbon atoms of each of these hydrocarbon groups is preferably 1 or larger, and the upper limit thereof is preferably 10 or smaller, especially preferably 6 or smaller. When the number thereof is outside the range, there are cases where this compound poses a problem concerning the chemical stability and industrial availability thereof.

Examples of the hydrocarbon groups constituting such an acyclic carbonate include ones which are the same as the substituents with which the cyclic carbonate may be substituted, and further include hydrocarbon groups which are the same as the halogenated substituents.

Examples of the acyclic carbonate include dimethyl carbonate, diethyl carbonate, dipropyl carbonate, dibutyl carbonate, divinyl carbonate, diallyl carbonate, diphenyl carbonate, ethyl methyl carbonate, methyl propyl carbonate, butyl methyl carbonate, methyl vinyl carbonate, allyl methyl carbonate, methyl phenyl carbonate, ethyl propyl carbonate, butyl ethyl carbonate, ethyl vinyl carbonate, allyl ethyl carbonate, and ethyl phenyl carbonate and the like.

Preferred of these from the standpoints of industrial availability, etc. are dimethyl carbonate, diethyl carbonate, diphenyl carbonate, ethyl methyl carbonate, methyl vinyl carbonate, ethyl vinyl carbonate, allyl methyl carbonate, allyl ethyl carbonate, methyl phenyl carbonate, ethyl phenyl carbonate, and the like.

Examples of those acyclic carbonates which have been halogenated include fluoromethyl methyl carbonate, difluoromethyl methyl carbonate, trifluoromethyl methyl carbonate, bis(fluoromethyl) carbonate, bis(difluoro)methyl carbonate, bis(trifluoro)methyl carbonate, chloromethyl methyl carbonate, dichloromethyl methyl carbonate, trichloromethyl methyl carbonate, bis(chloromethyl) carbonate, bis(dichloro)methyl carbonate, bis(trichloro)methyl carbonate, 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, 2-chloroethyl methyl carbonate, ethyl chloromethyl carbonate, 2,2-dichloroethyl methyl carbonate, 2-chloroethyl chloromethyl carbonate, ethyl dichloromethyl carbonate, 2,2,2-trichloroethyl methyl carbonate, 2,2-dichloroethyl chloromethyl carbonate, 2-chloroethyl dichloromethyl carbonate, ethyl trichloromethyl carbonate, ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, ethyl 2-chloroethyl carbonate, ethyl 2,2-dichloroethyl carbonate, bis(2-chloroethyl) carbonate, ethyl 2,2,2-trichloroethyl carbonate, 2,2-dichloroethyl-2'-chloroethyl carbonate, bis(2,2-dichloroethyl) carbonate, 2,2,2-trichloroethyl-2'-chloroethyl carbonate, 2,2,2-trichloroethyl-2',2'-dichloroethyl carbonate, bis(2,2,2-trichloroethyl) carbonate, fluoromethyl vinyl carbonate, 2-fluoroethyl vinyl carbonate, 2,2-difluoroethylvinyl carbonate, 2,2,2-trifluoroethyl vinyl carbonate, chloromethyl vinyl carbonate, 2-chloroethyl vinyl carbonate, 2,2-dichloroethyl vinyl carbonate, 2,2,2-trichloroethyl vinyl carbonate, fluoromethyl allyl carbonate, 2-fluoroethyl allyl carbonate, 2,2-difluoroethyl allyl carbonate, 2,2,2-trifluoroethyl allyl carbonate, chloromethyl allyl carbonate, 2-chloroethyl allyl carbonate, 2,2-dichloroethyl allyl carbonate, 2,2,2-trichloroethyl allyl carbonate, fluoromethyl phenyl carbonate, 2-fluoroethyl phenyl carbonate, 2,2-difluoroethyl phenyl carbonate, 2,2,2-trifluoroethyl phenyl carbonate, chloromethyl phenyl carbonate, 2-chloroethyl phenyl carbonate, 2,2-dichloroethyl phenyl carbonate, and 2,2,2-trichloroethyl phenyl carbonate and the like.

Preferred of these acyclic carbonates having a halogen atom are the carbonates having a fluorine atom. In particular, the following carbonates are more preferred from the standpoints of industrial availability and chemical stability: fluoromethyl methyl carbonate, bis(fluoromethyl) carbonate, difluoromethyl methyl carbonate, 2,2-difluoroethyl methyl carbonate, ethyl 2,2-difluoroethyl carbonate, bis(2,2-difluoroethyl) carbonate, 2,2,2-trifluoroethyl methyl carbonate, ethyl 2,2,2-trifluoroethyl carbonate, and bis(2,2,2-trifluoroethyl) carbonate.

The molecular weight of the acyclic carbonate having a halogen atom is not particularly limited, and may be any value unless the effects of invention 1 are considerably lessened thereby. However, the molecular weight thereof is generally 50 or higher, preferably 80 or higher, and is generally 250 or lower, preferably 150 or lower. When the acyclic carbonate has too high a molecular weight, this acyclic carbonate having a halogen atom has reduced solubility in nonaqueous electrolyte 1 and there are cases where it is difficult to sufficiently produce the effects of invention 1.

Processes for producing the acyclic carbonate having a halogen atom also are not particularly limited. The acyclic carbonate can be produced by a known process selected at will.

Any one of those acyclic carbonates having a halogen atom explained above may be contained alone in nonaqueous electrolyte 1 of the invention, or any desired combination of two or more of these may be contained in any desired proportion.

It is thought that the acyclic carbonate having a halogen atom performs different functions according to the content thereof. Factors in this have not been elucidated in detail. Although the scope of invention 1 should not be construed as being limited by the factors, the following is thought. In the case where the acyclic carbonate having a halogen atom is used as an additive in an amount of from 0.001% by mass to 10% by mass based on the whole nonaqueous solvent, this acyclic carbonate is thought to decompose on the surface of the negative electrode to form a protective film for protecting the surface of the negative electrode. On the other hand, in the case where the acyclic carbonate having a halogen atom is used as a nonaqueous solvent in an amount of from 10% by mass to 100% by mass, this acyclic carbonate is thought to not only perform that function of an additive but also perform the function of improving the oxidation resistance of nonaqueous electrolyte 1.

In the case where the acyclic carbonate having a halogen atom is used as an additive, the content thereof is generally 0.001% by mass or higher, preferably 0.01% by mass or higher, and is generally 10% by mass or lower, preferably 5% by mass or lower, based on the whole nonaqueous solvent. When the content thereof is too low, there are cases where the formation of a negative-electrode coating film based on the reductional decomposition of the acyclic carbonate is insufficient, making it impossible to impart sufficient battery characteristics.

In the case where the acyclic carbonate having a halogen atom is used as a nonaqueous solvent, the content thereof is generally 10% by mass or higher, preferably 12% by mass or higher, most preferably 15% by mass or higher, and is generally 100% by mass or lower, preferably 80% by mass or lower, most preferably 50% by mass or lower, based on the whole nonaqueous solvent. When the content thereof is lower than the lower limit, there are cases where the oxidative decomposition of other components of nonaqueous electrolyte 1 which proceeds on the surface of the positive electrode is not inhibited to a desirable degree, making it impossible to produce the effects of invention 1. On the other hand, contents thereof higher than the upper limit result in an increased viscosity of the electrolyte and there are hence cases where the increased viscosity reduces various characteristics of the battery.

The acyclic carbonate having a halogen atom may be used as a mixture with the cyclic carbonate having a halogen atom which was described above and/or the "nonaqueous solvent other than the carbonates having a halogen atom" which will be described later, in any desired proportion. Examples of combinations in the case of employing such a mixture include:

an acyclic carbonate having a halogen atom and a cyclic carbonate having no halogen atoms; an acyclic carbonate having a halogen atom and a cyclic carbonate having a halogen atom; an acyclic carbonate having a halogen atom and a cyclic carboxylic acid ester; an acyclic carbonate having a halogen atom and a phosphorus-containing organic solvent;

an acyclic carbonate having a halogen atom, a cyclic carbonate having no halogen atoms, and an acyclic carbonate; an acyclic carbonate having a halogen atom, a cyclic carbonate having no halogen atoms, and a cyclic carbonate having a halogen atom; an acyclic carbonate having a halogen atom, a cyclic carbonate having no halogen atoms, and a cyclic carboxylic acid ester; an acyclic carbonate having a halogen atom, a cyclic carbonate having no halogen atoms, and a phosphorus-containing organic solvent; an acyclic carbonate having a halogen atom, a cyclic carbonate having a halogen atom, and an acyclic carbonate; an acyclic carbonate having a halogen atom, a cyclic carbonate having a halogen atom, and a cyclic carboxylic acid ester; an acyclic carbonate having a halogen atom, a cyclic carbonate having a halogen atom, and a phosphorus-containing organic solvent; an acyclic carbonate having a halogen atom, a cyclic carbonate having no halogen atoms, an acyclic carbonate, and a cyclic carboxylic acid ester;

an acyclic carbonate having a halogen atom, a cyclic carbonate having no halogen atoms, a cyclic carbonate having a halogen atom, and a cyclic carboxylic acid ester; an acyclic carbonate having a halogen atom, a cyclic carbonate having no halogen atoms, a phosphorus-containing organic solvent, and a cyclic carboxylic acid ester; an acyclic carbonate having a halogen atom, a cyclic carbonate having no halogen atoms, a cyclic carboxylic acid ester, and an acyclic carbonate having no halogen atoms; an acyclic carbonate having a halogen atom, a cyclic carbonate having no halogen atoms, a cyclic ether, and an acyclic carbonate having no halogen atoms; an acyclic carbonate having a halogen atom, a cyclic carbonate having no halogen atoms, a phosphorus-containing organic solvent, and an acyclic carbonate having no halogen atoms;

an acyclic carbonate having a halogen atom, a cyclic carbonate having no halogen atoms, a cyclic carbonate having a halogen atom, and an acyclic carbonate having no halogen atoms; an acyclic carbonate having a halogen atom, a cyclic carbonate having no halogen atoms, a cyclic carbonate having a halogen atom, and a cyclic carboxylic acid ester; an acyclic carbonate having a halogen atom, a cyclic carbonate having no halogen atoms, a cyclic carbonate having a halogen atom, a cyclic carboxylic acid ester, and an acyclic carbonate having no halogen atoms; an acyclic carbonate having a halogen atom, a cyclic carbonate having no halogen atoms, a cyclic carbonate having a halogen atom, a cyclic ether, and an acyclic carbonate having no halogen atoms; and an acyclic carbonate having a halogen atom, a cyclic carbonate having no halogen atoms, a cyclic carbonate having a halogen atom, a phosphorus-containing organic solvent, and an acyclic carbonate having no halogen atoms and the like.

<1-3. Nonaqueous Solvent Other than Carbonates Having Halogen Atom>

The "nonaqueous solvent other than carbonates having a halogen atom" which may be contained in nonaqueous electrolyte 1 of the invention is not particularly limited so long as it is a solvent which, after used to fabricate a battery, exerts no adverse influence on the battery characteristics. However, this solvent preferably is one or more of the following "nonaqueous solvents other than carbonates having a halogen atom".

Examples of the "nonaqueous solvent other than carbonates having a halogen atom" include acyclic or cyclic carbonates, acyclic or cyclic carboxylic acid esters, acyclic or cyclic ethers, phosphorus-containing organic solvents, and sulfur-containing organic solvents and the like.

The acyclic carbonates also are not limited in the kind thereof. However, dialkyl carbonates are preferred. The number of carbon atoms of each constituent alkyl group is preferably 1-5, especially preferably 1-4. Examples thereof include dimethyl carbonate, ethyl methyl carbonate, diethyl carbonate, methyl n-propyl carbonate, ethyl n-propyl carbonate, and di-n-propyl carbonate and the like.

Of these, dimethyl carbonate, ethyl methyl carbonate, or diethyl carbonate is preferred from the standpoint of industrial availability and because these compounds are satisfactory in various properties in a nonaqueous-electrolyte secondary battery.

The cyclic carbonates are not limited in the kind thereof. However, the number of carbon atoms of the alkylene group constituting each cyclic carbonate is preferably 2-6, especially preferably 2-4. Examples of the cyclic carbonates include ethylene carbonate, propylene carbonate, and butylene carbonate (2-ethylethylene carbonate or cis- or trans-2,3-dimethylethylene carbonate) and the like.

Of these, ethylene carbonate or propylene carbonate is preferred because these compounds are satisfactory in various properties in a nonaqueous-electrolyte secondary battery.

The acyclic carboxylic acid esters also are not limited in the kind thereof. Examples thereof include methyl acetate, ethyl acetate, n-propyl acetate, isopropyl acetate, n-butyl acetate, isobutyl acetate, tert-butyl acetate, methyl propionate, ethyl propionate, n-propyl propionate, isopropyl propionate, n-butyl propionate, isobutyl propionate, and tert-butyl propionate and the like.

Of these, ethyl acetate, methyl propionate, or ethyl propionate is preferred from the standpoint of industrial availability and because these compounds are satisfactory in various properties in a nonaqueous-electrolyte secondary battery.

The cyclic carboxylic acid esters also are not limited in the kind thereof. Examples of such esters in ordinary use include γ-butyrolactone, γ-valerolactone, and δ-valerolactone and the like.

Of these, γ-butyrolactone is preferred from the standpoint of industrial availability and because this compound is satisfactory in various properties in a nonaqueous-electrolyte secondary battery.

The acyclic ethers also are not limited in the kind thereof. Examples thereof include dimethoxymethane, dimethoxyethane, diethoxymethane, diethoxyethane, ethoxymethoxymethane, and ethoxymethoxyethane and the like.

Of these, dimethoxyethane or diethoxyethane is preferred from the standpoint of industrial availability and because these compounds are satisfactory in various properties in a nonaqueous-electrolyte secondary battery.

The cyclic ethers also are not limited in the kind thereof. Examples of such ethers in ordinary use include tetrahydrofuran, 2-methyltetrahydrofuran, and tetrahydropyran and the like.

The phosphorus-containing organic solvents also are not particularly limited in the kind thereof. Examples thereof include phosphoric acid esters such as trimethyl phosphate, triethyl phosphate, and triphenyl phosphate; phosphorous acid esters such as trimethyl phosphite, triethyl phosphite, and triphenyl phosphite; and phosphine oxides such as trimethylphosphine oxide, triethylphosphine oxide, and triphenylphosphine oxide and the like.

Furthermore, the sulfur-containing organic solvents also are not particularly limited in the kind thereof. Examples thereof include ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide and the like.

Of those compounds, the acyclic or cyclic carbonates or the acyclic or cyclic carboxylic acid esters are preferred because these compounds are satisfactory in various properties in a nonaqueous-electrolyte secondary battery. More preferred of these is ethylene carbonate, propylene carbonate, dimethyl carbonate, ethyl methyl carbonate, diethyl carbonate, ethyl acetate, methyl propionate, ethyl propionate, or γ-butyrolactone. Especially preferred is dimethyl carbonate, ethyl methyl carbonate, diethyl carbonate, ethyl acetate, methyl propionate, or ethyl propionate.

Those compounds may be used alone or in combination of two or more thereof. It is, however, preferred to use two or more compounds in combination. For example, it is especially preferred to use a high-permittivity solvent, such as a cyclic carbonate, in combination with a low-viscosity solvent, such as an acyclic carbonate or an acyclic ester and the like.

A preferred combination of "nonaqueous solvents other than carbonates having a halogen atom" is a combination consisting mainly of at least one of cyclic carbonates and at least one of acyclic carbonates. In particular, the total proportion of the cyclic carbonate and the acyclic carbonate to the whole nonaqueous solvent is generally 80% by volume or higher, preferably 85% by volume or higher, more preferably 90% by volume or higher. The proportion by volume of the cyclic carbonate to the sum of the cyclic carbonate and the acyclic carbonate is preferably 5% by volume or higher, more preferably 10% by volume or higher, especially preferably 15% by volume or higher, and is generally 50% by volume or lower, preferably 35% by volume or lower, more preferably 30% by volume or lower. Use of such combination of "nonaqueous solvents other than carbonates having a halogen atom" is preferred because the battery fabricated with this combination has an improved balance between cycle characteristics and high-temperature storability (in particular, residual capacity and high-load discharge capacity after high-temperature storage).

Examples of the preferred combination including at least one cyclic carbonate and at least one acyclic carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate and the like.

Combinations obtained by further adding propylene carbonate to those combinations including ethylene carbonate and one or more acyclic carbonates are also included in preferred combinations. In the case where propylene carbonate is contained, the volume ratio of the ethylene carbonate to the propylene carbonate is preferably from 99:1 to 40:60, especially preferably from 95:5 to 50:50. It is also preferred to regulate the proportion of the propylene carbonate to the whole nonaqueous solvent to a value which is 0.1% by volume or higher, preferably 1% by volume or higher, more preferably 2% by volume or higher, and is generally 10% by volume or lower, preferably 8% by volume or lower, more preferably 5% by volume or lower. This is because this regulation brings about excellent discharge load characteristics while maintaining the properties of the combination of ethylene carbonate and one or more acyclic carbonates.

More preferred of these are combinations including an asymmetric acyclic carbonate. In particular, combinations including ethylene carbonate, a symmetric acyclic carbonate, and an asymmetric acyclic carbonate, such as a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, or such combinations which further contain propylene carbonate are preferred because these combinations have a satisfactory balance between cycle characteristics and discharge load characteristics. Preferred of such combinations are ones in which the asymmetric acyclic carbonate is ethyl methyl carbonate. Furthermore, the number of carbon atoms of each of the alkyl groups constituting each dialkyl carbonate is preferably 1-2.

Other examples of preferred mixed solvents are ones containing an acyclic ester. In particular, the cyclic carbonate/acyclic carbonate mixed solvents which contain an acyclic ester are preferred from the standpoint of improving the low-temperature characteristics of a battery. The acyclic ester especially preferably is ethyl acetate or methyl propionate. The proportion by volume of the acyclic ester to the whole nonaqueous solvent is generally 5% or higher, preferably 8% or higher, more preferably 15% or higher, and is generally 50% or lower, preferably 35% or lower, more preferably 30% or lower, even more preferably 25% or lower.

Other preferred examples of the "nonaqueous solvent other than carbonates having a halogen atom" are ones in which one organic solvent selected from the group consisting of ethylene carbonate, propylene carbonate, butylene carbonate, γ-butyrolactone, and γ-valerolactone or a mixed solvent composed of two or more organic solvents selected from the group accounts for at least 60% by volume of the whole. Such mixed solvents have a flash point of preferably 50° C. or higher, especially preferably 70° C. or higher. Nonaqueous electrolyte 1 employing this solvent is reduced in solvent vaporization and liquid leakage even when used at high temperatures. In particular, when such a nonaqueous solvent which includes ethylene carbonate and γ-butyrolactone in a total amount of 80% by volume or larger, preferably 90% by volume or larger, based on the whole nonaqueous solvent and in which the volume ratio of the ethylene carbonate to the γ-butyrolactone is from 5:95 to 45:55 or such a nonaqueous solvent which includes ethylene carbonate and propylene carbonate in a total amount of 80% by volume or larger, preferably 90% by volume or larger, based on the whole nonaqueous solvent and in which the volume ratio of the ethylene carbonate to the propylene carbonate is from 30:70 to 80:20 is used, then an improved balance between cycle characteristics and discharge load characteristics, etc. is generally obtained.

<1-3. Monofluorophosphate and Difluorophosphate>

Nonaqueous electrolyte 1 of the invention contains a monofluorophosphate and/or a difluorophosphate as an essential component. The "monofluorophosphate and/or difluorophosphate" to be used in the invention is not particularly limited in the kind thereof so long as this ingredient is constituted of one or more monofluorophosphate ions and/or difluorophosphate ions and one or more cations. However, this ingredient must be selected in view of the necessity of finally producing a nonaqueous electrolyte usable as the electrolyte of a nonaqueous-electrolyte secondary battery to be used.

It is therefore preferred that the monofluorophosphate and/or difluorophosphate in the invention should be a salt of one or more monofluorophosphate ions and/or difluorophosphate ions with one or more ions of at least one metal selected from Group 1, Group 2, and Group 13 of the periodic table (hereinafter suitably referred to as "specific metal") or with a quaternary onium. The monofluorophosphate and/or difluorophosphate may be one salt or may be any desired combination of two or more salts.

<1-3-1. Monofluorophosphoric Acid Metal Salt and Difluorophosphoric Acid Metal Salt>

First, an explanation is given on the case where the monofluorophosphate and difluorophosphate in the invention are a salt of one or more monofluorophosphate ions or one or more difluorophosphate ions with one or more specific-metal ions (hereinafter sometimes referred to as "monofluorophosphoric acid metal salt" and "difluorophosphoric acid metal salt", respectively).

Examples of the metals in Group 1 of the periodic table among the specific metals usable in the monofluorophosphoric acid metal salt and difluorophosphoric acid metal salt in the invention include lithium, sodium, potassium, and cesium. Preferred of these is lithium or sodium. Lithium is especially preferred.

Examples of the metals in Group 2 of the periodic table include magnesium, calcium, strontium, and barium. Preferred of these is magnesium or calcium. Magnesium is especially preferred.

Examples of the metals in Group 13 of the periodic table include aluminum, gallium, indium, and thallium. Preferred of these is aluminum or gallium. Aluminum is especially preferred.

The number of the atoms of such a specific metal possessed by one molecule of the monofluorophosphoric acid metal salt or difluorophosphoric acid metal salt in the invention is not limited. The salt may have only one atom of the specific metal or two or more atoms thereof.

In the case where the monofluorophosphoric acid metal salt or the difluorophosphoric acid metal salt in the invention has two or more specific-metal atoms per molecule, these specific-metal atoms may be of the same kind or may be of different kinds. Besides the specific metal(s), one or more atoms of a metal other than the specific metals may be possessed.

Examples of the monofluorophosphoric acid metal salt and difluorophosphoric acid metal salt include $Li_2PO_3F$, $Na_2PO_3F$, $MgPO_3F$, $CaPO_3F$, $Al_2(PO_3F)_3$, $Ga_2(PO_3F)_3$, $LiPO_2F_2$, $NaPO_2F_2$, $Mg(PO_2F_2)_2$, $Ca(PO_2F_2)_2$, $Al(PO_2F_2)_3$, and $Ga(PO_2F_2)_3$. Preferred of these are $Li_2PO_3F$, $LiPO_2F_2$, $NaPO_2F_2$, and $Mg(PO_2F_2)_2$ and the like.

<1-3-2. Monofluorophosphoric Acid Quaternary Onium Salt and Difluorophosphoric Acid Quaternary Onium Salt>

An explanation is then given on the case where the monofluorophosphate and difluorophosphate in invention 1 to invention 6 are a salt of a monofluorophosphate ion or difluorophosphate ion with a quaternary onium (hereinafter sometimes referred to as "monofluorophosphoric acid quaternary onium salt" and "difluorophosphoric acid quaternary onium salt", respectively).

The quaternary onium used in the monofluorophosphoric acid quaternary onium salt and difluorophosphoric acid quaternary onium salt in invention 1 to invention 6 usually is a cation. Examples thereof include cations represented by the following general formula (1).

[Chemical Formula-3]

In general formula (1), $R^1$ to $R^4$ each independently represent a hydrocarbon group. The kind of this hydrocarbon group is not limited. Namely, the hydrocarbon group may be an aliphatic hydrocarbon group or an aromatic hydrocarbon group, or may be a hydrocarbon group including these two kinds of groups bonded to each other. In the case of an aliphatic hydrocarbon group, this group may be an acyclic or cyclic group or may be a structure including an acyclic moiety and a cyclic moiety bonded thereto. In the case of an acyclic hydrocarbon group, this group may be linear or branched. The hydrocarbon group may be a saturated hydrocarbon group or may have an unsaturated bond.

Examples of the hydrocarbon groups represented by $R^1$ to $R^4$ include alkyl groups, cycloalkyl groups, aryl groups, and aralkyl groups, and the like.

Examples of the alkyl groups include methyl, ethyl, 1-propyl, 1-methylethyl, 1-butyl, 1-methylpropyl, 2-methylpropyl, and 1,1-dimethylethyl.

Preferred of these are methyl, ethyl, 1-propyl, 1-butyl, and the like.

Examples of the cycloalkyl groups include cyclopentyl, 2-methylcyclopentyl, 3-methylcyclopentyl, 2,2-dimethylcyclopentyl, 2,3-dimethylcyclopentyl, 2,4-dimethylcyclopentyl, 2,5-dimethylcyclopentyl, 3,3-dimethylcyclopentyl, 3,4-dimethylcyclopentyl, 2-ethylcyclopentyl, 3-ethylcyclopentyl, cyclohexyl, 2-methylcyclohexyl, 3-methylcyclohexyl, 4-methylcyclohexyl, 2,2-dimethylcyclohexyl, 2,3-dimethylcyclohexyl, 2,4-dimethylcyclohexyl, 2,5-dimethylcyclohexyl, 2,6-dimethylcyclohexyl, 3,4-dimethylcyclohexyl, 3,5-dimethylcyclohexyl, 2-ethylcyclohexyl, 3-ethylcyclohexyl, 4-ethylcyclohexyl, bicyclo[3.2.1]oct-1-yl, and bicyclo[3.2.1]oct-2-yl, and the like.

Preferred of these are cyclopentyl, 2-methylcyclopentyl, 3-methylcyclopentyl, cyclohexyl, 2-methylcyclohexyl, 3-methylcyclohexyl, 4-methylcyclohexyl, and the like.

Examples of the aryl groups include phenyl, 2-methylphenyl, 3-methylphenyl, 4-methylphenyl, and 2,3-dimethylphenyl, and the like.

Preferred of these is phenyl.

Examples of the aralkyl groups include phenylmethyl, 1-phenylethyl, 2-phenylethyl, diphenylmethyl, and triphenylmethyl and the like.

Preferred of these are phenylmethyl and 2-phenylethyl.

The hydrocarbon groups represented by $R^1$ to $R^4$ each may be substituted with one or more substituents. The kinds of the substituents are not limited unless the substituents considerably lessen the effects of invention 1. Examples of the substituents include halogen atoms, hydroxyl, amino, nitro, cyano, carboxyl, ether groups, and aldehyde groups. In the case where the hydrocarbon group represented by each of $R^1$ to $R^4$ has two or more substituents, these substituents may be the same or different.

When any two or more of the hydrocarbon groups represented by $R^1$ to $R^4$ are compared, the hydrocarbon groups may be the same or different. When the hydrocarbon groups represented by $R^1$ to $R^4$ have a substituent, these substituted hydrocarbon groups including the substituents may be the same or different. Furthermore, any desired two or more of the hydrocarbon groups represented by $R^1$ to $R^4$ may be bonded to each other to form a cyclic structure.

The number of carbon atoms of each of the hydrocarbon groups represented by $R^1$ to $R^4$ is generally 1 or larger, and the upper limit thereof is generally 20 or smaller, preferably 10 or smaller, more preferably 5 or smaller. When the number of carbon atoms thereof is too large, the number of moles per unit mass is too small and various effects tend to be reduced. In the case where the hydrocarbon group represented by each of $R^1$ to $R^4$ has substituents, the number of carbon atoms of the substituted hydrocarbon group including these substituents is generally within that range.

In general formula (1), Q represents an atom belonging to Group 15 of the periodic table. Preferred of such atoms is a nitrogen atom or phosphorus atom.

In view of the above explanation, preferred examples of the quaternary onium represented by general formula (1) include aliphatic acyclic quaternary salts, alicyclic ammoniums, alicyclic phosphoniums, and nitrogen-containing heterocyclic aromatic cations.

Especially preferred of the aliphatic acyclic quaternary salts are tetraalkylammoniums, tetraalkylphosphoniums, and the like.

Examples of the tetraalkylammoniums include tetramethylammonium, ethyltrimethylammonium, diethyldimethylammonium, triethylmethylammonium, tetraethylammonium, and tetra-n-butylammonium, and the like.

Examples of the tetraalkylphosphoniums include tetramethylphosphonium, ethyltrimethylphosphonium, diethyldimethylphosphonium, triethylmethylphosphonium, tetraethylphosphonium, and tetra-n-butylphosphonium, and the like.

Especially preferred of the alicyclic ammoniums are pyrrolidiniums, morpholiniums, imidazoliniums, tetrahydropyrimidiniums, piperaziniums, piperidiniums, and the like.

Examples of the pyrrolidiniums include N,N-dimethylpyrrolidium, N-ethyl-N-methylpyrrolidium, and N,N-diethylpyrrolidium, and the like.

Examples of the morpholiniums include N,N-dimethylmorpholinium, N-ethyl-N-methylmorpholinium, and N,N-diethylmorpholinium, and the like.

Examples of the imidazoliniums include N,N'-dimethylimidazolinium, N-ethyl-N'-methylimidazolinium, N,N'-diethylimidazolinium, and 1,2,3-trimehylimidazolinium, and the like.

Examples of the tetrahydropyrimidiniums include N,N'-dimethyltetrahydropyrimidinium, N-ethyl-N'-methyltetrahydropyrimidinium, N,N'-diethyltetrahydropyrimidinium, and 1,2,3-trimehyltetrahydropyrimidinium, and the like.

Examples of the piperaziniums include N,N,N',N'-tetramethylpiperazinium, N-ethyl-N,N',N'-trimethylpiperazinium, N,N-diethyl-N',N'-dimethylpiperazinium, N,N,N'-triethyl-N'-methylpiperazinium, and N,N,N',N'-tetraethylpiperazinium, and the like.

Examples of the piperidiniums include N,N-dimethylpiperidinium, N-ethyl-N-methylpiperidinium, and N,N-diethylpiperidinium, and the like.

Especially preferred of the nitrogen-containing heterocyclic aromatic cations are pyridiniums, imidazoliums, and the like.

Examples of the pyridiniums include N-methylpyridinium, N-ethylpyridinium, 1,2-dimethylpyrimidinium, 1,3-dimethylpyrimidinium, 1,4-dimethylpyrimidinium, and 1-ethyl-2-methylpyrimidinium, and the like.

Examples of the imidazoliums include N,N'-dimethylimidazolium, N-ethyl-N'-methylimidazolium, N,N'-diethylimidazolium, and 1,2,3-trimehylimidazolium and the like.

Namely, the salts of the quaternary oniums enumerated above with the monofluorophosphate ions and/or difluorophosphate ions enumerated above are preferred examples of the monofluorophosphoric acid quaternary onium salt and difluorophosphoric acid quaternary onium salt in the invention.

<1-3-3. Content, Detection (Derivation of Containment), Technical Range, etc.>

In the nonaqueous electrolyte of the invention, one monofluorophosphate or difluorophosphate only may be used or any desired combination of two or more monofluorophosphates and/or difluorophosphates may be used in any desired proportion. However, from the standpoint of efficiently operating the nonaqueous-electrolyte secondary battery, it is preferred to use one monofluorophosphate or difluorophosphate.

The molecular weight of the monofluorophosphate or difluorophosphate is not limited, and may be any desired value unless this considerably lessens the effects of the invention. However, the molecular weight thereof is generally 100 or higher. There is no particular upper limit on the molecular weight thereof. However, it is preferred that the molecular weight thereof should be generally 1,000 or lower, preferably 500 or lower, because such a value is practicable in view of the reactivity of this reaction.

Usually, one salt of monofluorophosphoric acid or one salt of difluorophosphoric acid is used. However, in the case where it is preferred to use a mixture of two or more salts in the nonaqueous electrolyte to be prepared, a mixture of two or more of monofluorophosphates and difluorophosphates may be used.

The molecular weight of the monofluorophosphate or difluorophosphate is not limited, and may be any desired value unless this considerably lessens the effects of the invention. However, the molecular weight thereof is generally 150 or higher. There is no particular upper limit on the molecular weight thereof. However, it is preferred that the molecular weight thereof should be generally 1,000 or lower, preferably 500 or lower, because such a value is practicable in view of the reactivity of this reaction.

The proportion of the monofluorophosphate and difluorophosphate in the nonaqueous electrolyte is preferably 10 ppm or higher (0.001% by mass or higher), more preferably 0.01% by mass or higher, especially preferably 0.05% by mass or higher, even more preferably 0.1% by mass or higher, in terms of the total content of the salts based on the whole nonaqueous electrolyte. The upper limit of the proportion of the sum of the salts is preferably 5% by mass or lower, more preferably 4% by mass or lower, even more preferably 3% by mass or lower. When the concentration of the monofluorophosphate and the difluorophosphate is too low, there are cases where the effect of improving discharge load characteristics is difficult to obtain. On the other hand, too high concentrations thereof may lead to a decrease in charge/discharge efficiency.

When a nonaqueous electrolyte containing a monofluorophosphate and a difluorophosphate is subjected to the actual fabrication of a nonaqueous-electrolyte secondary battery and the battery is disassembled to discharge the nonaqueous electrolyte again, then there are often cases where the content of the salts in this nonaqueous electrolyte has decreased considerably. Consequently, the nonaqueous electrolyte discharged from a battery can be regarded as included in the invention when at least one monofluorophosphate and/or difluorophosphate can be detected in the electrolyte even in a slight amount. Furthermore, even when a nonaqueous electrolyte containing a monofluorophosphate and a difluorophosphate is subjected to the actual fabrication of a nonaqueous-electrolyte secondary battery and the nonaqueous electrolyte recovered by disassembling this battery and discharging the nonaqueous electrolyte therefrom does not contain the monofluorophosphate and/or difluorophosphate, then there are often cases where the phosphoric acid salt is detected on the positive electrode, negative electrode, or separator as another constituent member of the nonaqueous-electrolyte secondary battery. Consequently, when at least one monofluorophosphate and/or difluorophosphate has been detected in at least one constituent member selected from the positive electrode, negative electrode, and separator, this case also is regarded as included in the invention.

Moreover, when a monofluorophosphate and/or a difluorophosphate has been incorporated into a nonaqueous electrolyte and has further been incorporated into at least one constituted member selected from the positive electrode, negative electrode, and separator, this case also is regarded as included in the invention.

On the other hand, a monofluorophosphate and/or a difluorophosphate may be incorporated beforehand into an inner part, or the surface of the positive electrode of a nonaqueous-electrolyte secondary battery to be fabricated. In this case, part or the whole of the monofluorophosphate and/or difluorophosphate which has been incorporated beforehand is expected to dissolve in the nonaqueous electrolyte to perform, the function thereof. This case also is regarded as included in the invention.

Techniques for incorporating the salt beforehand into an inner part of a positive electrode or into the surface of a positive electrode are not particularly limited. Examples thereof include: a method in which a monofluorophosphate and/or a difluorophosphate is dissolved beforehand in a slurry to be prepared in the production of a positive electrode which will be described later; and a method in which a solution prepared by dissolving a monofluorophosphate and/or a difluorophosphate in any desired nonaqueous solvent beforehand is applied to or infiltrated into a positive electrode which has been produced, and this electrode is dried to remove the solvent used and thereby incorporate the salt.

Furthermore, use may be made of a method in which a nonaqueous-electrolyte secondary battery is actually fabricated using a nonaqueous electrolyte containing at least one monofluorophosphate and/or difluorophosphate so that the salt is incorporated into an inner part of the positive electrode or the surface of the positive electrode from the nonaqueous electrolyte. Since the nonaqueous electrolyte is infiltrated into the positive electrode in fabricated a nonaqueous-electrolyte secondary battery, there are often cases where the monofluorophosphate and difluorophosphate are contained in an inner part of the positive electrode or in the surface of the positive electrode. Because of this, when at least a monofluorophosphate and/or a difluorophosphate can be detected in the positive electrode recovered from a disassembled battery, this case is regarded as included in the invention.

A monofluorophosphate and a difluorophosphate may be incorporated beforehand into an inner part or the surface of the negative electrode of a nonaqueous-electrolyte secondary battery to be fabricated. In this case, part or the whole of the monofluorophosphate and/or difluorophosphate which has been incorporated beforehand is expected to dissolve in the nonaqueous electrolyte to perform the function thereof. This case is regarded as included in the invention. Techniques for incorporating the salt beforehand into an inner part of a negative electrode or into the surface of a negative electrode are not particularly limited. Examples thereof include: a method in which a monofluorophosphate and a difluorophosphate are dissolved beforehand in a slurry to be prepared in the production of a negative electrode which will be described later; and a method in which a solution prepared by dissolving a monofluorophosphate and a difluorophosphate in any desired nonaqueous solvent beforehand is applied to or infiltrated into a negative electrode which has been produced, and this electrode is dried to remove the solvent used and thereby incorporate the salt.

Furthermore, use may be made of a method in which a nonaqueous-electrolyte secondary battery is actually fabricated using a nonaqueous electrolyte containing at least one monofluorophosphate and difluorophosphate so that the salt is incorporated into an inner part of the negative electrode or the surface of the negative electrode from the nonaqueous electrolyte. Since the nonaqueous electrolyte is infiltrated into the negative electrode in fabricated a nonaqueous-electrolyte secondary battery, there are often cases where the monofluorophosphate and difluorophosphate are contained in an inner part of the negative electrode or in the surface of the negative electrode. Because of this, when at least a monofluorophosphate and a difluorophosphate can be detected in the negative electrode recovered from a disassembled battery, this case is regarded as included in the invention.

A monofluorophosphate and/or a difluorophosphate may also be incorporated beforehand into an inner part or the surface of the separator of a nonaqueous-electrolyte secondary battery to be fabricated. In this case, part or the whole of the monofluorophosphate and difluorophosphate which nave been incorporated beforehand is expected to dissolve in the nonaqueous electrolyte to perform the function thereof. This case is regarded as included in the invention. Techniques for incorporating the salts beforehand into an inner part of a separator or into the surface of a separator are not particularly limited. Examples thereof include: a method in which a monofluorophosphate and a difluorophosphate are mixed beforehand during separator production; and a method in which a solution prepared by dissolving a monofluorophosphate and a difluorophosphate in any desired nonaqueous solvent beforehand is applied to or infiltrated into a separator to be subjected to the fabrication of a nonaqueous-electrolyte secondary battery, and this separator is dried to remove the solvent used and thereby incorporate the salt.

Furthermore, use may be made of a method in which a nonaqueous-electrolyte secondary battery is actually fabricated using a nonaqueous electrolyte containing a monofluorophosphate and/or a difluorophosphate so that the salt is incorporated into an inner part of the separator or the surface of the separator from the nonaqueous electrolyte. Since the nonaqueous electrolyte is infiltrated into the separator in fabricated a nonaqueous-electrolyte secondary battery, there are often cases where the monofluorophosphate and difluorophosphate are contained in an inner part of the separator or in the surface of the separator. Because of this, when at least a monofluorophosphate and a difluorophosphate can be detected in the separator recovered from a disassembled battery, this case is regarded as included in the invention.

It is thought that when the monofluorophosphate and difluorophosphate are incorporated into a nonaqueous electrolyte together with a carbonate having a halogen atom, this nonaqueous electrolyte can improve the high-temperature storability of a nonaqueous-electrolyte secondary battery employing the nonaqueous electrolyte. Factors in this have not been elucidated in detail. Although the scope of the invention is not construed as being limited by the factors, the following is thought. The monofluorophosphate and/or difluorophosphate contained in the nonaqueous electrolyte is thought to react with the carbonate having a halogen atom contained therein to thereby form a satisfactory protective coating layer on the surface of the negative-electrode active material, and this protective coating layer is thought to inhibit side reactions to inhibit the deterioration caused by high-temperature storage. It is also thought that the coexistence of the monofluorophosphate and/or difluorophosphate and the carbonate having a halogen atom in the electrolyte contributes to an improvement in the properties of the protective coating film in some way.

<1-4. Additives>

The nonaqueous electrolyte of invention 1 may contain various additives so long as these additives do not considerably lessen the effects of invention 1. In the case where additives are additionally incorporated to prepare the nonaqueous electrolyte, conventionally known additives can be used at will. One additive may be used alone, or any desired combination of two or more additives may be used in any desired proportion.

Examples of the additives include overcharge inhibitors and aids for improving capacity retentivity and cycle characteristics after high-temperature storage. It is preferred to add a carbonate having an unsaturated bond (hereinafter sometimes referred to as "specific carbonate") as an aid for improving capacity retentivity and cycle characteristics after high-temperature storage, among those additives. The specific carbonate and other additives are separately explained below.

<1-4-1. Specific Carbonate>

The specific carbonate is a carbonate having an unsaturated bond. The specific carbonate may have a halogen atom.

The molecular weight of the specific carbonate is not particularly limited, and may be any desired value unless this considerably lessens the effects of invention 1. However, the molecular weight thereof is generally 50 or higher, preferably 80 or higher, and is generally 250 or lower, preferably 150 or lower. When the molecular weight thereof is too high, this specific carbonate has reduced solubility in the nonaqueous electrolyte and there are cases where the effect of the carbonate is difficult to produce sufficiently.

Processes for producing the specific carbonate also are not particularly limited, and a known process selected at will can be used to produce the carbonate.

Any one specific carbonate may be incorporated alone into the nonaqueous electrolyte of invention 1, or any desired combination of two or more specific carbonates may be incorporated thereinto in any desired proportion.

The amount of the specific carbonate to be incorporated into the nonaqueous electrolyte of invention 1 is not limited, and may be any desired value unless this considerably lessens the effects of invention 1. It is, however, desirable that the specific carbonate should be incorporated in a concentration which is generally 0.01% by mass or higher, preferably 0.1% by mass or higher, more preferably 0.3% by mass or higher, and is generally 70% by mass or lower, preferably 50% by mass or lower, more preferably 40% by mass or lower, based on the nonaqueous electrolyte of invention 1.

When the amount of the specific carbonate is below the lower limit of that range, there are cases where use of this nonaqueous electrolyte of invention 1 in a nonaqueous-electrolyte secondary battery results in difficulties in producing the effect of sufficiently improving the cycle characteristics of the nonaqueous-electrolyte secondary battery. On the other hand, when the proportion of the specific carbonate is too high, there is a tendency that use of this nonaqueous electrolyte of invention 1 in a nonaqueous-electrolyte secondary battery results in decreases in the high-temperature storability and continuous-charge characteristics of the nonaqueous-electrolyte secondary battery. In particular, there are cases where gas evolution is enhanced and capacity retentivity decreases.

The specific carbonate according to invention 1 is not limited so long as it is a carbonate having one or more carbon-carbon unsaturated bonds, e.g., carbon-carbon double bonds or carbon-carbon triple bonds. Any desired unsaturated carbonates may be used. Incidentally, carbonates having one or more aromatic rings are included in the carbonate having an unsaturated bond.

Examples of the unsaturated carbonate include vinylene carbonate and derivatives thereof, ethylene carbonate derivatives substituted with one or more aromatic rings or with one or more substituents having a carbon-carbon unsaturated bond, phenyl carbonates, vinyl carbonates, and allyl carbonates, and the like.

Examples of the vinylene carbonate and derivatives there of include vinylene carbonate, methylvinylene carbonate, 4,5-dimethylvinylene carbonate, phenylvinylene carbonate, 4,5-diphenylvinylene carbonate, and catechol carbonate, and the like.

Examples of the ethylene carbonate derivatives substituted with one or more aromatic rings or with one or more substituents having a carbon-carbon unsaturated bond include vinylethylene carbonate, 4,5-divinylethylene carbonate, phenylethylene carbonate, and 4,5-diphenylethylene carbonate, and the like.

Examples of the phenyl carbonates include diphenyl carbonate, ethyl phenyl carbonate, methyl phenyl carbonate, and t-butyl phenyl carbonate, and the like.

Examples of the vinyl carbonates include divinyl carbonate and methyl vinyl carbonate, and the like.

Examples of the allyl carbonates include diallyl carbonate and allyl methyl carbonate.

Preferred of these specific carbonates are the vinylene carbonate and derivatives thereof and the ethylene derivatives substituted with one or more aromatic rings or with one or more substituents having a carbon-carbon unsaturated bond. In particular, vinylene carbonate, 4,5-diphenylvinylene carbonate, 4,5-dimethylvinylene carbonate, and vinylethylene carbonate are more preferred because these carbonates form a stable interface-protective coating film.

<1-4-2. Other Additives>

Additives other than the specific carbonate are explained below. Examples of the additives other than the specific carbonate include overcharge inhibitors and aids for improving capacity retentivity and cycle characteristics after high-temperature storage.

<1-4-2-1. Overcharge Inhibitors>

Examples of the overcharge inhibitors include aromatic compounds including: toluene derivatives thereof, such as toluene and xylene; unsubstituted biphenyl or alkyl-substituted biphenyl derivatives, such as biphenyl, 2-methylbiphenyl, 3-methylbiphenyl, and 4-methylbiphenyl; unsubstituted terphenyls or alkyl-substituted terphenyl derivatives, such as o-terphenyl, m-terphenyl, and p-terphenyl; partly hydrogenated unsubstituted terphenyls or partly hydrogenated alkyl-substituted terphenyl derivatives; cycloalkylbenzenes and derivatives thereof, such as cyclopentylbenzene and cyclohexylbenzene; alkylbenzene derivatives having one or more tertiary carbon, atoms directly bonded to the benzene ring, such as cumene, 1,3-diisopropylbenzene, and 1,4-diisopropylbenzene; alkylbenzene derivatives having a quaternary carbon atom directly bonded to the benzene ring, such as t-butylbenzene, t-amylbenzene, and t-hexylbenzene; and aromatic compounds having an oxygen atom, such as diphenyl ether and dibenzofuran, and the like.

Other examples of the overcharge inhibitors include products of the partial fluorination of aromatic compounds shown above, such as fluorobenzene, fluorotoluene, benzotrifluoride, 2-fluorobiphenyl, o-cyclohexylfluorobenzene, and p-cyclohexylfluorobenzene; and fluorine-containing anisole compounds such as 2,4-difluoroanisole, 2,5-difluoroanisole, and 1,6-difluoroanisole, and the like.

One of those overcharge inhibitors may be used alone, or any desired combination of two or more thereof may be used in any desired proportion. In the case of employing any desired combination, compounds in the same class among those enumerated above may be used in combination or compounds in different classes may be used in combination.

Examples of the case where compounds in different classes are used in combination include a toluene derivative and a biphenyl derivative; a toluene derivative and a terphenyl derivative; a toluene derivative and a partly hydrogenated terphenyl derivative; a toluene derivative and a cycloalkylbenzene derivative; a toluene derivative and an alkylbenzene derivative having one or more tertiary carbon atoms directly bonded to the benzene ring; a toluene derivative and an alkylbenzene derivative having a quaternary carbon atom directly bonded to the benzene ring; a toluene derivative and an aromatic compound having an oxygen atom; a toluene derivative and a partly fluorinated aromatic compound; a toluene derivative and a fluorine-containing anisole compound; a biphenyl derivative and a terphenyl derivative; a biphenyl derivative and a partly hydrogenated terphenyl derivative; a biphenyl derivative and a cycloalkylbenzene derivative; a biphenyl derivative and an alkylbenzene derivative having one or more tertiary carbon atoms directly bonded to the benzene ring; a biphenyl derivative and an alkylbenzene derivative having a quaternary carbon atom directly bonded to the benzene ring; a biphenyl derivative and an aromatic compound having an oxygen atom; a biphenyl derivative and a partly fluorinated aromatic compound; a biphenyl derivative and a fluorine-containing anisole compound; a terphenyl derivative and a partly hydrogenated terphenyl derivative; a terphenyl derivative and a cycloalkylbenzene derivative; a terphenyl derivative and an alkylbenzene derivative having one or more tertiary carbon atoms directly bonded to the benzene ring; a terphenyl derivative and an alkylbenzene derivative having a quaternary carbon atom directly bonded to the benzene ring; a terphenyl derivative and an aromatic compound having an oxygen atom; a terphenyl derivative and a partly fluorinated aromatic compound; a terphenyl derivative and a fluorine-containing anisole compound; a partly hydrogenated terphenyl derivative and a cycloalkylbenzene derivative; a partly hydrogenated terphenyl derivative and an alkylbenzene derivative having one or more tertiary carbon atoms directly bonded to the benzene ring; a partly hydrogenated terphenyl derivative and an alkylbenzene derivative having a quaternary carbon atom directly bonded to the benzene ring; a partly hydrogenated terphenyl derivative and an aromatic compound having an oxygen atom; a partly hydrogenated terphenyl derivative and a partly fluorinated aromatic compound; a partly hydrogenated terphenyl derivative and a fluorine-containing anisole compound; a cycloalkylbenzene derivative and an alkylbenzene derivative having one or more tertiary carbon atoms directly bonded to the benzene ring; a cycloalkylbenzene derivative and an alkylbenzene derivative having a quaternary carbon atom directly bonded to the benzene ring; a cycloalkylbenzene derivative and an aromatic compound having an oxygen atom; a cycloalkylbenzene derivative and a partly fluorinated aromatic compound; a cycloalkylbenzene derivative and a fluorine-containing anisole compound; an alkylbenzene derivative having one or more tertiary carbon atoms directly bonded to the benzene ring and an alkylbenzene derivative having a quaternary carbon atom directly bonded to the benzene ring; an alkylbenzene derivative having one or more tertiary carbon atoms directly bonded to the benzene ring and an aromatic compound having an oxygen atom; an alkylbenzene derivative having one or more tertiary carbon atoms directly bonded to the benzene ring and a partly fluorinated aromatic compound; an alkylbenzene derivative having one or more tertiary carbon atoms directly bonded to the benzene ring and a fluorine-containing anisole compound; an alkylbenzene derivative having a quaternary carbon atom directly bonded to the benzene ring and an aromatic compound having an oxygen atom; an alkylbenzene derivative having a quaternary carbon atom directly bonded to the benzene ring and a partly fluorinated aromatic compound; an alkylbenzene derivative having a quaternary carbon atom directly bonded to the benzene ring and a fluorine-containing anisole compound; an aromatic compound having an oxygen atom and a partly fluorinated aromatic compound; an aromatic compound having an oxygen atom and a fluorine-containing anisole compound; and a partly fluorinated aromatic compound and a fluorine-containing anisole compound.

Specific examples thereof include a combination of biphenyl and o-terphenyl, a combination of biphenyl and m-terphenyl, a combination of biphenyl and a partly hydrogenated terphenyl derivative, a combination of biphenyl and cumene, a combination of biphenyl and cyclopentylbenzene, a combination of biphenyl and cyclohexylbenzene, a combination of biphenyl and t-butylbenzene, a combination of biphenyl and t-amylbenzene, a combination of biphenyl and diphenyl ether, a combination of biphenyl and dibenzofuran, a combination of biphenyl and fluorobenzene, a combination of biphenyl and benzotrifluoride, a combination of biphenyl and 2-fluorobiphenyl, a combination of biphenyl and o-fluorocyclohexylbenzene, a combination of biphenyl and p-fluorocyclohexylbenzene, a combination of biphenyl and 2,4-difluoroanisole, a combination of o-terphenyl and a partly hydrogenated terphenyl derivative, a combination of o-terphenyl and cumene, a combination of o-terphenyl and cyclopentylbenzene, a combination of o-terphenyl and cyclohexylbenzene, a combination of o-terphenyl and t-butylbenzene, a combination of o-terphenyl and t-amylbenzene, a combination of o-terphenyl and diphenyl ether, a combination of o-terphenyl and dibenzofuran, a combination of o-terphenyl and fluorobenzene, a combination of o-terphenyl and benzotrifluoride, a combination of o-terphenyl and 2-fluorobiphenyl, a combination of o-terphenyl and o-fluorocyclohexylbenzene, a combination of o-terphenyl and p-fluorocyclohexylbenzene, a combination of o-terphenyl and 2,4-difluoroanisole, a combination of m-terphenyl and a partly hydrogenated terphenyl derivative, a combination of m-terphenyl and cumene, a combination of m-terphenyl and cyclopentylbenzene, a combination of m-terphenyl and cyclohexylbenzene, a combination of m-terphenyl and t-butylbenzene, a combination of m-terphenyl and t-amylbenzene, a combination of m-terphenyl and diphenyl ether, a combination of m-terphenyl and dibenzofuran, a combination of m-terphenyl and fluorobenzene, a combination of m-terphenyl and benzotrifluoride, a combination of m-terphenyl and 2-fluorobiphenyl, a combination of m-terphenyl and o-fluorocyclohexylbenzene, a combination of m-terphenyl and p-fluorocyclohexylbenzene, a combination of m-terphenyl and 2,4-difluoroanisole, a combination of a partly hydrogenated terphenyl derivative and cumene, a combination of a partly hydrogenated terphenyl derivative and cyclopentylbenzene, a combination of a partly hydrogenated terphenyl derivative and cyclohexylbenzene, a combination of a partly hydrogenated terphenyl derivative and t-butylbenzene, a combination of a partly hydrogenated terphenyl derivative and t-amylbenzene, a combination of a partly hydrogenated terphenyl derivative and diphenyl ether, a combination of a partly hydrogenated terphenyl derivative and dibenzofuran, a combination of a partly hydrogenated terphenyl derivative and fluorobenzene, a combination of a partly hydrogenated terphenyl derivative and benzotrifluoride, a combination of a partly hydrogenated terphenyl derivative and 2-fluorobiphenyl, a combination of a partly hydrogenated terphenyl derivative and o-fluorocyclohexylbenzene, a combination of a partly hydrogenated terphenyl derivative and p-fluorocyclohexylbenzene, a combination of a partly hydrogenated terphenyl derivative and 2,4-difluoroanisole, a combination of cumene and cyclopentylbenzene, a combination of cumene and cyclohexylbenzene, a combination of cumene and t-butylbenzene, a combination of cumene and t-amylbenzene, a combination of cumene and diphenyl ether, a combination of cumene and dibenzofuran, a combination of cumene and fluorobenzene, a combination of cumene and benzotrifluoride, a combination of cumene and 2-fluorobiphenyl, a combination of cumene and o-fluorocyclohexylbenzene, a combination of cumene and p-fluorocyclohexylbenzene, a combination of cumene and 2,4-difluoroanisole, a combination of cyclohexylbenzene and t-butylbenzene, a combination of cyclohexylbenzene and t-amylbenzene, a combination of cyclohexylbenzene and diphenyl ether, a combination of cyclohexylbenzene and dibenzofuran, a combination of cyclohexylbenzene and fluorobenzene, a combination of cyclohexylbenzene and benzotrifluoride, a combination of cyclohexylbenzene and 2-fluorobiphenyl, a combination of cyclohexylbenzene and o-fluorocyclohexylbenzene, a combination of cyclohexylbenzene and p-fluorocyclohexylbenzene, a combination of cyclohexylbenzene and 2,4-difluoroanisole, a combination of t-butylbenzene and t-amylbenzene, a combination of t-butylbenzene and diphenyl ether, a combination of t-butylbenzene and dibenzofuran, a combination of t-butylbenzene and fluorobenzene, a combination of t-butylbenzene and benzotrifluoride, a combination of t-butylbenzene and 2-fluorobiphenyl, a combination of t-butylbenzene and o-fluorocyclohexylbenzene, a combination of t-butylbenzene and p-fluorocyclohexylbenzene, a combination of t-butylbenzene and 2,4-difluoroanisole, a combination of t-amylbenzene and diphenyl ether, a combination of t-amylbenzene and dibenzofuran, a combination of t-amylbenzene and fluorobenzene, a combination of t-amylbenzene and benzotrifluoride, a combination of t-amylbenzene and 2-fluorobiphenyl, a combination of t-amylbenzene and o-fluorocyclohexylbenzene, a combination of t-amylbenzene and p-fluorocyclohexylbenzene, a combination of t-amylbenzene and 2,4-difluoroanisole, a combination of diphenyl ether and dibenzofuran, a combination of diphenyl ether and fluorobenzene, a combination of diphenyl ether and benzotrifluoride, a combination of diphenyl ether and 2-fluorobiphenyl, a combination of diphenyl ether and o-fluorocyclohexylbenzene, a combination of diphenyl ether and p-fluorocyclohexylbenzene, a combination of diphenylether and 2,4-difluoroanisole, a combination of dibenzofuran and fluorobenzene, a combination of dibenzofuran and benzotrifluoride, a combination of dibenzofuran and 2-fluorobiphenyl, a combination of dibenzofuran and o-fluorocyclohexylbenzene, a combination of dibenzofuran and p-fluorocyclohexylbenzene, a combination of dibenzofuran and 2,4-difluoroanisole, a combination of fluorobenzene and benzotrifluoride, a combination of fluorobenzene and 2-fluorobiphenyl, a combination of fluorobenzene and o-fluorocyclohexylbenzene, a combination of fluorobenzene and p-fluorocyclohexylbenzene, a combination of fluorobenzene and 2,4-difluoroanisole, a combination of benzotrifluoride and 2-fluorobiphenyl, a combination of benzotrifluoride and o-fluorocyclohexylbenzene, a combination of benzotrifluoride and p-fluorocyclohexylbenzene, a combination of benzotrifluoride and 2,4-difluoroanisole, a combination of 2-fluorobiphenyl and o-fluorocyclohexylbenzene, a combination of 2-fluorobiphenyl and p-fluorocyclohexylbenzene, a combination of 2-fluorobiphenyl and 2,4-difluoroanisole, a combination of o-fluorocyclohexylbenzene and p-fluorocyclohexylbenzene, a combination of o-fluorocyclohexylbenzene and 2,4-difluoroanisole, and a combination of p-fluorocyclohexylbenzene and 2,4-difluoroanisole, and the like.

In the case where nonaqueous electrolyte 1 of the invention contains an overcharge inhibitor, the concentration thereof may be any value unless this considerably lessens the effects of the invention 1. It is, however, desirable that the concentration thereof should be regulated so as to be in the range of generally from 0.1% by mass to 5% by mass based on the whole nonaqueous electrolyte.

To incorporate an overcharge inhibitor into nonaqueous electrolyte 1 of the invention in such an amount as not to considerably lessen the effects of invention 1 is preferred because the nonaqueous-electrolyte secondary battery has improved safety even if overcharged due to an erroneous usage or under a situation in which an overcharge protection circuit does not work normally, such as, e.g., charger abnormality.

<1-4-2-2. Aids for Improving Capacity Retentivity and Cycle Characteristics After High-Temperature Storage>

Examples of the aids for improving capacity retentivity and cycle characteristics after high-temperature storage include the anhydrides of dicarboxylic acids such as succinic acid, maleic acid, and phthalic acid;

carbonate compounds other than the specific carbonates, such as erythritan carbonate and spiro-bis-dimethylene carbonate; sulfur-containing compounds such as ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide;

nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide;

hydrocarbon compounds such as heptane, octane, and cycloheptane; and fluorine-containing aromatic compounds such as fluorobenzene, difluorobenzene, and benzotrifluoride.

[2. Nonaqueous-Electrolyte Secondary Battery]

The nonaqueous-electrolyte secondary battery of this invention is constituted of the nonaqueous electrolyte of the invention described above and a positive electrode and a negative electrode which are capable of occluding and releasing ions. The nonaqueous-electrolyte secondary battery of the invention may be equipped with other constitutions.

<2-1. Battery Constitution>

The constitution of the nonaqueous-electrolyte secondary battery of the invention, excluding the negative electrode and the nonaqueous electrolyte, may be the same as that of conventionally known nonaqueous-electrolyte secondary batteries. Usually, the battery of the invention has a constitution including a positive electrode and a negative electrode which have been superposed through a porous film (separator) impregnated with the nonaqueous electrolyte of the invention, the electrodes and the separator being held in a case. Consequently, the shape of the nonaqueous-electrolyte secondary battery of the invention is not particularly limited, and may be any of the cylindrical type, prismatic type, laminate type, coin type, large type, and the like.

<2-2. Nonaqueous Electrolyte>

As the nonaqueous electrolyte, the nonaqueous electrolyte of the invention described above is used. Incidentally, a mixture of the nonaqueous electrolyte of the invention and another nonaqueous electrolyte may be used so long as this is not counter to the spirit of the invention.

<2-3. Negative Electrode>

Negative-electrode active materials usable in the negative electrode are described below.

The negative-electrode active materials are not particularly limited so long as these are capable of electrochemically occluding/releasing lithium ions. Examples thereof include a carbonaceous material, an alloy material, and a lithium-containing metal composite oxide material.

<2-3-1. Carbonaceous Material>

The carbonaceous material to be used as a negative-electrode active material preferably is one which is selected from:

(1) natural graphites;
(2) artificial carbonaceous substances and carbonaceous materials obtained by subjecting artificial graphitic substances to a heat treatment at a temperature in the range of 400-3,200° C. one or more times;
(3) carbonaceous materials giving a negative-electrode active-material layer which is composed of at least two carbonaceous substances differing in crystallinity and/or has an interface where at least two carbonaceous substances differing in crystallinity are in contact with each other; and
(4) carbonaceous materials giving a negative-electrode active-material layer which is composed of at least two carbonaceous substances differing in orientation and/or has an interface where at least two carbonaceous substances differing in orientation are in contact with each other. This is because this carbonaceous material brings about a satisfactory balance between initial irreversible capacity and high-current-density charge/discharge characteristics. One of the carbonaceous materials (1) to (4) may be used alone, or any desired combination of two or more thereof in any desired proportion may be used.

Examples of the artificial carbonaceous substances and artificial graphitic substances in (2) above include natural graphites, coal coke, petroleum coke, coal pitch, petroleum pitch, carbonaceous substances obtained by oxidizing these pitches, needle coke, pitch coke, carbon materials obtained by partly graphitizing these cokes, products of the pyrolysis of organic substances, such as furnace black, acetylene black, and pitch-derived carbon fibers, organic substances capable of carbonization and products of the carbonization thereof, or solutions obtained by dissolving any of such organic substances capable of carbonization in a low-molecular organic solvent, e.g., benzene, toluene, xylene, quinoline, or n-hexane, and products of the carbonization of these solutions.

Examples of the organic substances capable of carbonization include coal tar pitches ranging from soft pitch to hard pitch, coal-derived heavy oil such as dry distillation/liquefaction oil, straight-run heavy oil such as topping residues and vacuum distillation residues, heavy oils resulting from petroleum cracking, such as ethylene tar as a by-product of the thermal cracking of crude oil, naphtha, etc., aromatic hydrocarbons such as acenaphthylene, decacyclene, anthracene, and phenanthrene, nitrogen-atom-containing heterocyclic compounds such as phenazine and acridine, sulfur-atom-containing heterocyclic compounds such as thiophene and bithiophene, polyphenylenes such as biphenyl and terphenyl, poly(vinyl chloride), poly(vinyl alcohol), poly(vinyl butyral), substances obtained by insolubilizing these compounds, nitrogen-containing organic polymers such as polyacrylonitrile and polypyrrole, sulfur-containing organic polymers such as polythiophene, organic polymers such as polystyrene, natural polymers such as polysaccharides represented by cellulose, lignin, mannan, poly(galacturonic acid), chitosan, and saccharose, thermoplastic resins such as poly(phenylene sulfide) and poly (phenylene oxide), and thermosetting resins such as furfuryl alcohol resins, phenol-formaldehyde resins, and imide resins, and the like.

<2-3-2. Constitution and Properties of Carbonaceous Negative Electrode and Method of Preparation Thereof>

With respect to the properties of the carbonaceous material, negative electrode containing the carbonaceous material, method of electrode formation, current collector, and nonaqueous-electrolyte secondary battery, it is desirable that any one of the following (1) to (21) should be satisfied or two or more thereof be simultaneously satisfied.

(1) X-Ray Parameter

The carbonaceous material preferably has a value of d (interplanar spacing) for the lattice planes (002), as determined by X-ray diffractometry in accordance with the method of the Japan Society for Promotion of Scientific Research, of generally 0.335-0.340 nm, especially 0.335-0.338 nm, in particular 0.335-0.337 nm. The crystallite size (Lc) thereof, as determined by X-ray diffractometry in accordance with the method of the Japan Society for Promotion of Scientific Research, is generally 1.0 nm or larger, preferably 1.5 nm or larger, especially preferably 2 nm or larger.

A preferred material obtained by coating the surface of a graphite with amorphous carbon is one which is constituted of a graphite having a value of d for the lattice planes (002) as determined by X-ray diffractometry of 0.335-0.338 nm as a core material and, adherent to the surface thereof, a carbonaceous material having a larger value of d for the lattice planes (002) as determined by X-ray diffractometry than the core material, and in which the proportion of the core material to the carbonaceous material having a larger value of d for the lattice planes (002) as determined by X-ray diffractometry than the core material is from 99/1 to 80/20 in terms of weight ratio. By using this material, a negative electrode which has a high capacity and is less apt to react with the electrolyte can be produced.

(2) Ash Content

The ash content of the carbonaceous material is preferably 1% by mass or lower, especially 0.5% by mass or lower, in particular 0.1% by mass or lower, based on the whole carbonaceous material. The lower limit of the ash content thereof is preferably at least 1 ppm by mass of the whole carbonaceous material. When the ash content by mass thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous material necessitates much time and energy and an apparatus for pollution prevention, resulting in an increase in cost.

(3) Volume-Average Particle Diameter

With respect to the volume-average particle diameter of the carbonaceous material, the volume-average particle diameter (median diameter) thereof as determined by the laser diffraction/scattering method is generally 1 μm or larger, preferably 3 μm or larger, more preferably 5 μm or larger, especially preferably 7 μm or larger, and is generally 100 μm or smaller, preferably 50 μm or smaller, more preferably 40 μm or smaller, even more preferably 30 μm or smaller, especially preferably 25 μm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous material is undesirable from the standpoint of battery production because an uneven coating surface is apt to result when an electrode is produced through coating fluid application.

Volume-average particle diameter is determined by dispersing the carbon powder in a 0.2% by mass aqueous solution (about 10 mL) of poly(oxyethylene (20)) sorbitan monolaurate as a surfactant and examining the dispersion with a laser diffraction/scattering type particle size distribution analyzer (LA-700, manufactured by HORIBA, Ltd.). The median diameter determined through this measurement is defined as the volume-average particle diameter of the carbonaceous material in the invention.

(4) Raman R Value, Raman Half-Value Width

The Raman R value of the carbonaceous material as determined by the argon ion laser Raman spectroscopy is generally 0.01 or higher, preferably 0.03 or higher, more preferably 0.1 or higher, and is generally 1.5 or lower, preferably 1.2 or lower, more preferably 1 or lower, especially preferably 0.5 or lower.

When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 $cm^{-1}$ of the carbonaceous material is not particularly limited. However, the half-value width thereof is generally 10 $cm^{-1}$ or larger, preferably 5 $cm^{-1}$ or larger, and is generally 100 $cm^{-1}$ or smaller, preferably 80 $cm^{-1}$ or smaller, more preferably 60 $cm^{-1}$ or smaller, especially preferably 40 $cm^{-1}$ or smaller. When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

The examination for a Raman spectrum is made with a Raman spectrometer (Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 cm$^{-1}$ and the intensity $I_B$ of a peak $P_B$ around 1,360 cm$^{-1}$. The ratio between these intensities R ($R=I_B/I_A$) is calculated. The Raman R value calculated through this examination is defined as the Raman R value of the carbonaceous material in the invention. Furthermore, the half-value width of the peak $P_A$ around 1,580 cm$^{-1}$ in the Raman spectrum obtained is measured, and this value is defined as the Raman half-value width of the carbonaceous material in the invention.

Conditions for the Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points (5) BET Specific Surface Area The BET specific surface area of the carbonaceous material, in terms of the value of specific surface area as determined by the BET method, is generally 0.1 m$^2\cdot$g$^{-1}$ or larger, preferably 0.7 m$^2\cdot$g$^{-1}$ or larger, more preferably 1.0 m$^2\cdot$g$^{-1}$ or larger, especially preferably 1.5 m$^2\cdot$g$^{-1}$ or larger, and is generally 100 m$^2\cdot$g$^{-1}$ or smaller, preferably 25 m$^2\cdot$g$^{-1}$ or smaller, more preferably 15 m$^2\cdot$g$^{-1}$ or smaller, especially preferably 10 m$^2\cdot$g$^{-1}$ or smaller. When the BET specific surface area thereof is smaller than the lower limit of that range, use of this carbonaceous material as a negative-electrode material is apt to result in poor lithium acceptance during charge and in lithium deposition on the electrode surface. Consequently, there is the possibility of resulting in reduced stability. On the other hand, when the specific surface area thereof exceeds the upper limit of that range, there are cases where use of this carbonaceous material as a negative-electrode material is apt to result in enhanced reactivity with the nonaqueous electrolyte and enhanced gas evolution and a preferred battery is difficult to obtain.

The determination of specific surface area by the BET method is made with a surface area meter (a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the carbonaceous material in the invention.

(6) Pore Diameter Distribution

The pore diameter distribution of the carbonaceous material is calculated through a measurement of the amount of intruded mercury. It is desirable that the carbonaceous material should have a pore diameter distribution in which the amount of interstices which correspond to pores having a diameter of from 0.01 μm to 1 μm and which include pores within the particles, particle surface irregularities formed by steps, and pores attributable to contact surfaces among the particles, as determined by mercury porosimetry (mercury intrusion method), is generally 0.01 cm$^3\cdot$g$^{-1}$ or larger, preferably 0.05 cm$^3\cdot$g$^{-1}$ or larger, more preferably 0.1 cm$^3\cdot$g$^{-1}$ or larger, and is generally 0.6 cm$^3\cdot$g$^{-1}$ or smaller, preferably 0.4 cm$^3\cdot$g$^{-1}$ or smaller, more preferably 0.3 cm$^3\cdot$g$^{-1}$ or smaller. When the pore diameter distribution thereof is larger than the upper limit of that range, there are cases where a large amount of a binder is necessary in electrode plate formation. When the amount of interstices thereof is smaller than the lower limit of that range, there are cases where high-current-density charge/discharge characteristics decrease and the effect of diminishing electrode expansion/contraction during charge/discharge is not obtained.

The total volume of pores thereof corresponding to the pore diameter range of from 0.01 μm to 100 μm, as determined by mercury porosimetry (mercury intrusion method), is generally 0.1 cm$^3\cdot$g$^{-1}$ or larger, preferably 0.25 cm$^3\cdot$g$^{-1}$ or larger, more preferably 0.4 cm$^3\cdot$g$^{-1}$ or larger, and is generally 10 cm$^3\cdot$g$^{-1}$ or smaller, preferably 5 cm$^3\cdot$g$^{-1}$ or smaller, more preferably 2 cm$^3\cdot$g$^{-1}$ or smaller. When the total pore volume thereof exceeds the upper limit of that range, there are cases where a large amount of a binder is necessary in electrode plate formation. When the total pore volume thereof is smaller than the lower limit of that range, there are cases where the dispersing effect of a thickener or binder in electrode plate formation is not obtained.

The average pore diameter thereof is generally 0.05 μm or larger, preferably 0.1 μm or larger, more preferably 0.5 μm or larger, and is generally 50 μm or smaller, preferably 20 μm or smaller, more preferably 10 μm or smaller. When the average pore diameter thereof exceeds the upper limit of that range, there are cases where a large amount of a binder is necessary. When the average pore diameter thereof is smaller than the lower limit of that range, there are cases where high-current-density charge/discharge characteristics decrease.

The amount of mercury intruded is measured with a mercury porosimeter (Autopore 9520, manufactured by Micromeritics Corp.) as an apparatus for the mercury porosimetry. A sample is pretreated by placing about 0.2 g of the sample in a powder cell, closing the cell, and degassing the sample at room temperature under vacuum (50 μmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds.

A pore diameter distribution is calculated from the mercury intrusion curve thus obtained, using the Washburn equation. Incidentally, the surface tension (γ) and contact angle (ψ) of mercury are taken as 485 dyne·cm$^{-1}$ (1 dyne=10 μN) and 140°, respectively. The average pore diameter used is the pore diameter corresponding to a cumulative pore volume of 50%.

(7) Roundness

When the carbonaceous material is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of carbonaceous-material particles having a particle diameter in the range of 3-40 μm, the more the particles are desirable. The roundness of the particles is desirably 0.1 or higher, preferably 0.5 or higher, more preferably 0.8 or higher, even more preferably 0.85 or higher, especially preferably 0.9 or higher.

The higher the roundness, the more the high-current-density charge/discharge characteristics are improved. Consequently, when the roundness of the carbonaceous-material particles is lower than the lower limit of that range, there are cases where the negative-electrode active material has reduced suitability for loading and interparticle resistance is increased, resulting in reduced short-time high-current-density charge/discharge characteristics.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 μm are examined with the analyzer having a detection range set at 0.6-400 μm. The roundness determined through this measurement is defined as the roundness of the carbonaceous material in the invention.

Methods for improving roundness are not particularly limited. However, a carbonaceous material in which the particles have been rounded by a rounding treatment is preferred because it gives an electrode in which the interstices among particles are uniform in shape. Examples of the rounding treatment include: a method in which a shear force or compressive force is applied to thereby mechanically make the shape of the particles close to sphere; and a method of mechanical/physical treatment in which fine particles are aggregated into particles by means of the bonding force of a binder or of the fine particles themselves.

(8) True Density

The true density of the carbonaceous material is generally 1.4 g·cm$^{-3}$ or higher, preferably 1.6 g·cm$^{-3}$ or higher, more preferably 1.8 g·cm$^{-3}$ or higher, especially preferably 2.0 g·cm$^{-3}$ or higher, and is generally 2.26 g·cm$^{-3}$ or lower. When the true density of the carbonaceous material is lower than the lower limit of that range, there are cases where this carbon has too low crystallinity, resulting in an increase in initial irreversible capacity. Incidentally, the upper limit of that range is a theoretical value of the true density of graphites.

The true density of the carbonaceous material is determined by the liquid-phase displacement method (pycnometer method) using butanol. The value determined through this measurement is defined as the true density of the carbonaceous material in the invention.

(9) Tap Density

The tap density of the carbonaceous material is generally 0.1 g·cm$^{-3}$ or higher, preferably 0.5 g·cm$^{-3}$ or higher, more preferably 0.7 g·cm$^{-3}$ or higher, especially preferably 1 g·cm$^{-3}$ or higher, and is preferably 2 g·cm$^{-3}$ or lower, more preferably 1.8 g·cm$^{-3}$ or lower, especially preferably 1.6 g·cm$^{-3}$ or lower. When the tap density thereof is lower than the lower limit of that range, there are cases where this carbonaceous material, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain.

Tap density is determined by dropping a sample through a sieve having an opening size of 300 μm into a 20 cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and calculating the tap density from the resultant volume of the sample and the weight thereof. The tap density calculated through this measurement is defined as the tap density of the carbonaceous material in the invention.

(10) Orientation Ratio

The orientation ratio of the carbonaceous material is generally 0.005 or higher, preferably 0.01 or higher, more preferably 0.015 or higher, and is generally 0.67 or lower. When the orientation ratio thereof is lower than the lower limit of that range, there are cases where high-density charge/discharge characteristics decrease. The upper limit of that range is a theoretical upper limit of the orientation ratio of carbonaceous materials.

Orientation ratio is determined by X-ray diffractometry after a sample is molded by compaction. A molding obtained by packing 0.47 g of a sample into a molding machine having a diameter of 17 mm and compacting the sample at 58.8 MN·m$^{-2}$ is set with clay on a sample holder for examination so as to be flush with the holder. This sample molding is examined for X-ray diffraction. From the intensities of the resultant (110) diffraction peak and (004) diffraction peak for the carbon, the ratio represented by (110) diffraction peak intensity/(004) diffraction peak intensity is calculated. The orientation ratio calculated through this measurement is defined as the orientation ratio of the carbonaceous material in the invention.

Conditions for the X-ray diffractometry are as follows. Incidentally, "2θ" represents diffraction angle.

Target: Cu(Kα line) graphite monochromator

Slit:
  Divergence slit=0.5 degrees
  Receiving slit=0.15 mm
  Scattering slit=0.5 degrees Examination range and step angle/measuring time:
  (110) plane: 75°≤2θ≤80° 1°/60 sec
  (004) plane: 52°≤2θ≤57° 1°/60 sec

(11) Aspect Ratio (Powder)

The aspect ratio of the carbonaceous material is generally 1 or higher, and is generally 10 or lower, preferably 8 or lower, more preferably 5 or lower. When the aspect ratio thereof exceeds the upper limit of that range, there are cases where this carbonaceous material causes streak lines in electrode plate formation and an even coating surface cannot be obtained, resulting in a decrease in high-current-density charge/discharge characteristics. Incidentally, the lower limit of that range is a theoretical lower limit of the aspect ratio of carbonaceous materials.

In determining aspect ratio, particles of the carbonaceous material are examined with a scanning electron microscope with enlargement. Fifty are arbitrarily selected from graphite particles fixed to an edge face of a metal having a thickness of 50 μm or smaller, and each particle is examined in a three-dimensional manner while rotating or inclining the stage to which the sample is fixed. In this examination, the length of the longest axis A of each carbonaceous-material particle and the length of the shortest axis B perpendicular to that axis are measured, and the average of the A/B values is determined. The aspect ratio (A/B) determined through this measurement is defined as the aspect ratio of the carbonaceous material in the invention.

(12) Minor-Material Mixing

Minor-material mixing means that the negative electrode and/or the negative-electrode active material contains two or more carbonaceous materials differing in property. The term property herein means one or more properties selected from the group consisting of X-ray diffraction parameter, median diameter, aspect ratio, BET specific surface area, orientation ratio, Raman R value, tap density, true density, pore distribution, roundness, and ash content.

Especially preferred examples of the minor-material mixing include: one in which the volume-based particle size distribution is not symmetrical about the median diameter; one in which two or more carbonaceous materials differing in Raman R value are contained; and one in which carbonaceous materials differing in X-ray parameter are contained.

One example of the effects of the minor-material mixing is that the incorporation of a carbonaceous material, such as a graphite, e.g., a natural graphite or artificial graphite, or an amorphous carbon, e.g., a carbon black such as acetylene black or needle coke, as a conductive material serves to reduce electrical resistance.

In the case where conductive materials are incorporated as minor-material mixing, one conductive material may be incorporated alone or any desired combination of two or more conductive materials in any desired proportion may be incorporated. The proportion of the conductive material(s) to be incorporated is generally 0.1% by mass or higher, preferably 0.5% by mass or higher, more preferably 0.6% by mass or higher, and is generally 45% by mass or lower, preferably 40% by mass or lower, based on the carbonaceous material. When the proportion thereof is lower than the lower limit of that range, there are cases where the effect of improving conductivity is difficult to obtain. Proportions thereof exceeding the upper limit of that range may lead to an increase in initial irreversible capacity.

(13) Electrode Production

Any known method can be used for electrode production unless this considerably lessens the effects of the invention. For example, a binder and a solvent are added to a negative-electrode active material optionally together with a thickener, conductive material, filler, etc. to obtain a slurry and this slurry is applied to a current collector and dried. Thereafter, the coated current collector is pressed, whereby an electrode can be formed.

The thickness of the negative-electrode active-material layer per one side in the stage just before the step of injecting a nonaqueous electrolyte in battery fabrication is generally 15 μm or larger, preferably 20 μm or larger, more preferably 30 μm or larger, and is generally 50 μm or smaller, preferably 20 μm or smaller, more preferably 00 μm or smaller. The reasons for this are as follows. When the thickness of the negative-electrode active-material layer is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be roller-pressed to obtain a sheet electrode, or may be subjected to compression molding to obtain a pellet electrode.

(14) Current Collector

As the current collector for holding the negative-electrode active material, a known one can be used at will. Examples of the current collector for the negative electrode include metallic materials such as copper, nickel, stainless steel, and nickel-plated steel. Copper is especially preferred from the standpoints of processability and cost.

In the case where the current collector is a metallic material, examples of the shape of the current collector include metal foils, metal cylinders, metal coils, metal plates, thin metal films, expanded metals, punching metals, and metal foams. Preferred of these are thin metal films. More preferred are copper foils. Even more preferred are a rolled copper foil, which is produced by the rolling process, and an electrolytic copper foil, which is produced by the electrolytic process. Either of these can be used as a current collector.

In the case of a copper foil having a thickness smaller than 25 μm, use can be made of a copper alloy (e.g., phosphor bronze, titanium-copper, Corson alloy, or Cu—Cr—Zr alloy) having a higher strength than pure copper.

The current collector constituted of a copper foil produced by the rolling process is less apt to crack even when the negative electrode is rolled tightly or rolled at an acute angle, because the copper crystals are oriented in the rolling direction. This current collector can be advantageously used in small cylindrical batteries.

The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may be deposited on a surface of the rolled copper foil by the electrolytic process. One or each side of such a copper foil may have undergone a surface-roughening treatment or a surface treatment (e.g., a chromate treatment in a thickness of from several nanometers to about 1 μm or a priming treatment with titanium).

The current collector base is desired to further have the following properties.

(14-1) Average Surface Roughness (Ra)

The average surface roughness (Ra) of that side of the current collector base on which a thin negative-electrode active-material film is to be formed, as determined by the method provided for in JIS B 0601-1994, is not particularly limited. However, the average surface roughness thereof is generally 0.05 μm or higher, preferably 0.1 μm or higher, more preferably 0.15 μm or higher, and is generally 1.5 μm or lower, preferably 1.3 μm or lower, more preferably 1.0 μm or lower. This is because when the average surface roughness (Ra) of the current collector base is within that range, satisfactory charge/discharge cycle characteristics can be expected. In addition, the area of the interface between the base and a thin negative-electrode active-material film is increased and adhesion to the thin negative-electrode active-material film is improved. The upper limit of the average surface roughness (Ra) thereof is not particularly limited. However, a current collector base having an Ra of 1.5 µm or lower is usually employed because a foil having a practical thickness for batteries and having an average surface roughness (Ra) exceeding 1.5 µm is generally difficult to procure.

(14-2) Tensile Strength

Tensile strength is a quotient obtained by dividing the maximum tensile force required before test piece breakage by the sectional area of the test piece. In the invention, the tensile strength is determined through a measurement conducted with the same apparatus and by the same method as those described in JIS Z 2241 (Method of Metallic-Material Tensile Test).

The tensile strength of the current collector base is not particularly limited. However, it is generally 100 $N \cdot mm^{-2}$ or higher, preferably 250 $N \cdot mm^{-2}$ or higher, more preferably 400 $N \cdot mm^{-2}$ or higher, especially preferably 500 $N \cdot mm^{-2}$ or higher. The higher the tensile strength, the more the current collector base is preferred. However, the tensile strength thereof is generally 1,000 $N \cdot mm^{-2}$ or lower from the standpoint of industrial availability. A current collector base having a high tensile strength can be inhibited from cracking with the expansion/contraction of the thin negative-electrode active-material film which occur upon charge/discharge. With this current collector base, satisfactory cycle characteristics can be obtained.

(14-3) 0.2% Proof Stress

The term 0.2% proof stress means the degree of load necessary for imparting a plastic (permanent) deformation of 0.2%. Namely, it means that application of that degree of load and subsequent removal thereof result in a 0.2% deformation. The 0.2% proof stress is determined through a measurement conducted with the same apparatus and by the same method as for tensile strength.

The 0.2% proof stress of the current collector base is not particularly limited. However, it is desirable that the 0.2% proof stress thereof should be generally 30 $N \cdot mm^{-2}$ or higher, preferably 150 $N \cdot mm^{-2}$ or higher, especially preferably 300 $N/mm^2$ or higher. The higher the 0.2% proof stress, the more the current collector base is preferred. However, the 0.2% proof stress thereof is generally desirably 900 $N \cdot mm^{-2}$ or lower from the standpoint of industrial availability. A current collector base having a high 0.2% proof stress can be inhibited from plastically deforming with the expansion/contraction of the thin negative-electrode active-material film which occur upon charge/discharge. With this current collector base, satisfactory cycle characteristics can be obtained.

(14-4) Thickness of Current Collector

The current collector may have any desired thickness. However, the thickness thereof is generally 1 µm or larger, preferably 3 µm or larger, more preferably 5 µm or larger, and is generally 1 mm or smaller, preferably 100 µm or smaller, more preferably 50 µm or smaller. In case where the current collector is thinner than 1 µm, this collector has reduced strength and there are hence cases where coating is difficult. When the current collector is thicker than 100 µm, there are cases where this collector deforms an electrode shape, e.g., a rolled form. The current collector may be in a mesh form.

(15) Thickness Ratio between Current Collector and Negative-Electrode Active-Material Layer The thickness ratio between the current collector and the negative-electrode active-material layer is not particularly limited. However, the value of "(thickness of the negative-electrode active-material layer on one side just before impregnation with the nonaqueous electrolyte)/(thickness of the current collector)" is preferably 150 or smaller, more preferably 20 or smaller, especially preferably 10 or smaller, and is preferably 0.1 or larger, more preferably 0.4 or larger, especially preferably 1 or larger.

When the thickness ratio between the current collector and the negative-electrode active-material layer exceeds the upper limit of that range, there are cases where this current collector heats up due to Joule's heat during high-current-density charge/discharge. When that ratio decreases beyond the lower limit of that range, the proportion by volume of the current collector to the negative-electrode active material increases and this may reduce the capacity of the battery.

(16) Electrode Density

When the negative-electrode active material is used to form an electrode, the electrode structure is not particularly limited. However, the density of the negative-electrode active material present on the current collector is preferably 1 $g \cdot cm^{-3}$ or higher, more preferably 1.2 $g \cdot cm^{-3}$ or higher, especially preferably 1.3 $g \cdot cm^{-3}$ or higher, and is preferably 2 $g \cdot cm^{-3}$ or lower, more preferably 1.9 $g \cdot cm^{-3}$ or lower, even more preferably 1.8 $g \cdot cm^{-3}$ or lower, especially preferably 1.7 $g \cdot cm^{-3}$ or lower. When the density of the negative-electrode active material present on the current collector exceeds the upper limit of that range, there are cases where the negative-electrode active-material particles are broken and this increases the initial irreversible capacity and reduces the infiltration of a nonaqueous electrolyte into around the current collector/negative-electrode active material interface. As a result, high-current-density charge/discharge characteristics may decrease. When the density thereof is lower than the lower limit of that range, there are cases where electrical conductivity among the negative-electrode active-material particles decreases and this increases battery resistance, resulting in a reduced capacity per unit volume.

(17) Binder

The binder for binding the negative-electrode active material is not particularly limited so long as it is stable to the nonaqueous electrolyte and to the solvent to be used for electrode production.

Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these may be used alone, or any desired combination of two or more thereof in any desired proportion may be used.

The kind of the solvent to be used for forming a slurry is not particularly limited so long as it is a solvent in which the negative-electrode active material and binder and the thickener and conductive material which are optionally used according to need can be dissolved or dispersed. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane, and the like.

Especially when an aqueous solvent is used, it is preferred to add a dispersant or the like in combination with a thickener and prepare a slurry using a latex of, e.g., SBR. One of those solvents may be used alone, or any desired combination of two or more thereof in any desired proportion may be used.

The proportion of the binder to the negative-electrode active material is preferably 0.1% by mass or higher, more preferably 0.5% by mass or higher, especially preferably 0.6% by mass or higher, and is preferably 20% by mass or lower, more preferably 15% by mass or lower, even more preferably 10% by mass or lower, especially preferably 8% by mass or lower. In case where the proportion of the binder to the negative-electrode active material exceeds the upper limit of that range, the proportion of the binder which does not contribute to battery capacity increases and this may lead to a decrease in battery capacity. When the binder amount is small than the lower limit of that range, there are cases where the negative electrode has a reduced strength.

Especially when the binder includes a rubbery polymer represented by SBR as the main component, the proportion of this binder to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower.

In the case where the binder includes a fluorochemical polymer represented by poly(vinylidene fluoride) as the main component, the proportion of this binder to the negative-electrode active material is generally 1% by mass or higher, preferably 2% by mass or higher, more preferably 3% by mass or higher, and is generally 15% by mass or lower, preferably 10% by mass or lower, more preferably 8% by mass or lower.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used.

In the case where such a thickener is further added, the proportion of the thickener to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower. When the proportion of the thickener to the negative-electrode active material is lower than the lower limit of that range, there are cases where applicability decreases considerably. Proportions thereof exceeding the upper limit of that range result in a reduced proportion of the negative-electrode active material in the negative-electrode active-material layer, and this may pose a problem that battery capacity decreases and a problem that resistance among the particles of the negative-electrode active material increases.

(18) Orientation Ratio in Electrode Plate

The orientation ratio in the electrode plate is generally 0.001 or higher, preferably 0.005 or higher, more preferably 0.01 or higher, and is generally 0.67 or lower. When the orientation ratio therein is lower than the lower limit of that range, there are cases where high-density charge/discharge characteristics decrease. The upper limit of that range is a theoretical upper limit of orientation ratio in carbonaceous-material electrodes.

An examination for determining the orientation ratio in the electrode plate is as follows. The negative electrode which has been pressed to a target density is examined by X-ray diffractometry to determine the orientation ratio of the negative-electrode active material in this electrode. Although specific techniques therefor are not particularly limited, a standard method is as follows. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. The negative-electrode active-material orientation ratio for the electrode thus calculated is defined as the orientation ratio in the electrode plate employing the carbonaceous material in the invention.

Conditions for this X-ray diffractometry are as follows. Incidentally, "2θ" represents diffraction angle.

Target: Cu(Kα line) graphite monochromator
Slit:
    Divergence slit=1 degree
    Receiving slit=0.1 mm
    Scattering slit=1 degree
Examination range and step angle/measuring time:
    (110) plane: $76.5°≤2θ≤78.5°$ 0.01°/3 sec
    (004) plane: $53.5°≤2θ≤56.0°$ 0.01°/3 sec
Sample preparation:

The electrode is fixed to a glass plate with a double-faced pressure-sensitive adhesive tape having a thickness of 0.1 mm.

<2-3-3. Metal Compound Material, Constitution and Properties of Negative Electrode Employing Metal Compound Material, and Method of Preparation Thereof>

The metal compound material to be used as a negative-electrode active material is not particularly limited so long as the material is capable of occluding/releasing lithium. Use may be made of an elemental metal or alloy which forms a lithium alloy or any of compounds thereof, such as oxides, carbides, nitrides, silicides, sulfides, and phosphides. Examples of such metal compounds include compounds containing a metal such as Ag, Al, Ba, Bi, Cu, Ga, Ge, In, Ni, P, Pb, Sb, Si, Sn, Sr, or Zn. In particular, the negative-electrode active material preferably is an elemental metal or alloy which forms a lithium alloy. It is preferred that the active material should be a material containing any of the metals and semimetals in Group 13 and Group 14 (i.e., carbon is excluded). Furthermore, it is preferred that the active material should be an elemental metal selected from silicon (Si), tin (Sn), and lead (Pb) (hereinafter, these meals are often referred to as "specific metallic elements") or an alloy or compound containing one or more atoms of any of these metals. One of such material may be used alone, or any desired combination of two or more of these in any desired proportion may be used.

Examples of the negative-electrode active material including atoms of at least one member selected from the specific metallic elements include: the elemental metal which is any one of the specific metallic elements; alloys constituted of two or more specific metal elements; alloys constituted of one or more specific metal elements and one or more metallic elements of another kind; compounds containing one or more specific metallic elements; and composite compounds, e.g., oxides, carbides, nitrides, silicides, sulfides, or phosphides, of these compounds. By using any of these elemental metals, alloys, and metal compounds as a negative-electrode active material, a battery having a higher capacity can be obtained.

Examples of the negative-electrode active material further include compounds formed by the complicated bonding of any of those composite compounds to one or more elemental metals or alloys or to several elements, e.g., nonmetallic elements. More specifically, in the case of silicon and tin, for example, it is able to use an alloy of those elements with a metal which does not function as a negative electrode. In the case of tin, for example, it is able to use a complicated compound constituted of a combination of five to six elements including tin, a metal which functions as a negative electrode and is not silicon, a metal which does not function as a negative electrode, and a nonmetallic element.

Preferred of those negative-electrode active materials are the elemental metal which is any one of the specific metallic elements, alloys of two or more of the specific metallic elements, and oxides, carbides, nitrides, and other compounds of the specific metallic elements. This is because these negative-electrode active materials give a battery having a high capacity per unit weight. Especially preferred are the elemental metal(s), alloys, oxides, carbides, nitrides, and the like of silicon and/or tin from the standpoints of capacity per unit weight and environmental burden.

The following compounds containing silicon and/or tin also are preferred because these compounds bring about excellent cycle characteristics, although inferior in capacity per unit mass to the elemental metals or alloys thereof.

A silicon and/or tin oxide in which the elemental ratio of the silicon and/or tin to the oxygen is generally 0.5 or higher, preferably 0.7 or higher, more preferably 0.9 or higher, and is generally 1.5 or lower, preferably 1.3 or lower, more preferably 1.1 or lower.

A silicon and/or tin nitride in which the elemental ratio of the silicon and/or tin to the nitrogen is generally 0.5 or higher, preferably 0.7 or higher, more preferably 0.9 or higher, and is generally 1.5 or lower, preferably 1.3 or lower, more preferably 1.1 or lower.

A silicon and/or tin carbide in which the elemental ratio of the silicon and/or tin to the carbon is generally 0.5 or higher, preferably 0.7 or higher, more preferably 0.9 or higher, and is generally 1.5 or lower, preferably 1.3 or lower, more preferably 1.1 or lower.

Any one of the negative-electrode active materials described above may be used alone, or any desired combination of two or more thereof in any desired proportion may be used.

The negative electrode in the nonaqueous-electrolyte secondary battery of this invention can be produced by any known method. Examples of methods for negative-electrode production include: a method in which a binder, a conductive material, and other ingredients are added to any of the negative-electrode active materials described above and this mixture is directly pressed by roller to form a sheet electrode; and a method in which the mixture is compression-molded to form a pellet electrode. Usually, however, use is made of a method in which a thin film layer containing any of the negative-electrode active materials described above (negative-electrode active-material layer) is formed on a current collector for negative electrodes (hereinafter sometimes referred to as "negative-electrode current collector") by a technique such as, e.g., coating fluid application, vapor deposition, sputtering, or plating. In this case, a negative-electrode active-material layer may be formed on a negative-electrode current collector by adding a binder, thickener, conductive material, solvent, etc. to the negative-electrode active material to obtain a mixture in a slurry form, applying this mixture to the negative-electrode current collector, drying the mixture applied, and then pressing the coated current collector to densify the coating.

Examples of the material of the negative-electrode current collector include steel, copper alloys, nickel, nickel alloys, and stainless steel. Copper foils are preferred of these materials from the standpoints of processability into thin films and cost.

The thickness of the negative-electrode current collector is generally 1 μm or larger, preferably 5 μm or larger, and is generally 100 μm or smaller, preferably 50 μm or smaller. The reasons for this are as follows. In case where the negative-electrode current collector is too thick, this may result in too large a decrease in the capacity of the whole battery. Conversely, in case where the current collector is too thin, this collector may be difficult to handle.

It is preferred that the surface of each of those negative-electrode current collectors should be subjected to a surface-roughening treatment beforehand in order to improve the effect of binding the negative-electrode active-material layer to be formed on the surface. Examples of techniques for the surface roughening include blasting, rolling press with a roll having a roughened surface, and mechanical polishing in which the collector surface is polished with an abrasive cloth or paper having abrasive particles fixed thereto, a grindstone, an emery wheel, a wire brush equipped with steel bristles, or the like. Examples thereof further include electrolytic polishing and chemical polishing.

It is also possible to use a negative-electrode current collector of the perforated type, such as an expanded metal or a punching metal, as a negative-electrode current collector having a reduced weight in order to improve energy density per unit weight of the battery. A negative-electrode current collector of this type can be varied in weight at will by changing the percentage of openings thereof. Furthermore, in the case where a negative-electrode active-material layer is formed on each side of a negative-electrode current collector of this type, the negative-electrode active-material layers are even less apt to peel off because of the effect of ribetting through the holes. It should, however, be noted that too high a percentage of openings results in a reduced contact area between each negative-electrode active-material layer and the negative-electrode current collector and hence in reduced, rather than increased adhesion strength.

The slurry for forming a negative-electrode active-material layer is generally produced by adding a binder, a thickener, etc. to a negative-electrode material. The term "negative-electrode material" in this description means a material including both a negative-electrode active material and a conductive material.

It is preferred that the content of the negative-electrode active material in the negative-electrode material should be generally 70% by mass or higher, especially 75% by mass or higher, and be generally 97% by mass or lower, especially 95% by mass or lower. The reasons for this are as follows. In case where the content of the negative-electrode active material is too low, a secondary battery employing the resultant negative electrode tends to have an insufficient capacity. In case where the content thereof is too high, the relative content of the binder and other components is insufficient and this tends to result in insufficient strength of the negative electrode obtained. When two or more negative-electrode active materials are used in combination, this combination may be used so that the total amount of the negative-electrode active materials satisfies that range.

Examples of the conductive material for use in the negative electrode include metallic materials such as copper and nickel, and carbon materials such as graphites and carbon blacks. One of these materials may be used alone, or any desired combination of two or more thereof in any desired proportion may be used. In particular, use of a carbon material as the conductive material is preferred because the carbon material functions also as an active material. It is preferred that the content of the conductive material in the negative electrode should be generally 3% by mass or higher, especially 5% by mass or higher, and be generally 30% by mass or lower, especially 25% by mass or lower. The reasons for this are as follows. In case where the content of the conductive material is too low, conductivity tends to be insufficient. In case where the content thereof is too high, the relative content of the negative-electrode active material and other components is insufficient and this tends to result in decreases in battery capacity and strength. When two or more conductive materials are used in combination, this combination may be used so that the total amount of the conductive materials satisfies that range.

As the binder for the negative electrode, any desired binder can be used so long as it is safe for the solvent to be used in electrode production and for the electrolyte. Examples thereof include poly(vinylidene fluoride), polytetrafluoroethylene, polyethylene, polypropylene, styrene/butadiene rubbers, isoprene rubbers, butadiene rubbers, ethylene/acrylic acid copolymers, and ethylene/methacrylic acid copolymers. One of these binders may be used alone, or any desired combination of two or more thereof in any desired proportion may be used. It is preferred that the content of the binder should be generally 0.5 parts by weight or larger, especially 1 part by weight or larger, and be generally 10 parts by weight or smaller, especially 8 parts by weight or smaller, per 100 parts by weight of the negative-electrode material. The reasons for this are as follows. In case where the content of the binder is too low, the resultant electrode tends to have insufficient strength. In case where the content thereof is too high, the relative content of the negative-electrode active material and other components is insufficient and this tends to result in insufficient battery capacity and insufficient conductivity. When two or more binders are used in combination, this combination may be used so that the total amount of the binders satisfies that ranges.

Examples of the thickener for use in the negative electrode include carboxymethyl cellulose, methyl cellulose, hydroxymethyl cellulose, ethyl cellulose, poly(vinyl alcohol), oxidized starch, phosphorylated starch, and casein. One of these thickeners may be used alone, or any desired combination of two or more thereof in any desired proportion may be used. A thickener may be used according to need. In the case of using a thickener, it is preferred to use the thickener so that the content thereof in the negative-electrode active-material layer is in the range of generally from 0.5% by mass to 5% by mass.

The slurry for forming a negative-electrode active-material layer is prepared by mixing the negative-electrode active material with a conductive material, a binder, and a thickener according to need using an aqueous solvent or an organic solvent as a dispersion medium. Water is generally used as the aqueous solvent. However, a solvent other than water, such as an alcohol, e.g., ethanol, a cyclic amide, e.g., N-methylpyrrolidone, or the like, can be used in combination with water in a proportion of up to about 30% by mass based on the water. Examples of the organic solvent usually include cyclic amides such as N-methylpyrrolidone, acyclic amides such as N,N-dimethylformamide and N,N-dimethylacetamide, aromatic hydrocarbons such as anisole, toluene, and xylene, and alcohols such as butanol and cyclohexanol. Preferred of these are cyclic amides such as N-methylpyrrolidone and acyclic amides such as N,N-dimethylformamide and N,N-dimethylacetamide. Any one of such solvents may be used alone, or any desired combination of two or more thereof in any desired proportion may be used.

The viscosity of the slurry is not particularly limited so long as the slurry is applicable to a current collector. The slurry may be suitably prepared while changing the amount of the solvent to be used, etc. so that the slurry is applicable.

The slurry obtained is applied to the negative-electrode current collector described above, and the coated collector is dried and then pressed, whereby a negative-electrode active-material layer is formed. Techniques for the application are not particularly limited, and a technique which itself is known can be employed. Techniques for the drying also are not particularly limited, and use can be made of a known technique such as, e.g., natural drying, drying by heating, or vacuum drying.

The negative-electrode active material is used to produce an electrode in the manner described above. The structure of this electrode is not particularly limited. However, the density of the active material present on the current collector is preferably 1 g·cm$^{-3}$ or higher, more preferably 1.2 g·cm$^{-3}$ or higher, especially preferably 1.3 g·cm$^{-3}$ or higher, and is preferably 2 g·cm$^{-3}$ or lower, more preferably 1.9 g·cm$^{-3}$ or lower, even more preferably 1.8 g·cm$^{-3}$ or lower, especially preferably 1.7 g·cm$^{-3}$ or lower. When the density of the active material present on the current collector exceeds the upper limit of that range, there are cases where particles of the active material are destroyed and this causes an increase in initial irreversible capacity and reduces the infiltration of the nonaqueous electrolyte into around the current collector/active material interface, resulting in impaired high-current-density charge/discharge characteristics. When the density thereof is lower than the lower limit of that range, there are cases where conductivity between particles of the active material decreases, resulting in increased battery resistance and reduced capacity per unit volume.

<2-3-4. Lithium-Containing Metal Composite Oxide Material, Constitution and Properties of Negative Electrode Employing Lithium-Containing Metal Composite Oxide Material, and Method of Preparation Thereof>

The lithium-containing metal composite oxide material to be used as a negative-electrode active material is not particularly limited so long as the material is capable of occluding/releasing lithium. However, a lithium-containing composite metal oxide material containing titanium is preferred, and a composite oxide of lithium and titanium (hereinafter abbreviated to "lithium-titanium composite oxide") is more preferred. Namely, use of a lithium-titanium composite oxide having a spinel structure is especially preferred because incorporation of this composite oxide into a negative-electrode active material for nonaqueous-electrolyte secondary batteries is effective in considerably reducing output resistance.

Also preferred are lithium-titanium composite oxides in which the lithium or titanium has been replaced by one or more other metallic elements, e.g., at least one element selected from the group consisting of Na, K, Co, Al, Fe, Ti, Mg, Cr, Ga, Cu, Zn, and Nb.

Such metal oxide preferably is a lithium-titanium composite oxide represented by general formula (2) wherein $0.7 \leq x \leq 1.5$, $1.5 \leq y \leq 2.3$, and $0 \leq z \leq 1.6$, because the structure thereof is stable during lithium ion doping/undoping.

$$Li_xTi_yM_zO_4 \quad (2)$$

[In general formula (2), M represents at least one element selected from the group consisting of Na, K, Co, Al, Fe, Ti, Mg, Cr, Ga, Cu, Zn, and Nb.]

Of the compositions represented by general formula (2), structures represented by general formula (2) wherein
(a) $1.2 \leq x \leq 1.4$, $1.5 \leq y \leq 1.7$, and $z=0$
(b) $0.9 \leq x \leq 1.1$, $1.9 \leq y \leq 2.1$, and $z=0$ or
(c) $0.7 \leq x \leq 0.9$, $2.1 \leq y \leq 2.3$, and $z=0$
are especially preferred because they bring about a satisfactory balance among battery performances.

Especially preferred typical compositions of those compounds are: $Li_{4/3}Ti_{5/3}O_4$ for (a), $Li_1Ti_2O_4$ for (b), and $Li_{4/5}Ti_{11/5}O_4$ for (c). Preferred examples of the structure wherein $z \neq 0$ include $Li_{4/3}Ti_{4/3}Al_{1/3}O_4$.

It is preferred that the lithium-titanium composite oxide for use as the negative-electrode active material in the invention should satisfy at least one of the following features (1) to (13) concerning properties, shape, etc., besides the requirements described above. Especially preferably, the composite oxide simultaneously satisfies two or more of the following features.

(1) BET Specific Surface Area

The BET specific surface area of the lithium-titanium composite oxide for use as the negative-electrode active material, as determined by the BET method, is preferably 0.5 m²·g⁻¹ or larger, more preferably 0.7 m²·g⁻¹ or larger, even more preferably 1.0 m²·g⁻¹ or larger, especially preferably 5 m²·g⁻¹ or larger, and is preferably 200 m²·g⁻¹ or smaller, more preferably 100 m²·g⁻¹ or smaller, even more preferably 50 m²·g⁻¹ or smaller, especially preferably 25 m²·g⁻¹ or smaller. When the BET specific surface area thereof is smaller than the lower limit of that range, there are cases where use of this composite oxide as a negative-electrode material results in a reduced reaction area available for contact with the nonaqueous electrolyte and in an increase in output resistance. On the other hand, in case where the BET specific surface area thereof exceeds the upper limit of that range, the proportion of surfaces and edge faces of crystals of the titanium-containing metal oxide increases and this causes crystal deformation. There are hence cases where irreversible capacity becomes not negligible and a preferred battery is difficult to obtain.

BET specific surface area is determined with a surface area meter (a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure. The specific surface area determined through this measurement is defined as the BET specific surface area of the lithium-titanium composite oxide in the invention.

(2) Volume-Average Particle Diameter

The volume-average particle diameter (secondary-particle diameter in the case where the primary particles have aggregated to form secondary particles) of the lithium-titanium composite oxide is defined as the volume-average particle diameter (median diameter) determined by the laser diffraction/scattering method.

The volume-average particle diameter of the lithium-titanium composite oxide is generally 0.1 μm or larger, preferably 0.5 μm or larger, more preferably 0.7 μm or larger, and is generally 50 μm or smaller, preferably 40 μm or smaller, even more preferably 30 μm or smaller, especially preferably 25 μm or smaller.

Volume-average particle diameter is determined by dispersing the carbon powder in a 0.2% by mass aqueous solution (about 10 mL) of poly(oxyethylene (20)) sorbitan monolaurate as a surfactant and examining the dispersion with a laser diffraction/scattering type particle size distribution analyzer (LA-700, manufactured by HORIBA, Ltd.). The median diameter determined by this measurement is defined as the volume-average particle diameter of the carbonaceous material in the invention.

When the volume-average particle diameter of the lithium-titanium composite oxide is smaller than the lower limit of that range, there are cases where a large amount of a binder is necessary in electrode production and this results in a decrease in battery capacity. When the volume-average particle diameter thereof exceeds the upper limit of that range, there are cases where such a composite oxide is undesirable from the standpoint of battery production because an uneven coating surface is apt to result when an electrode plate is produced.

(3) Average Primary-Particle Diameter

In the case where the primary particles have aggregated to form secondary particles, the average primary-particle diameter of the lithium-titanium composite oxide is generally 0.01 μm or larger, preferably 0.05 μm or larger, more preferably 0.1 μm or larger, especially preferably 0.2 μm or larger, and is generally 2 μm or smaller, preferably 1.6 μm or smaller, more preferably 1.3 μm or smaller, especially preferably 1 μm or smaller. In case where the volume-average primary-particle diameter thereof exceeds the upper limit of that range, spherical secondary particles are difficult to form and this adversely influences powder loading or results in a considerably reduced specific surface area. There may hence be a high possibility that battery performances such as output characteristics might decrease. When the average primary-particle diameter thereof is smaller than the lower limit of that range, crystal growth is usually insufficient and, hence, there are cases where use of this composite oxide gives a secondary battery having reduced performances, e.g., poor charge/discharge reversibility.

Primary-particle diameter is determined through an examination with a scanning electron microscope (SEM). Specifically, arbitrarily selected 50 primary-particle images in a photograph having a magnification capable of particle observation, e.g., 10,000-100,000 diameters, each are examined for the length of the longest segment of a horizontal line which extends across the primary-particle image from one side to the other side of the boundary. These measured lengths are averaged, whereby the average value can be determined.

(4) Shape

The shape of the particles of the lithium-titanium composite oxide may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

In electrochemical elements, the active material in each electrode usually expands/contracts with the charge/discharge of the element and, hence, deterioration is apt to occur, such as active-material breakage and conduction path breakage, due to the stress caused by the expansion/contraction. Because of this, an active material in which the primary particles have aggregated to form secondary particles is preferable to an active material composed of primary particles only since the particles in the former active material relieve the stress caused by expansion/contraction to prevent deterioration.

Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

(5) Tap Density

The tap density of the lithium-titanium composite oxide is preferably 0.05 g·cm$^{-3}$ or higher, more preferably 0.1 g·cm$^{-3}$ or higher, even more preferably 0.2 g·cm$^{-3}$ or higher, especially preferably 0.4 g·cm$^{-3}$ or higher, and is preferably 2.8 g·cm$^{-3}$ or lower, more preferably 2.4 g·cm$^{-3}$ or lower, especially preferably 2 g·cm$^{-3}$ or lower. In case where the tap density thereof is lower than the lower limit of that range, this composite oxide, when used in a negative electrode, is less apt to have a high loading density and has a reduced interparticle contact area. There are hence cases where interparticle resistance increases and output resistance increases. On the other hand, in case where the tap density thereof exceeds the upper limit of that range, the electrode has too small an amount of interparticle interstices and a reduced amount of channels for the nonaqueous electrolyte. There are hence cases where output resistance increases.

The tap density of a sample is determined by dropping the sample through a sieve having an opening size of 300 μm into a 20 cm$^2$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and calculating a density from the resultant volume of the sample and the weight thereof. The tap density calculated through this measurement is defined as the tap density of the lithium-titanium composite oxide in the invention.

(6) Roundness

When the lithium-titanium composite oxide is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of the lithium-titanium composite oxide, the more the particles thereof are desirable. The roundness of the composite oxide is generally 0.10 or higher, preferably 0.80 or higher, more preferably 0.85 or higher, especially preferably 0.90 or higher. The higher the roundness, the more the high-current-density charge/discharge characteristics are improved. Consequently, when the roundness of the composite oxide is lower than the lower limit of that range, there are cases where the negative-electrode active material has reduced suitability for loading and interparticle resistance is increased, resulting in reduced short-time high-current-density charge/discharge characteristics.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 μm are examined with the analyzer having a detection range set at 0.6-400 μm. The roundness determined through this measurement is defined as the roundness of the lithium-titanium composite oxide in the invention.

(7) Aspect Ratio

The aspect ratio of the lithium-titanium composite oxide is generally 1 or higher, and is generally 5 or lower, preferably 4 or lower, more preferably 3 or lower, especially preferably 2 or lower. When the aspect ratio thereof exceeds the upper limit of that range, there are cases where this composite oxide causes streak lines in electrode plate formation and an even coating surface cannot be obtained, resulting in a decrease in short-time high-current-density charge/discharge characteristics. Incidentally, the lower limit of that range is a theoretical lower limit of the aspect ratio of lithium-titanium composite oxides.

In determining aspect ratio, particles of the lithium-titanium composite oxide are examined with a scanning electron microscope with enlargement. Fifty are arbitrarily selected from composite-oxide particles fixed to an edge face of a metal having a thickness of 50 μm or smaller, and each particle is examined in a three-dimensional manner while rotating or inclining the stage to which the sample is fixed. In this examination, the length of the longest axis A of each particle and the length of the shortest axis B perpendicular to that axis are measured, and the average of the A/B values is determined. The aspect ratio (A/B) determined through this measurement is defined as the aspect ratio of the lithium-titanium composite oxide in the invention.

(8) Processes for Producing Negative-Electrode Active Material

Processes for producing the lithium-titanium composite oxide are not particularly limited unless they depart from the spirit of the invention. Examples thereof include several processes, and processes in general use for producing inorganic compounds may be employed.

Examples thereof include a method in which a titanium source, e.g., titanium oxide, is evenly mixed with a lithium source, e.g., LiOH, Li$_2$CO$_3$, or LiNO$_3$, and optionally with a source of other element(s) and this mixture is burned at a high temperature to obtain the active material.

Especially for producing spherical or ellipsoidal active materials, various techniques are usable. Examples thereof include: a method which comprises dissolving or pulverizing/dispersing a titanium source, e.g., titanium oxide, optionally together with a source of other element(s) in a solvent, e.g., water, regulating the pH of the solution or dispersion with stirring to produce a spherical precursor, recovering and optionally drying the precursor, subsequently adding thereto a lithium source, e.g., LiOH, Li$_2$CO$_3$, or LiNO$_3$, and burning the mixture at a high temperature to obtain the active material.

Another example is a method which comprises dissolving or pulverizing/dispersing a titanium source, e.g., titanium oxide, optionally together with a source of other element(s) in a solvent, e.g., water, drying and forming the solution or dispersion with a spray dryer or the like to obtain a spherical or ellipsoidal precursor, adding thereto a lithium source, e.g., LiOH, Li$_2$CO$_3$, or LiNO$_3$, and burning the mixture at a high temperature to obtain the active material.

Still another example is a method which comprises dissolving or pulverizing/dispersing a titanium source, e.g., titanium oxide, together with a lithium source, e.g., LiOH, Li$_2$CO$_3$, or LiNO$_3$, and optionally with a source of other element(s) in a solvent, e.g., water, drying and forming the solution or dispersion with a spray dryer or the like to obtain a spherical or ellipsoidal precursor, and burning the precursor at a high temperature to obtain the active material.

In those steps, one or more of elements other than Ti, such as, e.g., Al, Mn, Ti, V, Cr, Mn, Fe, Co, Li, Ni, Cu, Zn, Mg, Ga, Zr, C, Si, Sn, and Ag, can be caused to be present in the titanium-containing metal oxide structure and/or present so as be in contact with the titanium-containing oxide. The incorporation of such elements can be used for regulating the operating voltage and capacity of the battery.

(9) Electrode Production

Any known method can be used for electrode production. For example, a binder and a solvent are added to a negative-electrode active material optionally together with a thickener, conductive material, filler, etc. to obtain a slurry and this slurry is applied to a current collector and dried. Thereafter, the coated current collector is pressed, whereby an electrode can be formed.

The thickness of the negative-electrode active-material layer per one side in the stage just before the step of injecting a nonaqueous electrolyte in battery fabrication is generally 15 μm or larger, preferably 20 μm or larger, more preferably 30 μm or larger. The upper limit thereof desirably is 150 μm or smaller, preferably 120 μm or smaller, more preferably 100 μm or smaller. When the thickness thereof is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be roller-pressed to obtain a sheet electrode, or may be subjected to compression molding to obtain a pellet electrode.

(10) Current Collector

As the current collector for holding the negative-electrode active material, a known one can be used at will. Examples of the current collector for the negative electrode include metallic materials such as copper, nickel, stainless steel, and nickel-plated steel. Copper is especially preferred of these from the standpoints of processability and cost.

In the case where the current collector is a metallic material, examples of the shape of the current collector include metal foils, metal cylinders, metal coils, metal plates, thin metal films, expanded metals, punching metals, and metal foams. Preferred of these are metal foil films including copper (Cu) and/or aluminum (Al). More preferred are copper foils and aluminum foils. Even more preferred are a rolled copper foil, which is produced by the rolling process, and an electrolytic copper foil, which is produced by the electrolytic process. Either of these can be used as a current collector.

In the case of a copper foil having a thickness smaller than 25 μm, use can be made of a copper alloy (e.g., phosphor bronze, titanium-copper, Corson alloy, or Cu—Cr—Zr alloy) having a higher strength than pure copper. Furthermore, an aluminum foil can be advantageously used because it has a low specific gravity and, hence, use of the foil as a current collector can reduce the weight of the battery.

The current collector comprising a copper foil produced by the rolling process is less apt to crack even when the negative electrode is rolled tightly or rolled at an acute angle, because the copper crystals are oriented in the rolling direction. This current collector can be advantageously used in small cylindrical batteries.

The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may be deposited on a surface of the rolled copper foil by the electrolytic process. One or each side of such a copper foil may have undergone a surface-roughening treatment or a surface treatment (e.g., a chromate treatment in a thickness of from several nanometers to about 1 μm or a priming treatment with titanium).

The current collector base is desired to further have the following properties.

(10-1) Average Surface Roughness (Ra)

The average surface roughness (Ra) of that side of the current collector base on which a thin active-material film is to be formed, as determined by the method provided for in JIS B 0601-1994, is not particularly limited. However, the average surface roughness thereof is generally 0.01 μm or higher, preferably 0.03 μm or higher, and is generally 1.5 μm or lower, preferably 1.3 μm or lower, more preferably 1.0 μm or lower.

This is because when the average surface roughness (Ra) of the current collector base is within that range, satisfactory charge/discharge cycle characteristics can be expected. In addition, the area of the interface between the base and a thin active-material film is increased and adhesion to the thin negative-electrode active-material film is improved. The upper limit of the average surface roughness (Ra) thereof is not particularly limited. However, a current collector base having an average surface roughness (Ra) of 1.5 μm or lower is usually employed because a foil having a practical thickness for batteries and having an Ra exceeding 1.5 μm is generally difficult to procure.

(10-2) Tensile Strength

Tensile strength is a quotient obtained by dividing the maximum tensile force required before test piece breakage by the sectional area of the test piece. In the invention, the tensile strength is determined through a measurement conducted with the same apparatus and by the same method as those described in JIS Z 2241 (Method of Metallic-Material Tensile Test).

The tensile strength of the current collector base is not particularly limited. However, it is generally 50 N·mm$^{-2}$ or higher, preferably 100 N·mm$^{-2}$ or higher, more preferably 150 N·mm$^{-2}$ or higher. The higher the tensile strength, the more the current collector base is preferred. However, it is desirable that the tensile strength thereof should be generally 1,000 N·mm$^{-2}$ or lower from the standpoint of industrial availability. A current collector base having a high tensile strength can be inhibited from cracking with the expansion/ contraction of the thin active-material film which occur upon charge/discharge. With this current collector base, satisfactory cycle characteristics can be obtained.

(10-3) 0.2% Proof Stress

The term 0.2% proof stress means the degree of load necessary for imparting a plastic (permanent) deformation of 0.2%. Namely, it means that application of that degree of load and subsequent removal thereof result in a 0.2% deformation. The 0.2% proof stress is determined through a measurement conducted with the same apparatus and by the same method as for tensile strength.

The 0.2% proof stress of the current collector base is not particularly limited. However, the 0.2% proof stress thereof is generally 30 N·mm$^{-2}$ or higher, preferably 100 N·mm$^{-2}$ or higher, especially preferably 150 N/mm$^2$ or higher. The higher the 0.2% proof stress, the more the current collector base is preferred. However, the 0.2% proof stress thereof is generally desirably 900 N·mm$^{-2}$ or lower from the standpoint of industrial availability. A current collector base having a high 0.2% proof stress can be inhibited from plastically deforming with the expansion/contraction of the thin active-material film which occur upon charge/discharge. With this current collector base, satisfactory cycle characteristics can be obtained.

(10-4) Thickness of Current Collector

The current collector may have any desired thickness. However, the thickness thereof is generally 1 μm or larger, preferably 3 μm or larger, more preferably 5 μm or larger, and is generally 1 mm or smaller, preferably 100 μm or smaller, more preferably 50 μm or smaller. In case where the current collector is thinner than 1 μm, this collector has reduced strength and there are hence cases where coating is difficult. When the current collector is thicker than 100 μm, there are cases where this collector deforms an electrode shape, e.g., a rolled form. The current collector may be in a mesh form.

(11) Thickness Ratio between Current Collector and Active-Material Layer

The thickness ratio between the current collector and the active-material layer is not particularly limited. However, the value of "(thickness of the active-material layer on one side just before impregnation with the nonaqueous electrolyte)/(thickness of the current collector)" is generally 150 or smaller, preferably 20 or smaller, more preferably 10 or smaller, and is generally 0.1 or larger, preferably 0.4 or larger, more preferably 1 or larger. When the thickness ratio between the current collector and the negative-electrode active-material layer exceeds the upper limit of that range, there are cases where this current collector heats up due to Joule's heat during high-current-density charge/discharge. When that ratio decreases beyond the lower limit of that range, the proportion by volume of the current collector to the negative-electrode active material increases and this may reduce the capacity of the battery.

(12) Electrode Density

When the negative-electrode active material is used to form an electrode, the electrode structure is not particularly limited. However, the density of the active material present on the current collector is preferably 1.0 g·cm$^{-3}$ or higher, more preferably 1.2 g·cm$^{-3}$ or higher, even more preferably 1.3 g·cm$^{-3}$ or higher, especially preferably 1.5 g·cm$^{-3}$ or higher, and is preferably 3 g·cm$^{-3}$ or lower, more preferably 2.5 g·cm$^{-3}$ or lower, even more preferably 2.2 g·cm$^{-3}$ or lower, especially preferably 2 g·cm$^{-3}$ or lower. When the density of the active material present on the current collector exceeds the upper limit of that range, there are cases where bonding between the current collector and the negative-electrode active material is weak and the active material sheds from the electrode. When the density thereof is lower than the lower limit of that range, there are cases where electrical conductivity among particles of the negative-electrode active material decreases and this increases battery resistance.

(13) Binder

The binder for binding the negative-electrode active material is not particularly limited so long as it is stable to the nonaqueous electrolyte and to the solvent to be used for electrode production.

Examples thereof include resinous polymers such as polyethylene, polypropylene, poly(ethylene terephthalate), poly(methyl methacrylate), polyimides, aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers and products of hydrogenation thereof; flexible resinous polymers such as syndiotactic-1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these may be used alone, or any desired combination of two or more thereof in any desired proportion may be used.

The kind of the solvent to be used for forming a slurry is not particularly limited so long as it is a solvent in which the negative-electrode active material and binder and the thickener and conductive material which are optionally used according to need can be dissolved or dispersed. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane. Especially when an aqueous solvent is used, a dispersant or the like is added in combination with the thickener described above to prepare a slurry using a latex of, e.g., SBR. One of such ingredients may be used alone, or any desired combination of two or more thereof in any desired proportion may be used.

The proportion of the binder to the negative-electrode active material is generally 0.1% by mass or higher, preferably 0.5% by mass or higher, more preferably 0.6% by mass or higher, and is generally 20% by mass or lower, preferably 15% by mass or lower, more preferably 10% by mass or lower, especially preferably 8% by mass or lower. In case where the proportion of the binder to the negative-electrode active material exceeds the upper limit of that range, the proportion of the binder which does not contribute to battery capacity increases and this may lead to a decrease in battery capacity. When the binder proportion is small than the lower limit, there are cases where the negative electrode has reduced strength and this is undesirable from the standpoint of battery fabrication step.

Especially when the binder includes a rubbery polymer represented by SBR as the main component, the proportion of this binder to the active material is generally 0.1% by mass or higher, preferably 0.5% by mass or higher, more preferably 0.6% by mass or higher, and is generally 5% by mass or lower, preferably 3% by mass or lower, more preferably 2% by mass or lower.

In the case where the binder includes a fluorochemical polymer represented by poly(vinylidene fluoride) as the main component, the proportion of this binder to the active material is 1% by mass or higher, preferably 2% by mass or higher, more preferably 3% by mass or higher, and is generally 15% by mass or lower, preferably 10% by mass or lower, more preferably 8% by mass or lower.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly (vinyl alcohol), oxidized starch, phosphorylated starch, casein, and salts of these. One of these thickeners may be used alone, or any desired combination of two or more thereof in any desired proportion may be used.

In the case where such a thickener is further added, the proportion of the thickener to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit of that range result in a reduced proportion of the active material in the negative-electrode active-material layer, and this may pose a problem that battery capacity decreases and a problem that resistance among the particles of the negative-electrode active material increases.

<2-4. Positive Electrode>

The positive electrode for use in the nonaqueous-electrolyte secondary battery of this invention is explained below.

<2-4-1. Positive-Electrode Active Material>

Positive-electrode active materials usable in the positive electrode are explained below.

(1) Composition

The positive-electrode active materials are not particularly limited so long as these are capable of electrochemically occluding/releasing lithium ions. For example, however, a substance containing lithium and at least one transition metal is preferred. Examples thereof include lithium-transition metal composite oxides and lithium-containing transition metal/phosphoric acid compounds.

The transition metal in the lithium-transition metal composite oxides preferably is V, Ti, Cr, Mn, Fe, Co, Ni, Cu, or the like. Specific examples of the composite oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_4$, and ones formed by partly replacing the transition metal atom(s) as a main component of these lithium-transition metal composite oxides by one or more other metals, e.g., Al, Ti, V, Cr, Mn, Fe, Co, Li, Ni, Cu, Zn, Mg, Ga, Zr, Si, etc.

Examples of such compounds formed by replacement include $LiNi_{0.5}Mn_{0.5}O_2$, $LiNi_{0.05}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$, etc.

The transition metal in the lithium-containing transition metal/phosphoric acid compounds preferably is V, Ti, Cr, Mn, Fe, Co, Ni, Cu, or the like. Specific examples of the compounds include iron phosphate compounds such, as $LiFePO_4$, $Li_3Fe_2(PO_4)_3$, and $LiFeP_2O_7$, cobalt phosphate compounds such as $LiCoPO_4$, and ones formed by partly replacing the transition metal atom(s) as a main component of these lithium-transition metal/phosphoric acid compounds by one or more other metals, e.g., Al, Ti, V, Cr, Mn, Fe, Co, Li, Ni, Cu, Zn, Mg, Ga, Zr, Nb, Si, etc.

(2) Surface Coating

Use may be made of a material including any of those positive-electrode active materials and, adherent to the surface thereof, a substance (hereinafter abbreviated to "surface-adherent substance") having a composition different from that of the substance constituting the core positive-electrode active material. Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate and the like.

Those surface-adherent substances each can be adhered to the surface of a positive-electrode active material, for example, by: a method in which the substance is dissolved or suspended in a solvent and this solution or suspension is infiltrated into a positive-electrode active material and then dried; a method in which a precursor for the surface-adherent substance is dissolved or suspended in a solvent and this solution or suspension is infiltrated into a positive-electrode active material and then heated or otherwise treated to react the precursor; or a method in which the substance is added to a precursor for a positive-electrode active material and heat-treated together with the precursor.

The mass of the surface-adherent substance adherent to the surface of the positive-electrode active material is generally 0.1 ppm or larger, preferably 1 ppm or larger, more preferably 10 ppm or larger, in terms of mass ppm of the positive-electrode active material. The amount thereof is generally 20% or smaller, preferably 10% or smaller, more preferably 5% or smaller, based on the mass of the positive-electrode active material.

The surface-adherent substance serves to inhibit the nonaqueous electrolyte from undergoing an oxidation reaction on the surface of the positive-electrode active material, whereby the battery life can be improved. However, in case where the amount of the substance adhered is smaller than the lower limit of that range, that effect is not sufficiently produced. On the other hand, amounts thereof exceeding the upper limit of that range may result in an increase in resistance because the surface-adherent substance inhibits the occlusion/release of lithium ions. Consequently, that range is preferred.

(3) Shape

The shape of the particles of the positive-electrode active material may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

The reasons for that are as follows. In electrochemical elements, the active material in each electrode usually expands/contracts with the charge/discharge of the element and, hence, deterioration is apt to occur, such as active-material breakage and conduction path breakage, due to the stress caused by the expansion/contraction. Consequently, a positive-electrode active material in which the primary particles have aggregated to form secondary particles is preferable to an active material composed of primary particles only since the particles in the former active material relieve the stress caused by expansion/contraction to prevent deterioration.

Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

(4) Tap Density

The tap density of the positive-electrode active material is generally 1.3 g·cm$^{-3}$ or higher, preferably 1.5 g·cm$^{-3}$ or higher, more preferably 1.6 g·cm$^{-3}$ or higher, especially preferably 1.7 g·cm$^{-3}$ or higher, and is generally 2.5 g·cm$^{-3}$ or lower, preferably 2.4 g·cm$^{-3}$ or lower.

By using a metal composite oxide powder having a high tap density, a positive-electrode active-material layer having a high density can be formed. Consequently, when the tap density of the positive-electrode active material is lower than the lower limit of that range, not only it is necessary to use a larger amount of a dispersion medium and larger amounts of a conductive material and a binder in forming a positive-electrode active-material layer. There are hence cases where the loading of the positive-electrode active material in the positive-electrode active-material layer is limited, resulting in a limited battery capacity. The higher the tap density, the more the positive-electrode active material is generally preferred. There is no particular upper limit on the tap density. However, when the tap density thereof is lower than that range, there are cases where the diffusion of lithium ions in the positive-electrode active-material layer through the nonaqueous electrolyte as a medium becomes a rate-determining stage and this is apt to reduce load characteristics.

The tap density of a sample is determined by dropping the sample through a sieve having an opening size of 300 μm into a 20 cm$^3$ tapping cell to fill the capacity of the cell with the sample, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. The tap density determined through this measurement is defined as the tap density of the positive-electrode active material in the invention.

(5) Median Diameter d50

The median diameter d50 (secondary-particle diameter in the case where the primary particles have aggregated to form secondary particles) of the particles of the positive-electrode active material can be determined also with a laser diffraction/scattering type particle size distribution analyzer.

The median diameter d50 thereof is generally 0.1 μm or larger, preferably 0.5 μm or larger, more preferably 1 μm or larger, especially preferably 3 μm or larger, and is generally 20 μm or smaller, preferably 18 μm or smaller, more preferably 16 μm or smaller, especially preferably 15 μm or smaller. When the median diameter d50 thereof is smaller than the lower limit of that range, there are cases where a product having a high bulk density cannot be obtained. When the median diameter thereof exceeds the upper limit of that range, lithium diffusion in the individual particles requires a longer time and this results in a decrease in battery performance. In addition, there are cases where such positive-electrode active-material particles, when used in producing a positive electrode for batteries, i.e., when the active material and other ingredients including a conductive material and a binder are slurried with a solvent and this slurry is applied in a thin-film form, pose a problem, for example, that streak lines generate.

It is possible to further improve loading in positive-electrode production by mixing two or more positive-electrode active materials differing in median diameter d50.

In determining median diameter d50, a 0.1% by mass aqueous solution of sodium hexametaphosphate is used as a dispersion medium. LA-920, manufactured by HORIBA, Ltd., is used as a particle size distribution analyzer to conduct a five-minute ultrasonic dispersing treatment, before the particles are examined at a measuring refractive index set at 1.24.

(6) Average Primary-Particle Diameter

In the case where the primary particles have aggregated to form secondary particles, the average primary-particle diameter of this positive-electrode active material is generally 0.01 μm or larger, preferably 0.05 μm or larger, more preferably 0.08 μm or larger, especially preferably 0.1 μm or larger, and is generally 3 μm or smaller, preferably 2 μm or smaller, more preferably 1 μm or smaller, especially preferably 0.6 μm or smaller. The reasons for this are as follows. In case where the average primary-particle diameter thereof exceeds the upper limit of that range, spherical secondary particles are difficult to form and this adversely influences powder loading or results in a considerably reduced specific surface area. There may hence be a high possibility that battery performances such as output characteristics might decrease. When the average primary-particle diameter thereof is smaller than the lower limit of that range, crystal growth is usually insufficient and, hence, there are cases where use of this positive-electrode active material gives a secondary battery having reduced performances, e.g., poor charge/discharge reversibility.

Average primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged, whereby the average value can be determined.

(7) BET Specific Surface Area

The BET specific surface area of the positive-electrode active material, in terms of the value of specific surface area as determined by the BET method, is generally 0.2 m$^2$·g$^{-1}$ or larger, preferably 0.3 m$^2$·g$^{-1}$ or larger, more preferably 0.4 m$^2$·g$^{-1}$ or larger, and is generally 4.0 m$^2$·g$^{-1}$ or smaller, preferably 2.5 m$^2$·g$^{-1}$ or smaller, more preferably 1.5 m$^2$·g$^{-1}$ or smaller. In case where the BET specific surface area thereof is smaller than the lower limit of that range, battery performances are apt to decrease. In case where the BET specific surface area thereof exceeds the upper limit of that range, a high tap density is difficult to obtain and there are cases where applicability in forming a positive-electrode active-material layer is poor.

BET specific surface area is measured with a surface area meter (a fully automatic surface area measuring apparatus manufactured by Ohukura Riken Co., Ltd.). The specific surface area is determined by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure. The specific surface area determined through this measurement is defined as the BET specific surface area of the positive-electrode active material in the invention.

(8) Processes for Producing Positive-Electrode Active Material

Processes for producing positive-electrode active materials are not particularly limited unless the processes depart from the spirit of the invention. Examples thereof include several processes. Techniques which are in general use for producing inorganic compounds may be employed.

Especially for producing spherical or ellipsoidal active materials, various techniques are usable. Examples thereof include: a method which comprises dissolving or pulverizing/dispersing a transition metal source, e.g., a transition metal nitrate or sulfate, optionally together with a source of other element(s) in a solvent, e.g., water, regulating the pH of the solution or dispersion with stirring to produce a spherical precursor, recovering and optionally drying the precursor, subsequently adding thereto a lithium source, e.g., LiOH, $Li_2CO_3$, or $LiNO_3$, and burning the mixture at a high temperature to obtain the active material.

Another example is a method which comprises dissolving or pulverizing/dispersing a transition metal source, e.g., a transition metal nitrate, sulfate, hydroxide, or oxide, optionally together with a source of other element(s) in a solvent, e.g., water, drying and forming the solution or dispersion with a spray dryer or the like to obtain a spherical or ellipsoidal precursor, adding thereto a lithium source, e.g., LiOH, $Li_2CO_3$, or $LiNO_3$, and burning the mixture at a high temperature to obtain the active material.

Still another example is a method which comprises dissolving or pulverizing/dispersing a transition metal source, e.g., a transition metal nitrate, sulfate, hydroxide, or oxide, together with a lithium, source, e.g., LiOH, $Li_2CO_3$, or $LiNO_3$, and optionally with a source of other element(s) in a solvent, e.g., water, drying and forming the solution or dispersion with a spray dryer or the like to obtain a spherical or ellipsoidal precursor, and burning the precursor at a high temperature to obtain the active material.

<2-4-2. Electrode Structure and Production Process>

(1) Process for Producing Positive Electrode

The positive electrode is produced by forming a positive-electrode active-material layer including particles of a positive-electrode active material and a binder on a current collector. The production of the positive electrode with a positive-electrode active material can be conducted in an ordinary manner. Namely, a positive-electrode active material and a binder are mixed together by a dry process optionally together with a conductive material, thickener, etc. and this mixture is formed into a sheet and press-bonded to a positive-electrode current collector. Alternatively, those materials are dissolved or dispersed in a liquid medium to obtain a slurry and this slurry is applied to a positive-electrode current collector and dried. Thus, a positive-electrode active-material layer is formed on the current collector, whereby the positive electrode can be obtained.

The content of the positive-electrode active material in the positive-electrode active-material layer is generally 10% by mass or higher, preferably 30% by mass or higher, especially preferably 50% by mass or higher, and is generally 99.9% by mass or lower, preferably 99% by mass or lower. The reasons for this are as follows. When the content of the positive-electrode active material in the positive-electrode active-material layer is lower than the lower limit of that range, there are cases where an insufficient electrical capacity results. When the content thereof exceeds the upper limit of that range, there are cases where the positive electrode has insufficient strength. One positive-electrode active-material powder may be used alone in the invention, or any desired combination of two or more positive-electrode active materials differing in composition or powder properties may be used in any desired proportion.

(2) Conductive Material

As the conductive material, a known conductive material can be used at will. Examples thereof include metallic materials such as copper and nickel; graphites such as natural graphites and artificial graphites; carbon blacks such as acetylene black; and carbon materials such as amorphous carbon, e.g., needle coke. One of these materials may be used alone, or any desired combination of two or more thereof in any desired proportion may be used.

The conductive material may be used so that it is incorporated in the positive-electrode active-material layer in an amount of generally 0.01% by mass or larger, preferably 0.1% by mass or larger, more preferably 1% by mass or larger, and of generally 50% by mass or lower, preferably 30% by mass or lower, more preferably 15% by mass or lower. When the content thereof is lower than the lower limit of that range, there are cases where electrical conductivity becomes insufficient. Conversely, when the content thereof exceeds the upper limit of that range, there are cases where battery capacity decreases.

(3) Binder

The binder to be used for producing the positive-electrode active-material layer is not particularly limited so long as the binder is stable to the nonaqueous electrolyte and to the solvent to be used for electrode production.

In the case where the layer is to be formed through coating fluid application, any binder may be used so long as it is a material which is soluble or dispersible in the liquid medium for use in electrode production. Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), NBR (acrylonitrile/butadiene rubbers), fluororubbers, isoprene rubbers, butadiene rubbers, and ethylene/propylene rubbers; thermoplastic elastomeric polymers such as styrene/butadiene/styrene block copolymers or products of hydrogenation thereof, EPDM (ethylene/propylene/diene terpolymers), styrene/ethylene/butadiene/ethylene copolymers, and styrene/isoprene/styrene block copolymers or products of hydrogenation thereof; flexible resinous polymers such as syndiotactic-1,2-polybutadiene, poly(vinylacetate), ethylene/vinyl acetate copolymers, and propylene/α-olefin copolymers; fluorochemical polymers such as poly(vinylidene fluoride) (PVdF), polytetrafluoroethylene, fluorinated poly (vinylidene fluoride), and polytetrafluoroethylene/ethylene copolymers; and polymer compositions having the property of conducting alkali metal ions (especially lithium ions). One of these substances may be used alone, or any desired combination of two or more thereof in any desired proportion may be used.

The proportion of the binder in the positive-electrode active-material layer is generally 0.1% by mass or higher, preferably 1% by mass or higher, more preferably 3% by mass or higher, and is generally 80% by mass or lower, preferably 60% by mass or lower, more preferably 40% by mass or lower, especially preferably 10% by mass or lower. When the proportion of the binder is lower than the lower limit of that range, there are cases where the positive-electrode active material cannot be sufficiently held and the positive electrode has insufficient mechanical strength to impair battery performances such as cycle characteristics. When the proportion thereof is higher than the upper limit of that range, there are cases where such high proportions lead to a decrease in battery capacity or conductivity.

(4) Liquid Medium

The kind of the liquid medium to be used for forming a slurry is not particularly limited so long as it is a solvent in which the positive-electrode active material, conductive material, and binder and a thickener, which is used according to need, can be dissolved or dispersed. Either an aqueous solvent or an organic solvent may be used.

Examples of the aqueous medium include water and mixed solvents including an alcohol and water. Examples of the organic medium include aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether and tetrahydrofuran (THF); amides such as N-methylpyrrolidone (NMP), dimethylformamide, and dimethylacetamide; and aprotic polar solvents such as hexamethylphosphoramide and dimethyl sulfoxide. One of these liquid media may be used alone, or any desired combination of two or more thereof in any desired proportion may be used.

(5) Thickener

When an aqueous medium is used as a liquid medium for forming a slurry, it is preferred to use a thickener and a latex of, e.g., a styrene/butadiene rubber (SBR) to prepare a slurry. A thickener is used generally for the purpose of regulating the viscosity of the slurry.

The thickener is not particularly limited unless it considerably lessens the effects of the invention. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used.

In the case where such a thickener is further used, the proportion of the thickener to the active material desirably is generally 0.1% by mass or higher, preferably 0.5% by mass or higher, more preferably 0.6% by mass or higher, and is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit of that range result in a reduced proportion of the active material in the positive-electrode active-material layer, and this may pose a problem that battery capacity decreases and a problem that resistance among the particles of the positive-electrode active material increases.

(6) Compaction

It is preferred that the positive-electrode active-material layer obtained by coating fluid application and drying should be compacted with a handpress, roller press, or the like in order to heighten the loading density of the positive-electrode active material. The density of the positive-electrode active-material layer is preferably 1 $g \cdot cm^{-3}$ or higher, more preferably 1.5 $g \cdot cm^{-3}$ or higher, especially preferably 2 $g \cdot cm^{-3}$ or higher. The upper limit thereof is preferably 4 $g \cdot cm^{-3}$ or lower, more preferably 3.5 $g \cdot cm^{-3}$ or lower, especially preferably 3 $g \cdot cm^{-3}$ or lower. When the density of the positive-electrode active-material layer exceeds the upper limit of that range, the infiltration of a nonaqueous electrolyte into around the current collector/active material interface becomes insufficient and there are cases where charge/discharge characteristics especially at a high current density decrease. When the density thereof is lower than the lower limit of that range, there are cases where electrical conductivity among the active-material particles decreases to increase battery resistance.

(7) Current Collector

The material of the positive-electrode current collector is not particularly limited, and a known one can be used at will. Examples thereof include metallic materials such as aluminum, stainless steel, nickel-plated materials, titanium, and tantalum; and carbon materials such as carbon cloths and carbon papers. Of these, metallic materials are preferred. Especially preferred is aluminum.

In the case of a metallic material, examples of the shape of the current collector include metal foils, metal cylinders, metal coils, metal plates, thin metal films, expanded metals, punching metals, and metal foams. In the case of a carbon material, examples of the collector shape include carbon plates, thin carbon films, and carbon cylinders. Of these, a thin metal film is preferred. The thin film may be in a suitable mesh form.

Although the current collector may nave any desired thickness, the thickness thereof is generally 1 μm or larger, preferably 3 μm or larger, more preferably 5 μm or larger, and is generally 1 mm or smaller, preferably 100 μm or smaller, more preferably 50 μm or smaller. When the thin film is thinner than the lower limit of that range, there are cases where this film is deficient in strength required of a current collector. When the thin film is thicker than the upper limit of that range, there are cases where this film has impaired handleability.

<2-5. Separator>

A separator is generally interposed between the positive electrode and the negative electrode in order to prevent short-circuiting. In this case, the nonaqueous electrolyte of this invention are usually infiltrated into the separator.

The material and shape of the separator are not particularly limited, and known separators can be employed at will unless the effects of the invention are considerably lessened thereby. In particular, use may be made of separators constituted of materials stable to the nonaqueous electrolyte of the invention, such as resins, glass fibers, and inorganic materials. It is preferred to use a separator which is in the form of a porous sheet, nonwoven fabric, or the like and has excellent liquid retentivity.

As the material of the resinous or glass-fiber separators, use can be made of, for example, polyolefins such as polyethylene and polypropylene, polytetrafluoroethylene, polyethersulfones, glass filters, and the like. Preferred of these are glass filters and polyolefins. More preferred are polyolefins. One of these materials may be used alone, or any desired combination of two or more thereof in any desired proportion may be used.

The separator may have any desired thickness. However, the thickness thereof is generally 1 μm or larger, preferably 5 μm or larger, more preferably 10 μm or larger, and is generally 50 μm or smaller, preferably 40 μm or smaller, more preferably 30 μm or smaller. When the separator is thinner than the lower limit of that range, there are cases where insulating properties and mechanical strength decrease. When the separator is thicker than the upper limit of that range, there are cases where battery performances including rate characteristics decrease. In addition, there also are cases where use of such a separator gives a nonaqueous-electrode secondary battery which as a whole has a reduced energy density.

In the case where a porous material such as, e.g., a porous sheet, or a nonwoven fabric is used as the separator, this separator may have any desired porosity. However, the porosity thereof is generally 20% or higher, preferably 35% or higher, more preferably 45% or higher, and is generally 90% or lower, preferably 85% or lower, more preferably 75% or lower. In case where the porosity thereof is lower than the lower limit of that range, this separator tends to have increased film resistance, resulting in impaired rate characteristics. In case where the porosity thereof is higher than the upper limit of that range, this separator tends to have reduced mechanical strength and reduced insulating properties.

The separator may have any desired average pore diameter. However, the average pore diameter thereof is generally 0.5 µm or smaller, preferably 0.2 µm or smaller, and is generally 0.05 µm or larger. In case where the average pore diameter thereof exceeds the upper limit of that range, short-circuiting is apt to occur. When the average pore diameter thereof is smaller than the lower limit of that range, there are cases where this separator has increased film resistance, resulting in reduced rate characteristics.

On the other hand, examples of the inorganic materials which may be used include oxides such as alumina and silicon dioxide, nitrides such as aluminum nitride and silicon nitride, and sulfates such as barium sulfate and calcium sulfate. Such materials of a particulate shape or fibrous shape may be used.

With respect to form, a separator of a thin film form may be used, such as a nonwoven fabric, woven fabric, or microporous film. Suitable ones of a thin film form have a pore diameter of 0.01-1 µm and a thickness of 5-50 µm. Besides such a separator in an independent thin film form, use can be made of a separator obtained by forming a composite porous layer containing particles of the inorganic material with a resinous binder on a surface layer of the positive electrode and/or negative electrode. Examples of such separators include a porous layer formed by fixing alumina particles having a 90% particle diameter smaller than 1 µm with a fluororesin as a binder on both sides of the positive electrode.

<2-6. Battery Design>
[Electrode Group]

The electrode group may be either of: one having a multilayer structure in which the positive-electrode plate and negative-electrode plate described above have been superposed through the separator described above; and one having a wound structure in which the positive-electrode plate and negative-electrode plate described above have been spirally wound through the separator described above. The proportion of the volume of the electrode group to the internal volume of the battery (hereinafter referred to as electrode group proportion) is generally 40% or higher, preferably 50% or higher, and is generally 90% or lower, preferably 80% or lower. In case where the electrode group proportion is lower than the lower limit of that range, a decrease in battery capacity results. In case where the electrode group proportion exceeds the upper limit of that range, this battery has a reduced space volume. There are hence cases where battery heating-up causes members to expand and a liquid component of the electrolyte to have a heightened vapor pressure, resulting in an increased internal pressure. This battery is reduced in various characteristics including charge/discharge cycling performance and high-temperature storability, and there are even cases where the gas release valve, which releases the gas from the internal pressure, works.

[Current Collector Structure]

The current collector structure is not particularly limited. However, for more effectively realizing the improvement in discharge characteristics which is brought about by the nonaqueous electrolyte of this invention, it is preferred to employ a structure reduced in the resistance of wiring parts and joint parts. In the case where internal resistance has been reduced in this manner, use of the nonaqueous electrolyte of the invention produces its effects especially satisfactorily.

In the case of electrode groups assembled into the multilayer structure described above, a structure obtained by bundling the metallic core parts of respective electrode layers and welding the bundled parts to a terminal is suitable. When each electrode has a large area, this results in increased internal resistance. In this case, it is preferred to dispose two or more terminals in each electrode to reduce the resistance. In the case of an electrode group having the wound structure described above, two or more lead structures may be disposed on each of the positive electrode and negative electrode and bundled into a terminal, whereby internal resistance can be reduced.

[Case]

The material of the case is not particularly limited so long as it is a substance stable to the nonaqueous electrolyte to be used. For example, use may be made of metals such as nickel-plated steel sheets, stainless steel, aluminum or aluminum alloys, and magnesium, alloys or laminated films constituted of a resin and an aluminum foil. From the standpoint of weight reduction, it is preferred to use a metal which is aluminum or an aluminum alloy or a laminated film.

Examples of the case made of such a metal include one of a sealed structure formed by fusion-bonding metallic members to each other by laser welding, resistance welding, or ultrasonic welding and one of a caulked structure obtained by caulking members of the metal through a resinous gasket. Examples of the case made of the laminated film include one of a sealed structure formed by thermally fusion-bonding resin layers to each other. For the purpose of enhancing sealability, a resin different from the resin used in the laminated film may be interposed between the resin layers. Especially when resin layers are to be thermally fusion-bonded to each other through a current collector terminal to produce a sealed structure, metal/resin bonding is necessary and, hence, a resin having polar groups or a modified resin having polar groups introduced therein is suitable for use as the resin to be interposed.

[Protective Element]

Examples of the protective element include a PTC (positive temperature coefficient), which increases in resistance upon abnormal heating-up or when an excessive current flows, a temperature fuse, a thermister, and a valve (current breaker valve) which breaks current flow through the circuit in abnormal heating-up based on an abrupt increase in the internal pressure or internal temperature of the battery, it is preferred to select such a protective element which does not work under ordinary high-current use conditions. From the standpoint of high output, it is preferred to employ a design which prevents abnormal heating-up and thermal run-away even without a protective element.

[Casing]

The nonaqueous-electrolyte secondary battery of this invention is usually fabricated by housing the nonaqueous electrolyte, negative electrode, positive electrode, separator, etc. in a casing. This casing is not limited, and a known one can be employed at will unless this considerably lessens the effects of the invention.

The casing may be made of any desired material. For example, however, nickel-plated iron, stainless steel, aluminum or an alloy thereof, nickel, titanium, or the like is generally used.

The casing may have any desired shape. For example, the casing may be any of the cylindrical type, prismatic type, laminate type, coin type, large type, and the like.

When a carbonate having a halogen atom and a monofluorophosphate and/or difluorophosphate are incorporated into a nonaqueous electrolyte and this nonaqueous electrolyte is used to fabricate a nonaqueous-electrode secondary battery, then this secondary battery can have improved storability in high-temperature environments. Details of the reasons for this are unclear. However, it is presumed that the coexistence of a carbonate having a halogen atom with a monofluorophosphate and/or difluorophosphate in the electrolyte contributes to an improvement in the properties of a protective coating film in some way. Furthermore, it is presumed that use of the carbonate having a halogen atom as a solvent improves the oxidation resistance of the nonaqueous electrolyte and hence inhibits this electrolyte from reacting with the positive-electrode active material. This nonaqueous electrolyte is presumed to contribute to an improvement in storability.

<Nonaqueous Electrolyte 2 and Nonaqueous-Electrolyte Secondary Battery 2>

[1. Nonaqueous Electrolyte 2 for Secondary Battery]

The nonaqueous electrolyte for use in nonaqueous-electrolyte secondary battery 2 of the invention (hereinafter suitably referred to as "nonaqueous electrolyte 2 in the invention") is a nonaqueous electrolyte mainly comprising a nonaqueous solvent and an electrolyte dissolved therein, and is characterized by containing a compound which is liquid at 25° C., has a permittivity of 5 or higher and a coefficient of viscosity of 0.6 cP or lower, and has a group constituting a heteroelement-containing framework (excluding carbonyl framework) and by further containing a monofluorophosphate and/or a difluorophosphate.

<1-1. Electrolyte>

The electrolyte to be used in nonaqueous electrolyte 2 of the invention is not limited, and known ones for use as electrolytes in a target nonaqueous-electrolyte secondary battery can be employed and incorporated at will. In the case where nonaqueous electrolyte 2 of the invention is to be used in nonaqueous-electrolyte secondary batteries, the electrolyte preferably is one or more lithium salts.

Examples of the electrolyte include the same electrolytes as those shown above with regard to nonaqueous electrolyte 1.

Preferred of these is $LiPF_6$, $LiBF_4$, $LiCF_3SO_3$, $LiN(CF_3SO_2)_2$, $LiN(C_2F_5SO_2)_2$, or lithium bis(oxalate)borate. Especially preferred is $LiPF_6$ or $LiBF_4$.

In the case of using a combination of electrolytes, the kinds of the electrolytes and the proportions of the electrolytes are the same as those described above with regard to nonaqueous electrolyte 1.

Furthermore, the lithium salt concentration, preferred concentration, and the like in the final composition of nonaqueous electrolyte 2 of the invention are the same as those described above with regard to nonaqueous electrolyte 1. The phenomena which occur when the concentration is outside the range also are the same as those described above with regard to nonaqueous electrolyte 1.

Especially in the case where the nonaqueous solvent of the nonaqueous electrolyte consists mainly of one or more carbonate compounds such as alkylene carbonates or dialkyl carbonates, preferred electrolytes and the proportion thereof are the same as those described above with regard to nonaqueous electrolyte 1. The phenomena which occur when the proportion is outside the range also are the same as those described above with regard to nonaqueous electrolyte 1.

In the case where the nonaqueous solvent of this nonaqueous electrolyte includes at least 50% by volume cyclic carboxylic acid ester compound such as, e.g., γ-butyrolactone or γ-valerolactone, it is preferred that $LiBF_4$ should account for 50 mol % or more of all lithium salts.

<1-2. Nonaqueous Solvent>

Nonaqueous electrolyte 2 of the invention contains "a compound which is liquid at 25° C., has a permittivity of 5 or higher and a coefficient of viscosity of 0.6 cP or lower, and has a group constituting a heteroelement-containing framework (excluding carbonyl group)".

<1-2-1. Compound which is Liquid at 25° C., has Permittivity of 5 or Higher and Coefficient of Viscosity of 0.6 cP or Lower, and has Group Constituting Heteroelement-Containing Framework (Excluding Carbonyl Group)>

The "compound which is liquid at 25° C., has a permittivity of 5 or higher and a coefficient of viscosity of 0.6 cP or lower, and has a group constituting a heteroelement-containing framework (excluding carbonyl group)" in invention 2 is not particularly limited so long as it is a compound within the scope of this definition. However, it is preferred that the compound should be a compound having an ether framework and/or a nitrile framework in view of the properties of the nonaqueous electrolyte. Namely, a compound having at least one ether group or nitrile group as part of the structure is preferred.

It is more preferred that the compound having an ether framework and/or a nitrile framework should further have an alkyl group which may have one or more substituents, from the standpoint of reducing the electrochemical reactivity of the compound. The "alkyl group" represents an acyclic alkyl group or a cyclic alkyl group.

In the case where the compound is a compound having an ether framework, the ether framework in cooperation with an alkylene group may have formed a saturated cyclic compound which may nave one or more substituents. Namely, that compound may be a cyclic ether which may have one or more substituents.

Preferred substituents of the "compound having an ether framework and/or a nitrile framework" are halogen substituents and/or "saturated aliphatic hydrocarbon substituents having no substituents other than halogen atoms", from the standpoint of the reactivity thereof.

Although such substituents of the compound preferably are halogen substituents, alkoxycarbonyl substituents, alkoxycarboxyl substituents, and alkylcarboxyl substituents from the standpoint of the reactivity thereof, there is a fear about an increase in viscosity coefficient. Because of this, fluorine atoms are preferred as the substituents.

Examples of the "compound which is liquid at 25° C., has a permittivity of 5 or higher and a coefficient of viscosity of 0.6 cP or lower, and has a group constituting a heteroelement-containing framework (excluding carbonyl group)" in invention 2 include dimethoxyethane, diethoxyethane, ethoxymethoxyethane, tetrahydrofuran, tetrahydropyran, 1,3-dioxolane, acetonitrile, propinonitrile, and fluoroacetonitrile and the like.

The permittivity of the "compound which is liquid at 25° C., has a permittivity of 5 or higher and a coefficient of viscosity of 0.6 cP or lower, and has a group constituting a heteroelement-containing framework (excluding carbonyl group)" in invention 2 is measured by the method described in The Electrochemical Society of Japan ed., *Denki Kagaku Sokutei Manyuaru Jissen-hen*, page 13. The value determined by this measurement is defined as permittivity in invention 2.

The coefficient of viscosity of the "compound which is liquid at 25° C., has a permittivity of 5 or higher and a coefficient of viscosity of 0.6 cP or lower, and has a group constituting a heteroelement-containing framework (excluding carbonyl group)" is measured with an Ostwald viscometer. The value determined by this measurement is defined as the coefficient of viscosity in invention 2. Incidentally, "cP" means "centipoises".

It is essential that the compound should have a permittivity of 5 or higher. The permittivity thereof is preferably 5.1 or higher, more preferably 5.2 or higher, especially preferably 5.3 or higher. It is essential that the compound should have a coefficient of viscosity of 0.6 cP or lower. The coefficient of viscosity thereof is preferably 0.5 cP or lower.

When a compound having a permittivity of 5 or higher and a coefficient of viscosity of 0.6 cP is used, (there is an advantage that) it is possible to produce an electrolyte which has low resistance, attains high ion movability, and has high infiltrating properties. In general, such compounds having a permittivity of 5 or higher and a coefficient of viscosity of 0.6 cP or lower are susceptible to electrochemical decomposition. However, the electrochemical decomposition can be inhibited by using such compound in combination with a monofluorophosphate and/or a difluorophosphate.

<1-2-2. Other Nonaqueous Solvents>

Nonaqueous electrolyte 2 of the invention may contain a nonaqueous solvent other than the "compound which is liquid at 25° C., has a permittivity of 5 or higher and a coefficient of viscosity of 0.6 cP or lower, and has a group constituting a heteroelement-containing framework (excluding carbonyl group)", or may contain no nonaqueous solvent other than that compound. Nonaqueous solvents which do not adversely influence battery characteristics after battery fabrication may be incorporated without particular limitations on the use and kind thereof. Such optional solvents preferably are one or more members selected from the nonaqueous solvents enumerated below.

Examples of the usable nonaqueous solvents include acyclic or cyclic carbonates, acyclic or cyclic carboxylic acid esters, phosphorus-containing organic solvents, and sulfur-containing organic solvents and the like.

The acyclic carbonates also are not limited in the kind thereof. However, dialkyl carbonates are preferred. The number of carbon atoms of each constituent alkyl group is preferably 1-5, especially preferably 1-4. Examples thereof include dimethyl carbonate, ethyl methyl carbonate, diethyl carbonate, methyl-n-propyl carbonate, ethyl n-propyl carbonate, and di-n-propyl-carbonate and the like.

Of these, dimethyl carbonate, ethyl methyl carbonate, or diethyl carbonate is preferred from the standpoint of industrial availability and the reason that these compounds are satisfactory in various properties in a nonaqueous-electrolyte secondary battery.

The cyclic carbonates are not limited in the kind thereof. However, the number of carbon atoms of the alkylene group constituting each cyclic carbonate is preferably 2-6, especially preferably 2-4. Examples of the cyclic carbonate include ethylene carbonate, propylene carbonate, and butylene carbonate (2-ethylethylene carbonate or cis- and trans-2,3-dimethylethylene carbonates) and the like.

Of these, ethylene carbonate or propylene carbonate is preferred because these compounds are satisfactory in various properties in a nonaqueous-electrolyte secondary battery.

The acyclic carboxylic acid esters also are not limited in the kind thereof. Examples thereof include methyl acetate, ethyl acetate, n-propyl acetate, isopropyl acetate, n-butyl acetate, isobutyl acetate, tert-butyl acetate, methyl propionate, ethyl propionate, n-propyl propionate, isopropyl propionate, n-butyl propionate, isobutyl propionate, and tert-butyl propionate and the like.

Of these, ethyl acetate, methyl propionate, or ethyl propionate is preferred from the standpoint of industrial availability and the reason that these compounds are satisfactory in various properties in a nonaqueous-electrolyte secondary battery.

The cyclic carboxylic acid esters also are not limited in the kind thereof. Examples of such esters in ordinary use include γ-butyrolactone, γ-valerolactone, and δ-valerolactone.

Of these, γ-butyrolactone is preferred from the standpoint of industrial availability and the reason that this compound is satisfactory in various properties in a nonaqueous-electrolyte secondary battery.

The phosphorus-containing organic solvents also are not particularly limited in the kind thereof. Examples thereof include phosphoric acid esters such as trimethyl phosphate, triethyl phosphate, and triphenyl phosphate; phosphorous acid esters such as trimethyl phosphite, triethyl phosphite, and triphenyl phosphite; and phosphine oxides such as trimethylphosphine oxide, triethylphosphine oxide, and triphenylphosphine oxide and the like.

Furthermore, the sulfur-containing organic solvents also are not particularly limited in the kind thereof. Examples thereof include ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide and the like.

Of those compounds, the acyclic or cyclic carbonates or the acyclic or cyclic carboxylic acid esters are preferred because these compounds are satisfactory in various properties in a nonaqueous-electrolyte secondary battery. More preferred of these is ethylene carbonate, propylene carbonate, dimethyl carbonate, ethyl methyl carbonate, diethyl carbonate, ethyl acetate, methyl propionate, ethyl propionate, or γ-butyrolactone. Even more preferred is ethylene carbonate, propylene carbonate, dimethyl carbonate, ethyl methyl carbonate, diethyl carbonate, ethyl acetate, methyl propionate, or γ-butyrolactone.

<1-2-3. Others>

The "compound which is liquid at 25° C., has a permittivity of 5 or higher and a coefficient of viscosity of 0.6 cP or lower, and has a group constituting a heteroelement-containing framework (excluding carbonyl group)" may be used alone or in combination with one or more of the other nonaqueous solvents shown above. However, it is preferred to employ a combination of two or more compounds including the "compound which is liquid at 25° C., has a permittivity of 5 or higher and a coefficient of viscosity of 0.6 cP or lower, and has a group constituting a heteroelement-containing framework (excluding carbonyl group)". For example, it is preferred to use a high-permittivity solvent, such as a cyclic carbonate, in combination with a low-viscosity solvent, such as an acyclic carbonate or an acyclic ester.

For example, it is preferred to use: a combination of a high-permittivity solvent, e.g., a cyclic carbonate, and the "compound which is liquid at 25° C., has a permittivity of 5 or higher and a coefficient of viscosity of 0.6 cP or lower, and has a group constituting a heteroelement-containing framework (excluding carbonyl group)"; or a combination of a high-permittivity solvent, e.g., a cyclic carbonate, a low-viscosity solvent, e.g., an acyclic carbonate or an acyclic ester, and the "compound which is liquid at 25° C., has a permittivity of 5 or higher and a coefficient of viscosity of 0.6 cP or lower, and has a group constituting a heteroelement-containing framework (excluding carbonyl group)". It is especially preferred to use the "compound which is liquid at 25° C., has a permittivity of 5 or higher and a coefficient of viscosity of 0.6 cP or lower, and has a group constituting a heteroelement-containing frame work (excluding carbonyl group)" in combination with one or more members selected from nonaqueous solvents including cyclic carbonates and acyclic carbonates.

In particular, the total proportion of the cyclic carbonate and the acyclic carbonate to the whole nonaqueous solvent is generally 80% by volume or higher, preferably 85% by volume or higher, more preferably 90% by volume or higher. The proportion by volume of the cyclic carbonate to the sum of the cyclic carbonate and the acyclic carbonate is preferably 5% by volume or higher, more preferably 10% by volume or higher, especially preferably 15% by volume or higher, and is generally 50% by volume or lower, preferably 35% by volume or lower, more preferably 30% by volume or lower. Use of such combination of nonaqueous solvents is preferred because the battery fabricated with this combination has an improved balance between cycle characteristics and high-temperature storability (in particular, residual capacity and high-load discharge capacity after high-temperature storage).

Examples of the preferred combination including at least one cyclic carbonate and at least acyclic carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate and the like.

Combinations obtained by further adding propylene carbonate to those combinations including ethylene carbonate and one or more acyclic carbonates are also included in preferred combinations. In the case where propylene carbonate is contained, the volume ratio of the ethylene carbonate to the propylene carbonate is preferably from 99:1 to 40:60, especially preferably from 95:5 to 50:50. It is also preferred to regulate the proportion of the propylene carbonate to the whole nonaqueous solvent to a value which is 0.1% by volume or higher, preferably 1% by volume or higher, more preferably 2% by volume or higher, and is generally 10% by volume or lower, preferably 8% by volume or lower, more preferably 5% by volume or lower. This is because this regulation brings about excellent discharge load characteristics while maintaining the properties of the combination of ethylene carbonate and one or more acyclic carbonates.

More preferred of these are combinations including an asymmetric acyclic carbonate. In particular, combinations including ethylene carbonate, a symmetric acyclic carbonate, and an asymmetric acyclic carbonate, such as a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, or such combinations which further contain propylene carbonate are preferred because these combinations have a satisfactory balance between cycle characteristics and discharge load characteristics. Preferred of such combinations are ones in which the asymmetric acyclic carbonate is ethyl methyl carbonate. Furthermore, the number of carbon atoms of each of the alkyl groups constituting each dialkyl carbonate is preferably 1-2.

Other examples of preferred mixed solvents are ones containing an acyclic ester. In particular, the cyclic carbonate/acyclic carbonate mixed solvents which contain an acyclic ester are preferred from the standpoint of improving the discharge load characteristics of a battery. The acyclic ester especially preferably is ethyl acetate or methyl propionate. The proportion by volume of the acyclic ester to the nonaqueous solvent is generally 5% or higher, preferably 8% or higher, more preferably 15% or higher, and is generally 50% or lower, preferably 35% or lower, more preferably 30% or lower, even more preferably 25% or lower.

Other preferred examples of nonaqueous solvents are ones in which one organic solvent selected from the group consisting of ethylene carbonate, propylene carbonate, butylene carbonate, γ-butyrolactone, and γ-valerolactone or a mixed solvent composed of two or more organic solvents selected from the group accounts for at least 60% by volume of the whole. Such mixed solvents have a flash point of preferably 50° C. or higher, especially preferably 70° C. or higher. The nonaqueous electrolyte employing this solvent is reduced in solvent vaporization and liquid leakage even when used at high temperatures. In particular, when such a nonaqueous solvent which includes ethylene carbonate and γ-butyrolactone in a total amount of 80% by volume or larger, preferably 90% by volume or larger, based on the nonaqueous solvent and in which the volume ratio of the ethylene carbonate to the γ-butyrolactone is from 5:95 to 45:55 or such a nonaqueous solvent which includes ethylene carbonate and propylene carbonate in a total amount of 80% by volume or larger, preferably 90% by volume or larger, based on the whole nonaqueous solvent and in which the volume ratio of the ethylene carbonate to the propylene carbonate is from 30:70 to 80:20 is used, then an improved balance between cycle characteristics and discharge load characteristics, etc. is generally obtained.

<1-3. Monofluorophosphate and Difluorophosphate>

Nonaqueous electrolyte 2 of the invention contains a monofluorophosphate and/or a difluorophosphate as an essential component. With respect to the "monofluorophosphate and difluorophosphate" to be used in invention 2, the kinds and contents thereof, places where the salts exist, methods of analysis, production process, etc. are the same as those described above with regard to nonaqueous electrolyte 1.

<1-4. Additives>

Nonaqueous electrolyte 2 of the Invention may contain various additives so long as these additives do not considerably lessen the effects of invention 2. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retentivity after high-temperature storage and cycle characteristics. It is preferred to add a carbonate having at least either of an unsaturated bond and a halogen atom (hereinafter sometimes referred to as "specific carbonate") as an aid for improving capacity retentivity after high-temperature storage and cycle characteristics, among those additives. The specific carbonate and other additives are separately explained below.

<1-4-1. Specific Carbonate>

The specific carbonate is a carbonate having at least either of an unsaturated bond and a halogen atom. The specific carbonate may have an unsaturated bond only or have a halogen atom only, or may have both an unsaturated bond and a halogen atom.

The molecular weight of the specific carbonate is not particularly limited, and may be any desired value unless this considerably lessens the effects of invention 2. However, the molecular weight thereof is generally 50 or higher, preferably 80 or higher, and is generally 250 or lower, preferably 150 or lower. When the molecular weight thereof is too high, this specific carbonate has reduced solubility in the nonaqueous electrolyte and there are cases where the effect of the carbonate is difficult to produce sufficiently.

Processes for producing the specific carbonate also are not particularly limited, and a known process selected at will can be used to produce the carbonate.

Any one specific carbonate may be incorporated alone into nonaqueous electrolyte 2 of the invention, or any desired combination of two or more specific carbonates may be incorporated thereinto in any desired proportion.

The amount of the specific carbonate to be incorporated into nonaqueous electrolyte 2 of the invention is not limited, and may be any desired value unless this considerably lessens the effects of invention 2. It is, however, desirable that the specific carbonate should be incorporated in a concentration which is generally 0.01% by mass or higher, preferably 0.1% by mass or higher, more preferably 0.3% by mass or higher, and is generally 70% by mass or lower, preferably 50% by mass or lower, more preferably 40% by mass or lower, based on nonaqueous electrolyte 2 of the invention.

When the amount of the specific carbonate is below the lower limit of that range, there are cases where use of this nonaqueous electrolyte 2 of the invention in a nonaqueous-electrolyte secondary battery results in difficulties in producing the effect of sufficiently improving the cycle characteristics of the nonaqueous-electrolyte secondary battery. On the other hand, when the proportion of the specific carbonate is too high, there is a tendency that use of this nonaqueous electrolyte 2 of the invention in a nonaqueous-electrolyte secondary battery results in decreases in the high-temperature storability and continuous-charge characteristics of the nonaqueous-electrolyte secondary battery. In particular, there are cases where gas evolution is enhanced and capacity retentivity decreases.

<1-4-1-1. Unsaturated Carbonate>

The carbonate having an unsaturated bond (hereinafter often referred to as "unsaturated carbonate") is the same as in nonaqueous electrolyte 1.

<1-4-1-2. Halogenated Carbonate>

On the other hand, the carbonate having a halogen atom (hereinafter often referred to as "halogenated carbonate") as one form of the specific carbonate according to invention 2 is not particularly limited so long as it is a carbonate having a halogen atom, and any desired halogenated carbonate can be used. The same carbonates as those shown above under "Carbonate Having Halogen Atom" with regard to nonaqueous electrolyte 1 can be used. Of these examples, preferred embodiments of the "halogenated carbonate" in nonaqueous electrolyte 2 are shown below.

Examples of the halogen atoms include fluorine, chlorine, bromine, and iodine atoms. Preferred of these are fluorine atoms or chlorine atoms. Especially preferred are fluorine atoms. The number of halogen atoms possessed by the halogenated carbonate also is not particularly limited so long as the number thereof is 1 or larger. However, the number thereof is generally 6 or smaller, preferably 4 or smaller. In the case where the halogenated carbonate has two or more halogen atoms, these atoms may be the same or different.

Examples of the halogenated carbonate include ethylene carbonate derivatives, dimethyl carbonate derivatives, ethyl methyl carbonate derivatives, and diethyl carbonate derivatives.

Examples of the ethylene carbonate derivatives include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate, and 4,4-dichloro-5,5-dimethylethylene carbonate and the like.

Examples of the dimethyl carbonate derivatives include fluoromethyl methyl carbonate, difluoromethyl methyl carbonate, trifluoromethyl methyl carbonate, bis(fluoromethyl) carbonate, bis(difluoro)methyl carbonate, bis(trifluoro)methyl carbonate, chloromethyl methyl carbonate, dichloromethyl methyl carbonate, trichloromethyl methyl carbonate, bis(chloromethyl) carbonate, bis(dichloro)methyl carbonate, and bis(trichloro)methyl carbonate and the like.

Examples of the ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, 2-chloroethyl methyl carbonate, ethyl chloromethyl carbonate, 2,2-dichloroethyl methyl carbonate, 2-chloroethyl chloromethyl carbonate, ethyl dichloromethyl carbonate, 2,2,2-trichloroethyl methyl carbonate, 2,2-dichloroethyl chloromethyl carbonate, 2-chloroethyl dichloromethyl carbonate, and ethyl trichloromethyl carbonate and the like.

Examples of the diethyl carbonate derivatives include Ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, ethyl-(2-chloroethyl) carbonate, ethyl-(2,2-dichloroethyl) carbonate, bis (2-chloroethyl) carbonate, ethyl-(2,2,2-trichloroethyl) carbonate, 2,2-dichloroethyl-2'-chloroethyl carbonate, bis(2,2-dichloroethyl) carbonate, 2,2,2-trichloroethyl-2'-chloroethyl carbonate, 2,2,2-trichloroethyl-2',2'-dichloroethyl carbonate, and bis (2,2,2-trichloroethyl) carbonate and the like.

Preferred of these halogenated carbonates are the carbonates having a fluorine atom. More preferred are the ethylene carbonate derivatives having a fluorine atom. In particular, fluoroethylene carbonate, 4-(fluoromethyl)-ethylene carbonate, 4,4-difluoroethylene carbonate, and 4,5-difluoroethylene carbonate are more suitable because these carbonates form an interface-protective coating film.

<1-4-1-3. Halogenated Unsaturated Carbonate>

Furthermore usable as the specific carbonate is a carbonate having both an unsaturated bond and a halogen atom (this carbonate is suitably referred to as "halogenated unsaturated carbonate"). This halogenated unsaturated carbonate is not particularly limited, and any desired halogenated unsaturated carbonate can be used unless the effects of invention 2 are considerably lessened thereby.

Examples of the halogenated unsaturated carbonate include vinylene carbonate derivatives, ethylene carbonate derivatives substituted with one or more aromatic rings or with one or more substituents having a carbon-carbon unsaturated bond, and allyl carbonates.

Examples of the vinylene carbonate derivatives include fluorovinylene carbonate, 4-fluoro-5-methylvinylene carbonate, 4-fluoro-5-phenylvinylene carbonate, 4-(trifluoromethyl)vinylene carbonate, chlorovinylene carbonate, 4-chloro-5-methylvinylene carbonate, 4-chloro-5-phenylvinylene carbonate, and 4-(trichloromethyl)vinylene carbonate and the like.

Examples of the ethylene carbonate derivatives substituted with one or more aromatic rings or with one or more substituents having a carbon-carbon unsaturated bond include 4-fluoro-4-vinylethylene carbonate, 4-fluoro-5-vinylethylene carbonate, 4,4-difluoro-5-vinylethylene carbonate, 4,5-difluoro-4-vinylethylene carbonate, 4-chloro-5-vinylethylene carbonate, 4,4-dichloro-5-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro-5-phenylethylene carbonate, 4,4-dichloro-5-phenylethylene carbonate, 4,5-dichloro-4-phenylethylene carbonate, 4,5-difluoro-4,5-diphenylethylene carbonate, and 4,5-dichloro-4,5-diphenylethylene carbonate and the like.

Examples of phenyl carbonates include fluoromethyl phenyl carbonate, 2-fluoroethyl phenyl carbonate, 2,2-difluoroethyl phenyl carbonate, 2,2,2-trifluoroethyl phenyl carbonate, chloromethyl phenyl carbonate, 2-chloroethyl phenyl carbonate, 2,2-dichloroethyl phenyl carbonate, and 2,2,2-trichloroethyl phenyl carbonate and the like.

Examples of vinyl carbonates include fluoromethyl vinyl carbonate, 2-fluoroethyl vinyl carbonate, 2,2-difluoroethyl vinyl carbonate, 2,2,2-trifluoroethyl vinyl carbonate, chloromethyl vinyl carbonate, 2-chloroethyl vinyl carbonate, 2,2-dichloroethyl vinyl carbonate, and 2,2,2-trichloroethyl vinyl carbonate and the like.

Examples of the allyl carbonates include fluoromethyl allyl carbonate, 2-fluoroethyl allyl carbonate, 2,2-difluoroethyl allyl carbonate, 2,2,2-trifluoroethyl allyl carbonate, chloromethyl allyl carbonate, 2-chloroethyl allyl carbonate, 2,2-dichloroethyl allyl carbonate, and 2,2,2-trichloroethyl allyl carbonate and the like.

It is especially preferred to use, as the specific carbonate, one or more members selected from the group consisting of vinylene carbonate, vinylethylene carbonate, fluoroethylene carbonate, 4,5-difluoroethylene carbonate, and derivatives of these, among the examples of the halogenated unsaturated carbonate enumerated above. These carbonates are highly effective even when used alone.

<1-4-2. Other Additives>

Examples of additives other than the specific carbonate include overcharge inhibitors and aids for improving capacity retentivity after high-temperature storage and cycle characteristics. The "overcharge inhibitors" and the "aids for improving capacity retentivity after high-temperature storage and cycle characteristics" are the same as those described above with regard to nonaqueous electrolyte 1.

[2. Nonaqueous-Electrolyte Secondary Battery]

Nonaqueous-electrolyte secondary battery 2 of the invention includes: a negative electrode and a positive electrode which are capable of occluding and releasing ions; and the nonaqueous electrolyte of this invention.

<2-1. Battery Constitution>

Nonaqueous-electrolyte secondary battery 2 of the invention may have the same battery constitution as that described above with regard to nonaqueous-electrolyte secondary battery 1.

<2-2. Nonaqueous Electrolyte>

As the nonaqueous electrolyte, the nonaqueous electrolyte 2 of the invention described above is used. Incidentally, a mixture of nonaqueous electrolyte 2 of the invention and another nonaqueous electrolyte may be used so long as this is not counter to the spirit of invention 2.

<2-3. Negative Electrode>

The negative electrode of nonaqueous-electrolyte secondary battery 2 may be the same as the negative electrode described above with regard to nonaqueous-electrolyte secondary battery 1.

<2-4. Positive Electrode>

The positive electrode of nonaqueous-electrolyte secondary battery 2 may be the same as the positive electrode described above with regard to nonaqueous-electrolyte secondary battery 1.

<2-5. Separator>

The separator of nonaqueous-electrolyte secondary battery 2 may be the same as the separator described above with regard to nonaqueous-electrolyte secondary battery 1.

<2-6. Battery Design>

The battery design of nonaqueous-electrolyte secondary battery 2 may be the same as the battery design described above with regard to nonaqueous-electrolyte secondary battery 1.

<Nonaqueous Electrolyte 3 and Nonaqueous-Electrolyte Secondary Battery 3>

[1. Nonaqueous Electrolyte]

Nonaqueous electrolyte 3 of the invention is a nonaqueous electrolyte mainly comprising a nonaqueous solvent and an electrolyte dissolved therein, the nonaqueous electrolyte containing a monofluorophosphate and/or a difluorophosphate and further containing "at least one compound selected from the group consisting of compounds represented by general formula (1) given above, nitrile compounds, isocyanate compounds, phosphazene compounds, disulfonic acid ester compounds, sulfide compounds, disulfide compounds, acid anhydrides, lactone compounds having a substituent in the α-position, and compounds having a carbon-carbon triple bond". Hereinafter, the at least one compound given in the quotation marks is referred to as "compound A of invention 3".

<1-1. Electrolyte>

Nonaqueous electrolyte 3 of the invention includes an electrolyte and a nonaqueous solvent containing the electrolyte dissolved therein. The electrolyte to be used in nonaqueous electrolyte 3 of the invention is not limited, and known ones for use as electrolytes in a target nonaqueous-electrolyte secondary battery can be employed and incorporated at will. In the case where nonaqueous electrolyte 3 of the invention is to be used in nonaqueous-electrolyte secondary batteries, one or more lithium salts are preferable of the electrolyte.

The electrolyte for use in nonaqueous electrolyte 3 of the invention is the same as that described above with regard to nonaqueous electrolyte 1 of the invention.

<1-2. Compound A of Invention 3>

Nonaqueous electrolyte 3 of the invention contains the "compound A of invention 3". "Compound A of invention 3" may be a compound represented by general formula (1), nitrile compound, isocyanate compound, phosphazene compound, disulfonic acid ester compound, sulfide compounds, disulfide compound, acid anhydride, lactone compound having a substituent in the α-position, or compound having a carbon-carbon triple bond. The compounds constituting the group of compounds for "compound A of invention 3" in invention 3 are explained below in more detail.

<1-2-1. Compounds Represented by General Formula (1)>

[Chemical Formula-4]

(1)

[In general formula (1), $R^1$, $R^2$, and $R^3$ each independently represent a fluorine atom, an alkyl group which has 1-12 carbon atoms and may be substituted with a fluorine atom, or an alkoxy group which has 1-12 carbon atoms and may be substituted with a fluorine atom.]

The alkyl group having 1-12 carbon atoms is not particularly limited. Examples thereof include acyclic or cyclic alkyl groups having preferably 1-8, more preferably 1-6 carbon atoms. Preferred of these are the acyclic alkyl groups. Specific examples thereof include methyl, ethyl, n-propyl, isopropyl, n-butyl, isobutyl, sec-butyl, tert-butyl, pentyl, cyclopentyl, and cyclohexyl and the like.

The alkoxy group having 1-12 carbon atoms is not particularly limited. However, this group preferably is an alkoxy group having 1-8 carbon atoms, especially preferably 1-6 carbon atoms. Examples thereof include methoxy, ethoxy, n-propoxy, isopropoxy, n-butoxy, isobutoxy, sec-butoxy, and tert-butoxy and the like.

Examples of the alkyl group substituted with a fluorine atom include trifluoromethyl, trifluoroethyl, and pentafluoroethyl and the like.

Examples of the alkoxy group substituted with a fluorine atom include trifluoromethoxy, trifluoroethoxy, and pentafluoroethoxy.

Examples of the compound in which all of $R^1$, $R^2$, and $R^3$ are alkoxy groups include trimethyl phosphate, ethyl dimethyl phosphate, dimethyl n-propyl phosphate, n-butyl dimethyl phosphate, diethyl methyl phosphate, ethyl n-propyl methyl phosphate, n-butyl ethyl methyl phosphate, di-n-propyl methyl phosphate, n-butyl n-propyl methyl phosphate, di-n-butyl methyl phosphate, triethyl phosphate, diethyl n-propyl phosphate, n-butyl diethyl phosphate, di-n-propyl ethyl phosphate, n-butyl n-propyl ethyl phosphate, di-n-butyl ethyl phosphate, tri-n-propyl phosphate, n-butyl di-n-propyl phosphate, di-n-butyl n-propyl phosphate, tri-n-butyl phosphate, cyclopentyl dimethyl phosphate, cyclopentyl diethyl phosphate, cyclopentyl di-n-propyl phosphate, cyclopentyl di-n-butyl phosphate, cyclopentylethyl methyl phosphate, dicyclopentyl methyl phosphate, tricyclopentyl phosphate, cyclohexyl dimethyl phosphate, cyclohexyl diethyl phosphate, cyclohexyl di-n-propyl phosphate, cyclohexyl di-n-butyl phosphate, cyclohexyl ethyl methyl phosphate, dicyclohexyl methyl phosphate, tricyclohexyl phosphate, dimethyl trifluoromethyl phosphate, diethyl trifluoromethyl phosphate, ethyl methyl trifluoromethyl phosphate, (2,2,2-trifluoroethyl) dimethyl phosphate, diethyl (2,2,2-trifluoroethyl) phosphate, ethyl (2,2,2-trifluoroethyl) methyl phosphate, (pentafluoroethyl) dimethyl phosphate, diethyl (pentafluoroethyl) phosphate, ethyl (pentafluoroethyl) methyl phosphate, bis(trifluoromethyl) methyl phosphate, tris(trifluoromethyl) phosphate, bis(2,2,2-trifluoroethyl) methyl phosphate, bis(2,2,2-trifluoroethyl) trifluoromethyl phosphate, bis(pentafluoroethyl) methyl phosphate, bis(pentafluoroethyl) trifluoromethyl phosphate, bis(trifluoromethyl) ethyl phosphate, bis(trifluoromethyl) 2,2,2-trifluoroethyl phosphate, bis(trifluoromethyl) pentafluoroethyl phosphate, bis(2,2,2-trifluoroethyl) ethyl phosphate, tris(2,2,2-trifluoroethyl) phosphate, bis(2,2,2,-trifluoroethyl) pentafluoroethyl phosphate, bis(pentafluoroethyl) ethyl phosphate, bis(pentafluoroethyl)-2,2,2-trifluoroethyl phosphate, and tris(pentafluoroethyl) phosphate and the like.

Preferred of the phosphoric acid esters enumerated above are trimethyl phosphate, ethyl dimethyl phosphate, diethyl methyl phosphate, triethyl phosphate, dimethyl trifluoromethyl phosphate, diethyl trifluoromethyl phosphate, ethyl methyl trifluoromethyl phosphate, (2,2,2-trifluoroethyl) dimethyl phosphate, diethyl (2,2,2-trifluoroethyl) phosphate, ethyl (2,2,2-trifluoroethyl) methyl phosphate, (pentafluoroethyl) dimethyl phosphate, diethyl (pentafluoroethyl) phosphate, ethyl (pentafluoroethyl) methyl phosphate, bis(trifluoromethyl) methyl phosphate, tris(trifluoromethyl) phosphate, bis(2,2,2-trifluoroethyl) methyl phosphate, bis(2,2,2-trifluoroethyl) trifluoromethyl phosphate, bis(pentafluoroethyl) methyl phosphate, bis(pentafluoroethyl) trifluoromethyl phosphate, bis(trifluoromethyl) ethyl phosphate, bis(trifluoromethyl)-2,2,2-trifluoroethyl phosphate, bis(trifluoromethyl) pentafluoroethyl phosphate, bis(2,2,2-trifluoroethyl) ethyl phosphate, tris(2,2,2-trifluoroethyl) phosphate, bis(2,2,2,-trifluoroethyl) pentafluoroethyl phosphate, bis(pentafluoroethyl) ethyl phosphate, bis(pentafluoroethyl)-2,2,2-trifluoroethyl phosphate, tris(pentafluoroethyl) phosphate, and the like.

Examples of the compound in which any one of $R^1$, $R^2$, and $R^3$ is an alkyl group and any two of these are alkoxy groups include dimethyl methylphosphonate, diethyl ethylphosphonate, di-n-propyl n-propylphosphonate, diisopropyl isopropylphosphonate, di-n-butyl n-butylphosphonate, diisobutyl isobutylphosphonate, di-tert-butyl tert-butylphosphonate, dicyclopentyl cyclopentylphosphonate, dicyclohexyl cyclohexylphosphonate, diethyl methylphosphonate, di-n-propyl methylphosphonate, di-n-butyl methylphosphonate, dicyclopentyl methylphosphonate, dicyclohexyl methylphosonate, dimethyl ethylphosphonate, di-n-propyl ethylphosphonate, di-n-butyl ethylphosphonate, dicyclopentyl ethylphosphonate, dicyclohexyl ethylphosphonate, dimethyl n-propylphosphonate, diethyl n-propylphosphonate, dimethyl n-butylphosphonate, diethyl n-butylphosphonate, dimethyl cyclohexylphosphonate, diethyl cyclohexylphosphonate, ethyl methyl methylphosphonate, methyl n-propyl methylphosphonate, n-butyl methyl methylphosphonate, cyclopentyl methyl methylphosphonate, cyclohexyl methyl methylphosphonate, ethyl n-propyl methylphosphonate, cyclohexyl ethyl methylphosphonate, ethyl methyl ethylphosphonate, methyl n-propyl ethylphosphonate, n-butyl methyl ethylphosphonate, cyclopentyl methyl ethylphosphonate, cyclohexyl methyl ethylphosphonate, ethyl n-propyl ethylphosphonate, cyclohexyl ethyl ethylphosphonate, ethyl methyl n-propylphosphonate, methyl n-propyl n-propylphosphonate, n-butyl methyl n-propylphosphonate, cyclopentyl methyl n-propylphosphonate, cyclohexyl methyl n-propylphosphonate, ethyl n-propyl n-propylphosphonate, cyclohexyl ethyl n-propylphosphonate, ethyl methyl n-butylphosphonate, methyl n-propyl n-butylphosphonate, n-butyl methyl n-butylphosphonate, cyclopentyl methyl n-butylphosphonate, cyclohexyl methyl n-butylphosphonate, ethyl n-propyl n-butylphosphonate, cyclohexyl ethyl n-butylphosphonate, ethyl methyl cyclohexylphosphonate, methyl n-propyl cyclohexylphosphonate, n-butyl methyl cyclohexylphosphonate, cyclopentyl methyl cyclohexylphosphonate, cyclohexyl methyl cyclohexylphosphonate, ethyl n-propyl cyclohexylphosphonate, cyclohexyl ethyl cyclohexylphosphonate, diperfluoromethyl methylphosphonate, di(2,2,2-trifluoroethyl) methylphosphonate, diperfluoroethyl methylphosphonate, di(2-fluorocyclohexyl) methylphosphonate, di(3-fluorocyclohexyl) methyl phosphonate, di(4-fluorocyclohexyl) methylphosphonate, diperfluoromethyl ethylphosphonate, di(2,2,2,-trifluoroethyl) ethylphosphonate, diperfluoroethyl ethyl phosphonate, di(2-fluorocyclohexyl) ethyl phosphonate, di(3-fluorocyclohexyl) ethylphosphonate, di(4-fluorocyclohexyl) ethylphosphonate, di(2,2,2-trifluoroethyl) n-propylphosphonate, diperfluoroethyl n-propylphosphonate, di(2,2,2-trifluoroethyl) n-butylphosphonate, diperfluoroethyl n-butylphosphonate, di(2,2,2-trifluoroethyl) cyclohexylphosphonate, diperfluoroethyl cyclohexylphosphonate, methyl perfluoromethyl methylphosphonate, methyl (2,2,2-trifluoroethyl) methylphosphonate, methyl perfluoroethyl methylphosphonate, (2-fluorocyclohexyl) methyl methylphosphonate, (3-fluorocyclohexyl) methyl methylphosphonate, (4-fluorocyclohexyl) methyl methylphosphonate, ethyl perfluoroethyl methylphosphonate, cyclohexyl (2,2,2-trifluoroethyl) methylphosphonate, cyclohexyl perfluoroethyl methylphosphonate, perfluoroethyl (2,2,2-trifluoroethyl) methylphosphonate, ethyl (2,2,2-trifluoroethyl) ethylphosphonate, ethyl perfluoroethyl ethylphosphonate, cyclohexyl (2,2,2-trifluoroethyl) ethylphosphonate, cyclohexyl perfluoroethyl ethylphosphonate, perfluoroethyl (2,2,2-trifluoroethyl) ethylphosphonate, (2-fluorocyclohexyl) (2,2,2-trifluoroethyl) ethylphosphonate, ethyl (2,2,2-trifluoroethyl) n-propylphosphonate, ethyl perfluoroethyl n-propylphosphonate, cyclohexyl (2,2,2-trifluoroethyl) n-propylphosphonate, cyclohexyl perfluoroethyl n-propylphosphonate, perfluoroethyl (2,2,2-trifluoroethyl) n-propylphosphonate, (2-fluorocyclohexyl) (2,2,2-trifluoroethyl) n-propylphosphonate, ethyl (2,2,2-trifluoroethyl) n-butylphosphonate, ethyl perfluoroethyl n-butylphosphonate, cyclohexyl (2,2,2-trifluoroethyl) n-butylphosphonate, cyclohexyl perfluoroethyl n-butylphosphonate, perfluoroethyl (2,2,2-trifluoroethyl) n-butylphosphonate, (2-fluorocyclohexyl) (2,2,2-trifluoroethyl) n-butylphosphonate, ethyl (2,2,2-trifluoroethyl) cyclohexylphosphonate, ethyl perfluoroethyl cyclohexylphosphonate, cyclohexyl (2,2,2-trifluoroethyl) cyclohexylphosphonate, cyclohexyl perfluoroethyl cyclohexylphosphonate, perfluoroethyl (2,2,2-trifluoroethyl) cyclohexylphosphonate, (2-fluorocyclohexyl) (2,2,2-trifluoroethyl) cyclohexylphosphonate, diperfluoromethyl perfluoromethylphosphonate, di(2,2,2-trifluoroethyl) (2,2,2-trifluoroethyl)phosphonate, diperfluoroethyl perfluoroethylphosphonate, di(2-fluorocyclohexyl) (2-fluorocyclohexyl)phosphonate, di(3-fluorocyclohexyl) (3-fluorocyclohexyl)phosphonate, di(4-fluorocyclohexyl) (4-fluorocyclohexyl)phosphonate, dimethyl (2,2,2-trifluoroethyl)phosphonate, diethyl (2,2,2-trifluoroethyl)phosphonate, di-n-butyl (2,2,2-trifluoroethyl)phosphonate, dicyclohexyl (2,2,2-trifluoroethyl)phosphonate, diperfluoroethyl (2,2,2-trifluoroethyl)phosphonate, di(2-fluorocyclohexyl) (2,2,2-trifluoroethyl)phosphonate, ethyl methyl (2,2,2-trifluoroethyl)phosphonate, n-butyl methyl (2,2,2-trifluoroethyl)phosphonate, cyclohexyl methyl (2,2,2-trifluoroethyl)phosphonate, methyl (2,2,2-trifluoroethyl) (2,2,2-trifluoroethyl)phosphonate, methyl perfluoroethyl (2,2,2-trifluoroethyl)phosphonate, (2-fluorocyclohexyl) methyl (2,2,2-trifluoroethyl)phosphonate, cyclohexyl ethyl (2,2,2-trifluoroethyl)phosphonate, ethyl (2,2,2-trifluoroethyl) (2,2,2-trifluoroethyl)phosphonate, cyclohexyl (2,2,2-trifluoroethyl) (2,2,2-trifluoroethyl)phosphonate, dimethyl (2-fluorocyclohexyl)phosphonate, diethyl (2-fluorocyclohexyl)phosphonate, dicyclohexyl (2-fluorocyclohexyl)phosphonate, bis(2,2,2-trifluoroethyl) (2-fluorocyclohexyl)phosphonate, ethyl methyl (2-fluorocyclohexyl)phosphonate, cyclohexyl methyl (2-fluorocyclohexyl)phosphonate, and methyl (2,2,2-trifluoroethyl) (2-fluorocyclohexyl)phosphonate.

Preferred of the phosphonic acid esters enumerated above are dimethyl methylphosphonate, diethyl ethylphosphonate, di-n-propyl n-propylphosphonate, di-n-butyl n-butylphosphonate, diisobutyl isobutylphosphonate, diethyl methylphosphonate, di-n-butyl methylphosphonate, dimethyl ethylphosphonate, di-n-propyl ethylphosphonate, dimethyl n-propylphosphonate, diethyl n-propylphosphonate, di(2,2,2-trifluoroethyl) methylphosphonate, di(2,2,2-trifluoroethyl) ethylphosphonate, diperfluoromethyl perfluoromethylphosphonate, di(2,2,2-trifluoroethyl) (2,2,2-trifluoroethyl)phosphonate, diperfluoroethyl perfluoroethylphosphonate, dimethyl (2,2,2-trifluoroethyl)phosphonate, and diethyl (2,2,2-trifluoroethyl)phosphonate.

Examples of the compound in which any two of $R^1$, $R^2$, and $R^3$ are alkyl groups and any one of these is an alkoxy group include methyl dimethylphosphinate, ethyl diethylphosphinate, n-propyl di-n-propylphosphinate, isopropyl diisopropylphosphinate, n-butyl di-n-butylphosphinate, isobutyl diisobutylphosphinate, tert-butyl di-tert-butylphosphinate, cyclopentyl dicyclopentylphosphinate, cyclohexyl dicyclohexylphosphinate, methyl diethylphosphinate, methyl di-n-propylphosphinate, methyl diisopropylphosphinate, methyl di-n-butylphosphinate, methyl diisobutylphosphinate, methyl di-tert-butylphosphinate, methyl dicyclopentylphosphinate, methyl dicyclohexylphosphinate, ethyl dimethylphosphinate, ethyl di-n-propylphosphinate, ethyl diisopropylphosphinate, ethyl di-n-butylphosphinate, ethyl diisobutylphosphinate, ethyl di-tert-butylphosphinate, ethyl dicyclopentylphosphinate, ethyl dicyclohexylphosphinate, n-propyl dimethylphosphinate, n-propyl diethylphosphinate, n-propyl diisopropylphosphinate, n-propyl di-n-butylphosphinate, n-propyl diisobutylphosphinate, n-propyl di-tert-butylphosphinate, n-propyl dicyclopentylphosphinate, n-propyl dicyclohexylphosphinate, n-butyl dimethylphosphinate, n-butyl diethylphosphinate, n-butyl dicyclohexylphosphinate, cyclohexyl dimethylphosphinate, cyclohexyl diethylphosphinate, cyclohexyl di-n-propylphosphinate, cyclohexyl di-n-butylphosphinate, methyl ethylmethylphosphinate, methyl methyl-n-propylphosphinate, methyl n-butylmethylphosphinate, methyl cyclohexylmethylphosphinate, methyl ethyl-n-propylphosphinate, methyl n-butylethylphosphinate, methyl cyclohexylethylphosphinate, methyl cyclohexyl-n-propylphosphinate, methyl n-butylcyclohexylphosphinate, ethyl ethylmethylphosphinate, ethyl methyl-n-propylphosphinate, ethyl n-butylmethylphosphinate, ethyl cyclohexylmethylphosphinate, ethyl n-butylethylphosphinate, ethyl cyclohexylethylphosphinate, ethyl n-butylcyclohexylphosphinate, n-butyl ethylmethylphosphinate, n-butyl methyl-n-butylphosphinate, n-butyl cyclohexylmethylphosphinate, n-butyl methylphenylphosphinate, n-butyl n-butylethylphosphinate, n-butyl cyclohexylethylphosphinate, n-butyl ethylphenylphosphinate, n-butyl n-butylcyclohexylphosphinate, n-butyl cyclohexylvinylphosphinate, cyclohexyl ethylmethylphosphinate, cyclohexyl methyl-n-butylphosphinate, cyclohexyl cyclohexylmethylphosphinate, cyclohexyl n-butylethylphosphinate, cyclohexyl cyclohexylethylphosphinate, cyclohexyl n-butylcyclohexylphosphinate, perfluoromethyl bisperfluoromethylphosphinate, (2,2,2-trifluoroethyl) bis(2,2,2-trifluoroethyl) phosphonate, perfluoroethyl bisperfluoroethylphosphinate, (2-fluorocyclohexyl) di(2-fluorocyclohexyl)phosphinate, (3-fluorocyclohexyl) di(3-fluorocyclohexyl)phosphinate, (4-fluorocyclohexyl) di(4-fluorocyclohexyl)phosphinate, methyl bisperfluoromethylphosphinate, methyl bis(2,2,2-trifluoroethyl)phosphinate, methyl bisperfluoroethylphosphinate, methyl di(2-fluorocyclohexyl)phosphinate, methyl di(3-fluorocyclohexyl)phosphinate, methyl di(4-fluorocyclohexyl)phosphinate, ethyl bisperfluoromethylphosphinate, ethyl bis(2,2,2-trifluoroethyl)phosphinate, ethyl bisperfluoroethylphosphinate, ethyl di(2-fluorocyclohexyl)phosphinate, ethyl di(3-fluorocyclohexyl)phosphinate, ethyl di(4-fluorocyclohexyl)phosphinate, n-butyl bis (2,2,2-trifluoroethyl)phosphinate, cyclohexyl bis(2,2,2-trifluoroethyl)phosphinate, (2,2,2-trifluoroethyl) dimethylphosphinate, (2,2,2-trifluoroethyl) diethylphosphinate, (2,2,2-trifluoroethyl) di-n-butylphosphinate, (2,2,2-trifluoroethyl) dicyclohexylphosphinate, ethyl methyl(2,2,2-trifluoroethyl)phosphinate, ethyl methyl(2-fluorophenyl)phosphinate, ethyl ethyl(2,2,2-trifluoroethyl)phosphinate, ethyl n-butyl(2,2,2-trifluoroethyl)phosphinate, ethyl cyclohexyl(2,2,2-trifluoroethyl)phosphinate, n-butyl methyl(2,2,2-trifluoroethyl)phosphinate, n-butyl ethyl(2,2,2-trifluoroethyl)phosphinate, n-butyl n-butyl(2,2,2-trifluoroethyl)phosphinate, n-butyl cyclohexyl(2,2,2-trifluoroethyl)phosphinate, cyclohexyl methyl(2,2,2-trifluoroethyl)phosphinate, cyclohexyl ethyl(2,2,2-trifluoroethyl)phosphinate, cyclohexyl n-butyl(2,2,2-trifluoroethyl)phosphinate, cyclohexyl cyclohexyl(2,2,2-trifluoroethyl)phosphinate, (2,2,2-trifluoroethyl) ethylmethylphosphinate, (2,2,2-trifluoroethyl) methyl-n-butylphosphinate, (2,2,2-trifluoroethyl) cyclohexylmethylphosphinate, (2,2,2-trifluoroethyl) methyl(2,2,2-trifluoroethyl)phosphinate, (2,2,2-trifluoroethyl) n-butylethylphosphinate, (2,2,2-trifluoroethyl) cyclohexylethylphosphinate, (2,2,2-trifluoroethyl) ethyl(2,2,2-trifluoroethyl)phosphinate, (2,2,2-trifluoroethyl) n-butylcyclohexylphosphinate, (2,2,2-trifluoroethyl) n-butyl(2,2,2-trifluoroethyl)phosphinate, (2,2,2-trifluoroethyl) cyclohexyl(2,2,2-trifluoroethyl)phosphinate, and (2,2,2-trifluoroethyl) (2,2,2-trifluoroethyl)phenylphosphinate, and the like.

Preferred of the phosphinic acid esters enumerated above are methyl dimethylphosphinate, ethyl diethylphosphinate, n-propyl di-n-propylphosphinate, n-butyl di-n-butylphosphinate, methyl diethylphosphinate, ethyl dimethylphosphinate, perfluoromethyl bisperfluoromethylphosphinate, (2,2,2-trifluoroethyl) bis(2,2,2-trifluoroethyl)phosphonate, perfluoroethyl bisperfluoroethylphosphinate, methyl bisperfluoromethylphosphinate, methyl bis(2,2,2-trifluoroethyl) phosphinate, methyl bisperfluoroethylphosphinate, ethyl bisperfluoromethylphosphinate, ethyl bis(2,2,2-trifluoroethyl)phosphinate, ethyl bisperfluoroethylphosphinate, (2,2,2-trifluoroethyl) dimethylphosphinate, (2,2,2-trifluoroethyl) diethylphosphinate, and the like.

Examples of the compound in which all of $R^1$, $R^2$, and $R^3$ are alkyl groups include trimethylphosphine oxide, triethylphosphine oxide, tri-n-propylphosphine oxide, triisopropylphosphine oxide, tri-n-butylphosphine oxide, triisobutylphosphine oxide, tri-tert-butylphosphine oxide, tricyclopentylphosphine oxide, tricyclohexylphosphine oxide, ethyldimethylphosphine oxide, dimethyl-n-propylphosphine oxide, isopropyldimethylphosphine oxide, n-butyl dimethylphosphine oxide, isobutyldimethylphosphine oxide, tert-butyldimethylphosphine oxide, cyclopentyldimethylphosphine oxide, cyclohexyldimethylphosphine oxide, diethylmethylphosphine oxide, diethyl-n-propylphosphine oxide, diethyl-n-butylphosphine oxide, cyclohexyldiethylphosphine oxide, methyldi-n-propylphosphine oxide, ethyldi-n-propylphosphine oxide, cyclohexyldi-n-propylphosphine oxide, di-n-butylmethylphosphine oxide, di-n-butylethylphosphine oxide, di-n-butylcyclohexylphosphine oxide, dicyclohexylmethylphosphine oxide, dicyclohexylethylphosphine oxide, dicyclohexyl-n-propylphosphine oxide, n-butyldicyclohexylphosphine oxide, ethylmethyl-n-propylphosphine oxide, ethylmethylisopropylphosphine oxide, ethylmethyl-n-butylphosphine oxide, ethylmethylisobutylphosphine oxide, ethylmethyl-tert-butylphosphine oxide, ethylmethylcyclopentylphosphine oxide, ethylmethylcyclohexylphosphine oxide, n-butylmethyl-n-propylphosphine oxide, n-butylmethylcyclohexylphosphine oxide, cyclohexylmethyl(2,2,2-trifluoroethyl)phosphine oxide, triperfluoromethylphosphine oxide, tri(2,2,2-trifluoroethyl) phosphine oxide, triperfluoroethylphosphine oxide, tri(2-fluorocyclohexyl)phosphine oxide, tri(3-fluorocyclohexyl) phosphine oxide, tri (4-fluorocyclohexyl)phosphine oxide, perfluoromethyldimethylphosphine oxide, (2,2,2-trifluoroethyl)dimethylphosphine oxide, perfluoroethyldimethylphosphine oxide, (2-fluorocyclohexyl)dimethylphosphine oxide, (3-fluorocyclohexyl)dimethylphosphine oxide, (4-fluorocyclohexyl)dimethylphosphine oxide, diethyl(2,2,2-trifluoroethyl)phosphine oxide, di-n-butyl(2,2,2-trifluoroethyl)phosphine oxide, dicyclohexyl(2,2,2-trifluoroethyl) phosphine oxide, di(2,2,2-trifluoroethyl)methylphosphine oxide, ethyl(2,2,2-trifluoroethyl)phosphine oxide, n-butyldi (2,2,2-trifluoroethyl)phosphine oxide, cyclohexyldi(2,2,2-trifluoroethyl)phosphine oxide, ethylmethylperfluoromethylphosphine oxide, ethylmethyl(2,2,2-trifluoroethyl) phosphine oxide, ethylmethylperfluoroethylphosphine oxide, ethylmethyl(2-fluorocyclohexyl)phosphine oxide, ethylmethyl(3-fluorocyclohexyl)phosphine oxide, ethylmethyl(4-fluorocyclohexyl)phosphine oxide, n-butylmethyl (2,2,2-trifluoroethyl)phosphine oxide, n-butylethyl-n-propylphosphine oxide, n-butylethylcyclohexylphosphine oxide, n-butylethyl(2,2,2-trifluoroethyl)phosphine oxide, cyclohexylethyl(2,2,2-trifluoroethyl)phosphine oxide, and n-butylcyclohexyl(2,2,2-trifluoroethyl)phosphine oxide, and the like.

Preferred of the phosphine oxides enumerated above are trimethylphosphine oxide, triethylphosphine oxide, tri-n-propylphosphine oxide, tri-n-butylphosphine oxide, ethyldimethylphosphine oxide, diethylmethylphosphine oxide, triperfluoromethylphosphine oxide, tri(2,2,2-trifluoroethyl) phosphine oxide, triperfluoroethylphosphine oxide, and the like.

Examples of the compound in which any one of $R^1$, $R^2$, and $R^3$ is a fluorine atom include dimethyl fluorophosphate, ethyl methyl fluorophosphate, methyl n-propyl fluorophosphate, n-butyl methyl fluorophosphate, diethyl fluorophosphate, ethyl n-propyl fluorophosphate, n-butyl ethyl fluorophosphate, di-n-propyl fluorophosphate, n-butyl n-propyl fluorophosphate, di-n-butyl methyl fluorophosphate, cyclopentyl methyl fluorophosphate, cyclopentyl ethyl fluorophosphate, cyclopentyl n-propyl fluorophosphate, cyclopentyl n-butyl fluorophosphate, dicyclopentyl fluorophosphate, cyclohexyl methyl fluorophosphate, cyclohexyl ethyl fluorophosphate, cyclohexyl n-propyl fluorophosphate, cyclohexyl n-butyl fluorophosphate, dicyclohexyl fluorophosphate, bis(trifluoromethyl) fluorophosphate, methyl (trifluoromethyl) fluorophosphate, ethyl (trifluoromethyl) fluorophosphate, n-propyl (trifluoromethyl) fluorophosphate, bis(2,2,2-trifluoroethyl) fluorophosphate, methyl (2,2,2-trifluoroethyl) fluorophosphate, ethyl (2,2,2-trifluoroethyl) fluorophosphate, n-propyl (2,2,2-trifluoroethyl) fluorophosphate, (2,2,2-trifluoroethyl) (trifluoromethyl) fluorophosphate, bis(pentafluoroethyl) fluorophosphate, methyl (pentafluoroethyl) fluorophosphate, ethyl (pentafluoroethyl) fluorophosphate, n-propyl (pentafluoroethyl) fluorophosphate, (pentafluoroethyl) (trifluoromethyl) fluorophosphate, and (pentafluoroethyl) (2,2,2-trifluoroethyl) fluorophosphate and the like.

Preferred of the monofluorophosphoric acid esters enumerated above are dimethyl fluorophosphate, ethyl methyl fluorophosphate, methyl n-propyl fluorophosphate, diethyl fluorophosphate, ethyl n-propyl fluorophosphate, di-n-propyl fluorophosphate, bis(trifluoromethyl) fluorophosphate, methyl (trifluoromethyl) fluorophosphate, ethyl (trifluoromethyl) fluorophosphate, n-propyl (trifluoromethyl) fluorophosphate, bis(2,2,2-trifluoroethyl) fluorophosphate, methyl (2,2,2-trifluoroethyl) fluorophosphate, ethyl (2,2,2-trifluoroethyl) fluorophosphate, n-propyl (2,2,2-trifluoroethyl) fluorophosphate, bis(pentafluoroethyl) fluorophosphate, methyl (pentafluoroethyl) fluorophosphate, ethyl (pentafluoroethyl) fluorophosphate, n-propyl (pentafluoroethyl) fluorophosphate, and the like.

Examples of the compound in which any two of $R^1$, $R^2$, and $R^3$ are fluorine atoms include methyl difluorophosphate, ethyl difluorophosphate, n-propyl difluorophosphate, n-butyl difluorophosphate, cyclopentyl difluorophosphate, cyclohexyl difluorophosphate, (trifluoromethyl) difluorophosphate, (2,2,2-trifluoroethyl) difluorophosphate, and (pentafluoroethyl) difluorophosphate, and the like.

<1-2-2. Nitrile Compounds>

The nitrile compounds are not particularly limited in the kind thereof so long as they are compounds having a nitrile group in the molecule. The nitrile compounds may be compounds each having two or more nitrile groups per molecule. Examples of the nitrile compounds include mono-nitrile compounds such as acetonitrile, propionitrile, butyronitrile, isobutyronitrile, valeronitrile, isovaleronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trichloroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, and pentafluoropropionitrile, and the like;

di-nitrile compounds such as malononitrile, succinonitrile, 2-methylsuccinonitrile, tetramethylsuccinonitrile, glutaronitrile, 2-methylglutaronitrile, adiponitrile, fumaronitrile, and 2-methyleneglutaronitrile, and the like; and tetra-nitrile compounds such as tetracyanoethylene, and the like.

Preferred of these are acetonitrile, propionitrile, butyronitrile, valeronitrile, crotononitrile, 3-methylcrotononitrile, malononitrile, succinonitrile, glutaronitrile, adiponitrile, fumaronitrile, and the like.

<1-2-3. Isocyanate Compounds>

The isocyanate compounds are not particularly limited in the kind thereof so long as they are compounds having an isocyanate group in the molecule. The isocyanate compounds may be compounds each having two or more isocyanate groups per molecule. Examples of the isocyanate compounds include monoisocyanate compounds such as methyl isocyanate, ethyl isocyanate, n-propyl isocyanate, isopropyl isocyanate, n-butyl isocyanate, t-butyl isocyanate, cyclopentyl isocyanate, cyclohexyl isocyanate, phenyl isocyanate, vinyl isocyanate, and allyl isocyanate, and the like;

diisocyanate compounds such as methane diisocyanate, 1,2-ethane diisocyanate, 1,3-propane diisocyanate, and 1,4-dicyanatobutane and the like;

ester-group-containing isocyanate compounds such as methyl isocyanatoformate, ethyl isocyanatoformate, methyl isocyanatoacetate, ethyl isocyanatoacetate, n-propyl isocyanatoacetate, methyl 3-isocyanatopropionate, ethyl 3-isocyanatopropionate, n-propyl 3-isocyanatopropionate, methyl 2-isocyanatopropionate, ethyl 2-isocyanatopropionate, and n-propyl 2-isocyanatopropionate, and the like;

silicon-containing isocyanate compounds such as isocyanatotrimethylsilane, isocyanatotriethylsilane, isocyanatotri-n-propylsilane, isocyanatotrimethoxysilane, isocyanatotri-ethoxysilane, isocyanatotri-n-propoxysilane, isocyanatoraethyltrimethylsilane, isocyanatomethyltriethylsilane, 2-isocyanatoethyltrimethylsilane, 2-isocyanatoethyltriethylsilane, 3-isocyanatopropyltrimethylsilane, 3-isocyanatopropyltriethylsilane, isocyanatomethyltrimethoxysilane, isocyanatomethyltriethoxysilane, 2-isocyanatoethyltrimethoxysilane, 2-isocyanatoethyltriethoxysilane, 3-isocyanatopropyltrimethoxysilane, and 3-isocyanatopropyltriethoxysilane, and the like; and phosphorus-containing isocyanate compounds such as isocyanatodimethyl phosphate, isocyanatoethyl methyl phosphate, isocyanatomethyl n-propyl phosphate, isocyanato-n-butyl methyl phosphate, isocyanatodiethyl phosphate, isocyanatoethyl n-propyl phosphate, isocyanato-n-butyl ethyl phosphate, isocyanatodi-n-propyl phosphate, isocyanato-n-butyl n-propyl phosphate, and isocyanatodi-n-butyl methyl phosphate, and the like.

Preferred of these are methyl isocyanate, ethyl isocyanate, n-propyl isocyanate, n-butyl isocyanate, methane diisocyanate, 1,2-ethane diisocyanate, 1,3-propane diisocyanate, 1,4-dicyanatobutane, methyl isocyanatoformate, ethyl isocyanatoformate, methyl isocyanatoacetate, ethylisocyanatoacetate, isocyanatotrimethylsilane, isocyanatotriethylsilane, isocyanatotri-n-propylsilane, isocyanatotrimethoxysilane, isocyanatotriethoxysilane, isocyanatotri-n-propoxysilane, isocyanatodimethyl phosphate, isocyanatoethyl methyl phosphate, isocyanatodiethyl phosphate, and the like.

<1-2-4. Phosphazene Compounds>

The term "phosphazene compounds" in invention 3 means compounds having a structural unit represented by —P$X^aX^b$=N— (wherein $X^a$ and $X^b$ each independently represent a monovalent substituent). By the number of such structural units and by the state in which the structural units are bonded, phosphazene compounds are classified into: monophosphazenes constituted of only one structural unit of that kind; cyclic phosphazenes constituted of structural units of that kind which have been bonded cyclicly; polyphosphazenes constituted of structural units of that kind which have been bonded in an acyclic arrangement; etc. The kinds of phosphazene compounds are not particularly limited, and a compound falling under any of these groups can be used. However, it is preferred to use, among those compounds, a cyclic phosphazene represented by the following general formula (2) and/or an acyclic phosphazene represented by the following general formula (3).

[Chemical Formula-5]

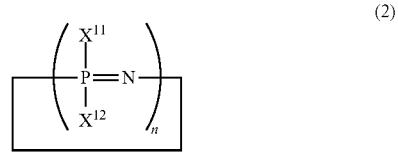

(2)

[In general formula (2), $X^{11}$ and $X^{12}$ each independently represent a monovalent substituent.]

[Chemical Formula-6]

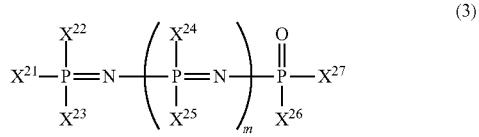

(3)

[In general formula (3), $X^{21}$, $X^{22}$, $X^{23}$, $X^{24}$, $X^{25}$, $X^{26}$, and $X^{27}$ each independently represent a monovalent substituent.]

In the following statement, when $X^{11}$, $X^{12}$, $X^{21}$, $X^{22}$, $X^{23}$, $X^{24}$, $X^{25}$, $X^{26}$, and $X^{27}$ are referred to without being especially distinguished from each other, "X" is used for representing these.

The monovalent substituents are not particularly limited unless the substituents are counter to the spirit of invention 3. Examples thereof include halogen atoms, alkyl groups, aryl groups, acyl groups, carboxy group, and groups represented by R—O— (wherein R represents an alkyl group or an aryl group) (hereinafter suitably referred to as "RO groups"). Of these, halogen atoms or RO groups are preferred from the standpoint of electrochemical stability.

The halogen atoms preferably are fluorine, chlorine, and bromine atoms. Especially preferred is a fluorine atom. On the other hand, with respect to the RO groups, when R is an alkyl group, preferred examples of R are alkyl groups having 1-6 carbon atoms. Specific examples of such preferred alkyl groups represented by R include methyl, ethyl, n-propyl, and isopropyl. Especially preferred is methyl or ethyl. On the other hand, when R is an aryl group, preferred examples thereof include phenyl, tolyl, and naphthyl. Especially preferred is phenyl. Incidentally, the hydrogen atoms possessed by the alkyl group or aryl group represented by R may have been replaced with halogen atoms. Replacement with fluorine is especially preferred because this enhances electrochemical stability. Although all the substituents represented by X may be of the same kind, the substituents may be a combination of substituents of two or more different kinds.

In general formula (2), n represents an integer of generally from 3 to 10, preferably 5 or smaller. In general formula (3), m represents an integer which is generally 0 or larger, and is generally 10 or smaller, preferably 3 or smaller. When n or m exceeds 10, there are cases where incorporation of these compounds into an electrolyte results in an increase in viscosity and hence in a decrease in conductivity and this reduces battery performances including load characteristics.

The molecular weights of the compounds respectively represented by general formula (2) and general formula (3) each are generally in the range of from 200 to 2,000, preferably to 1,000. When the molecular weights thereof are too high, there are cases where a dissolution failure occurs or an increase in higher viscosity results to impair load characteristics.

<1-2-5. Disulfonic Acid Ester Compounds>

The disulfonic acid ester compounds are not particularly limited in the kind thereof so long as they are compounds having two sulfonic acid ester structures in the molecule. Examples of acyclic disulfonic acid esters include ethanediol disulfonates such as ethanediol dimethanesulfonate, ethanediol diethanesulfonate, ethanediol dipropanesulfonate, ethanediol dibutanesulfonate, ethanediol bis(trifluoromethanesulfonate), ethanediol bis(pentafluoroethanesulfonate), ethanediol bis(heptafluoropropanesulfonate), ethanediol bis(perfluorobutanesulfonate), ethanediol bis(perfluoropentanesulfonate), ethanediol bis(perfluorohexanesulfonate), ethanediol bis(perfluorooctanesulfonate), ethanediol bis(perfluoro-1-methylethanesulfonate), ethanediol bis(perfluoro-1,1-dimethylethanesulfonate), ethanediol bis(perfluoro-3-methylbutanesulfonate), ethanediol di(fluoromethanesulfonate), ethanediol bis(difluoromethanesulfonate), ethanediol di(2-fluoroethanesulfonate), ethanediol bis(1,1-difluoroethanesulfonate), ethanediol bis(1,2-difluoroethanesulfonate), ethanediol bis(2,2-difluoroethanesulfonate), ethanediol bis(1,1,2-trifluoroethanesulfonate), ethanediol bis(1,2,2-trifluoroethanesulfonate), ethanediol bis(2,2,2-trifluoroethanesulfonate), ethanediol bis(1,1,2,2-tetrafluoroethanesulfonate), ethanediol bis(1,2,2,2-tetrafluoroethanesulfonate), ethanediol di(1-fluoro-1-methylethanesulfonate), ethanediol bis(1,2,2,2-tetrafluoro-1-methylethanesulfonate), ethanediol bis(1,1-difluoro-2-methylpropanesulfonate), ethanediol bis(1,2,2,3,3,3-hexafluoro-1-methylpropanesulfonate), ethanediol di(2-fluoro-1-fluoromethylethanesulfonate), ethanediol bis(2,2,2-trifluoro-1-trifluoromethylethanesulfonate), ethanediol bis(1-trifluoromethylethanesulfonate), ethanediol di(1-methyl-1-trifluoromethylethanesulfoante), and ethanediol bis(1-trifluoromethylhexanesulfonate), and the like;

1,2-propanediol disulfonates such as 1,2-propanediol dimethanesulfonate, 1,2-propanediol diethanesulfonate, 1,2-propanediol dipropanesulfonate, 1,2-propanediol dibutanesulfonate, 1,2-propanediol bis(trifluoromethanesulfonate), 1,2-propanediol bis(pentafluoroethanesulfonate), 1,2-propanediol bis(heptafluoropropanesulfonate), 1,2-propanediol bis(perfluorobutanesulfonate), 1,2-propanediol bis(perfluoropentanesulfonate), 1,2-propanediol bis(perfluorohexanesulfonate), 1,2-propanediol bis(perfluorooctanesulfonate), 1,2-propanediol bis(perfluoro-1-methylethanesulfonate), 1,2-propanediol bis(perfluoro-1,1-dimethylethanesulfonate), 1,2-propanediol bis(perfluoro-3-methylbutanesulfonate), 1,2-propanediol di(fluoromethanesulfonate), 1,2-propanediol bis(difluoromethanesulfonate), 1,2-propanediol di(2-fluoroethanesulfonate), 1,2-propanediol bis(1,1-difluoroethanesulfonate), 1,2-propanediol bis(1,2-difluoroethanesulfonate), 1,2-propanediol bis(2,2-difluoroethanesulfonate), 1,2-propanediol bis(1,1,2-trifluoroethanesulfonate), 1,2-propanediol bis(1,2,2-trifluoroethanesulfonate), 1,2-propanediol bis(2,2,2-trifluoroethanesulfonate), 1,2-propanediol bis(1,1,2,2-tetrafluoroethanesulfonate), 1,2-propanediol bis(1,2,2,2-tetrafluoroethanesulfonate), 1,2-propanediol di(1-fluoro-1-methylethanesulfonate), 1,2-propanediol bis(1,2,2,2-tetrafluoro-1-methylethanesulfonate), 1,2-propanediol bis(1,1-difluoro-2-methylpropanesulfonate), 1,2-propanediol bis (1,2,2,3,3,3-hexafluoro-1-methylpropanesulfonate), 1,2-propanediol di(2-fluoro-1-fluoromethylethanesulfonate), 1,2-propanediol bis(2,2,2-trifluoro-1-trifluoromethylethanesulfonate), 1,2-propanediol bis(1-trifluoromethylethanesulfonate), 1,2-propanediol di(1-methyl-1-trifluoromethylethanesulfoante), and 1,2-propanediol bis(1-trifluoromethylhexanesulfonate), and the like;

1,3-propanediol disulfonates such as 1,3-propanediol dimethanesulfonate, 1,3-propanediol diethanesulfonate, 1,3-propanediol dipropanesulfonate, 1,3-propanediol dibutanesulfonate, 1,3-propanediol bis(trifluoromethanesulfonate), 1,3-propanediol bis(pentafluoroethanesulfonate), 1,3-propanediol bis(heptafluoropropanesulfonate), 1,3-propanediol bis(perfluorobutanesulfonate), 1,3-propanediol bis(perfluoropentanesulfonate), 1,3-propanediol bis(perfluorohexanesulfonate), 1,3-propanediol bis(perfluorooctanesulfonate), 1,3-propanediol bis(perfluoro-1-methylethanesulfonate), 1,3-propanediol bis(perfluoro-1,1-dimethylethanesulfonate), 1,3-propanediol bis(perfluoro-3-methylbutanesulfonate), 1,3-propanediol di(fluoromethanesulfonate), 1,3-propanediol bis(difluoromethanesulfonate), 1,3-propanediol di(2-fluoroethanesulfonate), 1,3-propanediol bis(1,1-difluoroethanesulfonate), 1,3-propanediol bis(1,2-difluoroethanesulfonate), 1,3-propanediol bis(2,2-difluoroethanesulfonate), 1,3-propanediol bis(1,1,2-trifluoroethanesulfonate), 1,3-propanediol bis(1,2,2-trifluoroethanesulfonate), 1,3-propanediol bis(2,2,2-trifluoroethanesulfonate), 1,3-propanediol bis(1,1,2,2-tetrafluoroethanesulfonate), 1,3-propanediol bis (1,2,2,2-tetrafluoroethanesulfonate), 1,3-propanediol di(1-fluoro-1-methylethanesulfonate), 1,3-propanediol bis(1,2,2,2-tetrafluoro-1-methylethanesulfonate), 1,3-propanediol bis(1,1-difluoro-2-methylpropanesulfonate), 1,3-propanediol bis (1,2,2,3,3,3-hexafluoro-1-methylpropanesulfonate), 1,3-propanediol di(2-fluoro-1-fluoromethylethanesulfonate), 1,3-propanediol bis(2,2,2-trifluoro-1-trifluoromethylethanesulfonate), 1,3-propanediol bis(1-trifluoromethylethanesulfonate), 1,3-propanediol di(1-methyl-1-trifluoromethylethanesulfoante), and 1,3-propanediol bis(1-trifluoromethylhexanesulfonate);

1,2-butanediol disulfonates such as 1,2-butanediol dimethanesulfonate, 1,2-butanediol diethanesulfonate, 1,2-butanediol bis(trifluoromethanesulfonate), 1,2-butanediol bis (pentafluoroethanesulfonate), 1,2-butanediol bis (heptafluoropropanesulfonate), 1,2-butanediol bis (perfluorobutanesulfonate), 1,2-butanediol bis(perfluoro-1-methylethanesulfonate), 1,2-butanediol bis(perfluoro-1,1-dimethylethanesulfonate), 1,2-butanediol di(fluoromethanesulfonate), 1,2-butanediol bis(difluoromethanesulfonate), 1,2-butanediol di(2-fluoroethanesulfonate), 1,2-butanediol bis(2,2-difluoroethanesulfonate), 1,2-butanediol bis (2,2,2-trifluoroethanesulfonate), 1,2-butanediol di(1-fluoro-1-methylethanesulfonate), 1,2-butanediol di(2-fluoro-1-fluoromethylethanesulfonate), 1,2-butanediol bis(2,2,2-trifluoro-1-trifluoromethylethanesulfonate), 1,2-butanediol bis(1-trifluoromethylethanesulfonate), 1,2-butanediol di(1-methyl-1-trifluoromethylethanesulfonate), and 1,2-butanediol bis(1-trifluoromethylhexanesulfonate) and the like;

1,3-butanediol disulfonates such as 1,3-butanediol dimethanesulfonate, 1,3-butanediol diethanesulfonate, 1,3-butanediol bis(trifluoromethanesulfonate), 1,3-butanediol bis (pentafluoroethanesulfonate), 1,3-butanediol bis (heptafluoropropanesulfonate), 1,3-butanediol bis (perfluorobutanesulfonate), 1,3-butanediol bis(perfluoro-1-methylethanesulfonate), 1,3-butanediol bis(perfluoro-1,1-dimethylethanesulfonate), 1,3-butanediol di(fluoromethanesulfonate), 1,3-butanediol bis(difluoromethanesulfonate), 1,3-butanediol di(2-fluoroethanesulfonate), 1,3-butanediol bis(2,2-difluoroethanesulfonate), 1,3-butanediol bis(2,2,2-trifluoroethanesulfonate), 1,3-butanediol di(1-fluoro-1-methylethanesulfonate), 1,3-butanediol di(2-fluoro-1-fluoromethylethanesulfonate), 1,3-butanediol bis(2,2,2-trifluoro-1-trifluoromethylethanesulfonate), 1,3-butanediol bis[(1-trifluoromethyl)ethanesulfonate], 1,3-butanediol di(1-methyl-1-trifluoromethylethanesulfonate), and 1,3-butanediol bis(1-trifluoromethylhexanesulfonate) and the like;

1,4-butanediol disulfonates such as 1,4-butanediol dimethanesulfonate, 1,4-butanediol diethanesulfonate, 1,4-butanediol dipropanesulfonate, 1,4-butanediol dibutanesulfonate, 1,4-butanediol bis(trifluoromethanesulfonate), 1,4-butanediol bis(pentafluoroethanesulfonate), 1,4-butanediol bis(heptafluoropropanesulfonate), 1,4-butanediol bis (perfluorobutanesulfonate), 1,4-butanediol bis(perfluoropentanesulfonate), 1,4-butanediol bis (perfluorohexanesulfonate), 1,4-butanediol bis (perfluorooctanesulfonate), 1,4-butanediol bis(perfluoro-1-methylethanesulfonate), 1,4-butanediol bis(perfluoro-1,1-dimethylethanesulfonate), 1,4-butanediol bis(perfluoro-3-methylbutanesulfonate), 1,4-butanediol di(fluoromethanesulfonate), 1,4-butanediol bis(difluoromethanesulfonate), 1,4-butanediol di(2-fluoroethanesulfonate), 1,4-butanediol bis(1,1-difluoroethanesulfonate), 1,4-butanediol bis (1,2-difluoroethanesulfonate), 1,4-butanediol bis(2,2-difluoroethanesulfonate), 1,4-butanediol bis (1,1,2-trifluoroethanesulfonate), 1,4-butanediol bis(1,2,2-trifluoroethanesulfonate), 1,4-butanediol bis(2,2,2-trifluoroethanesulfonate), 1,4-butanediol bis(1,1,2,2-tetrafluoroethanesulfonate), 1,4-butanediol bis (1,2,2,2-tetrafluoroethanesulfonate), 1,4-butanediol di(1-fluoro-1-methylethanesulfonate), 1,4-butanediol bis(1,2,2,2-tetrafluoro-1-methylethanesulfonate), 1,4-butanediol bis(1,1-difluoro-2-methylpropanesulfonate), 1,4-butanediol bis(1,2,2,3,3,3-hexafluoro-1-methylpropanesulfonate), 1,4- butanediol di(2-fluoro-1-fluoromethylethanesulfonate), 1,4-butanediol bis(2,2,2-trifluoro-1-trifluoromethylethanesulfonate), 1,4-butanediol bis(1-trifluoromethylethanesulfonate), 1,4-butanediol di(1-methyl-1-trifluoromethylethanesulfoante), and 1,4-butanediol bis(1-trifluoromethylhexanesulfonate), and the like; and 1,4-benzenediol disulfonates such as 1,4-benzenediol dimethanesulfonate, 1,4-benzenediol diethanesulfonate, 1,4-benzenediol bis(trifluoromethanesulfonate), 1,4-benzenediol bis(pentafluoroethanesulfonate), 1,4-benzenediol bis(heptafluoropropanesulfonate), 1,4-benzenediol bis(perfluorobutanesulfonate), 1,4-benzenediol bis(perfluoro-1-methylethanesulfonate), 1,4-benzenediol bis(perfluoro-1,1-dimethylethanesulfonate), 1,4-benzenediol di(fluoromethanesulfonate), 1,4-benzenediol di(2-fluoroethanesulfonate), 1,4-benzenediol bis (2,2-difluoroethanesulfonate), 1,4-benzenediol bis(2,2,2-trifluoroethanesulfonate), 1,4-benzenediol di(1-fluoro-1-methylethanesulfonate), 1,4-benzenediol di(2-fluoro-1-fluoromethylethanesulfonate), 1,4-benzenediol bis (2,2,2-trifluoro-1-trifluoromethylethanesulfonate), 1,4-benzenediol bis(1-trifluoromethylethanesulfonate), 1,4-benzenediol di(1-methyl-1-trifluoromethylethanesulfonate), and 1,4-benzenediol bis(1-trifluoromethylhexanesulfonate) and the like.

Preferred of these are ethanediol disulfonates such as ethanediol dimethanesulfonate, ethanediol diethanesulfonate, ethanediol bis(trifluoromethanesulfonate), ethanediol bis(pentafluoroethanesulfonate), ethanediol di(fluoromethanesulfonate), ethanediol bis(difluoromethanesulfonate), ethanediol di(2-fluoroethanesulfonate), ethanediol bis(2,2-difluoroethanesulfonate), and ethanediol bis(2,2,2-trifluoroethanesulfonate) and the like;

1,2-propanediol disulfonates such as 1,2-propanediol dimethanesulfonate, 1,2-propanediol diethanesulfonate, 1,2-propanediol bis(trifluoromethanesulfonate), 1,2-propanediol bis(pentafluoroethanesulfonate), 1,2-propanediol di(fluoromethanesulfonate), 1,2-propanediol bis(difluoromethanesulfonate), 1,2-propanediol di(2-fluoroethanesulfonate), 1,2-propanediol bis (2,2-difluoroethanesulfonate), and 1,2-propanediol bis(2,2,2-trifluoroethanesulfonate), and the like;

1,3-propanediol disulfonates such as 1,3-propanediol dimethanesulfonate, 1,3-propanediol diethanesulfonate, 1,3-propanediol bis(trifluoromethanesulfonate), 1,3-propanediol bis(pentafluoroethanesulfonate), 1,3-propanediol di(fluoromethanesulfonate), 1,3-propanediol bis(difluoromethanesulfonate), 1,3-propanediol di(2-fluoroethanesulfonate), 1,3-propanediol bis(2,2-difluoroethanesulfonate), and 1,3-propanediol bis(2,2,2-trifluoroethanesulfonate) and the like;

1,2-butanediol disulfonates such as 1,2-butanediol dimethanesulfonate, 1,2-butanediol diethanesulfonate, 1,2-butanediol bis(trifluoromethanesulfonate), 1,2-butanediol bis(pentafluoroethanesulfonate), 1,2-butanediol di(fluoromethanesulfonate), 1,2-butanediol bis(difluoromethanesulfonate), 1,2-butanediol di(2-fluoroethanesulfonate), 1,2-butanediol bis(2,2-difluoroethanesulfonate), and 1,2-butanediol bis(2,2,2-trifluoroethanesulfonate) and the like;

1,3-butanediol disulfonates such as 1,3-butanediol dimethanesulfonate, 1,3-butanediol diethanesulfonate, 1,3-butanediol bis(trifluoromethanesulfonate), 1,3-butanediol bis(pentafluoroethanesulfonate), 1,3-butanediol di(fluoromethanesulfonate), 1,3-butanediol bis(difluoromethanesulfonate), 1,3-butanediol di(2-fluoroethanesulfonate), 1,3-butanediol bis(2,2-difluoroethanesulfonate), and 1,3-butanediol bis(2,2,2-trifluoroethanesulfonate) and the like; and 1,4-butanediol disulfonates such as 1,4-butanediol dimethanesulfonate, 1,4-butanediol diethanesulfonate, 1,4-butanediol bis(trifluoromethanesulfonate), 1,4-butanediol bis(pentafluoroethanesulfonate), 1,4-butanediol di(fluoromethanesulfonate), 1,4-butanediol bis(difluoromethanesulfonate), 1,4-butanediol di(2-fluoroethanesulfonate), 1,4-butanediol bis(2,2-difluoroethanesulfonate), and 1,4-butanediol bis(2,2,2-trifluoroethanesulfonate) and the like.

Especially preferred of these are ethanediol disulfonates such as ethanediol bis(trifluoromethanesulfonate), ethanediol bis(pentafluoroethanesulfonate), ethanediol di(fluoromethanesulfonate), ethanediol di(2-fluoroethanesulfonate), and ethanediol bis(2,2,2-trifluoroethanesulfonate) and the like;

1,2-propanediol disulfonates such as 1,2-propanediol bis(trifluoromethanesulfonate), 1,2-propanediol bis(pentafluoroethanesulfonate), 1,2-propanediol di(fluoromethanesulfonate), 1,2-propanediol di(2-fluoroethanesulfonate), and 1,2-propanediol bis(2,2,2-trifluoroethanesulfonate) and the like;

1,3-propanediol disulfonates such as 1,3-propanediol bis(trifluoromethanesulfonate), 1,3-propanediol bis(pentafluoroethanesulfonate), 1,3-propanediol di(2-fluoroethanesulfonate), and 1,3-propanediol bis(2,2,2-trifluoroethanesulfonate) and the like;

1,2-butanediol disulfonates such as 1,2-butanediol bis(trifluoromethanesulfonate), 1,2-butanediol bis(pentafluoroethanesulfonate), 1,2-butanediol di(fluoromethanesulfonate), 1,2-butanediol di(2-fluoroethanesulfonate), and 1,2-butanediol bis(2,2,2-trifluoroethanesulfonate) and the like;

1,3-butanediol disulfonates such as 1,3-butanediol bis(trifluoromethanesulfonate), 1,3-butanediol bis(pentafluoroethanesulfonate), 1,3-butanediol di(fluoromethanesulfonate), 1,3-butanediol di(2-fluoroethanesulfonate), and 1,3-butanediol bis(2,2,2-trifluoroethanesulfonate) and the like; and 1,4-butanediol disulfonates such as 1,4-butanediol bis(trifluoromethanesulfonate), 1,4-butanediol bis(pentafluoroethanesulfonate), 1,4-butanediol di(fluoromethanesulfonate), 1,4-butanediol di(2-fluoroethanesulfonate), and 1,4-butanediol bis(2,2,2-trifluoroethanesulfonate) and the like.

Examples of cyclic disulfonic acid esters include 1,5,2,4-dioxadithiane-2,2,4,4-tetraoxide, 3-methyl-1,5,2,4-dioxadithiane-2,2,4,4-tetraoxide, 3,3-dimethyl-1,5,2,4-dioxadithiane-2,2,4,4-tetraoxide, 3-fluoro-1,5,2,4-dioxadithiane-2,2,4,4-tetraoxide, 3,3-difluoro-1,5,2,4-dioxadithiane-2,2,4,4-tetraoxide, 6-methyl-1,5,2,4-dioxadithiane-2,2,4,4-tetraoxide, 6,6-dimethyl-1,5,2,4-dioxadithiane-2,2,4,4-tetraoxide, 6-fluoro-1,5,2,4-dioxadithiane-2,2,4,4-tetraoxide, 6,6-difluoro-1,5,2,4-dioxadithiane-2,2,4,4-tetraoxide, 3,6-dimethyl-1,5,2,4-dioxadithiane-2,2,4,4-tetraoxide, 3,6-difluoro-1,5,2,4-dioxadithiane-2,2,4,4-tetraoxide, 3,3,6,6-tetramethyl-1,5,2,4-dioxadithiane-2,2,4,4-tetraoxide, 3,3,6,6-tetrafluoro-1,5,2,4-dioxadithiane-2,2,4,4-tetraoxide, 1,4,2,5-dioxadithiane-2,2,5,5-tetraoxide, 3-methyl-1,4,2,5-dioxadithiane-2,2,5,5-tetraoxide, 3,3-dimethyl-1,4,2,5-dioxadithiane-2,2,5,5-tetraoxide, 3-fluoro-1,4,2,5-dioxadithiane-2,2,5,5-tetraoxide, 3,3-difluoro-1,4,2,5-dioxadithiane-2,2,5,5-tetraoxide, 3,6-dimethyl-1,4,2,5-dioxadithiane-2,2,5,5-tetraoxide, 3,6-difluoro-1,4,2,5-dioxadithiane-2,2,5,5- tetraoxide, 3,3,6,6-tetramethyl-1,4,2,5-dioxadithiane-2,2,5, 5-tetraoxide, 3,3,6,6-tetrafluoro-1,4,2,5-dioxadithiane-2,2,5,5-tetraoxide, 1,5,2,4-dioxadithian-6-one-2,2,4,4-tetraoxide, 3-methyl-1,5,2,4-dioxadithian-6-one-2,2,4,4-tetraoxide, 3,3-dimethyl-1,5,2,4-dioxadithian-6-one-2,2,4,4-tetraoxide, 3-fluoro-1,5,2,4-dioxadithian-6-one-2,2,4,4-tetraoxide, 3,3-difluoro-1,5,2,4-dioxadithian-6-one-2,2,4,4-tetraoxide, 1,5,2,4-dioxadithiepane-2,2,4,4-tetraoxide, 3-methyl-1,5,2,4-dioxadithiepane-2,2,4,4-tetraoxide, 3,3-dimethyl-1,5,2,4-dioxadithiepane-2,2,4,4-tetraoxide, 3-fluoro-1,5,2,4-dioxadithiepane-2,2,4,4-tetraoxide, 3,3-difluoro-1,5,2,4-dioxadithiepane-2,2,4,4-tetraoxide, 6-methyl-1,5,2,4-dioxadithiepane-2,2,4,4-tetraoxide, 6,7-dimethyl-1,5,2,4-dioxadithiepane-2,2,4,4-tetraoxide, 1,5,2,4-dioxadithiocane-2,2,4,4-tetraoxide, and 1,5,2,4-dioxadithionane-2,2,4,4-tetraoxide, and the like.

Preferred are compounds having a six-membered ring structure such as 1,5,2,4-dioxadithiane-2,2,4,4-tetraoxide, 3-methyl-1,5,2,4-dioxadithiane-2,2,4,4-tetraoxide, 3,3-dimethyl-1,5,2,4-dioxadithiane-2,2,4,4-tetraoxide, 3-fluoro-1,5,2,4-dioxadithiane-2,2,4,4-tetraoxide, 3,3-difluoro-1,5,2,4-dioxadithiane-2,2,4,4-tetraoxide, 6-methyl-1,5,2,4-dioxadithiane-2,2,4,4-tetraoxide, 6,6-dimethyl-1,5,2,4-dioxadithiane-2,2,4,4-tetraoxide, 6-fluoro-1,5,2,4-dioxadithiane-2,2,4,4-tetraoxide, 6,6-difluoro-1,5,2,4-dioxadithiane-2,2,4,4-tetraoxide, 3,6-dimethyl-1,5,2,4-dioxadithiane-2,2,4,4-tetraoxide, 3,6-difluoro-1,5,2,4-dioxadithiane-2,2,4,4-tetraoxide, 3,3,6,6-tetramethyl-1,5,2,4-dioxadithiane-2,2,4,4-tetraoxide, 3,3,6,6-tetrafluoro-1,5,2,4-dioxadithiane-2,2,4,4-tetraoxide, 1,4,2,5-dioxadithiane-2,2,5,5-tetraoxide, 3-methyl-1,4,2,5-dioxadithiane-2,2,5,5-tetraoxide, 3,3-dimethyl-1,4,2,5-dioxadithiane-2,2,5,5-tetraoxide, 3-fluoro-1,4,2,5-dioxadithiane-2,2,5,5-tetraoxide, 3,3-difluoro-1,4,2,5-dioxadithiane-2,2,5,5-tetraoxide, 3,6-dimethyl-1,4,2,5-dioxadithiane-2,2,5,5-tetraoxide, 3,6-difluoro-1,4,2,5-dioxadithiane-2,2,5,5-tetraoxide, 3,3,6,6-tetramethyl-1,4,2,5-dioxadithiane-2,2,5,5-tetraoxide, 3,3,6,6-tetrafluoro-1,4,2,5-dioxadithiane-2,2,5,5-tetraoxide, 1,5,2,4-dioxadithian-6-one-2,2,4,4-tetraoxide, 3-methyl-1,5,2,4-dioxadithian-6-one-2,2,4,4-tetraoxide, 3,3-dimethyl-1,5,2,4-dioxadithian-6-one-2,2,4,4-tetraoxide, 3-fluoro-1,5,2,4-dioxadithian-6-one-2,2,4,4-tetraoxide, and 3,3-difluoro-1,5,2,4-dioxadithian-6-one-2,2,4,4-tetraoxide.

<1-2-6. Sulfide Compounds>

The sulfide compounds are not particularly limited in the kind thereof so long as they are compounds having a sulfide structure in the molecule. Examples of the sulfide compounds include dimethyl sulfide, diethyl sulfide, di-n-propyl sulfide, diisopropyl sulfide, di-n-butyl sulfide, diisobutyl sulfide, di-tert-butyl sulfide, dicyclopentyl sulfide, dicyclohexyl sulfide, ethyl methyl sulfide, methyl propyl sulfide, methyl isopropyl sulfide, methyl n-butyl sulfide, methyl isobutyl sulfide, methyl tert-butyl sulfide, methyl cyclopentyl sulfide, methyl cyclohexyl sulfide, ethyl propyl sulfide, ethyl isopropyl sulfide, ethyl n-butyl sulfide, ethyl isobutyl sulfide, ethyl tert-butyl sulfide, ethyl cyclopentyl sulfide, ethyl cyclohexyl sulfide, diphenyl sulfide, di(2-tolyl) sulfide, di(3-tolyl) sulfide, di(4-tolyl) sulfide, divinyl sulfide, diallyl sulfide, dibenzyl sulfide, methyl phenyl sulfide, methyl (2-tolyl) sulfide, methyl (3-tolyl) sulfide, methyl (4-tolyl) sulfide, methyl vinyl sulfide, methyl allyl sulfide, methyl benzyl sulfide, ethyl phenyl sulfide, ethyl (2-tolyl) sulfide, ethyl (3-tolyl) sulfide, ethyl (4-tolyl) sulfide, ethyl vinyl sulfide, ethyl allyl sulfide, ethyl benzyl sulfide, phenyl propyl sulfide, phenyl isopropyl sulfide, phenyl n-butyl sulfide, phenyl isobutyl sulfide, phenyl tert-butyl sulfide, phenyl cyclopentyl sulfide, phenyl cyclohexyl sulfide, phenyl (2-tolyl) sulfide, phenyl (3-tolyl) sulfide, phenyl (4-tolyl) sulfide, phenyl vinyl sulfide, phenyl allyl sulfide, phenyl benzyl sulfide, bis(fluoromethyl) sulfide, bis(difluoromethyl) sulfide, bis(trifluoromethyl) sulfide, di(1-fluoroethyl) sulfide, di(2-fluoroethyl) sulfide, bis(2,2,2-trifluoroethyl) sulfide, bis(perfluoroethyl) sulfide, bis(3,3,3-trifluoro-n-propyl) sulfide, bis(2,2,3,3,3-pentafluoro-n-propyl) sulfide, bis(perfluoro-n-propyl) sulfide, di(2-fluoroisopropyl) sulfide, bis(2,2,2,2',2',2'-hexafluoroisopropyl) sulfide, bis(perfluoro-n-butyl) sulfide, di(2-fluoro-tert-butyl) sulfide, bis(perfluoro-tert-butyl) sulfide, di(2-fluorocyclohexyl) sulfide, di(3-fluorocyclohexyl) sulfide, di(4-fluorocyclohexyl) sulfide, bis(perfluorocyclohexyl) sulfide, methyl (fluoromethyl) sulfide, methyl (difluoromethyl) sulfide, methyl (trifluoromethyl) sulfide, methyl (1-fluoroethyl) sulfide, methyl (2-fluoroethyl) sulfide, methyl (2,2,2-trifluoroethyl) sulfide, methyl (perfluoroethyl) sulfide, methyl (3,3,3-trifluoro-n-propyl sulfide), methyl (2,2,3,3,3-pentafluoro-n-propyl) sulfide, methyl perfluoro-n-propyl sulfide, methyl (2-fluoroisopropyl) sulfide, methyl (2,2,2,2',2',2'-hexafluoroisopropyl) sulfide, methyl (perfluoro-n-butyl) sulfide, methyl (2-fluoro-tert-butyl) sulfide, methyl (perfluoro-tert-butyl) sulfide, methyl (2-fluorocyclohexyl) sulfide, methyl (3-fluorocyclohexyl) sulfide, methyl (4-fluorocyclohexyl) sulfide, methyl (perfluorocyclohexyl) sulfide, ethyl (fluoromethyl) sulfide, ethyl (difluoromethyl) sulfide, ethyl (trifluoromethyl) sulfide, ethyl (1-fluoroethyl) sulfide, ethyl (2-fluoroethyl) sulfide, ethyl (2,2,2-trifluoroethyl) sulfide, ethyl (perfluoroethyl) sulfide, ethyl (3,3,3-trifluoro-n-propyl) sulfide, ethyl (2,2,3,3,3-pentafluoro-n-propyl) sulfide, ethyl (perfluoro-n-propyl) sulfide, ethyl (2-fluoroisopropyl) sulfide, ethyl (2,2,2,2',2',2'-hexafluoroisopropyl) sulfide, ethyl (perfluoro-n-butyl) sulfide, ethyl (2-fluoro-tert-butyl) sulfide, ethyl (perfluoro-tert-butyl) sulfide, ethyl (2-fluorocyclohexyl) sulfide, ethyl (3-fluorocyclohexyl) sulfide, ethyl (4-fluorocyclohexyl) sulfide, ethyl (perfluorocyclohexyl) sulfide, (2,2,2-trifluoroethyl) (fluoromethyl) sulfide, (2,2,2-trifluoroethyl) (difluoromethyl) sulfide, (2,2,2-trifluoroethyl) (trifluoromethyl) sulfide, (2,2,2-trifluoroethyl) (1-fluoroethyl) sulfide, (2,2,2-trifluoroethyl) (2-fluoroethyl) sulfide, (2,2,2-trifluoroethyl) (perfluoroethyl) sulfide, (2,2,2-trifluoroethyl) (3,3,3-trifluoro-n-propyl) sulfide, (2,2,2-trifluoroethyl) (2,2,3,3,3-pentafluoro-n-propyl) sulfide, (2,2,2-trifluoroethyl) (perfluoro-n-propyl) sulfide, (2,2,2-trifluoroethyl) (2-fluoroisopropyl) sulfide, (2,2,2-trifluoroethyl) (2,2,2,2',2',2'-hexafluoroisopropyl) sulfide, (2,2,2-trifluoroethyl) (perfluoro-n-butyl) sulfide, (2,2,2-trifluoroethyl) (2-fluoro-tert-butyl) sulfide, (2,2,2-trifluoroethyl) (perfluoro-tert-butyl) sulfide, (2,2,2-trifluoroethyl) (2-fluorocyclohexyl) sulfide, (2,2,2-trifluoroethyl) (3-fluorocyclohexyl) sulfide, (2,2,2-trifluoroethyl) (4-fluorocyclohexyl) sulfide, (2,2,2-trifluoroethyl) (perfluorocyclohexyl) sulfide, di(2-fluorophenyl) sulfide, di(3-fluorophenyl) sulfide, di(4-fluorophenyl) sulfide, bis(2,3-difluorophenyl) sulfide, bis(2,4-difluorophenyl) sulfide, bis(3,5-difluorophenyl) sulfide, bis (2,4,6-trifluorophenyl) sulfide, bis(perfluorophenyl) sulfide, di(1-fluorovinyl) sulfide, di(2-fluorovinyl) sulfide, bis(perfluorovinyl) sulfide, bis[ (2-fluorophenyl)methyl]sulfide, bis[ (3-fluorophenyl)methyl] sulfide, bis[(4-fluorophenyl)methyl] sulfide, bis[ (perfluorophenyl)methyl] sulfide, methyl (2-fluorophenyl) sulfide, methyl (3-fluorophenyl) sulfide, methyl (4-fluorophenyl) sulfide, methyl (2,3-difluorophenyl) sulfide, methyl (2,4-difluorophenyl) sulfide, methyl (3,5-difluorophenyl) sulfide, methyl (2,4,6-trifluorophenyl) sulfide, methyl (perfluorophenyl) sulfide, methyl (1-fluorovinyl) sulfide, methyl (2-fluorovinyl) sulfide, methyl perfluorovinyl sulfide, methyl[(2-fluorophenyl)methyl] sulfide, methyl [(3-fluorophenyl)methyl] sulfide, methyl [(4-fluorophenyl)methyl] sulfide, methyl [(perfluorophenyl)methyl] sulfide, ethyl (2-fluorophenyl) sulfide, ethyl (3-fluorophenyl) sulfide, ethyl (4-fluorophenyl) sulfide, ethyl (2,3-difluorophenyl) sulfide, ethyl (2,4-difluorophenyl) sulfide, ethyl (3,5-difluorophenyl) sulfide, ethyl (2,4,6-trifluorophenyl) sulfide, ethyl (perfluorophenyl) sulfide, ethyl (1-fluorovinyl) sulfide, ethyl (2-fluorovinyl) sulfide, ethyl (perfluorovinyl) sulfide, ethyl [(2-fluorophenyl)ethyl] sulfide, ethyl [(3-fluorophenyl)methyl] sulfide, ethyl [(4-fluorophenyl)methyl] sulfide, ethyl [(perfluorophenyl)methyl] sulfide, phenyl (fluoromethyl) sulfide, phenyl (difluoromethyl) sulfide, phenyl (trifluoromethyl) sulfide, phenyl (1-fluoroethyl) sulfide, phenyl (2-fluoroethyl) sulfide, phenyl (2,2,2-trifluoroethyl) sulfide, phenyl (perfluoroethyl) sulfide, phenyl (3,3,3-trifluoro-n-propyl) sulfide, phenyl (2,2,3,3,3-pentafluoro-n-propyl) sulfide, phenyl (perfluoro-n-propyl) sulfide, phenyl (2-fluoroisopropyl) sulfide, phenyl (2,2,2,2',2',2'-hexafluoroisopropyl) sulfide, phenyl (perfluoro-n-butyl) sulfide, phenyl (2-fluoro-tert-butyl) sulfide, phenyl (perfluoro-tert-butyl) sulfide, phenyl (2-fluorocyclohexyl) sulfide, phenyl (3-fluorocyclohexyl) sulfide, phenyl (4-fluorocyclohexyl) sulfide, phenyl (perfluorocyclohexyl) sulfide, phenyl (2-fluorophenyl) sulfide, phenyl (3-fluorophenyl) sulfide, phenyl (4-fluorophenyl) sulfide, phenyl (2,3-difluorophenyl) sulfide, phenyl (2,4-difluorophenyl) sulfide, phenyl (3,5-difluorophenyl) sulfide, phenyl (2,4,6-trifluorophenyl) sulfide, phenyl (perfluorophenyl) sulfide, phenyl (1-fluorovinyl) sulfide, phenyl (2-fluorovinyl) sulfide, phenyl (perfluorovinyl) sulfide, phenyl (2-fluorophenyl)methyl sulfide, phenyl [(3-fluorophenyl)methyl] sulfide, phenyl [(4-fluorophenyl)methyl] sulfide, phenyl [(perfluorophenyl)methyl] sulfide, (2,2,2-trifluoroethyl) (2-fluorophenyl) sulfide, (2,2,2-trifluoroethyl) (3-fluorophenyl) sulfide, (2,2,2-trifluoroethyl) (4-fluorophenyl) sulfide, (2,2,2-trifluoroethyl) (2,3-difluorophenyl) sulfide, (2,2,2-trifluoroethyl) (2,4-difluorophenyl) sulfide, (2,2,2-trifluoroethyl) (3,5-difluorophenyl) sulfide, (2,2,2-trifluoroethyl) (2,4,6-trifluorophenyl) sulfide, (2,2,2-trifluoroethyl) (perfluorophenyl) sulfide, (2,2,2-trifluoroethyl) (1-fluorovinyl) sulfide, (2,2,2-trifluoroethyl) (2-fluorovinyl) sulfide, (2,2,2-trifluoroethyl) (perfluorovinyl) sulfide, (2,2,2-trifluoroethyl) [(2-fluorophenyl) methyl]sulfide, (2,2,2-trifluoroethyl) [(3-fluorophenyl)methyl] sulfide, (2,2,2-trifluoroethyl) [(4-fluorophenyl)methyl] sulfide, and (2,2,2-trifluoroethyl) [(perfluorophenyl)methyl] sulfide and the like.

<1-2-7. Disulfide Compounds>

The disulfide compounds are not particularly limited in the kind thereof so long as they are compounds having a disulfide structure in the molecule. Examples of the disulfide compounds include dimethyl disulfide, diethyl disulfide, di-n-propyl disulfide, diisopropyl disulfide, di-n-butyl disulfide, diisobutyl disulfide, di-tert-butyl disulfide, dicyclopentyl disulfide, dicyclohexyl disulfide, ethyl methyl disulfide, methyl propyl disulfide, methyl isopropyl disulfide, methyl n-butyl disulfide, methyl isobutyl disulfide, methyl tert-butyl disulfide, methyl cyclopentyl disulfide, methyl cyclohexyl disulfide, ethyl propyl disulfide, ethyl isopropyl disulfide, ethyl n-butyl disulfide, ethyl isobutyl disulfide, ethyl tert-butyl disulfide, ethyl cyclopentyl disulfide, ethyl cyclohexyl disulfide, diphenyl disulfide, di(2-tolyl) disulfide, di(3-tolyl) disulfide, di(4-tolyl) disulfide, divinyl disulfide, diallyl disulfide, dibenzyl disulfide, methyl phenyl disulfide, methyl (2-tolyl) disulfide, methyl (3-tolyl) disulfide, methyl (4-tolyl) disulfide, methyl vinyl disulfide, methyl allyl disulfide, methyl benzyl disulfide, ethyl phenyl disulfide, ethyl (2-tolyl) disulfide, ethyl (3-tolyl) disulfide, ethyl (4-tolyl) disulfide, ethyl vinyl disulfide, ethyl allyl disulfide, ethyl benzyl disulfide, phenyl propyl disulfide, phenyl isopropyl disulfide, phenyl n-butyl disulfide, phenyl isobutyl disulfide, phenyl tert-butyl disulfide, phenyl cyclopentyl disulfide, phenyl cyclohexyl disulfide, phenyl (2-tolyl) disulfide, phenyl (3-tolyl) disulfide, phenyl (4-tolyl) disulfide, phenyl vinyl disulfide, phenyl allyl disulfide, phenyl benzyl disulfide, bis(fluoromethyl) disulfide, bis(difluoromethyl) disulfide, bis(trifluoromethyl) disulfide, di(1-fluoroethyl) disulfide, di(2-fluoroethyl) disulfide, bis(2,2,2-trifluoroethyl) disulfide, bis(perfluoroethyl) disulfide, bis(3,3,3-trifluoro-n-propyl) disulfide, bis(2,2,3,3,3-pentafluoro-n-propyl) disulfide, bis(perfluoro-n-propyl) disulfide, di(2-fluoroisopropyl) disulfide, bis (2,2,2,2',2',2'-hexafluoroisopropyl) disulfide, bis (perfluoro-n-butyl) disulfide, di(2-fluoro-tert-butyl) disulfide, bis(perfluoro-tert-butyl) disulfide, di(2-fluorocyclohexyl) disulfide, di(3-fluorocyclohexyl) disulfide, di(4-fluorocyclohexyl) disulfide, bis(perfluorocyclohexyl) disulfide, methyl (fluoromethyl) disulfide, methyl (difluoromethyl) disulfide, methyl (trifluoromethyl) disulfide, methyl (1-fluoroethyl) disulfide, methyl (2-fluoroethyl) disulfide, methyl (2,2,2-trifluoroethyl) disulfide, methyl (perfluoroethyl) disulfide, methyl (3,3,3-trifluoro-n-propyl) disulfide, methyl (2,2,3,3,3-pentafluoro-n-propyl) disulfide, methyl (perfluoro-n-propyl) disulfide, methyl (2-fluoroisopropyl) disulfide, methyl (2,2,2,2',2',2'-hexafluoroisopropyl) disulfide, methyl (perfluoro-n-butyl) disulfide, methyl (2-fluoro-tert-butyl) disulfide, methyl (perfluoro-tert-butyl) disulfide, methyl (2-fluorocyclohexyl) disulfide, methyl (3-fluorocyclohexyl) disulfide, methyl (4-fluorocyclohexyl) disulfide, methyl (perfluorocyclohexyl) disulfide, ethyl (fluoromethyl) disulfide, ethyl (difluoromethyl) disulfide, ethyl (trifluoromethyl) disulfide, ethyl (1-fluoroethyl) disulfide, ethyl (2-fluoroethyl) disulfide, ethyl (2,2,2-trifluoroethyl) disulfide, ethyl (perfluoroethyl) disulfide, ethyl (3,3,3-trifluoro-n-propyl) disulfide, ethyl (2,2,3,3,3-pentafluoro-n-propyl) disulfide, ethyl (perfluoro-n-propyl) disulfide, ethyl 2-fluoroisopropyl disulfide, ethyl (2,2,2,2',2',2'-hexafluoroisopropyl) disulfide, ethyl (perfluoro-n-butyl) disulfide, ethyl (2-fluoro-tert-butyl) disulfide, ethyl (perfluoro-tert-butyl) disulfide, ethyl (2-fluorocyclohexyl) disulfide, ethyl (3-fluorocylohexyl) disulfide, ethyl (4-fluorocyclohexyl) disulfide, ethyl (perfluorocyclohexyl) disulfide, (2,2,2-trifluoroethyl) (fluoromethyl) disulfide, (2,2,2-trifluoroethyl) (difluoromethyl) disulfide, (2,2,2-trifluoroethyl) (trifluoromethyl) disulfide, (2,2,2-trifluoroethyl) (1-fluoroethyl) disulfide, (2,2,2-trifluoroethyl) (2-fluoroethyl) disulfide, (2,2,2-trifluoroethyl) (perfluoroethyl) disulfide, (2,2,2-trifluoroethyl) (3,3,3-trifluoro-n-propyl) disulfide, (2,2,2-trifluoroethyl) (2,2,3,3,3-pentafluoro-n-propyl) disulfide, (2,2,2-trifluoroethyl) (perfluoro-n-propyl) disulfide, (2,2,2-trifluoroethyl) (2-fluoroisopropyl) disulfide, (2,2,2-trifluoroethyl) (2,2,2,2',2',2'-hexafluoroisopropyl) disulfide, (2,2,2- trifluoroethyl) (perfluoro-n-butyl) disulfide, (2,2,2-trifluoroethyl) (2-fluoro-tert-butyl) disulfide, (2,2,2-trifluoroethyl) (perfluoro-tert-butyl) disulfide, (2,2,2-trifluoroethyl) (2-fluorocyclohexyl) disulfide, (2,2,2-trifluoroethyl) (3-fluorocyclohexyl) disulfide, (2,2,2-trifluoroethyl) (4-fluorocyclohexyl) disulfide, (2,2,2-trifluoroethyl) (perfluorocyclohexyl) disulfide, di(2-fluorophenyl) disulfide, di(3-fluorophenyl) disulfide, di(4-fluorophenyl) disulfide, bis(2,3-difluorophenyl) disulfide, bis(2,4-difluorophenyl) disulfide, bis(3,5-difluorophenyl) disulfide, bis(2,4,6-trifluorophenyl) disulfide, bis(perfluorophenyl) disulfide, di(1-fluorovinyl) disulfide, di(2-fluorovinyl) disulfide, bis(perfluorovinyl) disulfide, bis[(2-fluorophenyl)methyl] disulfide, bis[(3-fluorophenyl)methyl] disulfide, bis[(4-fluorophenyl)methyl] disulfide, bis[(perfluorophenyl)methyl] disulfide, methyl (2-fluorophenyl) disulfide, methyl (3-fluorophenyl) disulfide, methyl (4-fluorophenyl) disulfide, methyl (2,3-difluorophenyl) disulfide, methyl (2,4-difluorophenyl) disulfide, methyl (3,5-difluorophenyl) disulfide, methyl (2,4,6-trifluorophenyl) disulfide, methyl (perfluorophenyl) disulfide, methyl (1-fluorovinyl) disulfide, methyl (2-fluorovinyl) disulfide, methyl (perfluorovinyl) disulfide, methyl [(2-fluorophenyl)methyl] disulfide, methyl [(3-fluorophenyl)methyl] disulfide, methyl [(4-fluorophenyl)methyl] disulfide, methyl [(perfluorophenyl)methyl] disulfide, ethyl (2-fluorophenyl) disulfide, ethyl (3-fluorophenyl) disulfide, ethyl (4-fluorophenyl) disulfide, ethyl (2,3-difluorophenyl) disulfide, ethyl (2,4-difluorophenyl) disulfide, ethyl (3,5-difluorophenyl) disulfide, ethyl (2,4,6-trifluorophenyl) disulfide, ethyl (perfluorophenyl) disulfide, ethyl (1-fluorovinyl) disulfide, ethyl (2-fluorovinyl) disulfide, ethyl (perfluorovinyl) disulfide, ethyl [(2-fluorophenyl)ethyl] disulfide, ethyl [(3-fluorophenyl)methyl] disulfide, ethyl [(4-fluorophenyl)methyl] disulfide, ethyl [(perfluorophenyl)methyl] disulfide, phenyl (fluoromethyl) disulfide, phenyl (difluoromethyl) disulfide, phenyl (trifluoromethyl) disulfide, phenyl (1-fluoroethyl) disulfide, phenyl (2-fluoroethyl) disulfide, phenyl (2,2,2-trifluoroethyl) disulfide, phenyl (perfluoroethyl) disulfide, phenyl (3,3,3-trifluoro-n-propyl) disulfide, phenyl (2,2,3,3,3-pentafluoro-n-propyl) disulfide, phenyl (perfluoro-n-propyl) disulfide, phenyl (2-fluoroisopropyl) disulfide, phenyl (2,2,2,2',2',2'-hexafluoroisopropyl) disulfide, phenyl (perfluoro-n-butyl) disulfide, phenyl (2-fluoro-tert-butyl) disulfide, phenyl (perfluoro-tert-butyl) disulfide, phenyl (2-fluorocyclohexyl) disulfide, phenyl (3-fluorocyclohexyl) disulfide, phenyl (4-fluorocyclohexyl) disulfide, phenyl (perfluorocyclohexyl) disulfide, phenyl (2-fluorophenyl) disulfide, phenyl (3-fluorophenyl) disulfide, phenyl (4-fluorophenyl) disulfide, phenyl (2,3-difluorophenyl) disulfide, phenyl (2,4-difluorophenyl) disulfide, phenyl (3,5-difluorophenyl) disulfide, phenyl (2,4,6-trifluorophenyl) disulfide, phenyl (perfluorophenyl) disulfide, phenyl (1-fluorovinyl) disulfide, phenyl (2-fluorovinyl) disulfide, phenyl perfluorovinyl disulfide, phenyl [(2-fluorophenyl)methyl] disulfide, phenyl [(3-fluorophenyl)methyl] disulfide, phenyl [(4-fluorophenyl)methyl] disulfide, phenyl [(perfluorophenyl)methyl] disulfide, (2,2,2-trifluoroethyl) (2-fluorophenyl) disulfide, (2,2,2-trifluoroethyl) (3-fluorophenyl) disulfide, (2,2,2-trifluoroethyl) (4-fluorophenyl) disulfide, (2,2,2-trifluoroethyl) (2,3-difluorophenyl) disulfide, (2,2,2-trifluoroethyl) (2,4-difluorophenyl) disulfide, (2,2,2-trifluoroethyl) (3,5-difluorophenyl) disulfide, (2,2,2-trifluoroethyl) (2,4,6-trifluorophenyl) disulfide, (2,2,2-trifluoroethyl) (perfluorophenyl) disulfide, (2,2,2-trifluoroethyl) (1-fluorovinyl) disulfide, (2,2,2-trifluoroethyl) (2-fluorovinyl) disulfide, (2,2,2-trifluoroethyl) (perfluorovinyl) disulfide, (2,2,2-trifluoroethyl) [(2-fluorophenyl)methyl] disulfide, (2,2,2-trifluoroethyl) [(3-fluorophenyl)methyl] disulfide, (2,2,2-trifluoroethyl) [(4-fluorophenyl)methyl] disulfide, and (2,2,2-trifluoroethyl) [(perfluorophenyl)methyl] disulfide and the like.

<1-2-8. Acid Anhydrides>

The acid anhydrides are not limited in the kind thereof. The acid anhydrides may be compounds each having two or more acid anhydride structures per molecule. Examples of the acid anhydrides usable in invention 3 include the anhydrides of carboxylic acids, the anhydrides of sulfonic acids, and the anhydrides of carboxylic acids and sulfonic acids.

Examples of the carboxylic acid anhydrides include acetic anhydride, propionic anhydride, butyric anhydride, crotonic anhydride, trifluoroacetic anhydride, pentafluoropropionic anhydride, succinic anhydride, glutaric anhydride, maleic anhydride, citraconic anhydride, glutaconic anhydride, itaconic anhydride, diglycolic anhydride, cyclohexanedicarboxylic anhydride, cyclopentane tetracarboxylic dianhydride, 4-cyclohexene-1,2-dicarboxylic anhydride, 3,4,5,6-tetrahydrophthalic anhydride, 5-norbornene-2,3-dicarboxylic anhydride, phenylsuccinic anhydride, 2-phenylglutaric anhydride, phthalic anhydride, pyromellitic anhydride, fluorosuccinic anhydride, and tetrafluorosuccinic anhydride, and the like.

Preferred of these are succinic anhydride, glutaric anhydride, maleic anhydride, citraconic anhydride, itaconic anhydride, diglycolic anhydride, cyclohexanedicarboxylic anhydride, fluorosuccinic anhydride, and tetrafluorosuccinic anhydride.

Examples of the sulfonic acid anhydrides include methanesulfonic anhydride, ethanesulfonic anhydride, propanesulfonic anhydride, butanesulfonic anhydride, pentanesulfonic anhydride, hexanesulfonic anhydride, vinylsulfonic anhydride, benzenesulfonic anhydride, trifluoromethanesulfonic anhydride, 2,2,2-trifluoroethanesulfonic anhydride, pentafluoroethanesulfonic anhydride, 1,2-ethanedisulfonic anhydride, 1,3-propanedisulfonic anhydride, 1,4-butanedisulfonic anhydride, 1,2-benzenedisulfonic anhydride, tetrafluoro-1,2-ethanedisulfonic anhydride, hexafluoro-1,3-propanedisulfonic anhydride, octafluoro-1,4-butanedisulfonic anhydride, 3-fluoro-1,2-benzenedisulfonic anhydride, 4-fluoro-1,2-benzene disulfonic anhydride, and 3,4,5,6-tetrafluoro-1,2-benzenedisulfonic anhydride, and the like.

Preferred of these are methanesulfonic anhydride, ethanesulfonic anhydride, propanesulfonic anhydride, butanesulfonic anhydride, vinylsulfonic anhydride, benzenesulfonic anhydride, trifluoromethanesulfonic anhydride, 2,2,2-trifluoroethanesulfonic anhydride, pentafluoroethanesulfonic anhydride, 1,2-ethanedisulfonic anhydride, 1,3-propanedisulfonic anhydride, 1,2-benzenedisulfonic anhydride, and the like.

Examples of the anhydrides of carboxylic acids and sulfonic acids include acetic methanesulfonic anhydride, acetic ethanesulfonic anhydride, acetic propanesulfonic anhydride, propionic methanesulfonic anhydride, propionic ethanesulfonic anhydride, propionic propanesulfonic anhydride, trifluoroacetic methanesulfonic anhydride, trifluoroacetic ethanesulfonic anhydride, trifluoroacetic propanesulfonic anhydride, acetic trifluoromethanesulfonic anhydride, acetic 2,2,2-trifluoroethanesulfonic anhydride, acetic pentafluoroethanesulfonic anhydride, trifluoroacetic trifluoromethanesulfonic anhydride, trifluoroacetic 2,2,2-trifluoroethanesulfonic anhydride, trifluoroacetic pentafluoroethanesulfonic anhydride, 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic anhydride, 2-fluoro-3-sulfopropionic anhydride, 2,2-difluoro-3-sulfopropionic anhydride, 2,2,3,3,-tetrafluoro-3-sulfopropionic anhydride, 2-sulfobenzoic anhydride, 3-fluoro-2-sulfobenzoic anhydride, 4-fluoro-2-sulfobenzoic anhydride, 5-fluoro-2-sulfobenzoic anhydride, 6-fluoro-2-sulfobenzoic anhydride, 3,6-difluoro-2-sulfobenzoic anhydride, 3,4,5,6-tetrafluoro-2-sulfobenzoic anhydride, 3-trifluoromethyl-2-sulfobenzoic anhydride, 4-trifluoromethyl-2-sulfobenzoic anhydride, 5-trifluoromethyl-2-sulfobenzoic anhydride, and 6-trifluoromethyl-2-sulfobenzoic anhydride, and the like.

Preferred of these are acetic methanesulfonic anhydride, acetic ethanesulfonic anhydride, acetic propanesulfonic anhydride, propionic methanesulfonic anhydride, propionic ethanesulfonic anhydride, propionic propanesulfonic anhydride, trifluoroacetic methanesulfonic anhydride, trifluoroacetic ethanesulfonic anhydride, trifluoroacetic propanesulfonic anhydride, acetic trifluoromethanesulfonic anhydride, acetic 2,2,2-trifluoroethanesulfonic anhydride, acetic pentafluoroethanesulfonic anhydride, trifluoroacetic trifluoromethanesulfonic anhydride, trifluoroacetic 2,2,2-trifluoroethanesulfonic anhydride, trifluoroacetic pentafluoroethanesulfonic anhydride, 2-sulfobenzoic anhydride, 3-fluoro-2-sulfobenzoic anhydride, 4-fluoro-2-sulfobenzoic anhydride, 5-fluoro-2-sulfobenzoic anhydride, 6-fluoro-2-sulfobenzoic anhydride, and the like.

<1-2-9. Lactone Compounds Having Substituent in α-Position>

The lactone compounds having a substituent in the α-position are not particularly limited. Examples thereof include β-propiolactone derivatives such as α-methyl-β-propiolactone, α-ethyl-β-propiolactone, α-propyl-β-propiolactone, α-vinyl-β-propiolactone, α-allyl-β-propiolactone, α-phenyl-β-propiolactone, α-tolyl-β-propiolactone, α-naphthyl-β-propiolactone, α-fluoro-β-propiolactone, α,α-dimethyl-β-propiolactone, α, α-diethyl-β-propiolactone, α-ethyl-α-methyl-β-propiolactone, α-methyl-α-phenyl-β-propiolactone, α,α-diphenyl-β-propiolactone, α,α-ditolyl-β-propiolactone, α,α-bis(dimethylphenyl)-β-propiolactone, α,α-dinaphthyl-β-propiolactone, α,α-divinyl-β-propiolactone, α,α-diallyl-β-propiolactone, α,α-dibenzyl-β-propiolactone, α,α-diphenethyl-β-propiolactone, and α,α-difluoro-β-propiolactone, and the like;

β-butyrolactone derivatives such as α-methyl-β-butyrolactone, α-ethyl-β-butyrolactone, α-propyl-β-butyrolactone, α-vinyl-β-butyrolactone, α-allyl-β-butyrolactone, α-phenyl-β-butyrolactone, α-tolyl-β-butyrolactone, α-naphthyl-β-butyrolactone, α-fluoro-β-butyrolactone, α,α-dimethyl-β-butyrolactone, α,α-diethyl-β-butyrolactone, α-ethyl-α-methyl-β-butyrolactone, α-methyl-α-phenyl-β-butyrolactone, α,α-diphenyl-β-butyrolactone, α,α-ditolyl-β-butyrolactone, α,α-bis(dimethylphenyl)-β-butyrolactone, α,α-dinaphthyl-β-butyrolactone, α,α-divinyl-β-butyrolactone, α,α-diallyl-β-butyrolactone, α,α-dibenzyl-β-butyrolactone, α,α-diphenethyl-β-butyrolactone, and α,α-difluoro-β-butyrolactone, and the like;

γ-butyrolactone derivatives such as α-methyl-γ-butyrolactone, α-ethyl-γ-butyrolactone, α-propyl-γ-butyrolactone, α-vinyl-γ-butyrolactone, α-allyl-γ-butyrolactone, α-phenyl-γ-butyrolactone, α-tolyl-γ-butyrolactone, α-naphthyl-γ-butyrolactone, α-fluoro-γ-butyrolactone, α,α-dimethyl-γ-butyrolactone, α,α-diethyl-γ-butyrolactone, α-ethyl-α-methyl-γ-butyrolactone, α-methyl-α-phenyl-γ-butyrolactone, α,α-diphenyl-γ-butyrolactone, α,α-ditolyl-γ-butyrolactone, α,α-bis(dimethylphenyl)-γ-butyrolactone, α,α-dinaphthyl-γ-butyrolactone, α,α-divinyl-γ-butyrolactone, α,α-diallyl-γ-butyrolactone, α,α-dibenzyl-γ-butyrolactone, α,α-diphenethyl-γ-butyrolactone, and α,α-difluoro-γ-butyrolactone, and the like;

γ-valerolactone derivatives such as α-methyl-γ-valerolactone, α-ethyl-γ-valerolactone, α-propyl-γ-valerolactone, α-vinyl-γ-valerolactone, α-allyl-γ-valerolactone, α-phenyl-γ-valerolactone, α-tolyl-γ-valerolactone, α-naphthyl-γ-valerolactone, α-fluoro-γ-valerolactone, α,α-dimethyl-γ-valerolactone, α,α-diethyl-γ-valerolactone, α-ethyl-α-methyl-γ-valerolactone, α-methyl-α-phenyl-γ-valerolactone, α,α-diphenyl-γ-valerolactone, α,α-ditolyl-γ-valerolactone, α,α-bis(dimethylphenyl)-γ-valerolactone, α,α-dinaphthyl-γ-valerolactone, α,α-divinyl-γ-valerolactone, α,α-diallyl-γ-valerolactone, α,α-dibenzyl-γ-valerolactone, α,α-diphenethyl-γ-valerolactone, and α,α-difluoro-γ-valerolactone, and the like;

δ-valerolactone derivatives such as α-methyl-δ-valerolactone, α-ethyl-δ-valerolactone, α-propyl-δ-valerolactone, α-vinyl-δ-valerolactone, α-allyl-δ-valerolactone, α-phenyl-δ-valerolactone, α-tolyl-δ-valerolactone, α-naphthyl-δ-valerolactone, α-fluoro-δ-valerolactone, α,α-dimethyl-δ-valerolactone, α,α-diethyl-δ-valerolactone, α-ethyl-α-methyl-δ-valerolactone, α-methyl-α-phenyl-δ-valerolactone, α,α-diphenyl-δ-valerolactone, α,α-ditolyl-δ-valerolactone, α,α-bis(dimethylphenyl)-δ-valerolactone, α,α-dinaphthyl-δ-valerolactone, α,α-divinyl-δ-valerolactone, α,α-diallyl-δ-valerolactone, α,α-dibenzyl-δ-valerolactone, α,α-diphenethyl-δ-valerolactone, and α,α-difluoro-δ-valerolactone;

γ-caprolactone derivatives such as α-methyl-γ-caprolactone, α-ethyl-γ-caprolactone, α-propyl-γ-caprolactone, α-vinyl-γ-caprolactone, α-allyl-γ-caprolactone, α-phenyl-γ-caprolactone, α-tolyl-γ-caprolactone, α-naphthyl-γ-caprolactone, α-fluoro-γ-caprolactone, α,α-dimethyl-γ-caprolactone, α,α-diethyl-γ-caprolactone, α-ethyl-α-methyl-γ-caprolactone, α-methyl-α-phenyl-γ-caprolactone, α,α-diphenyl-γ-caprolactone, α,α-ditolyl-γ-caprolactone, α,α-bis(dimethylphenyl)-γ-caprolactone, α,α-dinaphthyl-γ-caprolactone, α,α-divinyl-γ-caprolactone, α,α-diallyl-γ-caprolactone, α,α-dibenzyl-γ-caprolactone, α,α-diphenethyl-γ-caprolactone, and α,α-difluoro-γ-caprolactone, and the like;

δ-caprolactone derivatives such as α-methyl-δ-caprolactone, α-ethyl-δ-caprolactone, α-propyl-δ-caprolactone, α-vinyl-δ-caprolactone, α-allyl-δ-caprolactone, α-phenyl-δ-caprolactone, α-tolyl-δ-caprolactone, α-naphthyl-δ-caprolactone, α-fluoro-δ-caprolactone, α,α-dimethyl-δ-caprolactone, α,α-diethyl-δ-caprolactone, α-ethyl-α-methyl-δ-caprolactone, α-methyl-α-phenyl-δ-caprolactone, α,α-diphenyl-δ-caprolactone, α,α-ditolyl-δ-caprolactone, α,α-bis(dimethylphenyl)-δ-caprolactone, α,α-dinaphthyl-δ-caprolactone, α,α-divinyl-δ-caprolactone, α,α-diallyl-δ-caprolactone, α,α-dibenzyl-δ-caprolactone, α,α-diphenethyl-δ-caprolactone, and α,α-difluoro-δ-caprolactone, and the like; and ε-caprolactone derivatives such as α-methyl-ε-caprolactone, α-ethyl-ε-caprolactone, α-propyl-ε-caprolactone, α-vinyl-ε-caprolactone, α-allyl-ε-caprolactone, α-phenyl-ε-caprolactone, α-tolyl-ε-caprolactone, α-naphthyl-ε-caprolactone, α-fluoro-ε-caprolactone, α,α-dimethyl-ε-caprolactone, α,α-diethyl-ε-caprolactone, α-ethyl-α-methyl-ε-caprolactone, α-methyl-α-phenyl-ε-caprolactone, α,α-diphenyl-ε-caprolactone, α,α-ditolyl-ε-caprolactone, α,α-bis(dimethylphenyl)-ε-caprolactone, α,α-dinaphthyl-ε-caprolactone, α,α-divinyl-ε-caprolactone, α,α-diallyl-ε- caprolactone, α,α-dibenzyl-ε-caprolactone, α,α-diphenethyl-ε-caprolactone, and α,α-difluoro-ε-caprolactone, and the like.

Preferred of these are α-methyl-substituted lactones such as α-methyl-γ-butyrolactone, α-methyl-γ-valerolactone, α-methyl-δ-valerolactone, and α-methyl-δ-caprolactone etc.; α-phenyl-substituted lactones such as α-phenyl-γ-butyrolactone, α-phenyl-γ-valerolactone, α-phenyl-δ-valerolactone, and α-phenyl-δ-caprolactone; α,α-dimethyl-substituted lactones such as α,α-dimethyl-γ-butyrolactone, α,α-dimethyl-γ-valerolactone, α,α-dimethyl-δ-valerolactone, α,α-dimethyl-γ-caprolactone, and α,α-dimethyl-δ-caprolactone etc.; and α,α-diphenyl-substituted lactones such as α,α-diphenyl-γ-butyrolactone, α,α-diphenyl-γ-valerolactone, α,α-diphenyl-δ-valerolactone, α,α-diphenyl-γ-caprolactone, and α,α-diphenyl-δ-caprolactone; and the like.

More preferred of these are α-methyl-γ-butyrolactone, α-phenyl-γ-butyrolactone, α,α-dimethyl-γ-butyrolactone, α,α-diphenyl-γ-butyrolactone, and the like.

<1-2-10. Compounds Having Carbon-Carbon Triple Bond>

The compounds having a carbon-carbon triple bond are not particularly limited in the kind thereof so long as they are compounds having a carbon-carbon triple bond in the molecule.

Examples of the compounds having a carbon-carbon triple bond include carbonate compounds such as 2-propynyl methyl carbonate, 2-propynyl ethyl carbonate, 2-propynyl propyl carbonate, 2-propynyl butyl carbonate, 2-propynyl cyclohexyl carbonate, 2-propynyl phenyl carbonate, bis-2-propynyl carbonate, 2-butynyl methyl carbonate, 2-butynyl ethyl carbonate, 2-butynyl propyl carbonate, 2-butynyl butyl carbonate, 2-butynyl cyclohexyl carbonate, 2-butynyl phenyl carbonate, bis-2-butynyl carbonate, 3-butynyl methyl carbonate, 3-butynyl ethyl carbonate, 2-pentynyl methyl carbonate, 1-methyl-2-butynyl methyl carbonate, 2-butyne-1,4-diol dimethyl carbonate, 2-butyne-1,4-diol diethyl carbonate, 2-butyne-1,4-diol dipropyl carbonate, 2-butyne-1,4-diol dicyclohexyl carbonate, and 2-butyne-1,4-diol diphenyl carbonate, and the like;

carboxylic acid ester compounds such as 2-propynyl acetate, 2-propynyl propionate, 2-propynyl butyrate, 2-propynyl cyclohexanecarboxylate, 2-propynyl benzoate, 2-butynyl acetate, 2-butynyl propionate, 2-butynyl butyrate, 2-butynyl cyclohexanecarboxylate, 2-butynyl benzoate, 3-butynyl acetate, 3-butynyl propionate, 3-butynyl butyrate, 3-butynyl cyclohexanecarboxylate, 3-butynyl benzoate, 2-pentynyl acetate, 1-methyl-2-butynyl acetate, 2-butyne-1,4-diol diacetate, 2-butyne-1,4-diol dipropionate, 2-butyne-1,4-diol dicyclohexanecarboxylate, and 2-butyne-1,4-diol dibenzoate etc.; and sulfonic acid ester compounds such as 2-propynyl methanesulfonate, 2-propynyl ethanesulfonate, 2-propynyl propanesulfonate, 2-propynyl cyclohexanesulfonate, 2-propynyl benzenesulfonate, 2-butynyl methanesulfonate, 2-butynyl ethanesulfonate, 2-butynyl propanesulfonate, 2-butynyl cyclohexanesulfonate, 2-butynyl benzenesulfonate, 3-butynyl methanesulfonate, 3-butynyl ethanesulfonate, 3-butynyl propanesulfonate, 3-butynyl cyclohexanesulfonate, 3-butynyl benzenesulfonate, 2-pentynyl methanesulfonate, 1-methyl-2-butynyl methanesulfonate, 2-propynyl trifluoromethanesulfonate, 2-propynyl pentafluoroethanesulfonate, 2-butyne-1,4-diol dimethanesulfonate, 2-butyne-1,4-diol dipropanesulfonate, 2-butyne-1,4-diol dicyclohexanesulfonate, and 2-butyne-1,4-diol dibenzenesulfonate etc.

<1-2-11. Content, Technical Range, Etc.>

One of such compounds enumerated above as "compound A of invention 3", i.e., at least one compound selected from the group consisting of compounds represented by general formula (1), nitrile compounds, isocyanate compounds, phosphazene compounds, disulfonic acid ester compounds, sulfide compounds, disulfide compounds, acid anhydrides, lactone compounds having a substituent in the α-position, and compounds having a carbon-carbon triple bond, may be used alone. Alternatively, any desired combination of two or more of these compounds in any desired proportion may be used. Furthermore, with respect to each of those classes of "compound A of invention 3", one of the compounds falling under the class may be used alone or any desired combination of two or more thereof in any desired proportion may be used.

The content of the "compound A of invention 3" in nonaqueous electrolyte 3 is not particularly limited. However, the total content thereof is generally 0.001% by mass or higher, more preferably 0.01% by mass or higher, even more preferably 0.1% by mass or higher, based on the whole nonaqueous electrolyte. The upper limit of the total content thereof is 50% by mass or lower, more preferably 25% by mass or lower, even more preferably 10% by mass or lower, especially preferably 5% by mass or lower. When the concentration of "compound A of invention 3" is too low, there are cases where the effect of improving continuous-charge characteristics is difficult to obtain. On the other hand, too high concentrations thereof may result in a decrease in charge/discharge efficiency.

<1-3. Nonaqueous Solvent>

The nonaqueous solvent contained in nonaqueous electrolyte 3 of the invention is not particularly limited in the use and kind thereof so log as the solvent is a nonaqueous solvent which does not adversely influence battery characteristics after battery fabrication. Examples thereof include the organic solvents enumerated above. However, it is preferred to employ one or more of the following nonaqueous solvents for use in nonaqueous electrolytes.

Examples of the usable nonaqueous solvents include acyclic or cyclic carbonates, acyclic or cyclic carboxylic acid esters, acyclic or cyclic ethers, and sulfur-containing organic solvents, and the like.

The acyclic carbonates also are not limited in the kind thereof. However, dialkyl carbonates are preferred. The number of carbon atoms of each constituent alkyl group is preferably 1-5, especially preferably 1-4. Examples thereof include dimethyl carbonate, ethyl methyl carbonate, diethyl carbonate, methyl n-propyl carbonate, ethyl n-propyl carbonate, and di-n-propyl carbonate, and the like.

Of these, dimethyl carbonate, ethyl methyl carbonate, or diethyl carbonate is preferred from the standpoint of industrial availability and because these compounds are satisfactory in various properties in a nonaqueous-electrolyte secondary battery.

The cyclic carbonates are not limited in the kind thereof. However, the number of carbon atoms of the alkylene group constituting each cyclic carbonate is preferably 2-6, especially preferably 2-4. Examples of the cyclic carbonates include ethylene carbonate, propylene carbonate, and butylene carbonate (2-ethylethylene carbonate or cis- and trans-2,3-dimethylethylene carbonates), and the like.

Of these, ethylene carbonate or propylene carbonate is preferred because these compounds are satisfactory in various properties in a nonaqueous-electrolyte secondary battery.

The acyclic carboxylic acid esters also are not limited in the kind thereof. Examples thereof include methyl acetate, ethyl acetate, n-propyl acetate, isopropyl acetate, n-butyl acetate, isobutyl acetate, tert-butyl acetate, methyl propionate, ethyl propionate, n-propyl propionate, isopropyl propionate, n-butyl propionate, isobutyl propionate, and tert-butyl propionate, and the like.

Of these, ethyl acetate, methyl propionate, or ethyl propionate is preferred from the standpoint of industrial availability and because these compounds are satisfactory in various properties in a nonaqueous-electrolyte secondary battery.

The cyclic carboxylic acid esters also are not limited in the kind thereof. Examples of such esters in ordinary use include γ-butyrolactone, γ-valerolactone, and δ-valerolactone, and the like.

Of these, γ-butyrolactone is preferred from the standpoint of industrial availability and because this compound is satisfactory in various properties in a nonaqueous-electrolyte secondary battery.

The acyclic ethers also are not limited in the kind thereof. Examples thereof include dimethoxymethane, dimethoxyethane, diethoxymethane, diethoxyethane, ethoxymethoxymethane, and ethoxymethoxyethane, and the like.

Of these, dimethoxyethane or diethoxyethane is preferred from the standpoint of industrial availability and because these compounds are satisfactory in various properties in a nonaqueous-electrolyte secondary battery.

The cyclic ethers also are not limited in the kind thereof. Examples thereof include tetrahydrofuran, 2-methyltetrahydrofuran, and tetrahydropyran, and the like.

Furthermore, the sulfur-containing organic solvents also are not particularly limited in the kind thereof. Examples thereof include ethylene sulfite, 1,3-propanesultone, 1,4-butanesultone, methyl methanesulfonate, sulfolane, and sulfolene and the like.

Of those compounds, the acyclic or cyclic carbonates or the acyclic or cyclic carboxylic acid esters are preferred because these compounds are satisfactory in various properties in a nonaqueous-electrolyte secondary battery. More preferred of these is ethylene carbonate, propylene carbonate, dimethyl carbonate, ethyl methyl carbonate, diethyl carbonate, ethyl acetate, methyl propionate, ethyl propionate, or γ-butyrolactone. Even more preferred is ethylene carbonate, propylene carbonate, dimethyl carbonate, ethyl methyl carbonate, diethyl carbonate, ethyl acetate, methyl propionate, or γ-butyrolactone.

Those compounds may be used alone or in combination of two or more thereof. It is, however, preferred to use two or more compounds in combination. For example, it is especially preferred to use a high-permittivity solvent, such as a cyclic carbonate, in combination with a low-viscosity solvent, such as an acyclic carbonate or an acyclic ester.

A preferred combination of nonaqueous solvents is a combination consisting mainly of at least one cyclic carbonate and at least one acyclic carbonate. In particular, the total proportion of the cyclic carbonate and the acyclic carbonate to the whole nonaqueous solvent is generally 80% by volume or higher, preferably 85% by volume or higher, more preferably 90% by volume or higher. The proportion by volume of the cyclic carbonate to the sum of the cyclic carbonate and the acyclic carbonate is preferably 5% by volume or higher, more preferably 10% by volume or higher, especially preferably 15% by volume or higher, and is generally 50% by volume or lower, preferably 35% by volume or lower, more preferably 30% or lower. Use of such combination of nonaqueous solvents is preferred because the battery fabricated with this combination has an improved balance between cycle characteristics and high-temperature storability (in particular, residual capacity and high-load discharge capacity after high-temperature storage).

Examples of the preferred combination including at least one cyclic carbonate and at least one acyclic carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate, and the like.

Combinations obtained by further adding propylene carbonate to those combinations including ethylene carbonate and one or more acyclic carbonates are also included in preferred combinations. In the case where propylene carbonate is contained, the volume ratio of the ethylene carbonate to the propylene carbonate is preferably from 99:1 to 40:60, especially preferably from 95:5 to 50:50. It is also preferred to regulate the proportion of the propylene carbonate to the whole nonaqueous solvent to a value which is 0.1% by volume or higher, preferably 1% by volume or higher, more preferably 2% by volume or higher, and is generally 10% by volume or lower, preferably 8% by volume or lower, more preferably 5% by volume or lower. This is because this regulation brings about excellent discharge load characteristics while maintaining the properties of the combination of ethylene carbonate and one or more acyclic carbonates.

More preferred of these are combinations including an asymmetric acyclic carbonate. In particular, combinations including ethylene carbonate, a symmetric acyclic carbonate, and an asymmetric acyclic carbonate, such as a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, or such combinations which further contain propylene carbonate are preferred because these combinations have a satisfactory balance between cycle characteristics and discharge load characteristics. Preferred of such combinations are ones in which the asymmetric acyclic carbonate is ethyl methyl carbonate. Furthermore, the number of carbon atoms of each of the alkyl groups constituting each dialkyl carbonate is preferably 1-2.

Other examples of preferred mixed solvents are ones containing an acyclic ester. In particular, the cyclic carbonate/acyclic carbonate mixed solvents which contain an acyclic ester are preferred from the standpoint of improving the discharge load characteristics of a battery. The acyclic ester especially preferably is methyl acetate, ethyl acetate, or methyl propionate. The proportion by volume of the acyclic ester to the whole nonaqueous solvent is generally 5% or higher, preferably 8% or higher, more preferably 15% or higher, and is generally 50% or lower, preferably 35% or lower, more preferably 30% or lower, even more preferably 25% or lower.

Other preferred examples of the nonaqueous solvent are ones in which one organic solvent selected from the group consisting of ethylene carbonate, propylene carbonate, butylene carbonate, γ-butyrolactone, and γ-valerolactone or a mixed solvent composed of two or more organic solvents selected from the group accounts for at least 60% by volume of the whole. Such mixed solvents have a flash point of preferably 50° C. or higher, especially preferably 70° C. or higher. Nonaqueous electrolyte 3 employing this solvent is reduced in solvent vaporization and liquid leakage even when used at high temperatures. In particular, when such a nonaqueous solvent which includes ethylene carbonate and γ-butyrolactone in a total amount of 80% by volume or larger, preferably 90% by volume or larger, based on the whole nonaqueous solvent and in which the volume ratio of the ethylene carbonate to the γ-butyrolactone is from 5:95 to 45:55 or such a nonaqueous solvent which includes ethylene carbonate and propylene carbonate in a total amount of 80% by volume or larger, preferably 90% by volume or larger, based on the whole nonaqueous solvent and in which the volume ratio of the ethylene carbonate to the propylene carbonate is from 30:70 to 80:20 is used, then an improved balance between cycle characteristics and discharge load characteristics, etc. is generally obtained.

<1-4. Monofluorophosphate and Difluorophosphate>

Nonaqueous electrolyte 3 of the invention contains a monofluorophosphate and/or a difluorophosphate as an essential component. With respect to the "monofluorophosphate and difluorophosphate" to be used in invention 3, the kinds and contents thereof, places where the salts exist, methods of analysis, production process, etc. are the same as those described above with regard to nonaqueous electrolyte 1.

<1-5. Additives>

Nonaqueous electrolyte 3 of the invention may contain various additives so long as these additives do not considerably lessen the effects of invention 3. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retentivity and cycle characteristics after high-temperature storage. It is preferred to add a carbonate having at least either of an unsaturated bond and a halogen atom (hereinafter sometimes referred to as "specific carbonate") as an aid for improving capacity retentivity after high-temperature storage and cycle characteristics, among those additives. The specific carbonate and other additives are separately explained below.

<1-5-1. Specific Carbonate>

The specific carbonate is a carbonate having at least either of an unsaturated bond and a halogen atom. The specific carbonate may have an unsaturated bond only or have a halogen atom only, or may have both an unsaturated bond and a halogen atom.

The molecular weight of the specific carbonate is not particularly limited, and may be any desired value unless this considerably lessens the effects of invention 3. However, the molecular weight thereof is generally 50 or higher, preferably 80 or higher, and is generally 250 or lower, preferably 150 or lower. When the molecular weight thereof is too high, this specific carbonate has reduced solubility in nonaqueous electrolyte 3 and there are cases where the effect of the carbonate is difficult to produce sufficiently.

Processes for producing the specific carbonate also are not particularly limited, and a known process selected at will can be used to produce the carbonate.

Any one specific carbonate may be incorporated alone into nonaqueous electrolyte 3 of the invention, or any desired combination of two or more specific carbonates may be incorporated thereinto in any desired proportion.

The amount of the specific carbonate to be incorporated into nonaqueous electrolyte 3 of the invention is not limited, and may be any desired value unless this considerably lessens the effects of invention 3. It is, however, desirable that the specific carbonate should be incorporated in a concentration which is generally 0.01% by mass or higher, preferably 0.1% by mass or higher, more preferably 0.3% by mass or higher, and is generally 70% by mass or lower, preferably 50% by mass or lower, more preferably 40% by mass or lower, based on nonaqueous electrolyte 3 of the invention. In particular, in the case of a carbonate having an unsaturated bond, it is preferred to incorporate this carbonate in an amount of 10% by mass or smaller based on nonaqueous electrolyte 3.

When the amount of the specific carbonate is below the lower limit of that range, there are cases where use of this nonaqueous electrolyte 3 of the invention in a nonaqueous-electrolyte secondary battery results in difficulties in producing the effect of sufficiently improving the cycle characteristics of the nonaqueous-electrolyte secondary battery. On the other hand, when the proportion of the specific carbonate is too high, there is a tendency that use of this nonaqueous electrolyte 3 of the invention in a nonaqueous-electrolyte secondary battery results in decreases in the high-temperature storability and continuous-charge characteristics of the nonaqueous-electrolyte secondary battery. In particular, there are cases where gas evolution is enhanced and capacity retentivity decreases.

<1-5-1-1. Unsaturated Carbonate>

The carbonate having an unsaturated bond (hereinafter often referred to as "unsaturated carbonate") as one form of the specific carbonate according to invention 3 is not limited so long as it is a carbonate having a carbon-carbon double bond, and any desired unsaturated carbonate can be used. Incidentally, carbonates having one or more aromatic rings are also included in the carbonate having an unsaturated bond.

Examples of the unsaturated carbonate include vinylene carbonate and derivatives thereof, ethylene carbonate derivatives substituted with one or more aromatic rings or with one or more substituents having a carbon-carbon unsaturated bond, phenyl carbonates, vinyl carbonates, and allyl carbonates.

Examples of the vinylene carbonate and derivatives thereof include vinylene carbonate, methylvinylene carbonate, 4,5-dimethylvinylene carbonate, phenylvinylene carbonate, 4,5-diphenylvinylene carbonate, and catechol carbonate, and the like.

Examples of the ethylene carbonate derivatives substituted with one or more aromatic rings or with one or more substituents having a carbon-carbon unsaturated bond include vinylethylene carbonate, 4,5-divinylethylene carbonate, phenylethylene carbonate, and 4,5-diphenylethylene carbonate, and the like.

Examples of the phenyl carbonates include diphenyl carbonate, ethyl phenyl carbonate, methyl phenyl carbonate, and t-butyl phenyl carbonate, and the like.

Examples of the vinyl carbonates include divinyl carbonate and methyl vinyl carbonate, and the like.

Examples of the allyl carbonates include diallyl carbonate and allyl methyl carbonate, and the like.

Preferred of these unsaturated carbonates as examples of the specific carbonate are the vinylene carbonate and derivatives thereof and the ethylene carbonate derivatives substituted with one or more aromatic rings or with one or more substituents having a carbon-carbon unsaturated bond. In particular, vinylene carbonate, 4,5-diphenylvinylene carbonate, 4,5-dimethylvinylene carbonate, or vinylethylene carbonate is more preferred because these carbonates form a stable interface-protective coating film.

<1-5-1-2. Halogenated Carbonate>

On the other hand, the carbonate having a halogen atom (hereinafter often referred to as "halogenated carbonate") as one form of the specific carbonate according to invention 3 is not particularly limited so long as it is a carbonate having a halogen atom, and any desired halogenated carbonate can be used.

Examples of the halogen atoms include fluorine, chlorine, bromine, and iodine atoms. Preferred of these are fluorine atoms or chlorine atoms. Especially preferred are fluorine atoms. The number of halogen atoms possessed by the halogenated carbonate also is not particularly limited so long as the number thereof is 1 or larger. However, the number thereof is generally 6 or smaller, preferably 4 or smaller. In the case where the halogenated carbonate has two or more halogen atoms, these atoms may be the same or different.

Examples of the halogenated carbonate include ethylene carbonate derivatives, dimethyl carbonate derivatives, ethyl methyl carbonate derivatives, and diethyl carbonate derivatives.

Examples of the ethylene carbonate derivatives include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate, and 4,4-dichloro-5,5-dimethylethylene carbonate, and the like.

Examples of the dimethyl carbonate derivatives include fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, chloromethyl methyl carbonate, dichloromethyl methyl carbonate, trichloromethyl methyl carbonate, bis(chloromethyl) carbonate, bis(dichloromethyl) carbonate, and bis(trichloromethyl) carbonate, and the like.

Examples of the ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, 2-chloroethyl methyl carbonate, ethyl chloromethyl carbonate, 2,2-dichloroethyl methyl carbonate, 2-chloroethyl chloromethyl carbonate, ethyl dichloromethyl carbonate, 2,2,2-trichloroethyl methyl carbonate, 2,2-dichloroethyl chloromethyl carbonate, 2-chloroethyl dichloromethyl carbonate, and ethyl trichloromethyl carbonate, and the like.

Examples of the diethyl carbonate derivatives include ethyl (2-fluoroethyl) carbonate, ethyl (2,2-difluoroethyl) carbonate, bis(2-fluoroethyl) carbonate, ethyl (2,2,2-trifluoroethyl) carbonate, 2,2-difluoroethyl 2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, ethyl-(2-chloroethyl) carbonate, ethyl-(2,2-dichloroethyl) carbonate, bis (2-chloroethyl) carbonate, ethyl-(2,2,2-trichloroethyl) carbonate, 2,2-dichloroethyl-2'-chloroethyl carbonate, bis(2,2-dichloroethyl) carbonate, 2,2,2-trichloroethyl-2'-chloroethyl carbonate, 2,2,2-trichloroethyl 2',2'-dichloroethyl carbonate, and bis(2,2,2-trichloroethyl) carbonate, and the like.

Preferred of these halogenated carbonates are the carbonates having a fluorine atom. More preferred are the carbonate derivatives having a fluorine atom. In particular, fluoroethylene carbonate, 4-(fluoromethyl)-ethylene carbonate, 4,4-difluoroethylene carbonate, and 4,5-difluoroethylene carbonate are more suitable because these carbonates form an interface-protective coating film.

<1-5-1-3. Halogenated Unsaturated Carbonate>

Furthermore usable as the specific carbonate is a carbonate having both an unsaturated bond and a halogen atom (referred to as "halogenated unsaturated carbonate"). This halogenated unsaturated carbonate is not particularly limited, and any desired halogenated unsaturated carbonate can be used unless the effects of invention 3 are considerably lessened thereby.

Examples of the halogenated unsaturated carbonate include vinylene carbonate derivatives, ethylene carbonate derivatives substituted with one or more aromatic rings or with one or more substituents having a carbon-carbon unsaturated bond, and allyl carbonates. With respect to the "halogenated unsaturated carbonate" in nonaqueous electrolyte 3, the same explanation as that given above with regard to nonaqueous electrolyte 2 applies.

<1-5-2. Other Additives>

Additives other than the specific carbonate are explained below. Examples of additives other than the specific carbonate include overcharge inhibitors and aids for improving capacity retentivity after high-temperature storage and cycle characteristics.

<1-5-2-1. Overcharge Inhibitors>

Examples of the overcharge inhibitor, content thereof, examples of combinations in the case of using compounds in different classes in combination, effects of the incorporation thereof, etc. are the same as those described above with regard to nonaqueous electrolyte 1.

<1-4-2. Other Additives>

Examples of additives other than the specific carbonate include overcharge inhibitors and aids for improving capacity retentivity after high-temperature storage and cycle characteristics. The "overcharge inhibitors" and the "aids for improving capacity retentivity after high-temperature storage and cycle characteristics" are the same as those described above with regard to nonaqueous electrolyte 1. It is, however, noted that the "compound A of invention 3" is excluded from the other additives.

<1-5-2-2. Aids>

Examples of the aids for improving capacity retentivity after high-temperature storage include and cycle characteristics carbonate compounds other than the specific carbonates, such as erythritan carbonate and spiro-bis-dimethylene carbonate etc.; sulfur-containing compounds such as ethylene sulfite, 1,3-propanesultone, 1,4-butanesultone, methyl methanesulfonate, sulfolane, sulfolene, dimethyl sulfone, diphenyl sulfone, methyl phenyl sulfone, tetramethylthiuram monosulfide, N,N-dimethylmethanesulfonamide, and N,N-diethylmethanesulfonamide etc.; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide etc.; and hydrocarbon compounds such as heptane, octane, and cycloheptane etc.

[2. Nonaqueous-Electrolyte Secondary Battery]

Nonaqueous-electrolyte secondary battery 3 of the invention includes: a negative electrode and a positive electrode which are capable of occluding and releasing ions; and the nonaqueous electrolyte 3 of the invention.

<2-1. Battery Constitution>

Nonaqueous-electrolyte secondary battery 3 of the invention may have the same battery constitution as that described above with regard to nonaqueous-electrolyte secondary battery 1.

<2-2. Nonaqueous Electrolyte>

As the nonaqueous electrolyte, the nonaqueous electrolyte 3 of the invention described above is used. Incidentally, a mixture of nonaqueous electrolyte 3 of the invention and another nonaqueous electrolyte may be used so long as this is not counter to the spirit of invention 3.

<2-3. Negative Electrode>

The negative electrode of nonaqueous-electrolyte secondary battery 3 may be the same as the negative electrode described above with regard to nonaqueous-electrolyte secondary battery 1.

<2-4. Positive Electrode>

The positive electrode of nonaqueous-electrolyte secondary battery 3 may be the same as the positive electrode described above with regard to nonaqueous-electrolyte secondary battery 1.

<2-5. Separator>

The separator of nonaqueous-electrolyte secondary battery 3 may be the same as the separator described above with regard to nonaqueous-electrolyte secondary battery 1.

<2-6. Battery Design>

The battery design of nonaqueous-electrolyte secondary battery 3 may be the same as the battery design described above with regard to nonaqueous-electrolyte secondary battery 1.

[1. Nonaqueous Electrolyte 4]

Like ordinary nonaqueous electrolytes, nonaqueous electrolyte 4 of the invention includes an electrolyte and a nonaqueous solvent containing the electrolyte dissolved therein. Usually, the electrolyte and the solvent are contained as main components.

<1-1. Electrolyte>

As the electrolyte in invention 4, one or more lithium salts are generally used. The lithium salts are not particularly limited so long as they are known to be usable in this application. Any desired such lithium salts can be used. Examples thereof are the same as those enumerated above with regard to the electrolyte in nonaqueous electrolyte 1. Specifically, the following are included in preferred examples.

Preferred examples thereof include inorganic lithium salts such as $LiPF_6$ and $LiBF_4$ etc.; fluorine-containing organic lithium salts such as $LiCF_3SO_3$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$ etc.; and lithium bis(oxalate)borate etc.

Preferred of these is $LiPF_6$, $LiBF_4$, $LiCF_3SO_3$, $LiN(CF_3SO_2)_2$, or $LiN(C_2F_5SO_2)_2$ from the standpoint of improving battery performances. Especially preferred is $LiPF_6$ or $LiBF_4$. These lithium salts may be used alone or in combination of two or more thereof. One preferred example in the case of using two or more lithium salts in combination is a combination of $LiPF_6$ and $LiBF_4$. This combination has the effect of improving cycle characteristics. In this case, the proportion of the $LiBF_4$ to the sum of the two is preferably 0.01% by mass or higher, especially preferably 0.1% by mass or higher, and is preferably 20% by mass or lower, especially preferably 5% by mass or lower. When the proportion thereof is lower than the lower limit, there are cases where the desired effect is not obtained. In case where the proportion thereof exceeds the upper limit, battery characteristics after high-temperature storage tend to decrease.

Another example is a combination of an inorganic lithium salt and a fluorine-containing organic lithium salt. In this case, the proportion of the inorganic lithium salt to the sum of the two is desirably from 70% by mass to 99% by mass. The fluorine-containing organic lithium salt preferably is any of $LiN(CF_3SO_2)_2$, $LiN(C_2F_5SO_2)_2$, the lithium salt of cyclic 1,2-perfluoroethanedisulfonylimide, and the lithium salt of cyclic 1,3-perfluoropropanedisulfonylimide. Use of this combination has the effect of inhibiting the deterioration caused by high-temperature storage.

The concentration of these electrolytes in nonaqueous electrolyte 4 is not particularly limited. However, the concentration thereof is generally 0.5 mol/L or higher, preferably 0.6 mol/L or higher, more preferably 0.7 mol/L or higher. The upper limit thereof is generally 3 mol/L or lower, preferably 2 mol/L or lower, more preferably 1.8 mol/L or lower, especially preferably 1.5 mol/L or lower. When the concentration of the electrolytes is too low, there are cases where this electrolyte has insufficient electrical conductivity. On the other hand, when the concentration thereof is too high, there are cases where an increase in viscosity results and this reduces electrical conductivity. There also are cases where battery performances decrease.

Nonaqueous electrolyte 4 of the invention includes an electrolyte and a nonaqueous solvent containing the electrolyte dissolved therein. This nonaqueous electrolyte 4 at least contains a cyclic sulfone compound, "a compound having a coefficient of viscosity at 25° C. of 1.5 mPa·s or lower", and "at least one compound selected from the group consisting of carbonates having an unsaturated bond, carbonates having a halogen atom, monofluorophosphates, and difluorophosphates".

<1-2. Cyclic Sulfone Compound>

The "cyclic sulfone compound" is not particularly limited so long as it is a cyclic compound in which the cyclic moiety is constituted of one or more methylene groups and one or more sulfone groups. Any desired cyclic sulfone compound can be used. Preferred of such compounds are ones in which the cyclic moiety is constituted of three or more methylene groups and one or more sulfone groups and which have a molecular weight of 500 or lower.

Examples of the cyclic sulfone compound include: monosulfone compounds including trimethylene sulfone compounds, tetramethylene sulfone compounds, and hexamethylene sulfone compounds; and disulfone compounds including trimethylene disulfone compounds, tetramethylene disulfone compounds, and hexamethylene disulfone compounds. More preferred of these from the standpoints of permittivity and viscosity are tetramethylene sulfone compounds, tetramethylene disulfone compounds, hexamethylene sulfone compounds, and hexamethylene disulfone compounds. Especially preferred are tetramethylene sulfone compounds (sulfolane compounds).

The cyclic sulfone compound preferably is sulfolane and/or a sulfolane derivative (hereinafter, the derivative and sulfolane are sometimes referred to inclusively as "sulfolane compound"), from the standpoint of producing the effects of the invention. Especially preferred of sulfolane derivatives are sulfolane derivatives in which one or more of the hydrogen atoms bonded to the carbon atoms constituting the sulfolane ring have been replaced with halogen atoms. Furthermore, sulfolane derivatives having one or more alkyl groups to such a degree as not to lessen the effects of the invention are also preferred. Moreover, such sulfolane derivatives in which one or more of the hydrogen atoms bonded to the carbon atoms constituting the alkyl groups have been replaced with halogen atoms are also especially preferred.

Examples of the halogen atoms include fluorine, chlorine, bromine, and iodine atoms. Preferred of these are fluorine atoms or chlorine atoms. Especially preferred are fluorine atoms. These (especially) preferred halogen atoms apply to both the halogen atoms bonded to the carbon atoms constituting the sulfolane ring and the halogen atoms bonded to the alkyl group(s) bonded to the sulfolane ring.

Examples of sulfolane derivatives containing one or more alkyl substituents include 2-methylsulfolane, 3-methylsulfolane, 2,2-dimethylsulfolane, 3,3-dimethylsulfolane, 2,3-dimethylsulfolane, 2,4-dimethylsulfolane, 2,5-dimethylsulfolane, 2,2,3-trimethylsulfolane, 2,2,4-trimethylsulfolane, 2,2,5-trimethylsulfolane, 2,3,3-trimethylsulfolane, 3,3,4-trimethylsulfolane, 3,3,5-trimethylsulfolane, 2,3,4-trimethylsulfolane, 2,3,5-trimethylsulfolane, 2,2,3,3-tetramethylsulfolane, 2,2,3,4-tetramethylsulfolane, 2,2,3,5-tetramethylsulfolane, 2,2,4,4-tetramethylsulfolane, 2,2,4,5-tetramethylsulfolane, 2,2,5,5-tetramethylsulfolane, 2,3,3,4-tetramethylsulfolane, 2,3,3,5-tetramethylsulfolane, 2,3,4,4-tetramethylsulfolane, 2,3,4,5-tetramethylsulfolane, 3,3,4,4-tetramethylsulfolane, 2,2,3,3,4-pentamethylsulfolane, 2,2,3,3,5-pentamethylsulfolane, 2,2,3,4,4-pentamethylsulfolane, 2,2,3,4,5-pentamethylsulfolane, 2,3,3,4,4-pentamethylsulfolane, 2,3,3,4,5-pentamethylsulfolane, 2,2,3,3,4,4-hexamethylsulfolane, 2,2,3,3,4,5-hexamethylsulfolane, 2,2,3,3,5,5-hexamethylsulfolane, 2,2,3,4,5,5-hexamethylsulfolane, 2,2,3,3,4,4,5-heptamethylsulfolane, 2,2,3,3,4,5,5-heptamethylsulfolane, and octamethylsulfolane, and the like.

Examples of sulfolane derivatives having no substituents and containing a fluorine atom include 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2,2,3-trifluorosulfolane, 2,3,3-trifluorosulfolane, 2,2,4-trifluorosulfolane, 2,2,5-trifluorosulfolane, 2,3,4-trifluorosulfolane, 2,3,5-trifluorosulfolane, 2,4,4-trifluorosulfolane, 2,2,3,3-tetrafluorosulfolane, 2,2,3,4-tetrafluorosulfolane, 2,2,4,4-tetrafluorosulfolane, 2,2,5,5-tetrafluorosulfolane, 2,3,3,4-tetrafluorosulfolane, 2,3,3,5-tetrafluorosulfolane, 2,3,4,4-tetrafluorosulfolane, 2,3,4,5-tetrafluorosulfolane, 2,2,3,3,4-pentafluorosulfolane, 2,2,3,3,5-pentafluorosulfolane, 2,2,3,4,4-pentafluorosulfolane, 2,2,3,4,5-pentafluorosulfolane, 2,3,3,4,4-pentafluorosulfolane, 2,3,3,4,5-pentafluorosulfolane, 2,2,3,3,4,4-hexafluorosulfolane, 2,2,3,3,4,5-hexafluorosulfolane, 2,2,3,3,5,5-hexafluorosulfolane, 2,2,3,4,5,5-hexafluorosulfolane, 2,2,3,3,4,4,5-heptafluorosulfolane, 2,2,3,3,4,5,5-heptafluorosulfolane, and octafluorosulfolane, Examples of sulfolane derivatives having one or more alkyl substituents and a fluorine atom include 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoro-2,4-dimethylsulfolane, 4-fluoro-2,4-dimethylsulfolane, 5-fluoro-2,4-dimethylsulfolane, 2,2-difluoro-3-methylsulfolane, 2,3-difluoro-3-methylsulfolane, 2,4-difluoro-3-methylsulfolane, 2,5-difluoro-3-methylsulfolane, 3,4-difluoro-3-methylsulfolane, 3,5-difluoro-3-methylsulfolane, 4,4-difluoro-3-methylsulfolane, 4,5-difluoro-3-methylsulfolane, 5,5-difluoro-3-methylsulfolane, 2,2,3-trifluoro-3-methylsulfolane, 2,2,4-trifluoro-3-methylsulfolane, 2,2,5-trifluoro-3-methylsulfolane, 2,3,4-trifluoro-3-methylsulfolane, 2,3,5-trifluoro-3-methylsulfolane, 2,4,4-trifluoro-3-methylsulfolane, 2,4,5-trifluoro-3-methylsulfolane, 2,5,5-trifluoro-3-methylsulfolane, 3,4,4-trifluoro-3-methylsulfolane, 3,4,5-trifluoro-3-methylsulfolane, 4,4,5-trifluoro-3-methylsulfolane, 4,5,5-trifluoro-3-methylsulfolane, 2,2,3,4-tetrafluoro-3-methylsulfolane, 2,2,3,5-tetrafluoro-3-methylsulfolane, 2,2,4,4-tetrafluoro-3-methylsulfolane, 2,2,4,5-tetrafluoro-3-methylsulfolane, 2,2,5,5-tetrafluoro-3-methylsulfolane, 2,3,4,4-tetrafluoro-3-methylsulfolane, 2,3,4,5-tetrafluoro-3-methylsulfolane, 2,3,5,5-tetrafluoro-3-methylsulfolane, 3,4,4,5-tetrafluoro-3-methylsulfolane, 3,4,5,5-tetrafluoro-3-methylsulfolane, 4,4,5,5-tetrafluoro-3-methylsulfolane, 2,2,3,4,4-pentafluoro-3-methylsulfolane, 2,2,3,4,5-pentafluoro-3-methylsulfolane, 2,2,3,5,5-pentafluoro-3-methylsulfolane, 2,3,4,4,5-pentafluoro-3-methylsulfolane, 2,3,4,5,5-pentafluoro-3-methylsulfolane, 2,2,3,4,4,5-hexafluoro-3-methylsulfolane, 2,2,3,4,5,5-hexafluoro-3-methylsulfolane, 2,3,4,4,5,5-hexafluoro-3-methylsulfolane, and heptafluoro-3-methylsulfolane, and the like.

Examples of sulfolane derivatives having a monofluoroalkyl substituent and a fluorine atom include 2-fluoro-3-(fluoromethyl)sulfolane, 3-fluoro-3-(fluoromethyl)sulfolane, 4-fluoro-3-(fluoromethyl)sulfolane, 5-fluoro-3-(fluoromethyl)sulfolane, 2,2-difluoro-3-(fluoromethyl)sulfolane, 2,3-difluoro-3-(fluoromethyl)sulfolane, 2,4-difluoro-3-(fluoromethyl)sulfolane, 2,5-difluoro-3-(fluoromethyl)sulfolane, 3,4-difluoro-3-(fluoromethyl)sulfolane, 3,5-difluoro-3-(fluoromethyl)sulfolane, 4,4-difluoro-3-(fluoromethyl)sulfolane, 4,5-difluoro-3-(fluoromethyl)sulfolane, 5,5-difluoro-3-(fluoromethyl)sulfolane, 2,2,3-trifluoro-3-(fluoromethyl)sulfolane, 2,2,4-trifluoro-3-(fluoromethyl)sulfolane, 2,2,5-trifluoro-3-(fluoromethyl)sulfolane, 2,3,4-trifluoro-3-(fluoromethyl)sulfolane, 2,3,5-trifluoro-3-(fluoromethyl)sulfolane, 2,4,4-trifluoro-3-(fluoromethyl)sulfolane, 2,4,5-trifluoro-3-(fluoromethyl)sulfolane, 2,5,5trifluoro-3-(fluoromethyl)sulfolane, 3,4,4-trifluoro-3-(fluoromethyl)sulfolane, 3,4,5-trifluoro-3-(fluoromethyl)sulfolane, 4,4,5-trifluoro-3-(fluoromethyl)sulfolane, 4,5,5-trifluoro-3-(fluoromethyl)sulfolane, 2,2,3,4-tetrafluoro-3-(fluoromethyl)sulfolane, 2,2,3,5-tetrafluoro-3-(fluoromethyl)sulfolane, 2,2,4,4-tetrafluoro-3-(fluoromethyl)sulfolane, 2,2,4,5-tetrafluoro-3-(fluoromethyl)sulfolane, 2,2,5,5-tetrafluoro-3-(fluoromethyl)sulfolane, 2,3,4,4-tetrafluoro-3-(fluoromethyl)sulfolane, 2,3,4,5-tetrafluoro-3-(fluoromethyl)sulfolane, 2,3,5,5-tetrafluoro-3-(fluoromethyl)sulfolane, 3,4,4,5-tetrafluoro-3-(fluoromethyl)sulfolane, 3,4,5,5-tetrafluoro-3-(fluoromethyl)sulfolane, 4,4,5,5-tetrafluoro-3-(fluoromethyl)sulfolane, 2,2,3,4,4-pentafluoro-3-(fluoromethyl)sulfolane, 2,2,3,4,5-pentafluoro-3-(fluoromethyl)sulfolane, 2,2,3,5,5-pentafluoro-3-(fluoromethyl)sulfolane, 2,3,4,4,5-pentafluoro-3-

(fluoromethyl)sulfolane, 2,3,4,5,5-pentafluoro-3-(fluoromethyl)sulfolane, 2,2,3,4,4,5-hexafluoro-3-(fluoromethyl)sulfolane, 2,2,3,4,5,5-hexafluoro-3-(fluoromethyl)sulfolane, 2,3,4,4,5,5-hexafluoro-3-(fluoromethyl)sulfolane, and heptafluoro-3-(fluoromethyl)sulfolane, and the like.

Examples of sulfolane derivatives having a difluoroalkyl substituent and a fluorine atom include 2-fluoro-3-(difluoromethyl)sulfolane, 3-fluoro-3-(difluoromethyl)sulfolane, 4-fluoro-3-(difluoromethyl)sulfolane, 5-fluoro-3-(difluoromethyl)sulfolane, 2,2-difluoro-3-(difluoromethyl)sulfolane, 2,3-difluoro-3-(difluoromethyl)sulfolane, 2,4-difluoro-3-(difluoromethyl)sulfolane, 2,5-difluoro-3-(difluoromethyl)sulfolane, 3,4-difluoro-3-(difluoromethyl)sulfolane, 3,5-difluoro-3-(difluoromethyl)sulfolane, 4,4-difluoro-3-(difluoromethyl)sulfolane, 4,5-difluoro-3-(difluoromethyl)sulfolane, 5,5-difluoro-3-(difluoromethyl)sulfolane, 2,2,3-trifluoro-3-(difluoromethyl)sulfolane, 2,2,4-trifluoro-3-(difluoromethyl)sulfolane, 2,2,5-trifluoro-3-(difluoromethyl)sulfolane, 2,3,4-trifluoro-3-(difluoromethyl)sulfolane, 2,3,5-trifluoro-3-(difluoromethyl)sulfolane, 2,4,4-trifluoro-3-(difluoromethyl)sulfolane, 2,4,5-trifluoro-3-(difluoromethyl)sulfolane, 2,5,5-trifluoro-3-(difluoromethyl)sulfolane, 3,4,4-trifluoro-3-(difluoromethyl)sulfolane, 3,4,5-trifluoro-3-(difluoromethyl)sulfolane, 4,4,5-trifluoro-3-(difluoromethyl)sulfolane, 4,5,5-trifluoro-3-(difluoromethyl)sulfolane, 2,2,3,4-tetrafluoro-3-(difluoromethyl)sulfolane, 2,2,3,5-tetrafluoro-3-(difluoromethyl)sulfolane, 2,2,4,4-tetrafluoro-3-(difluoromethyl)sulfolane, 2,2,4,5-tetrafluoro-3-(difluoromethyl)sulfolane, 2,2,5,5-tetrafluoro-3-(difluoromethyl)sulfolane, 2,3,4,4-tetrafluoro-3-(difluoromethyl)sulfolane, 2,3,4,5-tetrafluoro-3-(difluoromethyl)sulfolane, 2,3,5,5-tetrafluoro-3-(difluoromethyl)sulfolane, 3,4,4,5-tetrafluoro-3-(difluoromethyl)sulfolane, 3,4,5,5-tetrafluoro-3-(difluoromethyl)sulfolane, 4,4,5,5-tetrafluoro-3-(difluoromethyl)sulfolane, 2,2,3,4,4-pentafluoro-3-(difluoromethyl)sulfolane, 2,2,3,4,5-pentafluoro-3-(difluoromethyl)sulfolane, 2,2,3,5,5-pentafluoro-3-(difluoromethyl)sulfolane, 2,3,4,4,5-pentafluoro-3-(difluoromethyl)sulfolane, 2,3,4,5,5-pentafluoro-3-(difluoromethyl)sulfolane, 2,2,3,4,4,5-hexafluoro-3-(difluoromethyl)sulfolane, 2,2,3,4,5,5-hexafluoro-3-(difluoromethyl)sulfolane, 2,3,4,4,5,5-hexafluoro-3-(difluoromethyl)sulfolane, and heptafluoro-3-(difluoromethyl)sulfolane, and the like.

Examples of sulfolane derivatives having a trifluoroalkyl substituent and a fluorine atom include 2-fluoro-3-(trifluoromethyl)sulfolane, 3-fluoro-3-(trifluoromethyl)sulfolane, 4-fluoro-3-(trifluoromethyl)sulfolane, 5-fluoro-3-(trifluoromethyl)sulfolane, 2,2-difluoro-3-(trifluoromethyl)sulfolane, 2,3-difluoro-3-(trifluoromethyl)sulfolane, 2,4-difluoro-3-(trifluoromethyl)sulfolane, 2,5-difluoro-3-(trifluoromethyl)sulfolane, 3,4-difluoro-3-(trifluoromethyl)sulfolane, 3,5-difluoro-3-(trifluoromethyl)sulfolane, 4,4-difluoro-3-(trifluoromethyl)sulfolane, 4,5-difluoro-3-(trifluoromethyl)sulfolane, 5,5-difluoro-3-(trifluoromethyl)sulfolane, 2,2,3-trifluoro-3-(trifluoromethyl)sulfolane, 2,2,4-trifluoro-3-(trifluoromethyl)sulfolane, 2,2,5-trifluoro-3-(trifluoromethyl)sulfolane, 2,3,4-trifluoro-3-(trifluoromethyl)sulfolane, 2,3,5-trifluoro-3-(trifluoromethyl)sulfolane, 2,4,4-trifluoro-3-(trifluoromethyl)sulfolane, 2,4,5-trifluoro-3-(trifluoromethyl)sulfolane, 2,5,5-trifluoro-3-(trifluoromethyl)sulfolane, 3,4,4-trifluoro-3-(trifluoromethyl)sulfolane, 3,4,5-trifluoro-3-(trifluoromethyl)sulfolane, 4,4,5-trifluoro-3-(trifluoromethyl)sulfolane, 4,5,5-trifluoro-3-(trifluoromethyl)sulfolane, 2,2,3,4-tetrafluoro-3-(trifluoromethyl)sulfolane, 2,2,3,5-tetrafluoro-3-(trifluoromethyl)sulfolane, 2,2,4,4-tetrafluoro-3-(trifluoromethyl)sulfolane, 2,2,4,5-tetrafluoro-3-(trifluoromethyl)sulfolane, 2,2,5,5-tetrafluoro-3-(trifluoromethyl)sulfolane, 2,3,4,4-tetrafluoro-3-(trifluoromethyl)sulfolane, 2,3,4,5-tetrafluoro-3-(trifluoromethyl)sulfolane, 2,3,5,5-tetrafluoro-3-(trifluoromethyl)sulfolane, 3,4,4,5-tetrafluoro-3-(trifluoromethyl)sulfolane, 3,4,5,5-tetrafluoro-3-(trifluoromethyl)sulfolane, 4,4,5,5-tetrafluoro-3-(trifluoromethyl)sulfolane, 2,2,3,4,4-pentafluoro-3-(trifluoromethyl)sulfolane, 2,2,3,4,5-pentafluoro-3-(trifluoromethyl)sulfolane, 2,2,3,5,5-pentafluoro-3-(trifluoromethyl)sulfolane, 2,3,4,4,5-pentafluoro-3-(trifluoromethyl)sulfolane, 2,3,4,5,5-pentafluoro-3-(trifluoromethyl)sulfolane, 2,2,3,4,4,5-hexafluoro-3-(trifluoromethyl)sulfolane, 2,2,3,4,5,5-hexafluoro-3-(trifluoromethyl)sulfolane, 2,3,4,4,5,5-hexafluoro-3-(trifluoromethyl)sulfolane, and heptafluoro-3-(trifluoromethyl)sulfolane, and the like.

More preferred of the sulfolane compounds enumerated above are sulfolane, 2-methylsulfolane, 3-methylsulfolane, 2,2-dimethylsulfolane, 3,3-dimethylsulfolane, 2,3-dimethylsulfolane, 2,4-dimethylsulfolane, 2,5-dimethylsulfolane, 2-fluorosulfolane, 3-fluorosulfolane, 2-fluoro-3-methylsulfolane, 3-fluoro-3-methylsulfolane, 4-fluoro-3-methylsulfolane, 5-fluoro-3-methylsulfolane, 2-fluoro-2-methylsulfolane, 3-fluoro-2-methylsulfolane, 4-fluoro-2-methylsulfolane, 5-fluoro-2-methylsulfolane, 2-fluoro-2,4-dimethylsulfolane, 3-fluoro-2,4-dimethylsulfolane, 4-fluoro-2,4-dimethylsulfolane, and 5-fluoro-2,4-dimethylsulfolane.

Especially preferred are sulfolane, 2-methylsulfolane, 3-methylsulfolane, 2-fluorosulfolane, 3-fluorosulfolane, 2-fluoro-3-methylsulfolane, 3-fluoro-3-methylsulfolane, 4-fluoro-3-methylsulfolane, 5-fluoro-3-methylsulfolane, and the like.

In case where a cyclic sulfone compound which has been excessively alkyl-substituted is used, the result is an increase in the coefficient of viscosity and this causes a decrease in electrical conductivity. In case where a cyclic sulfone compound which has been excessively fluorinated is used, this compound used in a nonaqueous-electrolyte battery has reduced chemical stability or reduced solubility in other solvents. There are hence cases where it is difficult to sufficiently produce the effects of the invention.

Any one of the cyclic sulfone compounds enumerated above may be incorporated alone into nonaqueous electrolyte 4 of the invention, or any desired combination of two or more thereof in any desired proportion may be used. Processes for production also are not particularly limited, and a known process selected at will can be used to produce the cyclic sulfone compound.

It is desirable that the cyclic sulfone compound should be incorporated into the nonaqueous electrolyte 4 of the invention in a concentration which is generally 10% by volume or higher, preferably 15% by volume or higher, more preferably 20% by volume or higher, and is generally 70% by volume or lower, preferably 60% by volume or lower, more preferably 50% by volume or lower, based on the whole nonaqueous solvent in the electrolyte. When the concentration thereof is lower than the lower limit of that range and this nonaqueous electrolyte 4 of the invention is used in a nonaqueous-electrolyte battery, there are cases where this nonaqueous-electrolyte battery is less apt to have the effect of sufficiently improving in safety. In case where the concentration thereof is higher than the upper limit of that range, there is a tendency that the nonaqueous electrolyte comes to have an increased coefficient of viscosity and this results in a decrease in electrical conductivity. Especially when this nonaqueous-electrolyte battery is charged/discharged at a high current density, there are cases where charge/discharge capacity retentivity decreases.

<1-3. "Compound Having Coefficient of Viscosity at 25° C. of 1.5 mPa·s or Lower">

It is essential that nonaqueous electrolyte 4 of the invention should contain at least one "compound having a coefficient of viscosity at 25° C. of 1.5 mPa·s or lower". It is preferred that the "compound having a coefficient of viscosity at 25° C. of 1.5 mPa·s or lower" should be at least one compound selected from the group consisting of acyclic carbonates, acyclic carboxylic acid esters, acyclic ethers, and cyclic ethers, from the standpoint of battery characteristics in the case of use in a nonaqueous-electrolyte battery.

The acyclic carbonates preferably are ones having 3-7 carbon atoms. The acyclic carboxylic acid esters preferably are ones having 3-7 carbon atoms. The acyclic ethers preferably are ones having 3-10 carbon atoms. The cyclic ethers preferably are ones having 3-6 carbon atoms.

Examples of the acyclic carbonates having 3-7 carbon atoms include dimethyl carbonate, diethyl carbonate, di-n-propyl carbonate, diisopropyl carbonate, n-propyl isopropyl carbonate, ethyl methyl carbonate, methyl n-propyl carbonate, n-butyl methyl carbonate, isobutyl methyl carbonate, t-butyl methyl carbonate, ethyl n-propyl carbonate, n-butyl ethyl carbonate, isobutyl ethyl carbonate, and t-butyl ethyl carbonate, and the like.

Examples of the acyclic carboxylic acid esters having 3-7 carbon atoms include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate, and the like.

Examples of the acyclic ethers having 3-10 carbon atoms include diethyl ether, di-n-propyl ether, di-n-butyl ether, dimethoxymethane, dimethoxyethane, diethoxymethane, diethoxyethane, ethoxymethoxymethane, ethoxymethoxyethane, ethylene glycol di-n-propyl ether, ethylene glycol di-n-butyl ether, and diethylene glycol dimethyl ether, and the like.

Examples of the cyclic ethers having 3-6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, and 1,4-dioxane, and the like.

Preferred of the examples of the "compound having a coefficient of viscosity at 25° C. of 1.5 mPa·s or lower" enumerated above are dimethyl carbonate, diethyl carbonate, di-n-propyl carbonate, diisopropyl carbonate, n-propyl isopropyl carbonate, ethyl methyl carbonate, methyl n-propyl carbonate, diethyl ether, di-n-propyl ether, di-n-butyl ether, dimethoxymethane, dimethoxyethane, diethoxymethane, diethoxyethane, ethoxymethoxymethane, ethoxymethoxyethane, tetrahydrofuran, 2-methyltetrahydrofuran, 1,3-dioxane, 2-methyl-1,3-dioxane, 4-methyl-1,3-dioxane, 1,4-dioxane, methyl acetate, ethyl acetate, n-propyl acetate, n-butyl acetate, methyl propionate, ethyl propionate, n-propyl propionate, n-butyl propionate, methyl butyrate, ethyl butyrate, n-propyl butyrate, methyl isobutyrate, and ethyl isobutyrate.

Preferred of these is dimethyl carbonate, diethyl carbonate, ethyl methyl carbonate, dimethoxyethane, ethoxymethoxyethane, tetrahydrofuran, 2-methyltetrahydrofuran, 1,3-dioxane, 1,4-dioxane, methyl acetate, ethyl acetate, methyl propionate, ethyl propionate, methyl butyrate, ethyl butyrate, methyl isobutyrate, or ethyl isobutyrate. Especially preferred of these, from the standpoint of decomposition gas evolution during high-temperature battery storage, is dimethyl carbonate, diethyl carbonate, ethyl methyl carbonate, methyl acetate, ethyl acetate, methyl propionate, ethyl propionate, methyl butyrate, ethyl butyrate, methyl isobutyrate, or ethyl isobutyrate.

incidentally, the coefficient of viscosity at 25° C. is a value measured with any of a capillary viscometer, falling-ball viscometer, and vibration viscometer. When the coefficient of viscosity of the compound, which is a Newtonian fluid, is precisely measured with these viscometers, the same value is obtained within an error range for the measurements. However, it is preferred that the coefficient of viscosity should be measured with a capillary viscometer. Processes for production also are not particularly limited, and a known process selected at will can be used to produce the compound.

Also with respect to the compound having a specific low coefficient of viscosity explained above, any one of the examples of the compound may be incorporated alone into nonaqueous electrolyte 4 of the invention or any desired combination of two or more thereof in any desired proportion may be used. In the case where the "at least one compound selected from the group consisting of carbonates having an unsaturated bond, carbonates having a halogen atom, monofluorophosphates, and difluorophosphates", which will be described later, has a coefficient of viscosity at 25° C. of 1.5 mPa·s or lower, then this compound is regarded also as a "compound having a coefficient of viscosity at 25° C. of 1.5 mPa·s or lower". In this case, when this compound is used in a proportion of 30% by volume or higher based on the whole nonaqueous electrolyte, the coefficient of viscosity of the nonaqueous electrolyte can be reduced to a value within a range advantageous for the high-current-density charge/discharge characteristics of the battery. When the proportion thereof is 8% by mass or lower based on the whole nonaqueous electrolyte, an electrode surface coating film having high lithium ion conductivity can be formed.

In the invention, the content of the "compound having a coefficient of viscosity at 25° C. of 1.5 mPa·s or lower" is not particularly limited. However, it is desirable to incorporate this compound in a concentration of generally 30% by volume or higher, preferably 40% by volume or higher, more preferably 50% by volume or higher, based on the whole nonaqueous solvent in the nonaqueous electrolyte. In case where the concentration thereof is lower than the lower limit, there is a tendency that the nonaqueous electrolyte comes to have an increased coefficient of viscosity and this results in a decrease in electrical conductivity. In particular, there are cases where the nonaqueous-electrolyte battery has reduced heavy-current discharge characteristics. It is also desirable to incorporate the compound in a concentration of generally 90% by volume or lower, preferably 85% by volume or lower, more preferably 80% by volume or lower. In case where the concentration thereof exceeds the upper limit of that range, there is a tendency that this nonaqueous electrolyte 4 of the invention has a reduced permittivity and this results in a decrease in electrical conductivity. In particular, there are cases where the nonaqueous-electrolyte battery has reduced heavy-current discharge characteristics.

The nonaqueous solvent in nonaqueous electrolyte 4 according to the invention may include a highly polar solvent such as, e.g., a cyclic carbonate, so long as this does not lessen the effects of the invention. Preferred examples of such mixed solvents include a combination composed mainly of a sulfolane compound, an acyclic carbonate, and a cyclic carbonate, a combination composed mainly of a sulfolane compound, an acyclic ether, and a cyclic carbonate, and a combination composed mainly of a sulfolane compound, an acyclic ester, and a cyclic carbonate.

One preferred combination for constituting a nonaqueous solvent is a combination consisting mainly of at least one sulfolane compound, at least one acyclic carbonate, and at least one cyclic carbonate. In particular, this combination is one in which the total proportion of the sulfolane compound and the cyclic carbonate to the nonaqueous solvent is 15% by volume or higher, preferably 20% by volume or higher, more preferably 25% by volume or higher, and is generally 70% by volume or lower, preferably 60% by volume or lower, more preferably 50% by volume or lower, the proportion of the volume of the cyclic carbonate to the sum of the sulfolane compound and the cyclic carbonate is 5% or higher, preferably 10% by volume or higher, more preferably 15% by volume or higher, and is generally 90% by volume or lower, preferably 80% by volume or lower, more preferably 70% by volume or lower, and the proportion of the acyclic carbonate to the nonaqueous electrolyte is generally 30% by volume or higher, preferably 40% by volume or higher, more preferably 50% by volume or higher, and is generally 90% by volume or lower, preferably 85% by volume or lower, more preferably 80% by volume or lower. Use of such combination of nonaqueous solvents is preferred because the battery fabricated with this combination has an improved balance between cycle characteristics and high-temperature storability (in particular, residual capacity and high-load discharge capacity after high-temperature storage).

Examples of the preferred combination including at least one sulfolane compound, at least one cyclic carbonate, and at least one acyclic carbonate include: sulfolane, ethylene carbonate, and dimethyl carbonate; sulfolane, ethylene carbonate, and diethyl carbonate; sulfolane, ethylene carbonate, and ethyl methyl carbonate; sulfolane, ethylene carbonate, dimethyl carbonate, and diethyl carbonate; sulfolane, ethylene carbonate, dimethyl carbonate, and ethyl methyl carbonate; sulfolane, ethylene carbonate, diethyl carbonate, and ethyl methyl carbonate; and sulfolane, ethylene carbonate, dimethyl carbonate, diethyl carbonate, and ethyl methyl carbonate, and the like.

Combinations obtained by further adding propylene carbonate to those combinations including sulfolane, ethylene carbonate, and one or more acyclic carbonates are also included in preferred combinations.

In the case where propylene carbonate is contained, the volume ratio of the ethylene carbonate to the propylene carbonate is preferably from 99:1 to 40:60, especially preferably from 95:5 to 50:50. Furthermore, the proportion of the propylene carbonate to the whole nonaqueous solvent of the electrolyte may be regulated to 0.1% by volume or higher, preferably 1% by volume or higher, more preferably 2% by volume or higher, and the upper limit thereof may be regulated to generally 20% by volume or lower, preferably 8% by volume or lower, more preferably 5% by volume or lower. Incorporation of propylene carbonate in an amount within that range is preferred because this incorporation brings about even better low-temperature characteristics while maintaining the properties of the combination of sulfolane, ethylene carbonate, and one or more dialkyl carbonates.

In this description, the values of the volumes of nonaqueous solvents are ones measured at 25° C. However, in the case of a nonaqueous solvent which is solid at 25° C., such as, e.g., ethylene carbonate, the value measured at the melting point is used.

<1-4. "At Least One Compound Selected from Group Consisting of Carbonates Having Unsaturated Bond(s), Carbonates Having Halogen Atom(s), Monofluorophosphates, and Difluorophosphates">

Nonaqueous electrolyte 4 of the invention contains "at least one compound selected from the group consisting of carbonates having an unsaturated bond, carbonates having a halogen atom, monofluorophosphates, and difluorophosphates" (hereinafter sometimes referred to as "specific compound(s)") besides the ingredients described above. Each of these specific compounds has the ability to form an interface-protective coating film. There is hence a conception by which the specific compounds as components of an electrolyte can be classified in the same group.

<1-4-1. Carbonates Having Unsaturated Bond(s)>

The carbonates having an unsaturated bond (hereinafter sometimes referred to as "unsaturated carbonates") are not particularly limited so long as they are carbonates having one or more carbon-carbon unsaturated bonds, such as carbon-carbon double bonds or carbon-carbon triple bonds. Any desired unsaturated carbonate can be used. Incidentally, carbonates having one or more aromatic rings are also included in the carbonates having an unsaturated bond.

With respect to the unsaturated carbonates in nonaqueous electrolyte 4, the same explanation as that given above with regard to nonaqueous electrolyte 1 applies.

<1-4-2. Carbonates Having Halogen Atom(s)>

On the other hand, the carbonates having a halogen atom (hereinafter sometimes referred to as "halogenated carbonates") are not particularly limited so long as they are carbonates having a halogen atom. Any desired halogenated carbonate can be used. With respect to the halogenated carbonates in nonaqueous electrolyte 4, the same explanation as that given above with regard to nonaqueous electrolytes 1 and 2 applies.

It is also preferred to use a carbonate having both an unsaturated bond and a halogen atom (this carbonate is hereinafter sometimes referred to as "halogenated unsaturated carbonate"). This halogenated unsaturated carbonate is not particularly limited, and any desired halogenated unsaturated carbonate can be used unless the effects of the invention are considerably lessened thereby. With respect to the halogenated unsaturated carbonate in nonaqueous electrolyte 4, the same explanation as that given above with regard to nonaqueous electrolyte 2 applies.

The "carbonates having an unsaturated bond" and the "carbonates having a halogen atom" are hereinafter inclusively referred to as "specific carbonates". The specific carbonates are not particularly limited in molecular weight, and may have any desired molecular weight unless the effects of the invention are considerably lessened thereby. However, the molecular weight thereof is generally 50 or higher, preferably 80 or higher, and is generally 250 or lower, preferably 150 or lower. When the molecular weight thereof is too high, there are cases where such specific carbonates have reduced solubility in the nonaqueous electrolyte, making it difficult to sufficiently produce the effects of the invention. Processes for producing specific carbonates also are not particularly limited, and a known process selected at will can be used to produce the carbonates.

Any one specific carbonate may be incorporated alone into nonaqueous electrolyte 4 of the invention, or any desired combination of two or more specific carbonates in any desired proportion may be incorporated. The amount of the specific carbonate to be incorporated into the nonaqueous electrolyte 4 of the invention is not limited, and the specific carbonate may be incorporated in any desired amount unless the effects of the invention are considerably lessened thereby. However, it is desirable that the specific carbonate should be incorporated in a concentration which is generally 0.01% by mass or higher, preferably 0.1% by mass or higher, more preferably 0.3% by mass or higher, and is generally 8% by mass or lower, preferably 5% by mass or lower, more preferably 3% by mass or lower, based on the whole nonaqueous electrolyte 4 of the invention. When the proportion thereof is lower than the lower limit of that range and this nonaqueous electrolyte 4 of the invention is used in a nonaqueous-electrolyte battery, there are cases where this nonaqueous-electrolyte battery is less apt to have the effect of sufficiently improving in cycle characteristics. On the other hand, in case where the proportion of the specific carbonate is too high, use of this nonaqueous electrolyte 4 of the invention in a nonaqueous-electrolyte battery tends to result in reduced high-temperature storability of this non-aqueous-electrolyte battery. In particular, there are cases where gas evolution is enhanced and discharge capacity retentivity decreases.

<1-4-3. Monofluorophosphates and Difluorophosphates>

With respect to the "monofluorophosphates and difluorophosphates" for use in invention 4, the kinds and contents thereof, places where the salts exist, methods of analysis, production process, etc. are the same as those described above with regard to nonaqueous electrolyte 1.

Nonaqueous electrolyte 4 of the invention can contain "other compounds" so long as this does not lessen the effects of the invention. Examples of the "other compounds" include various compounds including conventionally known overcharge inhibitors and aids.

<1-5. Overcharge Inhibitor>

By incorporating an overcharge inhibitor, the battery can be inhibited from rupturing/firing upon overcharge, etc. With respect to the overcharge inhibitor in nonaqueous electrolyte 4, the same explanation as that given above with regard to nonaqueous electrolyte 1 applies. Preferred examples thereof include the following.

Examples of the overcharge inhibitor include: aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran; products of the partial fluorination of these aromatic compounds, such as 2-fluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole. Preferred of these are aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran. Two or more of these may be used in combination. In the case where two or more compounds are used in combination, it is especially preferred, from the standpoint of a balance between overcharge-inhibiting properties and high-temperature storability, to employ a combination of cyclohexylbenzene and t-butylbenzene or t-amylbenzene or to use a compound selected from oxygen-free aromatic compounds such as biphenyl, alkylbiphenyls, terphenyl, partly hydrogenated terphenyls, cyclohexylbenzene, t-butylbenzene, and t-amylbenzene in combination with a compound selected from oxygen-containing aromatic compounds such as diphenyl ether and dibenzofuran.

The proportion of the overcharge inhibitor in nonaqueous electrolyte 4 is generally 0.1% by mass or higher, preferably 0.2% by mass or higher, especially preferably 0.3% by mass or higher, most preferably 0.5% by mass or higher, based on the whole nonaqueous electrolyte. The upper limit thereof is generally 5% by mass or lower, preferably 3% by mass or lower, especially preferably 2% by mass or lower. In case where the concentration thereof is lower than the lower limit, the overcharge inhibitor produces almost no effect. Conversely, too high concentrations thereof tend to result in a decrease in battery characteristics, e.g., high-temperature storability.

<1-6. Aids>

Examples of the aids include: carbonate compounds such as erythritan carbonate, spiro-bis-dimethylene carbonate, and methoxyethyl methyl carbonate; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, 1,3-propanesultone, 1,4-butanesultone, methyl methanesulfonate, ethyl methanesulfonate, busulfan, sulfolene, dimethyl sulfone, diphenyl sulfone, N,N-dimethylmethanesulfonamide, and N,N-diethylmethanesulfonamide; nitrogen-containing compounds such as 1-methyl-2-pyrrolinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, and cycloheptane; and fluorine-containing aromatic compounds such as fluorobenzene, difluorobenzene, hexafluorobenzene, and benzotrifluoride. Two or more of these aids may be used in combination.

The proportion of these aids in nonaqueous electrolyte 4 is generally 0.01% by mass or higher, preferably 0.1% by mass or higher, especially preferably 0.2% by mass or higher, based on the whole nonaqueous electrolyte 4. The upper limit thereof is generally 5% by mass or lower, preferably 3% by mass or lower, especially preferably 1% by mass or lower. By adding those aids, capacity retentivity after high-temperature storage and cycle characteristics can be improved. In case where the concentration thereof is lower than the lower limit, the aids produce almost no effect. Conversely, too high concentrations thereof tend to result in a decrease in battery characteristics, e.g., high-load discharge characteristics.

<1-7. Preparation of Nonaqueous Electrolyte>

Nonaqueous electrolyte 4 according to the invention can be prepared by mixing an electrolyte, a cyclic sulfone compound, "a compound having a coefficient of viscosity at 25° C. of 1.5 mPa·s or lower", and the specific compound optionally together with "other compounds" to dissolve these ingredients in each other. It is preferred that in preparing nonaqueous electrolyte 4, each raw material should be dehydrated beforehand in order to reduce the water content of the electrolyte to be obtained. It is desirable to dehydrate each raw material to generally 50 ppm or lower, preferably 30 ppm or lower, especially preferably 10 ppm or lower. It is also possible to conduct dehydration, deacidification, and the like after the preparation of an electrolyte.

Nonaqueous electrolyte 4 of the invention is suitable for use as an electrolyte for nonaqueous-electrolyte batteries, in particular, for secondary batteries, e.g., lithium secondary batteries. Nonaqueous-electrolyte battery 4, which employs the electrolyte of the invention, is explained below.

[2. Nonaqueous-Electrolyte Battery]

Nonaqueous-electrolyte battery 4 of the invention includes: a negative electrode and a positive electrode which are capable of occluding and releasing ions; and the non-aqueous electrolyte 4 of the invention.

<2-1. Battery Constitution>

Nonaqueous-electrolyte secondary battery 4 of the invention may have the same battery constitution as that described above with regard to nonaqueous-electrolyte secondary battery 1.

<2-2. Nonaqueous Electrolyte>

As the nonaqueous electrolyte, the nonaqueous electrolyte 4 of the invention described above is used. Incidentally, a mixture of nonaqueous electrolyte 4 of the invention and another nonaqueous electrolyte may be used so long as this is not counter to the spirit of invention 4.

<2-3. Negative Electrode>

The negative electrode of nonaqueous-electrolyte secondary battery 4 may be the same as the negative electrode described above with regard to nonaqueous-electrolyte secondary battery 1.

<2-4. Positive Electrode>

The positive electrode of nonaqueous-electrolyte secondary battery 4 may be the same as the positive electrode described above with regard to nonaqueous-electrolyte secondary battery 1.

<2-5. Separator>

The separator of nonaqueous-electrolyte secondary battery 4 may be the same as the separator described above with regard to nonaqueous-electrolyte secondary battery 1.

<2-6. Battery Design>

The battery design of nonaqueous-electrolyte secondary battery 4 may be the same as the battery design described above with regard to nonaqueous-electrolyte secondary battery 1.

Nonaqueous-electrolyte secondary battery 5 of the invention is constituted of a nonaqueous electrolyte and a positive electrode and a negative electrode which both are capable of occluding and releasing lithium. Nonaqueous-electrolyte secondary battery 5 of the invention may be equipped with other constitutions.

<I. Nonaqueous Electrolyte>

Embodiment 5-1

Nonaqueous electrolyte 5 of the invention is a nonaqueous electrolyte which includes a nonaqueous organic solvent and a lithium salt dissolved therein, and is characterized in that the nonaqueous organic solvent contains a cyclic polyamine compound and/or a cyclic polyamide compound and further contains at least one compound selected from the group consisting of unsaturated carbonates, fluorine-containing carbonates, monofluorophosphates, and difluorophosphates. This electrolyte is referred to as "embodiment 5-1".

[1. Cyclic Polyamine Compound]

[1-1. Kind]

The cyclic polyamine compound which may be contained in nonaqueous electrolyte 5 of the invention (hereinafter suitably referred to as "cyclic polyamine compound of invention 5") is any of cyclic compounds having a structure formed by the condensation of one or more amines and derivatives of such cyclic compounds. Namely, the cyclic polyamine compound is any of cyclic compounds including two or more nitrogen atoms bonded to each other with alkylene groups and derivatives thereof formed by replacing one or more of the hydrogen atoms bonded to the nitrogen atoms with a hydrocarbon group.

The number of the nitrogen atoms constituting the ring is preferably 3 or larger, especially preferably 4 or larger, and is preferably 6 or smaller, especially preferably 4 or smaller. The alkylene groups are not particularly limited. However, alkylene groups having 2-4 carbon atoms, such as ethylene, methylethylene, propylene, and butylene, are preferred. Especially preferred is ethylene or propylene. Two or more kinds of alkylene groups may be contained.

Examples of the hydrocarbon group with which the hydrogen bonded to a nitrogen atom is replaced include alkyl groups, aryl groups, and aralkyl groups. Preferred of these are alkyl groups. Examples of the alkyl groups include methyl, ethyl, propyl, isopropyl, and butyl. Examples of the aryl groups include aryl groups having 6-8 carbon atoms, such as phenyl, p-tolyl, ethylphenyl, and dimethylphenyl. Examples of the aralkyl groups include benzyl and phenethyl.

The molecular weight of the cyclic polyamine compound of invention 5 is preferably 120 or higher, more preferably 170 or higher, and is preferably 800 or lower, more preferably 400 or lower, especially preferably 300 or lower. When the molecular weight thereof exceeds the upper limit of that range, there are cases where this polyamine compound is reduced in compatibility with or solubility in the nonaqueous electrolyte, resulting in a decrease in capacity especially at low temperatures.

Examples of the cyclic polyamine compound of invention 5 are shown below. However, the cyclic polyamine compound of invention 5 should not be construed as being limited to the following examples.

Examples of the cyclic polyamine compound of invention 5 include triazacycloalkanes such as 1,4,7-triazacyclononane, 1,4,7-triazacyclodecane, 1,4,8-triazacycloundecane, 1,5,9-triazacyclododecane, and 1,6,11-triazacyclopentadecane etc.;

tetraazacycloalkanes such as 1,4,7,10-tetraazacyclododecane (another name: cyclen), 1,4,7,10-tetraazacyclotridecane, 1,4,7,11-tetraazacyclotetradecane, 1,4,8,11-tetraazacyclotetradecane (another name: cyclam), 1,4,8,12-tetraazacyclopentadecane, and 1,5,9,13-tetraazacyclohexadecane;

pentaazacycloalkanes such as 1,4,7,10,13-pentaazacyclopentadecane and 1,4,7,10,13-pentaazacyclohexadecane;

hexaazacycloalkanes such as 1,4,7,10,13,16-hexaazacyclooctadecane (another name: hexacyclen) and 1,4,7,10,13,16-hexaazacyclononadecane etc.;

hydrocarbon-group-substituted triazacycloalkanes such as 1,4,7-tetramethyl-1,4,7-triazacyclononane, 2,5,8-tetramethyl-1,4,7-triazacyclononane, 1,4,7-tetraethyl-1,4,7-triazacyclononane, 1,4,7-tetraphenyl-1,4,7-triazacyclononane, 1,4,7-tetrabenzyl-1,4,7-triazacyclononane, 1,5,9-tetramethyl-1,5,9-triazacyclododecane, 1,5,9-tetraethyl-1,5,9-triazacyclododecane, 1,5,9-tetraphenyl-1,5,9-triazacyclododecane, and 1,5,9-tetrabenzyl-1,5,9-triazacyclododecane etc.;

hydrocarbon-group-substituted tetraazacycloalkanes such as 1,4,7,10-tetramethyl-1,4,7,10-tetraazacyclododecane, 2,5,8,11-tetramethyl-1,4,7,10-tetraazacyclododecane, 1,4,7,10-tetramethyl-1,4,7,10-tetraazacyclododecane, 1,4,7,10-tetraethyl-1,4,7,10-tetraazacyclododecane, 1,4,7,10-tetraphenyl-1,4,7,10-tetraazacyclododecane, 1,4,7,10-tetrabenzyl-1,4,7,10-tetraazacyclododecane, 1,4,8,11- tetramethyl-1,4,8,11-tetraazacyclotetradecane, 1,4,8,11-tetraethyl-1,4,8,11-tetraazacyclotetradecane, 1,4,8,11-tetraphenyl-1,4,8,11-tetraazacyclotetradecane, 1,4,8,11-tetrabenzyl-1,4,8,11-tetraazacyclotetradecane, 1,4,8,12-tetramethyl-1,4,8,12-tetraazacyclopentadecane, 1,4,8,12-tetraethyl-1,4,8,12-tetraazacyclopentadecane, 1,4,8,12-tetraphenyl-1,4,8,12-tetraazacyclopentadecane, and 1,4,8,12-tetrabenzyl-1,4,8,12-tetraazacyclopentadecane; and hydrocarbon-group-substituted hexaazacycloalkanes such as 1,4,7,10,13,16-hexamethyl-1,4,7,10,13,16-hexaazacyclooctadecane, 1,4,7,10,13,16-hexaethyl-1,4,7,10,13,16-hexaazacyclooctadecane, 1,4,7,10,13,16-hexaphenyl-1,4,7,10,13,16-hexaazacyclooctadecane, and 1,4,7,10,13,16-hexabenzyl-1,4,7,10,13,16-hexaazacyclooctadecane, and the like.

Preferred of these are triazacycloalkanes such as 1,4,7-triazacyclononane and 1,5,9-triazacyclododecane; tetraazacycloalkanes such as 1,4,7,10-tetraazacyclododecane (another name: cyclen), 1,4,8,11-tetraazacyclotetradecane (another name: cyclam), and 1,4,8,12-tetraazacyclopentadecane; and 1,4,7,10,13,16-hexaazacyclooctadecane (another name: hexacyclen) and methyl-substituted azacycloalkanes such as 1,4,7-tetramethyl-1,4,7-triazacyclononane, 1,5,9-tetramethyl-1,5,9-triazacyclododecane, 1,4,7,10-tetramethyl-1,4,7,10-tetraazacyclododecane, 1,4,7,10-tetramethyl-1,4,7,10-tetraazacyclododecane, 1,4,8,11-tetramethyl-1,4,8,11-tetraazacyclotetradecane, and 1,4,8,12-tetramethyl-1,4,8,12-tetraazacyclopentadecane, and the like.

Especially preferred of these are triazacycloalkanes such as 1,4,7-triazacyclononane and 1,5,9-triazacyclododecane; tetraazacycloalkanes such as 1,4,7,10-tetraazacyclododecane (another name: cyclen), 1,4,8,11-tetraazacyclotetradecane (another name: cyclam), and 1,4,8,12-tetraazacyclopentadecane; and methyl-substituted tetraazacycloalkanes such as 1,4,8,11-tetramethyl-1,4,8,11-tetraazacyclotetradecane, and the like.

One cyclic polyamine compound of invention 5 may be used alone, or any desired combination of two or more cyclic polyamine compounds of invention 5 in any desired proportion may be used.

These cyclic polyamine compounds have a molecular weight which is not excessively high. These compounds readily dissolve in nonaqueous organic solvents and partly undergo oxidation at the positive electrode. Upon this oxidation, the compounds form a stable coating film on the positive electrode. Because of this, the nonaqueous-electrolyte secondary battery employing the nonaqueous electrolyte containing any of these cyclic polyamine compounds has improved continuous-charge characteristics.

[1-2. Composition]

The content of the cyclic polyamine compound of invention 5 is not particularly limited so long as the compound dissolves in the nonaqueous solvent which will be described later. However, the cyclic polyamine compound is contained in such an amount that the content thereof is generally 0.001% by mass or higher, preferably 0.01% by mass or higher, and is generally 5% by mass or lower, preferably 1% by mass or lower, especially preferably 0.2% by mass or lower, based on the whole nonaqueous electrolyte. When the content thereof is lower than the lower limit of that range, there are cases where the effects of invention 5 are hardly produced. When the content thereof exceeds the upper limit, there are cases where the nonaqueous organic solvent including carbonates comes to undergo a decomposition reaction catalyzed by the cyclic polyamine compound, resulting in a decrease in battery characteristics such as rate characteristics. In the case of using two or more cyclic polyamine compounds of invention 5 in combination, the cyclic polyamine compounds of invention 5 are used so that the total concentration thereof is within the range shown above.

[2. Cyclic Polyamide Compound]

[2-1. Kind]

The cyclic polyamide compound which may be contained in nonaqueous electrolyte 5 of the invention (hereinafter suitably referred to as "cyclic polyamide compound of invention 5") is a compound having two or more amide bonds (—NHCO—) in the ring framework. The number of the amide bonds constituting the ring is preferably 2 or larger and is preferably 6 or smaller, especially preferably 4 or smaller. A cyclic polyamide compound having two amide bonds can be synthesized, for example, by the reaction of an acyclic polyamine compound with a malonic acid derivative. Cyclic polyamide compounds having three or more amide bonds can be synthesized, for example, by the cyclization polymerization reaction of various amino acids.

The molecular weight of the cyclic polyamide compound of invention 5 is preferably 160 or higher, more preferably 200 or higher, and is preferably 800 or lower, more preferably 600 or lower, especially preferably 500 or lower. When the molecular weight thereof exceeds the upper limit of that range, there are cases where the cyclic polyamide compound of invention 5 is reduced in compatibility with or solubility in nonaqueous organic solvents and this may cause a decrease in capacity especially at low temperatures.

Examples of the cyclic polyamide compound of invention 5 are shown below. However, the cyclic polyamide compound of invention 5 should not be construed as being limited to the following examples.

Examples of the cyclic polyamide compound of invention 5 which has two amide bonds include (substituted) triazacycloalkanediones such as 1,4,7-triazacyclodecane-8,10-dione, 9-methyl-1,4,7-triazacyclodecane-8,10-dione, 9,9'-dimethyl-1,4,7-triazacyclodecane-8,10-dione, 9-ethyl-1,4,7-triazacyclodecane-8,10-dione, 9-phenyl-1,4,7-triazacyclodecane-8,10-dione, 9-benzyl-1,4,7-triazacyclodecane-8,10-dione, 1,5,9-triazacyclododecane-6,8-dione, 7-methyl-1,5,9-triazacyclododecane-6,8-dione, 7,7'-methyl-1,5,9-triazacyclododecane-6,8-dione, 7-ethyl-1,5,9-triazacyclododecane-6,8-dione, 7-phenyl-1,5,9-triazacyclododecane-6,8-dione, and 7-benzyl-1,5,9-triazacyclododecane-6,8-dione;

(substituted) tetraazacycloalkanediones such as 1,4,7,10-tetraazacyclotridecane-11,13-dione, 12-methyl-1,4,7,10-tetraazacyclotridecane-11,13-dione, 12,12'-dimethyl-1,4,7,10-tetraazacyclotridecane-11,13-dione, 12-ethyl-1,4,7,10-tetraazacyclotridecane-11,13-dione, 12-phenyl-1,4,7,10-tetraazacyclotridecane-11,13-dione, 1,2-benzyl-1,4,7,10-tetraazacyclotridecane-11,13-dione, 1,4,8,11-tetraazacyclotetradecane-5,7-dione, 6-methyl-1,4,8,11-tetraazacyclotetradecane-5,7-dione, 6,6'-dimethyl-1,4,8,11-tetraazacyclotetradecane-5,7-dione, 6-ethyl-1,4,8,11-tetraazacyclotetradecane-5,7-dione, 6-phenyl-1,4,8,11-tetraazacyclotetradecane-5,7-dione, 6-benzyl-1,4,8,11-tetraazacyclotetradecane-5,7-dione, 1,4,8,12-tetraazacyclopentadecane-9,11-dione, 10-methyl-1,4,8,12-tetraazacyclopentadecane-9,11-dione, 10,10'-dimethyl-1,4,8,12-tetraazacyclopentadecane-9,11-dione, 10-ethyl-1,4,8,12-tetraazacyclopentadecane-9,11-dione, 10-phenyl-1,4,8,12-tetraazacyclopentadecane-9,11-dione, and 10-benzyl-1,4,8,12-tetraazacyclopentadecane-9,11-dione; and (substituted) tetraazacycloalkanediones such as 1,4,7,10,13,16-hexaazacyclononadecane-17,19-dione, 18-methyl-1,4,7,10,13,16-hexaazacyclononadecane-17,19-dione, 18,18'- ethyl-1,4,7,10,13,16-hexaazacyclononadecane-17,19-dione, 18-ethyl-1,4,7,10,13,16-hexaazacyclononadecane-17,19-dione, 18-phenyl-1,4,7,10,13,16-hexaazacyclononadecane-17,19-dione, and 18-benzyl-1,4,7,10,13,16-hexaazacyclononadecane-17,19-dione, and the like.

Examples of the cyclic polyamide compound which has three or more amide bonds include cyclic triamides such as cyclo(-glycyl)3, cyclo(β-alanyl)3, and cyclo(-prolyl)3;

cyclic tetraamides such as cyclo(-glycyl)4, cyclo (β-alanyl)4, cyclo(β-alanylglycyl-β-alanylglycyl), cyclo(β-alanyl-prolyl-β-alanylprolyl), cyclo(-glycyl)4, and cyclo(β-alanyl) 4; and cyclic hexaamides such as cyclo(-glycyl) 6 and cyclo(-prolyl-glycyl)3, and the like.

Preferred of these are triazacycloalkanediones such as 1,4,7-triazacyclodecane-8,10-dione and 1,5,9-triazacyclododecane-6,8-dione; tetraazacycloalkanediones such as 1,4,7,10-tetraazacyclotridecane-11,13-dione, 1,4,8,11-tetraazacyclotetradecane-5,7-dione, and 1,4,8,12-tetraazacyclopentadecane-9,11-dione; hexaamides such as cyclo(β-alanylglycyl-β-alanylglycyl) and cyclo(-prolyl-glycyl)3; and the like.

Especially preferred of these are 1,4,7,10-tetraazacyclotridecane-11,13-dione, 1,4,8,11-tetraazacyclotetradecane-5,7-dione, 1,4,8,12-tetraazacyclopentadecane-9,11-dione, cyclo(β-alanylglycyl-β-alanylglycyl), and the like.

One of the polyamide compounds of invention 5 shown above may be used alone, or any desired combination of two or more thereof in any desired proportion may be used.

These cyclic polyamide compounds of invention 5 have a molecular weight which is not excessively high. These compounds readily dissolve in nonaqueous organic solvents and partly undergo oxidation at the positive electrode. Upon this oxidation, the compounds form a stable coating film on the positive electrode. Because of this, the nonaqueous-electrolyte secondary battery employing the nonaqueous electrolyte containing any of these cyclic polyamide compounds of invention 5 has improved continuous-charge characteristics.

[2-2. Composition]

The content of the cyclic polyamide compound of invention 5 is not particularly limited so long as the compound dissolves in the nonaqueous solvent which will be described later. However, the cyclic polyamide compound is contained in such an amount that the content thereof is generally 0.001% by mass or higher, preferably 0.01% by mass or higher, and is generally 5% by mass or lower, preferably 1% by mass or lower, especially preferably 0.2% by mass or lower, based on the whole nonaqueous electrolyte. When the content thereof is lower than the lower limit of that range, there are cases where the effects of invention 5 are hardly produced. When the content thereof exceeds the upper limit, there are cases where the coating film formed on the positive electrode has an increased thickness and higher resistance and this coating film hence inhibits the movement of lithium (Li) ions, resulting in a decrease in battery characteristics such as rate characteristics. In the case of using two or more cyclic polyamide compounds of invention 5 in combination, the cyclic polyamide compounds of invention 5 are used so that the total concentration thereof is within the range shown above.

[3. At Least One Compound Selected from Group Consisting of Unsaturated Carbonates, Fluorine-Containing Carbonates, Monofluorophosphates, and Difluorophosphates]

Nonaqueous electrolyte 5 of the invention further contains at least one compound selected from the group consisting of unsaturated carbonates, fluorine-containing carbonates, monofluorophosphates, and difluorophosphates. These compounds are incorporated, for example, for the purpose of forming a coating film on the negative electrode to improve battery characteristics.

[3-1. Kind]

The unsaturated carbonates are not particularly limited so long as they are carbonates having one or more carbon-carbon unsaturated bonds. Any desired unsaturated carbonates can be used. Examples thereof include carbonates having one or more aromatic rings and carbonates having one or more carbon-carbon unsaturated bonds such as carbon-carbon double bonds or carbon-carbon triple bonds. The unsaturated carbonates are the same as those described above with regard to nonaqueous electrolyte 1.

The fluorine-containing carbonates are not limited so long as they are carbonates having a fluorine atom. Any desired fluorine-containing carbonates can be used.

Examples thereof include fluorine-containing cyclic carbonates such as fluoroethylene carbonate, 1,1-difluoroethylene carbonate, cis-difluoroethylene carbonate, trans-difluoroethylene carbonate, fluoropropylene carbonate, and trifluoromethylethylene carbonate; and fluorine-containing acyclic carbonates such as trifluoromethyl methyl carbonate, trifluoromethyl ethyl carbonate, 2-fluoroethyl methyl carbonate, 2-fluoroethyl ethyl carbonate, 2,2,2-trifluoroethyl methyl carbonate, 2,2,2-trifluoroethyl ethyl carbonate, bis(trifluoromethyl) carbonate, bis(2-fluoroethyl) carbonate, and bis(2,2,2-trifluoroethyl) carbonate, and the like.

Of these, fluorine-containing cyclic carbonates such as fluoroethylene carbonate, cis-difluoroethylene carbonate, and trans-difluoroethylene carbonate are preferred because these carbonates form a stable interface-protective coating film on the negative electrode.

One fluorine-containing carbonate may be used alone, or any desired combination of two or more fluorine-containing carbonates in any desired proportion may be used.

As the monofluorophosphates and difluorophosphates, any desired ones can be used. With respect, to the "monofluorophosphates and difluorophosphates" to be used in invention 5 (including all of embodiment 5-1, embodiment 5-2, and embodiment 5-3), the kinds and contents thereof, places where the salts exist, methods of analysis, production process, etc., are the same as those described above with regard to nonaqueous electrolyte 1. Especially preferred examples thereof include lithium monofluorophosphate, sodium monofluorophosphate, potassium monofluorophosphate, lithium difluorophosphate, sodium difluorophosphate, and potassium difluorophosphate. Preferred of these are lithium monofluorophosphate and lithium difluorophosphate. One monofluorophosphate or difluorophosphate may be used alone, or any desired combination of two or more of monofluorophosphates and difluorophosphates in any desired proportion may be used.

[3-2. Composition]

The concentration of the at least one compound selected from the group consisting of unsaturated carbonates, fluorine-containing carbonates, monofluorophosphates, and difluorophosphates in nonaqueous electrolyte 5 is generally 0.01% by mass or higher, preferably 0.1% by mass or higher, more preferably 0.3% by mass or higher, and is generally 1.0% by mass or lower, preferably 7% by mass or lower, more preferably 5% by mass or lower, based on the whole nonaqueous electrolyte. In case where the concentration thereof is too high, the coating film formed on the negative electrode has an increased thickness and higher resistance, resulting in a decrease in battery capacity. There also are cases where gas evolution is enhanced under high-temperature conditions and this further increases resistance to reduce the capacity. When the concentration thereof is too low, there are cases where the effects of invention 5 are not sufficiently produced.

[Function]

Reasons for the preference of the containment of at least one compound selected from the group consisting of unsaturated carbonates, fluorine-containing carbonates, monofluorophosphates, and difluorophosphates in nonaqueous electrolyte 5 of the invention are explained here. However, invention 5 should not be construed as being limited by the following reasons. The polyamine compound and/or polyamide compound of invention 5 is oxidized at the positive electrode at a less noble potential than the solvent and functions as a positive-electrode-protective coating film. This protective coating film inhibits the solvent from subsequently undergoing an oxidation reaction. The performance deterioration of, in particular, high-voltage batteries can hence be mitigated. However, there are cases where these compounds are reduced at the negative electrode to form a high-resistance coating film and this adversely influences battery characteristics including high-load characteristics. When at least one compound selected from the group consisting of unsaturated carbonates, fluorine-containing carbonates, monofluorophosphates, and difluorophosphates coexists in the electrolyte, these compounds are reduced at the negative electrode at a nobler potential than the polyamine compound and/or polyamide compound to form a protective coating film and thereby inhibit the polyamine compound and/or polyamide compound from reacting at the negative electrode. As a result, no high-resistance coating film is formed on the negative electrode, and a stable coating film is formed on the positive electrode to inhibit the electrolyte from reacting with the positive electrode. Consequently, the continuous-charge characteristics of the nonaqueous-electrolyte secondary battery can be greatly heightened.

[4. Nonaqueous Organic Solvent]

The nonaqueous organic solvent is not particularly limited, and known nonaqueous organic solvents can be used at will so long as the electrolyte which will be described later can dissolve therein. Examples thereof include acyclic carbonates, cyclic carbonates, acyclic esters, cyclic esters (lactone compounds), acyclic ethers, cyclic ethers, and sulfur-containing organic solvents. Preferred of these are acyclic carbonates, cyclic carbonates, acyclic esters, cyclic esters, acyclic ethers, or cyclic ethers as solvents having high ionic conductivity. These solvents are the same as those described above with regard to nonaqueous electrolytes 1 to 4. However, the following are preferred.

Examples of the acyclic carbonates include dimethyl carbonate, diethyl carbonate, ethyl methyl carbonate, methyl propyl carbonate, and ethyl propyl carbonate.

Examples of the cyclic carbonates include ethylene carbonate, propylene carbonate, butylene carbonate, fluoroethylene carbonate, difluoroethylene carbonate, fluoropropylene carbonate, and trifluoromethylethylene carbonate.

Examples of the acyclic ethers include 1,2-dimethoxyethane, 1,2-diethoxyethane, and diethyl ether.

Examples of the cyclic ethers include tetrahydrofuran, 2-methyltetrahydrofuran, 1,3-dioxolane, and 4-methyl-1,3-dioxolane.

Examples of the acyclic esters include methyl formate, methyl acetate, and methyl propionate.

Examples of the cyclic esters include γ-butyrolactone and γ-valerolactone.

One nonaqueous organic solvent may be used alone, or any desired combination of two or more nonaqueous organic solvents in any desired proportion may be used. However, it is preferred to use a mixture of two or more nonaqueous organic solvents in order to impart the desired characteristics, i.e., continuous-charge characteristics. In particular, it is preferred that the mixture should consist mainly of at least one cyclic carbonate and (at least one acyclic carbonate or at least one cyclic ester). The term "consist mainly of" as used here means that the nonaqueous organic solvents include at least one cyclic carbonate and (at least one acyclic carbonate or at least one cyclic ester) in a total amount of 70% by mass or larger based on the whole nonaqueous electrolyte.

In the case where two or more nonaqueous organic solvents are used in combination, examples of preferred combinations include: binary solvents such as ethylene carbonate/methyl ethyl carbonate, ethylene carbonate/diethyl carbonate, and ethylene carbonate/γ-butyrolactone; and ternary solvents such as ethylene carbonate/dimethyl carbonate/ethyl methyl carbonate and ethylene carbonate/methyl ethyl carbonate/diethyl carbonate. Nonaqueous organic solvents mainly including these compounds are suitable because they attain a satisfactory balance among various properties.

In the case where an organic solvent is used as the nonaqueous organic solvent, the number of carbon atoms of the organic solvent is generally 3 or larger and is generally 13 or smaller, preferably 7 or smaller. When the number of carbon atoms thereof is too large, there are cases where this organic solvent shows poor infiltration into the separator and negative electrode, making it impossible to attain sufficient capacity. On the other hand, when the number of carbon atoms thereof is too small, there are cases where this organic solvent has enhanced volatility to form a cause of an increase in the internal pressure of the battery.

The molecular weight of the nonaqueous organic solvent is generally 50 or higher, preferably 80 or higher, and is generally 250 or lower, preferably 150 or lower. When the molecular weight thereof is too high, there are cases where this nonaqueous organic solvent shows poor infiltration into the separator and negative electrode, making it impossible to attain sufficient capacity. On the other hand, when the molecular weight thereof is too low, there are cases where this nonaqueous organic solvent has enhanced volatility to form a cause of an increase in the internal pressure of the battery.

Furthermore, in the case where two or more nonaqueous organic solvents are used in combination, the proportion of a cyclic carbonate in the nonaqueous organic solvents is generally 5% by mass or higher, preferably 10% by mass or higher, more preferably 15% by mass or higher, especially preferably 20% by mass or higher, and is generally 60% by mass or lower, preferably 50% by mass or lower, especially preferably 40% by mass or lower, based on the whole nonaqueous organic solvents. When the proportion thereof is lower than the lower limit of that range, lithium salt dissociation is less apt to occur and electrical conductivity decreases. Consequently, high-load capacity is apt to decrease. On the other hand, when the proportion thereof exceeds the upper limit, this electrolyte has too high a viscosity and lithium ions are less apt to move. There are hence cases where high-load capacity decreases.

[5. Lithium Salt]

The lithium salt to be used as an electrolyte may be any of inorganic lithium salts and organic lithium salts. Examples thereof include the same "lithium salts" as those enumerated above under "Electrolyte" with regard to nonaqueous electrolyte 1. Examples of the inorganic lithium salts include: inorganic fluoride salts such as $LiPF_6$, $LiAsF_6$, $LiBF_4$, and $LiSbF_6$; inorganic chloride salts such as $LiAlCl_4$; and perhalogen acid salts such as $LiClO_4$, $LiBrO_4$, and $LiIO_4$. Examples of the organic lithium salts include fluorine-containing organic lithium salts such as: perfluoroalkanesulfonic acid salts, e.g., $CF_3O_3Li$ and $C_4F_9SO_3Li$; perfluoroalkanecarboxylic acid salts, e.g., $CF_3COOLi$; perfluoroalkanecarbonimide salts, e.g., $(CF_3CO)_2NLi$; and perfluoroalkanesulfonimide salts, e.g., $(CF_3SO_2)_2NLi$ and $(C_2F_5SO_2)_2NLi$, and the like.

Of these, $LiPF_6$, $LiBF_4$, $CF_3SO_3Li$, $(CF_3SO_2)_2NLi$, and the like are preferred because these salts are apt to dissolve in solvents and have a high degree of dissociation. One electrolyte may be used alone, or any desired combination of two or more electrolytes in any desired proportion may be used. In particular, a combination of $LiPF_6$ and $LiBF_4$ or a combination of $LiPF_6$ and $(CF_3SO_2)_2NLi$ is preferred because these combinations are effective in improving continuous-charge characteristics.

The concentration of the electrolyte in the nonaqueous electrolyte is generally 0.5 mol/L or higher, preferably 0.75 mol/L or higher, and is generally 2 mol/L or lower, preferably 1.75 mol/L or lower, based on the nonaqueous electrolyte. When the concentration thereof is too low, there are cases where this nonaqueous electrolyte has an insufficient electrical conductivity. On the other hand, in case where the concentration thereof is too high, this nonaqueous electrolyte has an increased viscosity and, hence, a reduced electrical conductivity and is apt to suffer deposition at low temperatures. There is hence a tendency that the nonaqueous-electrolyte secondary battery has reduced performances.

[6. Other Aids]

"Other aids" may be incorporated into nonaqueous electrolyte 5 of the invention for the purpose of improving the wetting properties of the nonaqueous electrolyte, overcharge characteristics, etc., unless the effects of invention 5 are lessened thereby. Examples of the "other aids" include: acid anhydrides such as maleic anhydride, succinic anhydride, and glutaric anhydride; carboxylic acid esters such as vinyl acetate, divinyl adipate, and allyl acetate; sulfur-containing compounds such as diphenyl disulfide, 1,3-propanesultone, 1,4-butanesultone, dimethyl sulfone, divinyl sulfone, dimethyl sulfite, ethylene methanesulfonate, and 2-propynyl methanesulfonate; and aromatic compounds such as t-butylbenzene, biphenyl, o-terphenyl, 4-fluorobiphenyl, fluorobenzene, 2,4-difluorobenzene, cyclohexylbenzene, diphenyl ether, 2,4-difluoroanisole, and trifluoromethylbenzene and these aromatic compounds substituted with a fluorine atom. One of such "other aids" may be used alone, or any desired combination of two or more thereof in any desired proportion may be used.

The concentration of the "other aids" in the nonaqueous electrolyte is generally 0.01% by mass or higher, preferably 0.05% by mass or higher, and is generally 10% by mass or lower, preferably 5% by mass or lower, based on the whole nonaqueous electrolyte. In the case of using two or more of the "other aids" in combination, these ingredients are used so that the total concentration thereof is within the range shown above.

[7. State of Nonaqueous Electrolyte]

Nonaqueous electrolyte 5 is present usually in a liquid state. However, this electrolyte may be caused to gel with a polymer to obtain a semi-solid electrolyte. For the gelation, any desired polymer may be used. Examples of the polymer include poly(vinylidene fluoride), copolymers of poly(vinylidene fluoride) and hexafluoropropylene, poly(ethylene oxide), polyacrylates, and polymethacrylates. One polymer may be used alone for the gelation, or any desired combination of two or more polymers in any desired proportion may be used for the gelation.

In the case where nonaqueous electrolyte 5 is used in the form of a semi-solid electrolyte, the proportion of the nonaqueous electrolyte to the semi-solid electrolyte is generally 30% by mass or higher, preferably 50% by mass or higher, especially preferably 75% by mass or higher, and is generally 99.95% by mass or lower, preferably 99% by mass or lower, especially preferably 98% by mass or lower, based on the total amount of the semi-solid electrolyte. When the proportion of the nonaqueous electrolyte is too high, there are cases where it is difficult to retain the electrolyte and liquid leakage is apt to occur. Conversely, when the proportion thereof is too low, there are cases where this electrolyte is insufficient in charge/discharge efficiency and capacity.

[8. Process for Producing Nonaqueous Electrolyte]

Nonaqueous electrolyte 5 of the invention can be prepared by dissolving a lithium salt, the cyclic polyamine compound and/or cyclic polyamide compound according to invention 5, and "at least one compound selected from the group consisting of unsaturated carbonates, fluorine-containing carbonates, monofluorophosphates, and difluorophosphates" in a nonaqueous organic solvent optionally together with "other aids".

It is preferred that in preparing nonaqueous electrolyte 5, each of the raw materials for the nonaqueous electrolyte, i.e., the lithium salt, cyclic polyamine compound and/or cyclic polyamide compound according to invention 5, nonaqueous organic solvent, and "other aids", should be dehydrated beforehand. With respect to the degree of dehydration, it is desirable to dehydrate each raw material to generally 50 ppm or lower, preferably 30 ppm or lower. In this description, ppm means proportion by weight.

When water is present in the nonaqueous electrolyte, there are cases where electrolysis of the water, reaction of the water with lithium metal, hydrolysis of the lithium salt, etc. occur. Techniques for the dehydration are not particularly limited. However, in the case where the material to be dehydrated is, for example, a liquid, e.g., a nonaqueous organic solvent, a molecular sieve or the like may be used. In the case where the material to be dehydrated is a solid, e.g., a lithium salt, this material may be dried at a temperature lower than decomposition temperatures.

Embodiment 5-2

Another essential point of invention 5 resides in a nonaqueous electrolyte which includes a nonaqueous organic solvent and a lithium salt dissolved therein, and is characterized in that the nonaqueous organic solvent contains a cyclic polyamine compound and further contains at least one cyclic carbonate in an amount of from 5% by mass to 40% by mass based on the whole nonaqueous organic solvent. This electrolyte is referred to as "embodiment 5-2".

[1. Cyclic Polyamine Compound]

[1-1. Kind]

The kind of the cyclic polyamine compound is as described above.

[1-2. Composition]

The composition is as described above.

[2. Cyclic Carbonate]

The cyclic carbonate in invention 5 is not particularly limited so long as it is a cyclic carbonate. Part or all of the hydrogen atoms may have been replaced with a halogen, e.g., fluorine or chlorine. Examples thereof include ethylene carbonate, propylene carbonate, butylene carbonate, fluoroethylene carbonate, difluoroethylene carbonate, fluoropropylene carbonate, and trifluoromethylethylene carbonate. One of such cyclic carbonates may be used alone, or any desired combination of two or more there in any desired proportion may be used.

Especially preferred are: a combination of ethylene carbonate and propylene carbonate; a combination of ethylene carbonate and fluoroethylene carbonate; and a combination of ethylene carbonate, propylene carbonate, and fluoroethylene carbonate.

Invention 5 is characterized in that the nonaqueous organic solvent contains a cyclic carbonate in an amount of 5-40% by mass based on the whole nonaqueous organic solvent. The lower limit of the content thereof is preferably 8% by mass or higher, especially preferably 10% by mass or higher, more preferably 12% by mass or higher. The upper limit thereof is preferably 35% by mass or lower, especially preferably 30% by mass or lower, more preferably 25% by mass or lower. Two or more cyclic carbonates may be used in combination so long as the total amount thereof is within the range shown above.

In case where the proportion of the cyclic carbonate is lower than the lower limit of that range, lithium salt dissociation is apt to occur and electrical conductivity hence decreases. Consequently, high-load capacity is apt to decrease. In case where the proportion thereof exceeds the upper limit, the nonaqueous organic solvent including the cyclic carbonate comes to undergo a decomposition reaction catalyzed by the polyamine compound. There are hence cases where a gas, e.g., carbon dioxide, generates in a large amount during high-temperature continuous charge, resulting in an increase in resistance and a decrease in recovery capacity.

The number of carbon atoms of the cyclic carbonate is generally 3 or larger and is generally 13 or smaller, preferably 5 or smaller. When the number of carbon atoms thereof is too large, there are cases where this cyclic carbonate snows poor infiltration into the separator and negative electrode, making it impossible to attain sufficient capacity. On the other hand, when the number of carbon atoms thereof is too small, there are cases where this cyclic carbonate has enhanced volatility to form a cause of an increase in the internal pressure of the battery.

[3. Nonaqueous Organic Solvent]
The nonaqueous organic solvent is as described above.

[4. Lithium Salt]
The lithium salt is as described above.

[5. At Least One Compound Selected from Group Consisting of Unsaturated Carbonates, Fluorine-Containing Carbonates, Monofluorophosphates, and Difluorophosphates]
In embodiment 5-2 also, it is preferred to incorporate at least one compound selected from the group consisting of unsaturated carbonates, fluorine-containing carbonates, monofluorophosphates, and difluorophosphates. These compounds are as described above.

[6. Other Aids]
Other aids are as described above.

[7. State of Nonaqueous Electrolyte]
The state of the nonaqueous electrolyte is as described above.

[8. Process for Producing Nonaqueous Electrolyte]
The process is as described above.

Embodiment 5-3

Still another essential point of invention 5 resides in a nonaqueous electrolyte which includes a nonaqueous organic solvent and a lithium salt dissolved therein, and is characterized by containing a cyclic polyamide compound. This electrolyte is referred, to as "embodiment 5-3".

[1. Cyclic Polyamide Compound]
[1-1. Kind]
The kind of the cyclic polyamide compound is as described above.

[1-2. Composition]
The composition is as described above.

[2. Nonaqueous Organic Solvent]
Usable nonaqueous solvents are as described above.

The reason why a cyclic polyamide compound, even when used alone, enables the effects of this invention to be produced is as follows. In a cyclic polyamide compound, the unshared electron pairs on the respective nitrogen atoms are in a delocalized state due to the influence of the adjoining carbonyl groups. Cyclic polyamide compounds hence have far lower basicity than cyclic polyamine compounds. Because of this, even when a solvent such as a cyclic carbonate is used in a large amount, this solvent is less apt to react on the negative electrode. Consequently, the kinds of the solvents to be used and the composition thereof are not particularly limited.

[3. Lithium Salt]
The lithium salt is as described above.

[4. Cyclic Carbonate]
In embodiment 5-3 also, it is preferred to incorporate a cyclic carbonate. The cyclic carbonate is as described above.

[5. At Least One Compound Selected from Group Consisting of Unsaturated Carbonates, Fluorine-Containing Carbonates, Monofluorophosphates, and Difluorophosphates]
In embodiment 5-3 also, it is preferred to incorporate at least one compound selected from the group consisting of unsaturated carbonates, fluorine-containing carbonates, monofluorophosphates, and difluorophosphates. These compounds are as described above.

[6. Other Aids]
Other aids are as described above.

[7. State of Nonaqueous Electrolyte]
The state of the nonaqueous electrolyte is as described above.

[8. Process for Producing Nonaqueous Electrolyte]
The process is as described above.

[II. Nonaqueous-Electrolyte Secondary Battery]
Nonaqueous-electrolyte secondary battery 5 of the invention includes: a negative electrode and a positive electrode which are capable of occluding/releasing ions; and the nonaqueous electrolyte of this invention.

<2-1. Battery Constitution>
Nonaqueous-electrolyte secondary battery 5 of the invention may have the same battery constitution as that described above with regard to nonaqueous-electrolyte secondary battery 1.

<2-2. Nonaqueous Electrolyte>
As the nonaqueous electrolyte, the nonaqueous electrolyte 5 of the invention described above is used. Incidentally, a mixture of nonaqueous electrolyte 5 of the invention and another nonaqueous electrolyte may be used so long as this is not counter to the spirit of invention 5.

<2-3. Negative Electrode>
The negative electrode of nonaqueous-electrolyte secondary battery 5 may be the same as the negative electrode described above with regard to nonaqueous-electrolyte secondary battery 1.

<2-4. Positive Electrode>

The positive electrode of nonaqueous-electrolyte secondary battery 5 may be the same as the positive electrode described above with regard to nonaqueous-electrolyte secondary battery 1.

<2-5. Separator>

The separator of nonaqueous-electrolyte secondary battery 5 may be the same as the separator described above with regard to nonaqueous-electrolyte secondary battery 1.

<2-6. Battery Design>

The battery design of nonaqueous-electrolyte secondary battery 5 may be the same as the battery design described above with regard to nonaqueous-electrolyte secondary battery 1.

[1. Nonaqueous Electrolyte 6]

Like ordinary nonaqueous electrolytes, nonaqueous electrolyte 6 of the invention includes an electrolyte and a nonaqueous solvent containing the electrolyte dissolved therein.

<1-1. Electrolyte>

The electrolyte to be used in nonaqueous electrolyte 6 of the invention is not limited, and known ones for use as electrolytes in a target nonaqueous-electrolyte secondary battery can be employed and mixed at will. In the case where nonaqueous electrolyte 6 of the invention is to be used in a nonaqueous-electrolyte secondary battery, the electrolyte preferably is one or more lithium salts. The electrolyte in nonaqueous electrolyte 6 may be the same as that described above with regard to nonaqueous electrolyte 1.

Nonaqueous electrolyte 6 of the invention includes a nonaqueous solvent and an electrolyte dissolved therein, and this nonaqueous electrolyte 6 contains "at least one cyclic disulfonylimide salt represented by general formula (1)" and "a monofluorophosphate and/or a difluorophosphate".

[Chemical Formula-7]

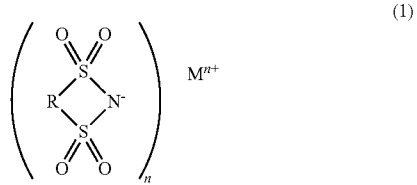

(1)

[In the formula, R represents an alkylene group which has 1-12 carbon atoms and may be substituted with an alkyl group, provided that the alkyl group(s) and the alkylene group may be substituted with a fluorine atom; n is an integer of 1 to 3; and M is one or more metals selected from Group 1, Group 2, and Group 13 of the periodic table or a quaternary onium.]

<1-2. Cyclic Disulfonylimide Salt Represented by General Formula (1)>

In the cyclic disulfonylimide salt represented by general formula (1), R represents an alkylene group which has 1-12, preferably 2-8 carbon atoms and which may be substituted with an alkyl group. The alkyl groups and the alkylene group may have been further substituted with a fluorine atom. When the number of carbon atoms thereof is too large, this disulfonylimide salt has an increased molecular weight per molecule and there are hence cases where the expected effect is lessened.

Examples of the unsubstituted alkylene group having 1-12 carbon atoms include ethylene, trimethylene, tetramethylene, and pentamethylene. Examples of the alkyl groups which may be introduced as substituents include linear or branched alkyl groups having preferably 1-8, especially preferably 1-4 carbon atoms. These groups may have been further substituted with a fluorine atom. Examples of the alkylene group substituted with an alkyl group include propylene, 2-methyltrimethylene, and neopentylene.

Any desired number of fluorine atoms can be introduced into any desired sites in such an unsubstituted alkylene group or alkyl-substituted alkylene group. Of such fluorinated alkylene groups, perfluoroalkylene groups are preferred from the standpoints of industrial availability, ease of production, etc. For example, perfluoroethylene and perfluorotrimethylene are especially preferred.

In the cyclic disulfonylimide salt represented by general formula (1), M is one or more metals selected from Group 1, Group 2, and Group 13 of the periodic table (hereinafter sometimes referred to as "specific metals") or a quaternary onium.

Examples of the metals in Group 1 of the periodic table include lithium, sodium, potassium, and cesium. Preferred of these are lithium and sodium. Especially preferred is lithium.

Examples of the metals in Group 2 of the periodic table include magnesium, calcium, strontium, and barium. Preferred of these are magnesium and calcium. Especially preferred is magnesium.

Examples of the metals in Group 13 of the periodic table include aluminum, gallium, indium, and thallium. Preferred of these are aluminum and gallium. Especially preferred, is aluminum.

Preferred of these specific metals is lithium, sodium, magnesium, calcium, aluminum, or gallium. More preferred is lithium, magnesium, or aluminum. Lithium is especially preferred.

One or more of such cyclic disulfonylimide salts represented by general formula (1) may be used. It is also possible for the salt to have two or more kinds of cyclic disulfonylimide anions together with the $M^{n+}$ common to these. Namely, it is possible for the salt to have two or more kinds of cyclic disulfonylimide anions in the molecule.

Examples of the cyclic disulfonylimide salt represented by general formula (1) include the lithium salt of cyclic 1,2-ethanedisulfonylimide, lithium salt of cyclic 1,3-propanedisulfonylimide, lithium salt of cyclic 1,2-perfluoroethanedisulfonylimide, lithium salt of cyclic 1,3-perfluoropropanedisulfonylimide, and lithium salt of cyclic 1,4-perfluorobutanedisulfonylimide, and the like.

Preferred of these are the lithium salt of cyclic 1,2-perfluoroethanedisulfonylimide and the lithium salt of cyclic 1,3-perfluoropropanedisulfonylimide.

The concentration of the cyclic disulfonylimide salt represented by general formula (1) in the nonaqueous electrolyte is preferably 0.001-1 mol/L. When the concentration of the cyclic disulfonylimide salt is too low, there are cases where it is difficult to sufficiently inhibit gas evolution during high-temperature storage or capacity deterioration through high-temperature storage. Conversely, too high concentrations thereof may result in cases where battery characteristics decrease through high-temperature storage. The concentration of the cyclic disulfonylimide salt is more preferably 0.01 mol/L or higher, especially preferably 0.02 mol/L or higher, more preferably 0.03 mol/L or higher. The upper limit thereof is preferably 0.5 mol/L or lower, more preferably 0.3 mol/L or lower, especially preferably 0.2 mol/L or lower.

<1-3. Nonaqueous Solvent>

The nonaqueous solvent contained in nonaqueous electrolyte 6 of the invention is not particularly limited so long as it is a solvent which does not adversely influence battery characteristics after battery fabrication. However, it is preferred to employ one or more of the following solvents for use in nonaqueous electrolytes.

Examples of nonaqueous solvents in ordinary use include acyclic and cyclic carbonates, acyclic and cyclic carboxylic acid esters, acyclic and cyclic ethers, phosphorus-containing organic solvents, and sulfur-containing organic solvents. These solvents are the same as those described above with regard to nonaqueous electrolytes 1 to 5.

<1-4. Monofluorophosphate and Difluorophosphate>

With respect to the "monofluorophosphate and difluorophosphate" to be used in invention 6, the kinds and contents thereof, places where the salts exist, methods of analysis, production process, etc. are the same as those described above with regard to nonaqueous electrolyte 1.

<1-5. Additives>

Nonaqueous electrolyte 6 of the invention may contain various additives so long as these additives do not considerably lessen the effects of invention 6. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retentivity after high-temperature storage and cycle characteristics. It is preferred to add a carbonate having at least either of an unsaturated bond and a halogen atom (hereinafter sometimes referred to as "specific carbonate") as an aid for improving capacity retentivity after high-temperature storage and cycle characteristics, among those additives. The specific carbonate and other additives are separately explained below.

<1-5-1. Specific Carbonate>

The specific carbonate is a carbonate having at least either of an unsaturated bond and a halogen atom. The specific carbonate may have an unsaturated bond only or have a halogen atom only, or may have both an unsaturated bond and a halogen atom.

The molecular weight of the specific carbonate is not particularly limited, and may be any desired value unless this considerably lessens the effects of invention 6. However, the molecular weight thereof is generally 50 or higher, preferably 80 or higher, and is generally 250 or lower, preferably 150 or lower. When the molecular weight thereof is too high, this specific carbonate has reduced solubility in the nonaqueous electrolyte and there are cases where the effect of the carbonate is difficult to produce sufficiently.

Processes for producing the specific carbonate also are not particularly limited, and a known process selected at will can be used to produce the carbonate.

Any one specific carbonate may be incorporated alone into nonaqueous electrolyte 6 of the invention, or any desired combination of two or more specific carbonates in any desired proportion may be incorporated thereinto.

The amount of the specific carbonate to be incorporated into nonaqueous electrolyte 6 of the invention is not limited, and may be any desired value unless this considerably lessens the effects of invention 6. It is, however, desirable that the specific carbonate should be incorporated in a concentration which is generally 0.01% by mass or higher, preferably 0.1% by mass or higher, more preferably 0.3% by mass or higher, and is generally 70% by mass or lower, preferably 50% by mass or lower, more preferably 40% by mass or lower, based on nonaqueous electrolyte 6 of the invention.

When the amount of the specific carbonate is below the lower limit of that range, there are cases where use of this nonaqueous electrolyte 6 of the invention in a nonaqueous-electrolyte secondary battery results in difficulties in producing the effect of sufficiently improving the cycle characteristics of the nonaqueous-electrolyte secondary battery. On the other hand, when the proportion of the specific carbonate is too high, there is a tendency that use of this nonaqueous electrolyte 6 of the invention in a nonaqueous-electrolyte secondary battery results in decreases in the high-temperature storability and continuous-charge characteristics of the nonaqueous-electrolyte secondary battery. In particular, there are cases where gas evolution is enhanced and capacity retentivity decreases.

(1-5-1-1. Unsaturated Carbonate)

The carbonate having an unsaturated bond (hereinafter often referred to as "unsaturated carbonate") as one form of the specific carbonate according to invention 6 is the same as that described above with regard to nonaqueous electrolyte 1.

(1-5-1-2. Halogenated Carbonate)

On the other hand, the carbonate having a halogen atom (hereinafter often referred to as "halogenated carbonate") as another form of the specific carbonate according to invention 6 is not particularly limited so long as it is a carbonate having a halogen atom, and any desired halogenated carbonate can be used. This "halogenated carbonate" is the same as that described above with regard to nonaqueous electrolyte 2.

(1-5-1-3. Halogenated Unsaturated Carbonate)

Furthermore usable as the specific carbonate is a carbonate having both an unsaturated bond and a halogen atom (this carbonate is suitably referred to as "halogenated unsaturated carbonate"). This halogenated unsaturated carbonate is not particularly limited, and any desired halogenated unsaturated carbonate can be used unless the effects of invention 6 are considerably lessened thereby. This "halogenated unsaturated carbonate" is the same as that described above with regard to nonaqueous electrolyte 2.

<1-5-2. Other Additives>

Additives other than the specific carbonate are explained below. Examples of additives other than the specific carbonate include overcharge inhibitors and aids for improving capacity retentivity after high-temperature storage and cycle characteristics.

<1-5-2-1. Overcharge Inhibitor>

The "overcharge inhibitor" is the same as that described above with regard to nonaqueous electrolyte 1.

<1-5-2-2. Aids>

On the other hand, examples of the aids for improving capacity retentivity after high-temperature storage and cycle characteristics include the same compounds as those enumerated above with regard to nonaqueous electrolyte 1.

[2. Nonaqueous-Electrolyte Secondary Battery]

Nonaqueous-electrolyte secondary battery 6 of the invention includes: a negative electrode and a positive electrode which are capable of occluding and releasing ions; and the nonaqueous electrolyte 6 of the invention.

<2-1. Battery Constitution>

Nonaqueous-electrolyte secondary battery 6 of the invention may have the same battery constitution as that described above with regard to nonaqueous-electrolyte secondary battery 1.

<2-2. Nonaqueous Electrolyte>

As the nonaqueous electrolyte, the nonaqueous electrolyte 6 of the invention described above is used. Incidentally, a mixture of nonaqueous electrolyte 6 of the invention and another nonaqueous electrolyte may be used so long as this is not counter to the spirit of invention 6.

<2-3. Negative Electrode>

The negative electrode of nonaqueous-electrolyte secondary battery 6 may be the same as the negative electrode described above with regard to nonaqueous-electrolyte secondary battery 1.

<2-4. Positive Electrode>

The positive electrode of nonaqueous-electrolyte secondary battery 6 may be the same as the positive electrode described above with regard to nonaqueous-electrolyte secondary battery 1.

<2-5. Separator>

The separator of nonaqueous-electrolyte secondary battery 6 may be the same as the separator described above with regard to nonaqueous-electrolyte secondary battery 1.

<2-6. Battery Design>

The battery design of nonaqueous-electrolyte secondary battery 6 may be the same as the battery design described above with regard to nonaqueous-electrolyte secondary battery 1.

EXAMPLES

The invention will be explained below in more detail by reference to Examples and Comparative Examples. However, the invention should not be construed as being limited to the following Examples unless the invention departs from the spirit thereof.

Example 1 of Nonaqueous Electrolyte 1

<Production of Nonaqueous-Electrolyte Secondary Battery, 1>

[Production of Positive Electrode]

Eighty-five parts by weight of $LiCoO_2$ ("C5", manufactured by Nippon Chemical Industrial Co., Ltd.) was used as a positive-electrode active material and mixed with 6 parts by weight of a carbon black and 9 parts by weight of poly(vinylidene fluoride) (trade name "KF-1000", manufactured by Kureha Chemical Industry Co., Ltd.). N-Methyl-2-pyrrolidone was added to the mixture to slurry it. This slurry was evenly applied to each side of an aluminum foil having a thickness of 15 μm and dried. Thereafter, the coated foil was pressed so as to result in positive-electrode active-material layers having a density of 3.0 g/cm³. Thus, a positive electrode was obtained.

[Production of Negative Electrode]

To 98 parts by weight of artificial-graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to one side of a copper foil having a thickness of 12 μm and dried. Thereafter, the coated foil was pressed so as to result in a negative-electrode active-material layer having a density of 1.5 g/cm³. Thus, a negative electrode was obtained.

[Nonaqueous Electrolyte]

In a dry argon atmosphere, $LiPF_6$ which each had been sufficiently dried was dissolved, in an amount of 1 mol/L, in a nonaqueous solvent prepared by mixing in the proportion shown in Table 1. Thus, a nonaqueous electrolyte was prepared. Furthermore, a monofluorophosphate and/or a difluorophosphate was dissolved in the solution so as to result in the respective concentrations shown in Table 1. Thus, a desired nonaqueous electrolyte was obtained.

[Fabrication of Nonaqueous-Electrolyte Secondary Battery]

The positive electrode and negative electrode described above and a separator made of polyethylene were superposed in the order of negative electrode/separator/positive electrode/separator/negative electrode to produce a battery element. This battery element was inserted into a bag constituted of a laminated film obtained by coating both sides of aluminum (thickness, 40 μm) with a resin layer, with terminals of the positive and negative electrodes projecting outward. Thereafter, 0.5 mL of the nonaqueous electrolyte was introduced into the bag, and this bag was vacuum-sealed to produce a sheet battery.

<Evaluation of Nonaqueous-Electrolyte Secondary Battery for High-Temperature Storability>

The battery in a sheet form was evaluated in the state of being sandwiched between glass plates in order to enhance contact between the electrodes. At 25° C., this battery was subjected to 3 cycles of charge/discharge at a constant current corresponding to 0.2 C and at a final charge voltage of 4.2V and a final discharge voltage of 3V to stabilize the battery. In the fourth cycle, the battery was subjected to 4.4V constant-current constant-voltage charge (CCCV charge) (0.05 C cutting) in which the battery was charged to a final charge voltage of 4.4V at a current corresponding to 0.5 C and further charged until the charge current value reached a current value corresponding to 0.05 C. Thereafter, this battery was subjected to 3V discharge at a constant current corresponding to 0.2 C to determine the discharge capacity of the battery before high-temperature storage. This battery was subjected again to 4.4V CCCV (0.05 C cutting) charge and then stored at a high temperature under the conditions of 85° C. and 24 hours.

Before and after the high-temperature storage, the sheet battery was immersed in an ethanol bath. The amount of the gas evolved was determined from the resultant volume change. The battery which had undergone the storage was discharged at 25° C. and a constant current of 0.2 C to a final discharge voltage of 3V to obtain the residual capacity after the storage test. This battery was subjected again to 4.4V CCCV (0.05 C cutting) charge and then discharged to 3V at a current value corresponding to 0.2 C to determine the 0.2 C capacity and thereby obtain the 0.2 C capacity of the battery which had undergone the storage test. This capacity was taken as recovery capacity. "1 C" means a current value at which the battery can be fully charged by 1-hour charge.

The residual capacity and recovery capacity (%) in the case where the discharge capacity as measured before the high-temperature storage is taken as 100 are shown in Table 1.

Example 2 of Nonaqueous Electrolyte 1 to
Example 55 of Nonaqueous Electrolyte 1 and
Comparative Example 1 for Nonaqueous
Electrolyte 1 to Comparative Example 12 for
Nonaqueous Electrolyte 1

Desired aqueous electrolytes were prepared in the same manner as in Example 1 of Nonaqueous Electrolyte 1, except that the nonaqueous solvent and the monofluorophosphate and/or difluorophosphate which are shown in Tables 1 to 5 were used so as to result in the contents shown in Tables 1 to 5. Nonaqueous-electrolyte secondary batteries were produced and then evaluated for high-temperature storability in the same manner as in Example 1 of Nonaqueous Electrolyte 1. The results thereof are shown in Table 1 to Table 5.

TABLE 1

| | Nonaqueous solvent (mass %) | Monofluorophosphate and/or difluorophosphate (mass %) | Storage swell (mL) | Residual capacity (%) | Recovery capacity (%) |
|---|---|---|---|---|---|
| Example 1 | ethylene carbonate + ethyl methyl carbonate + fluoroethylene carbonate (35.4:63.6:1.0) | lithium difluorophosphate (0.5) | 0.18 | 82 | 89 |
| Example 2 | ethylene carbonate + ethyl methyl carbonate + fluoroethylene carbonate (35.7:64.1:0.2) | lithium difluorophosphate (0.5) | 0.14 | 80 | 87 |
| Example 3 | ethylene carbonate + ethyl methyl carbonate + fluoroethylene carbonate (34.0:61.0:5.0) | lithium difluorophosphate (0.5) | 0.22 | 83 | 88 |
| Example 4 | ethylene carbonate + ethyl methyl carbonate + 4,5-difluoroethylene carbonate (35.4:63.6:1.0) | lithium difluorophosphate (0.5) | 0.19 | 83 | 88 |
| Example 5 | ethylene carbonate + ethyl methyl carbonate + 4-fluoro-5-methylethylene carbonate (35.4:63.6:1.0) | lithium difluorophosphate (0.5) | 0.20 | 82 | 88 |
| Example 6 | ethylene carbonate + ethyl methyl carbonate + 4-(fluoromethyl)ethylene carbonate (35.4:63.6:1.0) | lithium difluorophosphate (0.5) | 0.21 | 81 | 86 |
| Example 7 | ethylene carbonate + ethyl methyl carbonate + 4-(trifluoromethyl)ethylene carbonate (35.4:63.6:1.0) | lithium difluorophosphate (0.5) | 0.22 | 83 | 89 |
| Example 8 | ethylene carbonate + ethyl methyl carbonate + fluoroethylene carbonate + 2,2-difluoroethyl methyl carbonate (35.4:63.6:0.5:0.5) | lithium difluorophosphate (0.5) | 0.20 | 82 | 87 |
| Example 9 | ethylene carbonate + ethyl methyl carbonate + fluoroethylene carbonate (35.4:63.6:1.0) | lithium difluorophosphate (0.1) | 0.22 | 81 | 85 |
| Example 10 | ethylene carbonate + ethyl methyl carbonate + fluoroethylene carbonate (35.4:63.6:1.0) | lithium difluorophosphate (1.0) | 0.13 | 81 | 87 |
| Example 11 | ethylene carbonate + ethyl methyl carbonate + fluoroethylene carbonate (35.4:63.6:1.0) | sodium difluorophosphate (0.5) | 0.20 | 83 | 87 |
| Example 12 | ethylene carbonate + ethyl methyl carbonate + fluoroethylene carbonate (35.4:63.6:1.0) | dilithium monofluorophosphate (0.5) | 0.21 | 82 | 85 |
| Example 13 | ethylene carbonate + ethyl methyl carbonate + fluoroethylene carbonate + vinylene carbonate (35.0:63.0:1.0:1.0) | lithium difluorophosphate (0.5) | 0.23 | 82 | 86 |

TABLE 2

| | Nonaqueous solvent (wt %) | Monofluorophosphate and/or difluorophosphate (wt %) | Storage swell (mL) | Residual capacity (%) | Recovery capacity (%) |
|---|---|---|---|---|---|
| Example 14 | fluoroethylene carbonate + ethyl methyl carbonate (38.8:61.2) | Lithium difluorophosphate (0.5) | 0.22 | 81 | 88 |
| Example 15 | fluoroethylene carbonate + ethyl methyl carbonate (20.7:79.3) | Lithium difluorophosphate (0.5) | 0.15 | 82 | 87 |

TABLE 2-continued

| | Nonaqueous solvent (wt %) | Monofluorophosphate and/or difluorophosphate (wt %) | Results of evaluation of high-temperature storability | | |
|---|---|---|---|---|---|
| | | | Storage swell (mL) | Residual capacity (%) | Recovery capacity (%) |
| Example 16 | fluoroethylene carbonate + ethyl methyl carbonate (59.6:40.4) | Lithium difluorophosphate (0.5) | 0.24 | 80 | 89 |
| Example 17 | fluoroethylene carbonate + ethylene carbonate + ethyl methyl carbonate (17.5:19.9:62.6) | Lithium difluorophosphate (0.5) | 0.16 | 81 | 89 |
| Example 18 | 4,5-difluoroethylene carbonate + ethyl methyl carbonate (38.9:61.1.0) | Lithium difluorophosphate (0.5) | 0.22 | 80 | 85 |
| Example 19 | 4-fluoro-5-methylethylene carbonate + ethyl methyl carbonate (36.5:63.5.0) | Lithium difluorophosphate (0.5) | 0.20 | 82 | 87 |
| Example 20 | 4-(fluoromethyl)ethylene carbonate + ethyl methyl carbonate (36.2:63.8) | Lithium difluorophosphate (0.5) | 0.18 | 80 | 85 |
| Example 21 | 4-(trifluoromethyl)ethylene carbonate + ethyl methyl carbonate (39.8:60.2) | Lithium difluorophosphate (0.5) | 0.17 | 81 | 86 |
| Example 22 | fluoroethylene carbonate + ethyl methyl carbonate (38.8:61.2) | Lithium difluorophosphate (0.1) | 0.24 | 80 | 84 |
| Example 23 | fluoroethylene carbonate + ethyl methyl carbonate (38.8:61.2) | Lithium difluorophosphate (1.0) | 0.16 | 81 | 87 |
| Example 24 | fluoroethylene carbonate + ethyl methyl carbonate (38.8:61.2) | Sodium difluorophosphate (0.5) | 0.20 | 80 | 87 |
| Example 25 | fluoroethylene carbonate + ethyl methyl carbonate (38.8:61.2) | Dilithium monofluorophosphate (0.5) | 0.22 | 81 | 86 |
| Example 26 | fluoroethylene carbonate + ethyl methyl carbonate + ethyl 2,2-difloroethyl carbonate (38.4:60.6:1.0) | Lithium difluorophosphate (0.5) | 0.21 | 82 | 87 |
| Example 27 | fluoroethylene carbonate + ethyl methyl carbonate + ethyl (2,2-difloroethyl) carbonate (38.1:51.6:10.3) | Lithium difluorophosphate (0.5) | 0.19 | 80 | 84 |
| Example 28 | fluoroethylene carbonate + ethyl methyl carbonate + bis(2,2,2-trifloroethyl) carbonate (37.2:50.3:12.5) | Lithium difluorophosphate (0.5) | 0.18 | 83 | 86 |
| Example 29 | fluoroethylene carbonate + ethyl methyl carbonate + vinylene carbonate (38.4:60.6:1.0) | Lithium difluorophosphate (0.5) | 0.24 | 82 | 88 |

TABLE 3

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Example 30 | ethylene carbonate + ethyl methyl carbonate + ethyl-(2,2-difluoroethyl) carbonate (35.4:63.6:1.0) | Lithium difluorophosphate (0.5) | 0.23 | 82 | 89 |
| Example 31 | ethylene carbonate + ethyl methyl carbonate + ethyl-(2,2-difluoroethyl) carbonate (35.7:64.1:0.2) | Lithium difluorophosphate (0.5) | 0.20 | 83 | 88 |
| Example 32 | ethylene carbonate + ethyl methyl carbonate + ethyl-(2,2-difluoroethyl) carbonate (34.0:61.0:5.0) | Lithium difluorophosphate (0.5) | 0.24 | 81 | 86 |

TABLE 3-continued

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Example 33 | ethylene carbonate + ethyl methyl carbonate + ethyl-(2,2,2-trifluoroethyl) carbonate (35.4:63.6:1.0) | Lithium difluorophosphate (0.5) | 0.23 | 83 | 88 |
| Example 34 | ethylene carbonate + ethyl methyl carbonate + bis(2,2,2-trifluoroethyl) carbonate (35.4:63.6:1.0) | Lithium difluorophosphate (0.5) | 0.21 | 82 | 88 |
| Example 35 | ethylene carbonate + ethyl methyl carbonate + fluoromethyl methyl carbonate (35.4:63.6:1.0) | Lithium difluorophosphate (0.5) | 0.22 | 81 | 88 |
| Example 36 | ethylene carbonate + ethyl methyl carbonate + bis(monofluoromethyl) carbonate (35.4:63.6:1.0) | Lithium difluorophosphate (0.5) | 0.22 | 82 | 87 |
| Example 37 | ethylene carbonate + ethyl methyl carbonate + ethyl-(2,2-difluoroethyl) carbonate (35.4:63.6:1.0) | Lithium difluorophosphate (0.1) | 0.25 | 81 | 85 |
| Example 38 | ethylene carbonate + ethyl methyl carbonate + ethyl-(2,2-difluoroethyl) carbonate (35.4:63.6:1.0) | Lithium difluorophosphate (1.0) | 0.16 | 81 | 88 |
| Example 39 | ethylene carbonate + ethyl methyl carbonate + ethyl-(2,2-difluoroethyl) carbonate (35.4:63.6:1.0) | Sodium difluorophosphate (0.5) | 0.24 | 83 | 88 |
| Example 40 | ethylene carbonate + ethyl methyl carbonate + ethyl-(2,2-difluoroethyl) carbonate (35.4:63.6:1.0) | Dilithium monofluorophosphate (0.5) | 0.23 | 82 | 86 |
| Example 41 | ethylene carbonate + ethyl methyl carbonate + ethyl-(2,2-difluoroethyl) carbonate + vinylene carbonate (35.0:63.0:1.0:1.0) | Lithium difluorophosphate (0.5) | 0.25 | 83 | 89 |

TABLE 4

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Example 42 | ethylene carbonate + ethyl-(2,2-difluoroethyl) carbonate (31.8:68.2) | Lithium difluorophosphate (0.5) | 0.21 | 80 | 86 |
| Example 43 | ethylene carbonate + ethyl-(2,2-difluoroethyl) carbonate (16.1:83.9) | Lithium difluorophosphate (0.5) | 0.22 | 81 | 87 |
| Example 44 | ethylene carbonate + ethyl-(2,2-difluoroethyl) carbonate (52.1:47.9) | Lithium difluorophosphate (0.5) | 0.20 | 80 | 85 |
| Example 45 | ethylene carbonate + ethyl methyl carbonate + ethyl-(2,2-difluoroethyl) carbonate (35.1:54.1:10.8) | Lithium difluorophosphate (0.5) | 0.20 | 80 | 87 |
| Example 46 | ethylene carbonate + ethyl methyl carbonate + ethyl-(2,2,2-trifluoroethyl) carbonate (35.0:54.0:11.0) | Lithium difluorophosphate (0.5) | 0.22 | 82 | 89 |
| Example 47 | ethylene carbonate + ethyl methyl carbonate + bis(2,2,2-trifluoroethyl) carbonate (34.2:52.7:13.1) | Lithium difluorophosphate (0.5) | 0.22 | 81 | 89 |
| Example 48 | ethylene carbonate + ethyl methyl carbonate + | Lithium difluorophosphate (0.5) | 0.19 | 79 | 85 |

TABLE 4-continued

|  | Nonaqueous solvent (mass %) | Monofluorophosphate and/or difluorophosphate (mass %) | Results of evaluation of high-temperature storability | | |
|---|---|---|---|---|---|
|  |  |  | Storage swell (mL) | Residual capacity (%) | Recovery capacity (%) |
|  | fluoromethyl methyl carbonate (35.0:54.0:11.0) |  |  |  |  |
| Example 49 | ethylene carbonate + ethyl methyl carbonate + bis(monofluoromethyl) carbonate (34.5:53.2:12.3) | Lithium difluorophosphate (0.5) | 0.19 | 78 | 85 |
| Example 50 | ethylene carbonate + ethyl 2,2-difluoroethyl carbonate (31.8:68.2) | Lithium difluorophosphate (0.1) | 0.24 | 80 | 83 |
| Example 51 | ethylene carbonate + ethyl-(2,2-difluoroethyl) carbonate (31.8:68.2) | Lithium difluorophosphate (1.0) | 0.15 | 79 | 87 |
| Example 52 | ethylene carbonate + ethyl-(2,2-difluoroethyl)carbonate (31.8:68.2) | Sodium difluorophosphate (0.5) | 0.22 | 82 | 87 |
| Example 53 | ethylene carbonate + ethyl-(2,2-difluoroethyl) carbonate (31.8:68.2) | Dilithium monofluorophosphate (0.5) | 0.21 | 80 | 84 |
| Example 54 | ethylene carbonate + ethyl-(2,2-difluoroethyl) carbonate + fluoroethylene carbonate (31.5:67.5:1.0) | Lithium difluorophosphate (0.5) | 0.22 | 81 | 86 |
| Example 55 | ethylene carbonate + ethyl-(2,2-difluoroethyl) carbonate + vinylene carbonate (31.5:67.5:1.0) | Lithium difluorophosphate (0.5) | 0.24 | 82 | 87 |

TABLE 5

|  | Nonaqueous solvent (mass %) | Monofluorophosphate and/or difluorophosphate (mass %) | Results of evaluation of high-temperature storability | | |
|---|---|---|---|---|---|
|  |  |  | Storage swell (mL) | Residual capacity (%) | Recovery capacity (%) |
| Comparative Example 1 | ethylene carbonate + ethyl methyl carbonate (35.8:64.2) | — | 0.27 | 62 | 67 |
| Comparative Example 2 | ethylene carbonate + ethyl methyl carbonate + fluoroethylene carbonate (35.4:63.6:1.0) | — | 0.35 | 66 | 76 |
| Comparative Example 3 | ethylene carbonate + ethyl methyl carbonate (35.8:64.2) | lithium difluorophosphate (0.5) | 0.20 | 67 | 78 |
| Comparative Example 4 | ethylene carbonate + ethyl methyl carbonate + vinylene carbonate (35.4:63.6:1.0) | — | 0.42 | 67 | 83 |
| Comparative Example 5 | ethylene carbonate + ethyl methyl carbonate + fluoroethylene carbonate + vinylene carbonate (35.0:63.0:1.0:1.0) | — | 0.45 | 68 | 83 |
| Comparative Example 6 | ethylene carbonate + ethyl methyl carbonate + vinylene carbonate (35.4:63.6:1.0) | lithium difluorophosphate (0.5) | 0.39 | 67 | 82 |
| Comparative Example 7 | fluoroethylene carbonate + ethyl methyl carbonate (38.8:61.2) | — | 0.37 | 70 | 80 |
| Comparative Example 8 | fluoroethylene carbonate + ethyl methyl carbonate + vinylene carbonate (38.4:60.6:1.0) | — | 0.47 | 70 | 84 |
| Comparative Example 9 | ethylene carbonate + ethyl methyl carbonate + ethyl difluoroethyl carbonate (35.4:63.6:1.0) | — | 0.33 | 67 | 74 |

TABLE 5-continued

|  | Nonaqueous solvent (mass %) | Monofluorophosphate and/or difluorophosphate (mass %) | Results of evaluation of high-temperature storability | | |
|---|---|---|---|---|---|
|  |  |  | Storage swell (mL) | Residual capacity (%) | Recovery capacity (%) |
| Comparative Example 10 | ethylene carbonate + ethyl methyl carbonate + ethyl difluoroethyl carbonate + vinylene carbonate (35.0:63.0:1.0:1.0) | — | 0.44 | 68 | 83 |
| Comparative Example 11 | ethylene carbonate + ethyl-(2,2-difluoroethyl) carbonate (31.8:68.2) | — | 0.30 | 68 | 80 |
| Comparative Example 12 | ethylene carbonate + ethyl-(2,2-difluoroethyl) carbonate + vinylene carbonate (31.5:67.5:1.0) | — | 0.45 | 68 | 84 |

The following is apparent from Table 1 to Table 5. The nonaqueous-electrolyte secondary batteries 1 produced using the nonaqueous electrolytes 1 of the invention, which contained at least one carbonate having a halogen atom and further contained a monofluorophosphate and/or a difluorophosphate, were inhibited from swelling during high-temperature storage and from deteriorating in battery characteristics represented by residual capacity and recovery capacity, as compared with the nonaqueous-electrolyte secondary batteries produced using the nonaqueous electrolytes containing one of these compounds (Comparative Example 2 for Nonaqueous Electrolyte 1, Comparative Example 3 for Nonaqueous Electrolyte 1, and Comparative Examples 5 to 12 for Nonaqueous Electrolyte 1) or using the nonaqueous electrolytes containing neither of those compounds (Comparative Example 1 for Nonaqueous Electrolyte 1 and Comparative Example 4 for Nonaqueous Electrolyte 1).

Specifically, the electrolytes produced in Example 1 of Nonaqueous Electrolyte 1 to Example 55 of Nonaqueous Electrolyte 1 were effective in inhibiting swelling during high-temperature storage and in inhibiting deterioration in battery characteristics, as compared with Comparative Example 1 for Nonaqueous Electrolyte 1 and Comparative Example 4 for Nonaqueous Electrolyte 1. Even when compared with the Comparative Examples for Nonaqueous Electrolyte 1 in which the electrolytes contained only either of a carbonate having a halogen atom and a monofluorophosphate and/or difluorophosphate, the Examples of Nonaqueous Electrolyte 1, in which the electrolytes contained both of these compounds, were ascertained to have been improved in both inhibition of swelling during high-temperature storage and inhibition of deterioration in battery characteristics (for example, comparison between Example 1 of Nonaqueous Electrolyte 1 and Comparative Example 2 for Nonaqueous Electrolyte 1; comparison between Example 1 of Nonaqueous Electrolyte 1 to Example 8 of Nonaqueous Electrolyte 1 and Comparative Example 3 for Nonaqueous Electrolyte 1; and comparison between Example 13 of Nonaqueous Electrolyte 1 and Comparative Example 5 for Nonaqueous Electrolyte 1). The same effect was observed also in the case where nonaqueous electrolytes contained vinylene carbonate, which is an example of the specific carbonate.

Example 56 of Nonaqueous Electrolyte 1 to Example 74 of Nonaqueous Electrolyte 1 and Comparative Example 13 for Nonaqueous Electrolyte 1 To Comparative Example 24 for Nonaqueous Electrolyte 1

<Production of Nonaqueous-Electrolyte Secondary Battery, 2>

Subsequently, nonaqueous-electrolyte secondary batteries were produced in the same manner as in Example 1 of Nonaqueous Electrolyte 1, except that the negative electrode used in Example 1 of Nonaqueous Electrolyte 1 was replaced with the silicon-alloy negative electrode described below, and that the nonaqueous electrolytes to be used were prepared in the following manner. The compounds shown in each of the rows of the Examples of Nonaqueous Electrolyte 1 and the Comparative Examples for Nonaqueous Electrolyte 1 in the column "Nonaqueous solvent" and the column "Monofluorophosphate and/or difluorophosphate" in Table 6 to Table 8 were mixed together in the proportion shown therein. Furthermore, $LiPF_6$ was dissolved as an electrolyte salt as as to result in a concentration of 1 mol/L. Thus, desired nonaqueous electrolytes (nonaqueous electrolytes of Example 56 of Nonaqueous Electrolyte 1 to Example 74 of Nonaqueous Electrolyte 1 and Comparative Example 13 for Nonaqueous Electrolyte 1 to Comparative Example 24 for Nonaqueous Electrolyte 1) were prepared and used.

[Production of Silicon-Alloy Negative Electrode]

As negative-electrode active materials, use was made of 73.2 parts by weight of silicon and 8.1 part by weight of copper as non-carbon materials and 12.2 parts by weight of an artificial-graphite powder ("KS-6", manufactured by Timcal). Thereto were added 54.2 parts by weight of an N-methylpyrrolidone solution containing 12 parts by weight of poly(vinylidene fluoride) (hereinafter abbreviated to "PVDF") and 50 parts by weight of N-methylpyrrolidine. The ingredients were mixed together by means of a disperser to slurry the mixture. The slurry obtained was evenly applied to a copper foil having a thickness of 18 μm as a negative-electrode current collector. This coating was first allowed to dry naturally and thereafter finally dried at 85° C. for a whole day and night under reduced pressure. The resultant coated foil was pressed so as to result in an electrode density of about 1.5 g/cm³. Thus, a negative electrode was obtained.

<Evaluation of Nonaqueous-Electrolyte Secondary Battery for High-Temperature Storability>

Each of the batteries in a sheet form was evaluated in the state of being sandwiched between glass plates in order to enhance contact between the electrodes. At 25° C., this battery was subjected to 3 cycles of charge/discharge at a constant current corresponding to 0.2 C and at a final charge voltage of 4.2V and a final discharge voltage of 3V to stabilize the battery. In the fourth cycle, the battery was subjected to 4.2V constant-current constant-voltage charge (CCCV charge) (0.05C cutting) in which the battery was charged to a final charge voltage of 4.2V at a current corresponding to 0.5 C and further charged until the charge current value reached a current value corresponding to 0.05 C. Thereafter, this battery was subjected to 3V discharge at a constant current corresponding to 0.2 C to determine the discharge capacity of the battery before high-temperature storage. This battery was subjected again to 4.2V-CCCV (0.05 C cutting) charge and then stored at a high temperature under the conditions of 85° C. and 3 days.

Before and after the high-temperature storage, the sheet battery was immersed in an ethanol bath. The amount of the gas evolved was determined from the resultant volume change. The battery which had undergone the storage was discharged at 25° C. and a constant current of 0.2 C to a final discharge voltage of 3V to obtain the residual capacity after the storage test. This battery was subjected again to 4.2V-CCCV (0.05 C cutting) charge and then discharged to 3V at a current value corresponding to 0.2 C to determine the 0.2 C capacity and thereby obtain the 0.2 C capacity of the battery which had undergone the storage test. This capacity was taken as recovery capacity. "1C" means a current value at which the battery can be fully charged by 1-hour charge.

The residual capacity and recovery capacity (%) in the case where the discharge capacity as measured before the high-temperature storage is taken as 100 are shown in Table 6 to Table 8.

TABLE 6

| | | | Results of evaluation of high-temperature storability | | |
|---|---|---|---|---|---|
| | Nonaqueous solvent (mass %) | Monofluorophosphate and/or difluorophosphate (mass %) | Storage swell (mL) | Residual capacity (%) | Recovery capacity (%) |
| Example 56 | ethylene carbonate + diethyl carbonate + fluoroethylene carbonate (36.3:62.7:1.0) | lithium difluorophosphate (0.5) | 0.25 | 82 | 89 |
| Example 57 | ethylene carbonate + diethyl carbonate + 4,5-difluoroethylene carbonate (36.3:62.7:1.0) | lithium difluorophosphate (0.5) | 0.26 | 84 | 90 |
| Example 58 | ethylene carbonate + diethyl carbonate + 4-(trifluoromethyl)ethylene carbonate (36.3:62.7:1.0) | lithium difluorophosphate (0.5) | 0.28 | 83 | 88 |
| Example 59 | ethylene carbonate + diethyl carbonate + fluoroethylene carbonate + vinylene carbonate (35.9:62.1:1.0:1.0) | lithium difluorophosphate (0.5) | 0.28 | 82 | 87 |
| Example 60 | fluoroethylene carbonate + diethyl carbonate (39.7:60.3) | lithium difluorophosphate (0.5) | 0.25 | 83 | 91 |
| Example 61 | fluoroethylene carbonate + ethylene carbonate + diethyl carbonate (17.9:20.3:61.8) | lithium difluorophosphate (0.5) | 0.22 | 81 | 88 |
| Example 62 | 4,5-difluoroethylene carbonate + diethyl carbonate (39.9:60.1) | lithium difluorophosphate (0.5) | 0.25 | 82 | 90 |
| Example 63 | 4-(trifluoromethyl)ethylene carbonate + diethyl carbonate (40.7:59.3) | lithium difluorophosphate (0.5) | 0.20 | 83 | 89 |
| Example 64 | fluoroethylene carbonate + diethyl carbonate + vinylene carbonate (39.7:59.3:1) | lithium difluorophosphate (0.5) | 0.27 | 84 | 91 |

TABLE 7

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Example 65 | ethylene carbonate + diethyl carbonate + ethyl-(2,2-difluoroethyl) carbonate (36.3:62.7:1.0) | lithium difluorophosphate (0.5) | 0.27 | 81 | 89 |
| Example 66 | ethylene carbonate + diethyl carbonate + ethyl-(2,2,2-trifluoroethyl) carbonate (36.3:62.7:1.0) | lithium difluorophosphate (0.5) | 0.27 | 82 | 89 |
| Example 67 | ethylene carbonate + diethyl carbonate + bis(2,2,2-trifluoroethyl) carbonate (36.3:62.7:1.0) | lithium difluorophosphate (0.5) | 0.25 | 83 | 88 |
| Example 68 | ethylene carbonate + diethyl carbonate + ethyl-(2,2-difluoroethyl) carbonate + vinylene carbonate (35.9:62.1:1.0:1.0) | lithium difluorophosphate (0.5) | 0.28 | 82 | 90 |
| Example 69 | ethylene carbonate + ethyl-(2,2-difluoroethyl) carbonate (31.8:68.2) | lithium difluorophosphate (0.5) | 0.25 | 82 | 88 |
| Example 70 | ethylene carbonate + diethyl carbonate + ethyl-(2,2-difluoroethyl) carbonate (35.9:53.1:11.0) | lithium difluorophosphate (0.5) | 0.24 | 81 | 86 |
| Example 71 | ethylene carbonate + diethyl carbonate + ethyl-(2,2,2-trifluoroethyl) carbonate (35.8:53.0:11.3) | lithium difluorophosphate (0.5) | 0.26 | 83 | 88 |
| Example 72 | ethylene carbonate + diethyl carbonate + bis(2,2,2-trifluoroethyl) carbonate (34.9:51.7:13.4) | lithium difluorophosphate (0.5) | 0.26 | 83 | 88 |
| Example 73 | ethylene carbonate + ethyl-(2,2-difluoroethyl) carbonate + fluoroethylene carbonate (31.5:67.5:1.0) | lithium difluorophosphate (0.5) | 0.25 | 83 | 88 |
| Example 74 | ethylene carbonate + ethyl-(2,2-difluoroethyl) carbonate + vinylene carbonate (31.5:67.5:1.0) | lithium difluorophosphate (0.5) | 0.28 | 83 | 89 |

TABLE 8

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Comparative Example 13 | ethylene carbonate + diethyl carbonate (36.6:63.4) | — | 0.31 | 60 | 69 |
| Comparative Example 14 | ethylene carbonate + diethyl carbonate + fluoroethylene carbonate (36.3:62.7:1.0) | — | 0.38 | 68 | 78 |
| Comparative Example 15 | ethylene carbonate + diethyl carbonate (36.6:63.4) | lithium difluorophosphate (0.5) | 0.24 | 64 | 78 |
| Comparative Example 16 | ethylene carbonate + diethyl carbonate + vinylene carbonate (36.3:62.7:1.0) | — | 0.45 | 67 | 82 |
| Comparative Example 17 | ethylene carbonate + diethyl carbonate + fluoroethylene carbonate + vinylene carbonate (35.9:62.1:10:1.0) | — | 0.49 | 70 | 83 |

TABLE 8-continued

| | Nonaqueous solvent (mass %) | Monofluorophosphate and/or difluorophosphate (mass %) | Results of evaluation of high-temperature storability | | |
|---|---|---|---|---|---|
| | | | Storage swell (mL) | Residual capacity (%) | Recovery capacity (%) |
| Comparative Example 18 | ethylene carbonate + diethyl carbonate + vinylene carbonate (36.3:62.7:1.0) | lithium difluorophosphate (0.5) | 0.38 | 68 | 82 |
| Comparative Example 19 | fluoroethylene carbonate + diethyl carbonate (39.7:60.3) | — | 0.42 | 74 | 82 |
| Comparative Example 20 | fluoroethylene carbonate + diethyl carbonate + vinylene carbonate (39.3:59.7:1.0) | — | 0.49 | 74 | 85 |
| Comparative Example 21 | ethylene carbonate + diethyl carbonate + ethyl difluoroethyl carbonate (39.3:59.7:1.0) | — | 0.35 | 68 | 76 |
| Comparative Example 22 | ethylene carbonate + diethyl carbonate + ethyl difluoroethyl carbonate + vinylene carbonate (35.9:62.1:1.0:1.0) | — | 0.47 | 69 | 80 |
| Comparative Example 23 | ethylene carbonate + ethyl-(2,2-difluoroethyl) carbonate (31.8:68.2) | — | 0.33 | 70 | 80 |
| Comparative Example 24 | ethylene carbonate + ethyl-(2,2-difluoroethyl) carbonate + vinylene carbonate (31.5:67.5:1.0) | — | 0.49 | 71 | 83 |

The following was ascertained as apparent from Table 6 to Table 8. Even in the case of using a negative-electrode active material containing silicon, which is a non-carbon material, the nonaqueous-electrolyte secondary batteries produced using the nonaqueous electrolytes 1 of the invention (Example 56 of Nonaqueous Electrolyte 1 to Example 74 of Nonaqueous Electrolyte 1), which contained at least one carbonate having a halogen atom and further contained a monofluorophosphate and/or a difluorophosphate, were inhibited from swelling during high-temperature storage and from deteriorating in battery characteristics represented by residual capacity and recovery capacity as in the case of using a carbon material as an active material, as compared with the nonaqueous-electrolyte secondary batteries produced using the nonaqueous electrolytes containing one of these compounds (Comparative Example 14 for Nonaqueous Electrolyte 1, Comparative Example 15 for Nonaqueous Electrolyte 1, and Comparative Examples 17 to 24 for Nonaqueous Electrolyte 1) or using the nonaqueous electrolytes containing neither of those compounds (Comparative Examples 13 and 16 for Nonaqueous Electrolyte 1). The same effect was observed also in the case of using nonaqueous electrolytes containing vinylene carbonate, which is an example of the specific carbonate.

Example 1 of Nonaqueous Electrolyte 2

<Production of Nonaqueous-Electrolyte Secondary Battery>
[Production of Positive Electrode]
A positive electrode was produced in the same manner as in [Production of Positive Electrode] in Example 1 of Nonaqueous Electrolyte 1.
[Production of Negative Electrode]
A negative electrode was produced in the same manner as in [Production of Negative Electrode] in Example 1 of Nonaqueous Electrolyte 1.

[Nonaqueous Electrolyte]
In a dry argon atmosphere, $LiPF_6$ which each had been sufficiently dried was dissolved, in an amount of 1 mol/L, in a nonaqueous solvent prepared by mixing ethylene carbonate (EC), ethyl methyl carbonate (EMC), and dimethoxyethane (DME), which is "a compound which is liquid at 25° C., has a permittivity of 5 or higher and a coefficient of viscosity of 0.6 cP or lower, and has a group constituting a heteroelement-containing framework (excluding carbonyl group)", in the proportion shown in Table 9. Thus, a nonaqueous electrolyte was prepared. Furthermore, a monofluorophosphate and/or a difluorophosphate was dissolved in the solution so as to result in the respective concentrations shown in Table 9. Thus, a desired nonaqueous electrolyte was obtained.
[Fabrication of Nonaqueous-Electrolyte Secondary Battery]
A battery was produced in the same manner as in [Fabrication of Nonaqueous-Electrolyte Secondary Battery] in Example 1 of Nonaqueous Electrolyte 1.
<Evaluation of Nonaqueous-Electrolyte Secondary Battery for High-Temperature Storability>
The battery in a sheet form was evaluated in the state of being sandwiched between glass plates in order to enhance contact between the electrodes. At 25° C., this battery was subjected to 3 cycles of charge/discharge at a constant current corresponding to 0.2 C and at a final charge voltage of 4.2V and a final discharge voltage of 3V to stabilize the battery. In the fourth cycle, the battery was subjected to 4.2V constant-current constant-voltage charge (CCCV charge) (0.05 C cutting) in which the battery was charged to a final charge voltage of 4.2V at a current corresponding to 0.5 C and further charged until the charge current value reached a current value corresponding to 0.05 C. Thereafter, this battery was subjected to 3V discharge at a constant current corresponding to 0.2 C to determine the discharge capacity of the battery before high-temperature storage. This battery was subjected again to 4.2V-CCCV (0.05 C cutting) charge and then stored at a high temperature under the conditions of 85° C. and 24 hours.

Before and after the high-temperature storage, the sheet battery was immersed in an ethanol bath. The amount of the gas evolved was determined from the resultant volume change. This gas amount was taken as "storage swell (mL)". The battery which had undergone the storage was discharged at 25° C. and a constant current of 0.2 C to a final discharge voltage of 3V to obtain the "residual capacity (%)" after the storage test. This battery was subjected again to 4.2V-CCCV (0.05 C cutting) charge and then discharged to 3V at a current value corresponding to 0.2 C to determine the 0.2 C capacity and thereby obtain the 0.2 C capacity of the battery which had undergone the storage test. This capacity was taken as "recovery capacity (%)". This battery was subjected once more to 4.2V-CCCV (0.05 C cutting) charge and then discharged to 3V at a current value corresponding to 1 C to determine the 0.2 C capacity and thereby obtain the 1 C capacity of the battery which had undergone the storage test. This capacity was divided by the 0.2 C capacity, and the resultant quotient was taken as "load characteristics (%)".

In Table 9 are shown the storage swell (mL), the residual capacity (%) and recovery capacity (%), which are values when the discharge capacity before the high-temperature storage is taken as 100, and the load characteristics (%). "1 C" means a current value at which the battery can be fully charged by 1-hour charge.

Example 2 of Nonaqueous Electrolyte 2 to
Example 10 of Nonaqueous Electrolyte 2 and
Comparative Example 4 for Nonaqueous
Electrolyte 2

Desired nonaqueous electrolytes were prepared in the same manner as in Example 1 of Nonaqueous Electrolyte 2, except that the kinds and contents of the nonaqueous solvent and the monofluorophosphate and/or difluorophosphate were changed to those shown in Table 9. Nonaqueous-electrolyte secondary batteries were produced and then evaluated for high-temperature storability in the same manner as in Example 1 of Nonaqueous Electrolyte 2. The results thereof are shown in Table 9.

Comparative Example 1 for Nonaqueous
Electrolyte 2 for Nonaqueous Electrolyte 2 to
Comparative Example 3 for Nonaqueous
Electrolyte 2

Desired nonaqueous electrolytes were prepared in the same manner as in Example 1 of Nonaqueous Electrolyte 2, except that the nonaqueous solvent only was used so as to result in the contents shown in Table 9. Nonaqueous-electrolyte secondary batteries were produced and then evaluated for high-temperature storability in the same manner as in Example 1 of Nonaqueous Electrolyte 2. The results thereof are shown in Table 9.

Example 11 of Nonaqueous Electrolyte 2 to
Example 12 of Nonaqueous Electrolyte 2 and
Comparative Example 5 for Nonaqueous
Electrolyte 2 to Comparative Example 7 for
Nonaqueous Electrolyte 2

Desired nonaqueous electrolytes were prepared in the same manner as in Example 1 of Nonaqueous Electrolyte 2, except that the nonaqueous solvent was used so as to result in the contents shown in Table 9 and that vinylene carbonate (VC) was used in an amount of 1% by mass based on the whole nonaqueous electrolyte. Nonaqueous-electrolyte secondary batteries were produced and then evaluated for high-temperature storability in the same manner as in Example 1 of Nonaqueous Electrolyte 2. The results thereof are shown in Table 9.

The symbols used for expressing nonaqueous solvents in Table 9 and the permittivities and viscosity coefficients thereof are as follows.

EC: ethylene carbonate (permittivity, 90; viscosity coefficient, 1.9)
EMC: ethyl methyl carbonate (permittivity, 2.9; viscosity coefficient, 0.7)
DME: dimethoxyethane (permittivity, 7.1; viscosity coefficient, 0.5)
EME: ethoxymethoxyethane (permittivity, 5.7; viscosity coefficient, 0.5)
DEE: diethoxyethane (permittivity, 5; viscosity coefficient, 0.6)
AN: acetonitrile (permittivity, 37.5; viscosity coefficient, 0.4)
PN: propionitrile (permittivity, 27.7; viscosity coefficient, 0.4)

TABLE 9

| No. | Nonaqueous solvent (vol %) | Monofluorophosphate and/or difluorophosphate (mass %) | Addition of vinylene carbonate (1 mass %) | Results of evaluation of high-temperature storability | | | |
|---|---|---|---|---|---|---|---|
| | | | | Storage swell (mL) | Residual capacity (%) | Recovery capacity (%) | Load characteristics (%) |
| Example 1 | EC:EMC:DME = 30:60:10 | lithium difluorophosphate (0.5) | not added | 0.20 | 68 | 73 | 79 |
| Example 2 | EC:EMC:DME = 30:60:10 | lithium difluorophosphate (0.1) | not added | 0.28 | 63 | 69 | 75 |
| Example 3 | EC:EMC:DME = 30:60:10 | lithium difluorophosphate (1.0) | not added | 0.16 | 70 | 75 | 82 |
| Example 4 | EC:EMC:DME = 30:60:10 | dilithium monofluorophosphate (0.1) | not added | 0.33 | 59 | 65 | 69 |
| Example 5 | EC:EMC:EME = 30:60:10 | lithium difluorophosphate (0.5) | not added | 0.16 | 70 | 74 | 77 |
| Example 6 | EC:EMC:DEE = 30:60:10 | lithium difluorophosphate (0.5) | not added | 0.16 | 71 | 75 | 75 |
| Example 7 | EC:EMC:DME = 30:65:5 | lithium difluorophosphate (0.5) | not added | 0.15 | 71 | 76 | 74 |
| Example 8 | EC:EMC:AN = 30:65:5 | lithium difluorophosphate (0.5) | not added | 0.25 | 65 | 67 | 82 |
| Example 9 | EC:EMC:AN = 30:60:10 | lithium difluorophosphate (0.5) | not added | 0.30 | 62 | 64 | 85 |
| Example 10 | EC:EMC:PN = 30:65:5 | lithium difluorophosphate (0.5) | not added | 0.23 | 67 | 70 | 80 |

TABLE 9-continued

| No. | Nonaqueous solvent (vol %) | Monofluorophosphate and/or difluorophosphate (mass %) | Addition of vinylene carbonate (1 mass %) | Results of evaluation of high-temperature storability | | |
|---|---|---|---|---|---|---|
| | | | | Storage swell (mL) | Residual capacity (%) | Recovery capacity (%) | Load characteristics (%) |
| Example 11 | EC:EMC:DME = 30:60:10 | lithium difluorophosphate (0.5) | added | 0.24 | 71 | 75 | 77 |
| Example 12 | EC:EMC:AN = 30:65:5 | lithium difluorophosphate (0.5) | added | 0.28 | 68 | 69 | 80 |
| Comparative Example 1 | EC:EMC = 30:70 | none | not added | 0.18 | 70 | 74 | 60 |
| Comparative Example 2 | EC:EMC:DME = 30:60:10 | none | not added | Unable to be measured | did not work | did not work | did not work |
| Comparative Example 3 | EC:EMC:AN = 30:65:5 | none | not added | Unable to be measured | did not work | did not work | did not work |
| Comparative Example 4 | EC:EMC = 30:70 | lithium difluorophosphate (0.5) | not added | 0.20 | 67 | 78 | 68 |
| Comparative Example 5 | EC:EMC = 30:70 | none | added | 0.37 | 75 | 85 | 64 |
| Comparative Example 6 | EC:EMC:DME = 30:60:10 | none | added | 3.2 | 43 | 52 | 30 |
| Comparative Example 7 | EC:EMC:AN = 30:65:5 | none | added | 3.6 | 25 | 32 | 25 |

The following is apparent from Table 9. The nonaqueous-electrolyte secondary batteries produced using the nonaqueous electrolytes of the invention, which contained a "compound which was liquid at 25° C., had a permittivity of 5 or higher and a coefficient of viscosity of 0.6 cP or lower, and had a group constituting a heteroelement-containing framework (excluding carbonyl group)" according to this invention and further contained a monofluorophosphate and/or a difluorophosphate, were inhibited from swelling during high-temperature storage beyond the range where battery operation was possible and were further inhibited from deteriorating in battery characteristics represented by residual capacity and recovery capacity, as compared with the nonaqueous-electrolyte secondary batteries produced using the nonaqueous electrolytes containing one of those compounds or containing neither of those compounds, while retaining the advantage of keeping resistance low, which advantage is inherent in the "compound which is liquid at 25° C., has a permittivity of 5 or higher and a coefficient of viscosity of 0.6 cP or lower, and has a group constituting a heteroelement-containing framework (excluding carbonyl group)". The batteries according to the invention, on the other hand, retained high load characteristics.

Specifically, the nonaqueous electrolytes produced in Example 1 of Nonaqueous Electrolyte 2 to Example 10 of Nonaqueous Electrolyte 2 compared favorably in swelling during high-temperature storage with the nonaqueous electrolytes produced in Comparative Example 1 for Nonaqueous Electrolyte 2 and Comparative Example 4 for Nonaqueous Electrolyte 2, which contained a difluorophosphate only. Furthermore, these nonaqueous electrolytes according to the invention were equal to or lower than these comparative nonaqueous electrolytes in the deterioration of battery characteristics. The nonaqueous electrolytes of the invention, on the other hand, enabled the batteries to retain high load characteristics, which show an advantage inherent in the "compound which is liquid at 25° C., has a permittivity of 5 or higher and a coefficient of viscosity of 0.6 cP or lower, and has a group constituting a heteroelement-containing framework (excluding carbonyl group)" according to the invention. The batteries of Comparative Example 2 for Nonaqueous Electrolyte 2 and Comparative Example 3 for Nonaqueous Electrolyte 2, in which a "compound which was liquid at 25° C., had a permittivity of 5 or higher and a coefficient of viscosity of 0.6 cP or lower, and had a group constituting a heteroelement-containing framework (excluding carbonyl group)" only was contained, deteriorated to such a degree that the batteries did not work. The difference between the batteries of the Examples and those of the Comparative Examples is clear.

Furthermore, as apparent from Comparative Example 6 for Nonaqueous Electrolyte 2 to Comparative Example 7 for Nonaqueous Electrolyte 2, the batteries, in which the nonaqueous electrolytes contained vinylene carbonate (VC) as an example of the specific carbonate, continued working in a certain degree. However, a comparison between these Comparative Examples and Example 1 of Nonaqueous Electrolyte 2 to Example 10 of Nonaqueous Electrolyte 2 shows that there is a large difference in load characteristics. This is because the coexistence of the three ingredients, i.e., a "compound which is liquid at 25° C., has a permittivity of 5 or higher and a coefficient of viscosity of 0.6 cP or lower, and has a group constituting a heteroelement-containing framework (excluding carbonyl group)", a difluorophosphoric acid, and vinylene carbonate, produced a further effect as in Example 11 of Nonaqueous Electrolyte 2 and Example 12 of Nonaqueous Electrolyte 2.

Examples of Nonaqueous Electrolyte 3 and Comparative Examples for Nonaqueous Electrolyte 3

The nonaqueous-electrolyte secondary batteries obtained in the following Examples of Nonaqueous Electrolyte 3 and Comparative Examples for Nonaqueous Electrolyte 3 were evaluated by the methods shown below.

<Measurement of Initial Discharge Capacity>

Each nonaqueous-electrolyte secondary battery was evaluated in the state of being sandwiched between glass plates in order to enhance contact between the electrodes. At 25° C., this battery was charged to 4.2V at a constant current corresponding to 0.2 C and then discharged to 3V at a constant current of 0.2 C. Three cycles of this charge/discharge were conducted to stabilize the battery. In the fourth cycle, the battery was charged to 4.2V at a constant current of 0.5 C, subsequently charged at a constant voltage of 4.2V until the current value reached 0.05 C, and then discharged to 3V at a constant current of 0.2 C to determine initial discharge capacity. "1 C" means a current value at which the reference capacity of the battery is discharged over 1 hour; "0.2 C" means the current value which is ⅕ the 1 C.

<Evaluation of Continuous-Charge Characteristics>

The nonaqueous-electrolyte secondary battery which had undergone the capacity evaluation test was immersed in an ethanol bath to measure the volume thereof. Thereafter, at 60° C., the battery was subjected to constant-current charge at a constant current of 0.5 C and, at the time when the voltage had reached 4.25V, the constant-current charge was changed to constant-voltage charge to conduct continuous charge for 1 week. This battery was cooled and then immersed in an ethanol bath to measure the volume thereof. The amount of the gas which had generated was determined from the volume change through the continuous charge. This gas amount was taken as "amount of gas evolved through continuous charge (mL)". After the determination of the amount of the gas evolved, the battery was discharged to 3V at 25° C. and a constant current of 0.2 C. Subsequently, this battery was charged to 4.2V at a constant current of 0.5 C, thereafter charged at a constant voltage of 4.2V until the current value reached 0.05 C, and then discharged to 3V at a constant current of 1 C to determine the 1 C discharge capacity of the battery which had undergone the continuous-charge test. The proportion of this 1 C discharge capacity after the continuous-charge test to the initial discharge capacity was determined, and this proportion was taken as "1 C discharge capacity after continuous charge (%)".

Example 1 Of Nonaqueous Electrolyte 3

<Production of Nonaqueous-Electrolyte Secondary Battery>
[Production of Negative Electrode]

Ninety-four parts by weight of a natural-graphite powder having a d value for the lattice plane (002) and a crystallite size (Lc), both determined by X-ray diffractometry, of 0.336 nm and 652 nm, respectively, an ash content of 0.07 parts by weight, a median diameter as determined by the laser diffraction/scattering method of 12 μm, a specific surface area as determined by the BET method of 7.5 m²/g, an R value ($=I_B/I_A$) as determined by Raman spectroscopy using an argon ion laser light of 0.12, and a half-value width for a peak in 1,570-1,620 cm$^{-1}$ range of 19.9 cm$^{-1}$ was mixed with 6 parts by weight of poly(vinylidene fluoride). N-Methyl-2-pyrrolidone was added to the mixture to slurry it. This slurry was evenly applied to one side of a copper foil having a thickness of 12 μm and dried. Thereafter, the coated foil was pressed so as to result in a negative-electrode active-material layer having a density of 1.67 g/cm³. Thus, a negative electrode was obtained.

[Production of Positive Electrode]

Ninety percent by mass lithium cobalt oxide (LiCoO$_2$) as a positive-electrode active material was mixed with 4% by mass carbon black and 6% by mass poly(vinylidene fluoride) (trade name "KF-1000", manufactured by Kureha Chemical). N-Methyl-2-pyrrolidone was added to the mixture to slurry it. This slurry was applied to each side of an aluminum foil having a thickness of 15 μm and dried. Thereafter, the coated foil was pressed so as to result in positive-electrode active-material layers having a density of 3.2 g/cm³. Thus, a positive electrode was obtained.

[Nonaqueous Electrolyte]

In a dry argon atmosphere, sufficiently dried LiPF$_6$ and vinylene carbonate were added, in concentrations of 1 mol/L and 2% by mass respectively, to a mixture of ethylene carbonate, ethyl methyl carbonate, and dimethyl carbonate (volume ratio, 2:4:4). The monofluorophosphate and/or difluorophosphate and the "compound A of the invention" were dissolved therein so as to result in the respective concentrations shown in Table 10. Thus, a desired nonaqueous electrolyte was obtained.

[Production of Nonaqueous-Electrolyte Secondary Battery]

The positive electrode and negative electrode described above and a separator made of polyethylene were superposed in the order of negative electrode/separator/positive electrode/separator/negative electrode to produce a battery element. This battery element was inserted into a bag constituted of a laminated film obtained by coating both sides of aluminum (thickness, 40 μm) with a resin layer, with terminals of the positive and negative electrodes projecting outward. Thereafter, the nonaqueous electrolyte was introduced into the bag, and this bag was vacuum-sealed to produce a sheet battery. This battery was subjected to the evaluation of continuous-charge characteristics described above. The results thereof are shown in Table 10.

Example 2 of Nonaqueous Electrolyte 3 to
Example 10 of Nonaqueous Electrolyte 3 and
Comparative Example 1 for Nonaqueous
Electrolyte 3 to Comparative Example 4 for
Nonaqueous Electrolyte 3

Desired nonaqueous electrolytes were prepared in the same manner as in Example 1 of Nonaqueous Electrolyte 3, except that the "monofluorophosphate and/or difluorophosphate" and "compound of the invention" shown in Table 10 were replaced with the kinds shown in Table 10 and used so as to result in the contents shown in Table 10. Nonaqueous-electrolyte secondary batteries were produced and then evaluated for continuous-charge characteristics in the same manner as in Example 1 of Nonaqueous Electrolyte 3. The results thereof are shown in Table 10.

TABLE 10

| No. | Monofluorophosphate and/or difluorophosphate (mass %) | Compound of the invention (mass %) | Amount of gas evolved through continuous charge (mL) | 1 C discharge capacity after continuous charge (%) |
| --- | --- | --- | --- | --- |
| Example 1 | Lithium difluorophosphate (0.5) | ethyl diethylphosphinate (0.5) | 0.39 | 67 |
| Example 2 | Lithium difluorophosphate (0.5) | Succinonitrile (0.5) | 0.36 | 61 |
| Example 3 | Lithium difluorophosphate (0.5) | methyl isocyanate (0.5) | 0.45 | 65 |
| Example 4 | Lithium difluorophosphate (0.5) | Hexafluorotricyclophosphazene (0.5) | 0.39 | 64 |

TABLE 10-continued

| No. | Monofluorophosphate and/or difluorophosphate (mass %) | Compound of the invention (mass %) | Amount of gas evolved through continuous charge (mL) | 1 C discharge capacity after continuous charge (%) |
|---|---|---|---|---|
| Example 5 | Lithium difluorophosphate (0.5) | 1,4-butanediol bis(2,2,2-trifluoroethanesulfonate) (0.5) | 0.40 | 65 |
| Example 6 | Lithium difluorophosphate (0.5) | di-n-butyl sulfide (0.2) | 0.44 | 64 |
| Example 7 | Lithium difluorophosphate (0.5) | di-n-butyl disulfide (0.2) | 0.43 | 64 |
| Example 8 | Lithium difluorophosphate (0.5) | Succinic anhydride (0.3) | 0.41 | 66 |
| Example 9 | Lithium difluorophosphate (0.5) | α-methyl-γ-butyrolactone (0.5) | 0.42 | 65 |
| Example 10 | Lithium difluorophosphate (0.5) | 2-propynyl acetate (0.5) | 0.44 | 64 |
| Comparative Example 1 | — | — | 0.53 | 62 |
| Comparative Example 2 | Lithium difluorophosphate (0.5) | — | 0.51 | 61 |
| Comparative Example 3 | — | ethyl diethylphosphinate (0.5) | 0.54 | 64 |
| Comparative Example 4 | — | Succinonitrile (0.5) | 0.40 | 48 |

The following is apparent from Table 10. The nonaqueous-electrolyte secondary batteries produced using the nonaqueous electrolytes of the invention, which contained a "compound A of the invention" and further contained a monofluorophosphate and/or difluorophosphate (Example 1 of Nonaqueous Electrolyte 3 to Example 10 of Nonaqueous Electrolyte 3), were inhibited from suffering gas evolution and battery characteristics deterioration during continuous charge as compared with the nonaqueous-electrolyte secondary batteries produced using the nonaqueous electrolytes containing one of those compounds (Comparative Example 2 for Nonaqueous Electrolyte 3 to Comparative Example 4 for Nonaqueous Electrolyte 3) or using the nonaqueous electrolyte containing neither of those compounds (Comparative Example 1 for Nonaqueous Electrolyte 3).

The batteries obtained in the following Examples of Nonaqueous Electrolyte 4 and Comparative Examples for Nonaqueous Electrolyte 4 were evaluated by the methods shown below.

[Evaluation of Initial Discharge Capacity]

Each lithium secondary battery was evaluated in the state of being sandwiched between glass plates in order to enhance contact between the electrodes. At 25° C., this battery was charged to 4.2V at a constant current corresponding to 0.2 C and then discharged to 3V at a constant current of 0.2 C. Three cycles of this charge/discharge were conducted to stabilize the battery. In the fourth cycle, the battery was charged to 4.2V at a constant current of 0.5 C, subsequently charged at a constant voltage of 4.2V until the current value reached 0.05 C, and then discharged to 3V at a constant current of 0.2 C to determine initial discharge capacity. "1 C" means a current value at which the reference capacity of the battery is discharged over 1-hour; "2 C" means the current value two times the 1 C and "0.2 C" means the current value which is ⅕ the 1 C.

[Evaluation of 2 C Discharge Capacity]

The battery which had undergone the test for evaluating initial discharge capacity was subjected at 25° C. to a test in which the battery was charged to 4.2V at a constant current of 0.5 C, subsequently charged at a constant voltage of 4.2V until value reached 0.05 C, and discharged to 3V at a constant current of 2 C. The proportion of the resultant discharge capacity (%) to the discharge capacity determined through the test for initial discharge capacity, which was taken as 100, was determined.

[Evaluation of High-Temperature Storability]

The battery which had undergone the capacity evaluation tests was charged to 4.2V at a constant current of 0.5 C and then charged at a constant voltage of 4.2V until the current value reached 0.05 C. This battery was stored at 85° C. for 24 hours and then cooled. Thereafter, this battery was subjected at 25° C. to a test in which the battery was discharged to 3V at a constant current of 0.2 C, charged to 4.2V at a constant current of 0.5 C, subsequently charged at a constant voltage of 4.2V until the current value reached 0.05 C, and then discharged to 3V at a constant current of 2 C. The proportion of the resultant discharge capacity (%) to the discharge capacity determined through the test for initial discharge capacity, which was taken as 100, was determined.

[Evaluation of Thermal Stability]

The battery was charged to 4.2V at a constant current corresponding to 0.2 C and then discharged to 3V at a constant current of 0.2 C. Three cycles of this charge/discharge were conducted to stabilize the battery. In the fourth cycle, the battery was charged to 4.2V at a constant current of 0.5 C and then charged at a constant voltage of 4.2V until the current value reached 0.05 C. The quantity of exothermic heat of this battery in a charged state was measured with a Calvet calorimeter over the range of from room temperature to 300° C.

Example 1 of Nonaqueous Electrolyte 4

[Production of Negative Electrode]

To 98 parts by weight of artificial-graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to one side of a copper foil having a thickness of 10

μm and dried. This coated foil was rolled with a pressing machine to a thickness of 75 μm, and a piece of a shape having an active-material layer size with a width of 30 mm and a length of 40 mm and having an uncoated area with a width of 5 mm and a length of 9 mm was cut out of the rolled sheet. Thus, a negative electrode was obtained.

[Production of Positive Electrode]

Ninety percent by mass lithium cobalt oxide ($LiCoC_2$) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one side of an aluminum foil having a thickness of 15 μm and dried. This coated foil was rolled with a pressing machine to a thickness of 80 μm, and a piece of a shape having an active-material layer size with a width of 30 mm and a length of 40 mm and having a uncoated area with a width of 5 mm and a length of 9 mm was cut out of the rolled sheet. Thus, a positive electrode was obtained.

[Production of Electrolyte]

In a dry argon atmosphere, 98 parts by weight of a mixture of sulfolane (SLF) and ethyl methyl carbonate (EMC; coefficient of viscosity at 25° C., 0.68 mPa·s) (volume ratio, 3:7) was mixed with 2 parts by weight of vinylene carbonate (VC). Subsequently, sufficiently dried $LiPF_6$ was dissolved therein so as to result in a proportion of 1.0 mol/L. Thus, an electrolyte was obtained.

[Production of Nonaqueous-Electrolyte Battery]

The positive electrode and negative electrode described above and a separator made of polyethylene were superposed in the order of negative electrode/separator/positive electrode to produce a battery element. This battery element was inserted into a bag constituted of a laminated film obtained by coating both sides of aluminum (thickness, 40 μm) with a resin layer, with terminals of the positive and negative electrodes projecting outward. Thereafter, the electrolyte was introduced into the bag, and this bag was vacuum-sealed to produce a sheet battery. This battery was evaluated. The components of the electrolyte and the results of the evaluation are shown in Table 11 and Table 12.

Example 2 of Nonaqueous Electrolyte 4

A sheet-form lithium secondary battery was produced and evaluated in the same manners as in Example 1 of Nonaqueous Electrolyte 4, except that vinylethylene carbonate (VEC) was used in place of the vinylene carbonate (VC) in the electrolyte of Example 1 of Nonaqueous Electrolyte 4. The components of the electrolyte and the results of the evaluation are shown in Table 11 and Table 12.

Example 3 of Nonaqueous Electrolyte 4

A sheet-form lithium secondary battery was produced and evaluated in the same manners as in Example 1 of Nonaqueous Electrolyte 4, except that fluoroethylene carbonate (FEC) was used in place of the vinylene carbonate (VC) in the electrolyte of Example 1 of Nonaqueous Electrolyte 4. The components of the electrolyte and the results of the evaluation are shown in Table 11 and Table 12.

Example 4 of Nonaqueous Electrolyte 4

A sheet-form lithium secondary battery was produced and evaluated in the same manners as in Example 1 of Nonaqueous Electrolyte 4, except that 0.5 parts by weight of $LiPO_2F_2$ was used in place of the vinylene carbonate (VC) in the electrolyte of Example 1 of Nonaqueous Electrolyte 4. The components of the electrolyte and the results of the evaluation are shown in Table 11 and Table 12.

Comparative Example 1 for Nonaqueous Electrolyte 4

A sheet-form lithium secondary battery was produced and evaluated in the same manners as in Example 1 of Nonaqueous Electrolyte 4, except that use was made of an electrolyte produced by dissolving sufficiently dried $LiPF_6$ in a mixture of sulfolane (SLF) and ethyl methyl carbonate (EMC) (volume ratio, 3:7) so as to result in a proportion of 1.0 mol/L. The components of the electrolyte and the results of the evaluation are shown in Table 11 and Table 12.

Comparative Example 2 for Nonaqueous Electrolyte 4

A sheet-form lithium secondary battery was produced and evaluated in the same manners as in Example 1 of Nonaqueous Electrolyte 4, except that use was made of an electrolyte produced by mixing 94 parts by weight of a mixture of sulfolane (SLF) and γ-butyrolactone (GBL; coefficient of viscosity at 25° C., 1.73 mPa·s) (volume ratio, 3:7) with 2 parts by weight of vinylene carbonate (VC), 2 parts by weight of vinylethylene carbonate (VEC), and 2 parts by weight of trioctyl phosphate (TOP) and then dissolving sufficiently dried $LiPF_6$ therein so as to result in a proportion of 1.0 mol/L. The components of the electrolyte and the results of the evaluation are shown in Table 11 and Table 12.

Comparative Example 3 For Nonaqueous Electrolyte 4

A sheet-form lithium secondary battery was produced and evaluated in the same manners as in Example 1 of Nonaqueous Electrolyte 4, except that use was made of an electrolyte produced by mixing 94 parts by weight of a mixture of sulfolane (SLF) and γ-butyrolactone (GBL) (volume ratio, 3:7) with 2 parts by weight of vinylene carbonate (VC), 2 parts by weight of vinylethylene carbonate (VEC), and 2 parts by weight of trioctyl phosphate (TOP) and then dissolving sufficiently dried $LiBF_4$ therein so as to result in a proportion of 1.0 mol/L. The components of the electrolyte and the results of the evaluation are shown in Table 11 and Table 12.

Comparative Example 4 For Nonaqueous Electrolyte 4

A sheet-form lithium secondary battery was produced and evaluated in the same manners as in Example 1 of Nonaqueous Electrolyte 4, except that use was made of an electrolyte produced by mixing 98 parts by weight of a mixture of γ-butyrolactone (GBL) and ethyl methyl carbonate (EMC) (volume ratio, 3:7) with 2 parts by weight of vinylene carbonate (VC) and then dissolving sufficiently dried $LiPF_6$ therein so as to result in a proportion of 1.0 mol/L. The components of the electrolyte and the results of the evaluation are shown in Table 11 and Table 12.

Comparative Example 5 for Nonaqueous Electrolyte 4

A sheet-form lithium secondary battery was produced and evaluated in the same manners as in Example 1 of Nonaqueous Electrolyte 4, except that use was made of an electrolyte produced by mixing 98 parts by weight of a mixture of ethylene carbonate (EC) and ethyl methyl carbonate (EMC) (volume ratio, 3:7) with 2 parts by weight of vinylene carbonate (VC) and then dissolving sufficiently dried $LiPF_6$ therein so as to result in a proportion of 1.0 mol/L. The components of the electrolyte and the results of the evaluation are shown in Table 11 and Table 12.

TABLE 11

| | Electrolyte | Solvent |
|---|---|---|
| Example 1 | $LiPF_6$ | SLF + EMC + VC |
| Example 2 | $LiPF_6$ | SLF + EMC + VEC |
| Example 3 | $LiPF_6$ | SLF + EMC + FEC |
| Example 4 | $LiPF_6$ | SLF + EMC + $LiPO_2F_2$ |
| Comparative Example 1 | $LiPF_6$ | SLF + EMC |
| Comparative Example 2 | $LiPF_6$ | SLF + GBL + VC + VEC + TOP |
| Comparative Example 3 | $LiBF_4$ | SLF + GBL + VC + VEC + TOP |
| Comparative Example 4 | $LiPF_6$ | GBL + EMC + VC |
| Comparative Example 5 | $LiPF_6$ | EC + EMC + VC |

TABLE 12

| | 2 C discharge capacity before 85° C. storage (%) | 2 C discharge capacity after 85° C. storage (%) |
|---|---|---|
| Example 1 | 83.1 | 82.6 |
| Example 2 | 82.5 | 81.8 |
| Example 3 | 87.4 | 80.8 |
| Example 4 | 89.7 | 85.5 |
| Comparative Example 1 | 66.1 | 55.4 |
| Comparative Example 2 | 48.3 | 3.4 |
| Comparative Example 3 | 26.0 | 14.1 |
| Comparative Example 4 | 89.8 | 70.2 |
| Comparative Example 5 | 89.1 | 84.7 |

Example 5 of Nonaqueous Electrolyte 4

A sheet-form lithium secondary battery was produced using the positive electrode, negative electrode, and electrolyte obtained by the same methods as in Example 3 of Nonaqueous Electrolyte 4. This battery was evaluated for thermal stability by thermal analysis. The results of the evaluation are shown in Table 13.

Comparative Example 6 for Nonaqueous Electrolyte 4

A sheet-form, lithium secondary battery was produced using the positive electrode, negative electrode, and electrolyte obtained by the same methods as in Comparative Example 4 for Nonaqueous Electrolyte 4. This battery was evaluated for thermal stability by thermal analysis. The results of the evaluation are shown in Table 13.

TABLE 13

| | Quantity of exothermic heat (J) |
|---|---|
| Example 5 | 382 |
| Comparative Example 6 | 605 |

The following was found as apparent from Table 11 to Table 13. The batteries employing the nonaqueous electrolytes according to the invention (Examples 1 to 4 of Nonaqueous Electrolyte 4) were excellent in high-current-density charge/discharge characteristics and high-temperature storability and further had high safety as can be seen from the small quantity of exothermic heat of the battery of Example 5 of Nonaqueous Electrolyte 4. On the other hand, the batteries employing the nonaqueous electrolytes which were not nonaqueous electrolytes of the invention (Comparative Example 1 for Nonaqueous Electrolyte 4 to Comparative Example 5 for Nonaqueous Electrolyte 4) were inferior in charge/discharge characteristics and high-temperature storability and had a large quantity of exothermic heat as in Comparative Example 6 for Nonaqueous Electrolyte 4.

[Production of Positive Electrode]

Ninety-two parts by weight of a lithium-transition metal composite oxide containing nickel, manganese, and cobalt ($LiNi_{0.33}Mn_{0.33}Co_{0.33}O_2$) was mixed with 4 parts by weight of poly(vinylidene fluoride) (hereinafter suitably referred to as "PVdF") and 4 parts by weight of acetylene black. N-Methylpyrrolidone was added to the mixture to slurry it. This slurry was applied to each side of a current collector made of aluminum, and dried. Thus, a positive electrode was obtained.

[Production of Negative Electrode]

Ninety-two parts by weight of a graphite powder was mixed with 8 parts by weight of PVdF. N-Methylpyrrolidone was added to the mixture to slurry it. This slurry was applied to one side of a current collector made of copper, and dried. Thus, a negative electrode was obtained.

[Production of Nonaqueous-Electrolyte Secondary Battery]

The positive electrode and negative electrode described above and a separator made of polyethylene were superposed in the order of negative electrode/separator/positive electrode/separator/negative electrode. The battery element thus obtained was wrapped in a cylindrical aluminum-laminated film. The electrolyte which will be described later was introduced into this package, which was then vacuum-sealed. Thus, a sheet-form nonaqueous-electrolyte secondary battery was produced. Furthermore, this sheet battery was pressed by being sandwiched between glass plates, in order to enhance contact between the electrodes.

[Capacity Evaluation]

In a 25° C. thermostatic chamber, the sheet-form non-aqueous-electrolyte secondary battery was subjected to constant-current constant-voltage charge (hereinafter suitably referred to as "CCCV charge") to 4.4V at 0.2 C and then discharged to 2.75 V at 0.2C. This operation was repeated three times to conduct conditioning. Thereafter, this battery was subjected again to CCCV charge to 4.4V at 0.2 C and discharged again to 2.75 V at 1 C to determine initial discharge capacity. The cutoff current in each charging operation was set at 0.05 C. Incidentally, "1 C" means a current value at which the whole capacity of the battery is discharged over 1 hour.

[Evaluation of 4.4V Continuous-Charge Characteristics]

The battery which had undergone the capacity evaluation test was placed in a 60° C. thermostatic chamber and subjected to constant-current charge at 0.2 C. At the time when the voltage had reached 4.4V, the constant-current charge was changed to constant-voltage charge. The battery was charged for 14 days and then cooled to 25° C. Subsequently, this battery was immersed in an ethanol bath to measure the buoyancy (Archimedes' principle), and the amount of the gas evolved was determined from the buoyancy. Furthermore, the degree of deterioration in capacity through the continuous charge was evaluated in the following manner. The battery was first discharged to 3V at 0.2 C, subsequently subjected to CCCV charge to 4.4V at 0.2 C, and then discharged to 2.75 V at 1C to measure the discharge capacity (recovery capacity) in this discharge. The capacity retention after the continuous charge was determined according to the following calculation equation. The larger the value of this property, the lower the deterioration of the battery.

Capacity retention after continuous 7-day charge (%)=[(recovery capacity after continuous 7-day charge)/(initial discharge capacity)]×100

Example 1 of Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 2:8; weight ratio, 24.7:75.3). This solution is referred to as base electrolyte (I). A nonaqueous electrolyte was prepared by adding 1,4,8,11-tetraazacyclotetradecane and vinylene carbonate (VC) to the base electrolyte (I) so as to result in concentrations of 0.1% by mass and 1% by mass, respectively, based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 2 of Nonaqueous Electrolyte 5

A nonaqueous electrolyte was prepared by adding 1,4,8,11-tetraazacyclotetradecane and fluoroethylene carbonate (FEC) to the base electrolyte (I) so as to result in concentrations of 0.1% by mass and 1% by mass, respectively, based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 3 of Nonaqueous Electrolyte 5

A nonaqueous electrolyte was prepared by adding 1,4,8,11-tetraazacyclotetradecane and lithium difluorophosphate ($LiPO_2F_2$) to the base electrolyte (I) so as to result in concentrations of 0.1% by mass and 0.5% by mass, respectively, based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 4 of Nonaqueous Electrolyte 5

A nonaqueous electrolyte was prepared by adding 1,4,8,11-tetraazacyclotetradecane to the base electrolyte (I) so as to result in a concentration of 0.02% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Example 5 of Nonaqueous Electrolyte 5

A nonaqueous electrolyte was prepared by adding 1,4,8,11-tetraazacyclotetradecane to the base electrolyte (I) so as to result in a concentration of 0.05% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 6 of Nonaqueous Electrolyte 5

A nonaqueous electrolyte was prepared by adding 1,4,8,11-tetraazacyclotetradecane to the base electrolyte (I) so as to result in a concentration of 0.1% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 7 of Nonaqueous Electrolyte 5

A nonaqueous electrolyte was prepared by adding 1,4,7,10-tetraazacyclododecane to the base electrolyte (I) so as to result in a concentration of 0.1% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 8 of Nonaqueous Electrolyte 5

A nonaqueous electrolyte was prepared by adding 1,4,8,11-tetramethyl-1,4,8,11-tetraazacyclotetradecane to the base electrolyte (I) so as to result in a concentration of 0.1% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 9 of Nonaqueous Electrolyte 5

A nonaqueous electrolyte was prepared by adding 1,4,8,11-tetraazacyclotetradecane-5,7-dione to the base electrolyte (I) so as to result in a concentration of 0.1% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 10 of Nonaqueous Electrolyte 5

A nonaqueous electrolyte was prepared by adding cyclo (β-alanylglycyl-β-alanylglycyl) to the base electrolyte (I) so as to result in a concentration of 0.02% by mass based on the nonaqueous electrolyte. Using this nonaqueous electrolyte, a nonaqueous-electrolyte secondary battery was produced by the method described above. This battery was subjected to the capacity evaluation and the evaluation of 4.4V continuous-charge characteristics. The results thereof are shown in Table 14.

Example 11 of Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 1:9; weight ratio, 12.7:87.3). This solution is referred to as base electrolyte (II). A nonaqueous electrolyte was prepared by adding 1,4,8,11-tetraazacyclotetradecane to the base electrolyte (II) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Example 12 of Nonaqueous Electrolyte 5

$LiPF_6$ as an electrolyte was dissolved, in a proportion of 1 mol/L, in a mixed solvent composed of fluoroethylene carbonate (FEC) as a cyclic carbonate and ethyl methyl carbonate (EMC) as an acyclic carbonate (mixing volume ratio, 1:9; weight ratio, 14.2:85.8). This solution is referred to as base electrolyte (III). A nonaqueous electrolyte was prepared by adding 1,4,8,11-tetraazacyclotetradecane to the base electrolyte (III) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Example 13 of Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 3:7; weight ratio, 36.0:64.0). This solution is referred to as base electrolyte (IV). A nonaqueous electrolyte was prepared by adding 1,4,8,11-tetraazacyclotetradecane to the base electrolyte (IV) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Example 14 of Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 4:6; weight ratio, 46.7:53.4). This solution is referred to as base electrolyte (V). A nonaqueous electrolyte was prepared by adding 1,4,8,11-tetraazacyclotetradecane-5,7-dione to the base electrolyte (V) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Example 15 of Nonaqueous Electrolyte 5

$LiPF_6$ as an electrolyte was dissolved, in a proportion of 1 mol/L, in a mixed solvent composed of ethylene carbonate (EC) and propylene carbonate (PC) as cyclic carbonates (mixing volume ratio, 5:5; weight ratio, 52.4:47.6). This solution is referred to as base electrolyte (VI). A nonaqueous electrolyte was prepared by adding 1,4,8,11-tetraazacyclotetradecane-5,7-dione to the base electrolyte (VI) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14. It can be seen that when a cyclic polyamide compound has been added, there is no limitation on the weight ratio of cyclic carbonates usable as solvents.

Comparative Example 1 for Nonaqueous Electrolyte 5

Using the base electrolyte (I) by itself, a nonaqueous-electrolyte secondary battery was produced by the method described above. This battery was subjected to the capacity evaluation and the evaluation of 4.4V continuous-charge characteristics. The results thereof are shown in Table 14.

Comparative Example 2 for Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 35:65; weight ratio, 41.4:58.6). This solution is referred to as base electrolyte (VII). A nonaqueous electrolyte was prepared by adding 1,4,8,11-tetraazacyclotetradecane to the base electrolyte (VII) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

Comparative Example 3 For Nonaqueous Electrolyte 5

$LiPF_6$ as an electrolyte was dissolved, in a proportion of 1 mol/L, in a mixed solvent composed of ethylene carbonate (EC) as a cyclic carbonate and ethyl methyl carbonate (EMC) as an acyclic carbonate (mixing volume ratio, 4:6; weight ratio, 46.7:53.4). This solution is referred to as base electrolyte (V). A nonaqueous electrolyte was prepared by adding 1,4,8,11-tetraazacyclotetradecane to the base electrolyte (V) so as to result in a concentration of 0.1% by mass based on the nonaqueous electrolyte. Using the nonaqueous electrolyte obtained, a nonaqueous-electrolyte secondary battery was produced by the method described above. This battery was subjected to the capacity evaluation and the evaluation of 4.4V continuous-charge characteristics. The results thereof are shown in Table 14.

organic solvents which contained a cyclic polyamine compound and further contained a cyclic carbonate in an amount exceeding 40% by mass as in Comparative Example 2 for Nonaqueous Electrolyte 5 and Comparative Example 3 for Nonaqueous Electrolyte 5, the batteries had poor continuous-charge characteristics.

<Production of Secondary Battery>
[Production of Positive Electrode]
A positive electrode was produced in the same manner as in [Production of Positive Electrode] in Example 1 of Nonaqueous Electrolyte 1.

TABLE 14

| No. | Cyclic polyamine compound or cyclic polyamide compound (mass % based on nonaqueous electrolyte) | Specific compound (mass % based on nonaqueous electrolyte) | Nonaqueous organic solvent (volume ratio) | Nonaqueous organic solvent (mass ratio) | After continuous-charge test | |
|---|---|---|---|---|---|---|
| | | | | | Gas amount (mL) | Capacity retention (%) |
| Example 1 | cyclam 0.1% | VC 1% | EC/EMC = 2/8 | EC/EMC = 24.7/75.3 | 0.32 | 65.6 |
| Example 2 | cyclam 0.1% | FEC 1% | EC/EMC = 2/8 | EC/EMC = 24.7/75.3 | 0.33 | 67.5 |
| Example 3 | cyclam 0.1% | $LiPO_2F_2$ 0.5% | EC/EMC = 2/8 | EC/EMC = 24.7/75.3 | 0.19 | 70.6 |
| Example 4 | cyclam 0.02% | none | EC/EMC = 2/8 | EC/EMC = 24.7/75.3 | 0.24 | 63.8 |
| Example 5 | cyclam 0.05% | none | EC/EMC = 2/8 | EC/EMC = 24.7/75.3 | 0.23 | 65.0 |
| Example 6 | cyclam 0.1% | none | EC/EMC = 2/8 | EC/EMC = 24.7/75.3 | 0.28 | 61.9 |
| Example 7 | cyclen 0.1% | none | EC/EMC = 2/8 | EC/EMC = 24.7/75.3 | 0.27 | 55.6 |
| Example 8 | TM-cyclam 0.1% | none | EC/EMC = 2/8 | EC/EMC = 24.7/75.3 | 0.18 | 53.8 |
| Example 9 | DO-cyclam 0.1% | none | EC/EMC = 2/8 | EC/EMC = 24.7/75.3 | 0.28 | 64.4 |
| Example 10 | TetO-cyclam 0.02% | none | EC/EMC = 2/8 | EC/EMC = 24.7/75.3 | 0.22 | 65.0 |
| Example 11 | cyclam 0.1% | none | EC/EMC = 1/9 | EC/EMC = 12.7/87.3 | 0.20 | 61.3 |
| Example 12 | cyclam 0.1% | none | FEC/EMC = 1/9 | FEC/EMC = 14.2/85.8 | 0.32 | 66.3 |
| Example 13 | cyclam 0.1% | none | EC/EMC = 3/7 | EC/EMC = 36.0/64.0 | 0.35 | 60.0 |
| Example 14 | DO-cyclam 0.1% | none | EC/EMC = 4/6 | EC/EMC = 46.7/53.4 | 0.35 | 56.9 |
| Example 15 | DO-cyclam 0.1% | none | EC/PC = 5/5 | EC/PC = 52.4/47.6 | 0.39 | 59.4 |
| Comparative Example 1 | none | none | EC/EMC = 2/8 | EC/EMC = 24.7/75.3 | 0.82 | 43.8 |
| Comparative Example 2 | cyclam 0.1% | none | EC/EMC = 35/65 | EC/EMC = 41.4/58.6 | 0.71 | 48.1 |
| Comparative Example 3 | cyclam 0.1% | none | EC/EMC = 4/6 | EC/EMC = 46.7/53.4 | 0.98 | 40.6 |

The symbols each used for expressing a cyclic polyamine compound or cyclic polyamide compound in Table 14 are as follows.
cyclam: 1,4,8,11-tetraazacyclotetradecane
cyclen: 1,4,7,10-tetraazacyclododecane
TM-cyclam: 1,4,8,11-tetramethyl-1,4,8,11-tetraazacyclotetradecane
DO-cyclam: 1,4,8,11-tetraazacyclotetradecane-5,7-dione
TetO-cyclam: cyclo(β-alanylglycyl-β-alanylglycyl)
In Table 14, the "specific compound" means "at least one compound selected from the group consisting of unsaturated carbonates, fluorine-containing carbonates, monofluorophosphates, and difluorophosphates". The symbols used for expressing "specific compounds" are as follows.
VC: vinylene carbonate
FEC: fluoroethylene carbonate
$LiPO_2F_2$: lithium difluorophosphate
The following is apparent from Table 14. Use of the nonaqueous electrolytes according to the invention improved continuous-charge characteristics (Examples 1 to 15 of Nonaqueous Electrolyte 5). On the other hand, in the case of the nonaqueous electrolytes which were not nonaqueous electrolytes according to the invention (i.e., in the case of the nonaqueous electrolytes falling under none of embodiment 5-1, embodiment 5-2, and embodiment 5-3), the batteries were inferior in continuous-charge characteristics (Comparative Examples 1 to 3 for Nonaqueous Electrolyte 5). Furthermore, in the case of the nonaqueous

[Production of Negative Electrode]
A negative electrode was produced in the same manner as in [Production of Negative Electrode] in Example 1 of Nonaqueous Electrolyte 1.
[Nonaqueous Electrolyte]

Example 1 of Nonaqueous Electrolyte 6

One mol/L $LiPF_6$, 0.05 mol/L lithium salt of cyclic 1,2-perfluoroethane disulfonylimide, which is the cyclic disulfonylimide salt shown in Table 15, and 0.5% by mass lithium difluorophosphate which each had been sufficiently dried were dissolved in a mixture of ethylene carbonate and ethyl methyl carbonate (volume ratio, 3:7) in a dry argon atmosphere. Thus, a desired nonaqueous electrolyte was obtained.
[Fabrication of Battery]
A battery was produced in the same manner as in [Fabrication of Battery] in Example 1 of Nonaqueous Electrolyte 1.
[Evaluation of Battery]
The battery in a sheet form was evaluated in the state of being sandwiched between glass plates in order to enhance contact between the electrodes. At 25° C., this battery was subjected to 3 cycles of charge/discharge at a constant current corresponding to 0.2 C and at a final charge voltage of 4.2V and a final discharge voltage of 3V to stabilize the battery. In the fourth cycle, the battery was subjected to 4.4V constant-current constant-voltage charge (CCCV charge)

(0.05 C cutting) in which the battery was charged to a final charge voltage of 4.4V at a current corresponding to 0.5 C and further charged until the charge current value reached a current value corresponding to 0.05 C. Thereafter, this battery was subjected to 3V discharge at a constant current corresponding to 0.2 C to determine the discharge capacity of the battery before high-temperature storage. This battery was subjected again to 4.4V-CCCV (0.05 C cutting) charge and then stored at a high temperature under the conditions of 85° C. and 24 hours.

Before and after the high-temperature storage, the sheet battery was immersed in an ethanol bath. The amount of the gas evolved was determined from the resultant volume change. The battery which had undergone the storage was discharged at 25° C. and a constant current of 0.2 C to a final discharge voltage of 3V to obtain the residual capacity after the storage test. This battery was subjected again to 4.4V-CCCV (0.05 C cutting) charge and then discharged to 3V at a current value corresponding to 0.2 C to determine the 0.2 C capacity and thereby obtain the 0.2 C capacity of the battery which had undergone the storage test. This capacity was taken as recovery capacity. "1 C" means a current value at which the battery can be fully charged by 1-hour charge. The residual capacity and recovery capacity (%) in the case where the discharge capacity as measured before the high-temperature storage is taken as 100 are shown in Table 15.

Example 2 of Nonaqueous Electrolyte 6

A nonaqueous-electrolyte secondary battery was produced in the same manner as in Example 1 of Nonaqueous Electrolyte 6, except that the lithium salt of cyclic 1,2-perfluoroethanedisulfonylimide, which is a cyclic disulfonylimide salt, was used in an amount of 0.1 mol/L. This battery was evaluated, and the results thereof are shown in Table 15.

Example 3 of Nonaqueous Electrolyte 6

A nonaqueous-electrolyte secondary battery was produced in the same manner as in Example 1 of Nonaqueous Electrolyte 6, except that the lithium salt of cyclic 1,2-perfluoroethanedisulfonylimide, which is a cyclic disulfonylimide salt, was used in an amount of 0.01 mol/L. This battery was evaluated, and the results thereof are shown in Table 15.

Example 4 of Nonaqueous Electrolyte 6

A nonaqueous-electrolyte secondary battery was produced in the same manner as in Example 1 of Nonaqueous Electrolyte 6, except that the lithium salt of cyclic 1,2-perfluoroethanedisulfonylimide, which is a cyclic disulfonylimide salt, was used in an amount of 0.05 mol/L. This battery was evaluated, and the results thereof are shown in Table 15.

Example 5 of Nonaqueous Electrolyte 6

A nonaqueous-electrolyte secondary battery was produced in the same manner as in Example 1 of Nonaqueous Electrolyte 6, except that the sodium salt of cyclic 1,2-perfluoroethanedisulfonylimide, which is a cyclic disulfonylimide salt, was used in an amount of 0.05 mol/L. This battery was evaluated, and the results thereof are shown in Table 15.

Example 6 of Nonaqueous Electrolyte 6

A nonaqueous-electrolyte secondary battery was produced in the same manner as in Example 1 of Nonaqueous Electrolyte 6, except that lithium difluorophosphate was used in an amount of 0.1% by mass. This battery was evaluated, and the results thereof are shown in Table 15.

Example 7 of Nonaqueous Electrolyte 6

A nonaqueous-electrolyte secondary battery was produced in the same manner as in Example 1 of Nonaqueous Electrolyte 6, except that lithium difluorophosphate was used in an amount of 1.0% by mass. This battery was evaluated, and the results thereof are shown in Table 15.

Example 8 of Nonaqueous Electrolyte 6

A nonaqueous-electrolyte secondary battery was produced in the same manner as in Example 1 of Nonaqueous Electrolyte 6, except that sodium difluorophosphate was used in an amount of 0.5% by mass. This battery was evaluated, and the results thereof are shown in Table 15.

Example 9 of Nonaqueous Electrolyte 6

A nonaqueous-electrolyte secondary battery was produced in the same manner as in Example 1 of Nonaqueous Electrolyte 6, except that lithium monofluorophosphate was used in an amount of 0.5% by mass. This battery was evaluated, and the results thereof are shown in Table 15.

Example 10 of Nonaqueous Electrolyte 6

A nonaqueous-electrolyte secondary battery was produced in the same manner as in Example 1 of Nonaqueous Electrolyte 6, except that a desired nonaqueous electrolyte was obtained by dissolving 1 mol/L sufficiently dried $LiPF_6$, 0.05 mol/L lithium salt of cyclic 1,2-perfloroethanedisulfonylimide, which is the cyclic disulfonylimide salt shown in Table 15, 0.5% by mass lithium difluorophosphate, and 1 part by weight of vinylene carbonate in a mixture of ethylene carbonate and ethyl methyl carbonate (volume ratio, 3:7) in a dry argon atmosphere. This battery was evaluated, and the results thereof are shown in Table 15.

Comparative Example 1 for Nonaqueous Electrolyte 6

A nonaqueous-electrolyte secondary battery was produced in the same manner as in Example 1 of Nonaqueous Electrolyte 6, except that a nonaqueous electrolyte was obtained by dissolving 1 mol/L sufficiently dried $LiPF_6$ in a mixture of ethylene carbonate and ethyl methyl carbonate (volume ratio, 3:7) in a dry argon atmosphere. This battery was evaluated, and the results thereof are shown in Table 15.

Comparative Example 2 for Nonaqueous Electrolyte 6

A nonaqueous-electrolyte secondary battery was produced in the same manner as in Example 1 of Nonaqueous Electrolyte 6, except that the 0.5% by mass lithium difluorophosphate was omitted. This battery was evaluated, and the results thereof are shown in Table 15.

Comparative Example 3 for Nonaqueous Electrolyte 6

A nonaqueous-electrolyte secondary battery was produced in the same manner as in Example 1 of Nonaqueous Electrolyte 6, except that the 0.05 mol/L lithium salt of cyclic 1,2-perfluoroethanedisulfonylimide, which is a cyclic disulfonylimide salt, was omitted. This battery was evaluated, and the results thereof are shown in Table 15.

Comparative Example 4 for Nonaqueous Electrolyte 6

A nonaqueous-electrolyte secondary battery was produced in the same manner as in Example 1 of Nonaqueous Electrolyte 6, except that a nonaqueous electrolyte was obtained by dissolving 1 mol/L sufficiently dried $LiPF_6$ and 1 part by weight of vinylene carbonate in a mixture of ethylene carbonate and ethyl methyl carbonate (volume ratio, 3:7) in a dry argon atmosphere. This battery was evaluated, and the results thereof are shown in Table 15.

and/or a difluorophosphate (Example 1 of Nonaqueous Electrolyte 6 to Example 10 of Nonaqueous Electrolyte 6), were inhibited from swelling during high-temperature storage and from deteriorating in battery characteristics represented by residual capacity and recovery capacity, as compared with the nonaqueous-electrolyte secondary batteries produced using the nonaqueous electrolytes containing one of these compounds (Comparative Example 2 for Nonaqueous Electrolyte 6 and Comparative Example 3 for Nonaqueous Electrolyte 6) or using a nonaqueous electrolyte containing neither of those compounds (Comparative Example 1 for Nonaqueous Electrolyte 6).

Furthermore, even when compared with Comparative Example 2 for Nonaqueous Electrolyte 6 and Comparative Example 3 for Nonaqueous Electrolyte 6, in which the nonaqueous electrolytes contained only either of a cyclic disulfonylimide salt represented by general formula (1) and a monofluorophosphate and/or difluorophosphate, Example 1 of Nonaqueous Electrolyte 6 to Example 10 of Nonaqueous Electrolyte 6, in which the nonaqueous electrolytes

TABLE 15

| | Cyclic disulfonylimide salt (mol/L) | Monofluorophosphate and/or difluorophosphate (wt %) | Presence or absence of vinylene carbonate | Results of evaluation of high-temperature storability | | |
|---|---|---|---|---|---|---|
| | | | | Storage swell (mL) | Residual capacity (%) | Recovery capacity (%) |
| Example 1 | lithium salt of cyclic 1,2-perfloroethanedisulfonylimide (0.05) | lithium difluorophosphate (0.5) | absent | 0.14 | 80 | 85 |
| Example 2 | lithium salt of cyclic 1,2-perfloroethanedisulfonylimide (0.1) | lithium difluorophosphate (0.5) | absent | 0.19 | 83 | 86 |
| Example 3 | lithium salt of cyclic 1,2-perfloroethanedisulfonylimide (0.01) | lithium difluorophosphate (0.5) | absent | 0.14 | 78 | 82 |
| Example 4 | lithium salt of cyclic 1,2-perfloropropanedisulfonylimide (0.05) | lithium difluorophosphate (0.5) | absent | 0.15 | 81 | 85 |
| Example 5 | sodium salt of cyclic 1,2-perfloroethanedisulfonylimide (0.05) | lithium difluorophosphate (0.5) | absent | 0.16 | 81 | 84 |
| Example 6 | lithium salt of cyclic 1,2-perfloroethanedisulfonylimide (0.05) | lithium difluorophosphate (0.1) | absent | 0.17 | 75 | 81 |
| Example 7 | lithium salt of cyclic 1,2-perfloroethanedisulfonylimide (0.05) | lithium difluorophosphate (1.0) | absent | 0.13 | 80 | 86 |
| Example 8 | lithium salt of cyclic 1,2-perfloroethanedisulfonylimide (0.05) | sodium difluorophosphate (0.5) | absent | 0.16 | 80 | 86 |
| Example 9 | lithium salt of cyclic 1,2-perfloroethanedisulfonylimide (0.05) | dilithium monofluorophosphate (0.5) | absent | 0.15 | 78 | 84 |
| Example 10 | lithium salt of cyclic 1,2-perfloroethanedisulfonylimide (0.05) | lithium difluorophosphate (0.5) | present | 0.27 | 82 | 86 |
| Comparative Example 1 | — | — | absent | 0.27 | 62 | 67 |
| Comparative Example 2 | lithium salt of cyclic 1,2-perfloroethanedisulfonylimide (0.05) | — | absent | 0.33 | 69 | 75 |
| Comparative Example 3 | — | lithium difluorophosphate (0.5) | absent | 0.20 | 67 | 78 |
| Comparative Example 4 | — | — | present | 0.42 | 67 | 83 |

The following is apparent from Table 15. The nonaqueous-electrolyte secondary batteries produced using the nonaqueous electrolytes of the invention, which contained at least one cyclic disulfonylimide salt represented by general formula (1) and further contained a monofluorophosphate contained both of these compounds, were ascertained to have been improved in both inhibition of swelling during high-temperature storage and inhibition of deterioration in battery characteristics. In addition, as apparent from a comparison between Example 10 of Nonaqueous Electrolyte 6 and Comparative Example 4 for Nonaqueous Electrolyte 6, the same effect was observed also in the case of using a nonaqueous electrolyte containing vinylene carbonate, which is an example of the specific carbonate.

INDUSTRIAL APPLICABILITY

<Nonaqueous Electrolytes 1 and 2 and Nonaqueous-Electrolyte Secondary Batteries 1 and 2>

According to nonaqueous electrolytes 1 and 2 of the invention, nonaqueous-electrolyte secondary batteries having a high energy density can be produced in which the electrolytes are inhibited from decomposing and which are inhibited from deteriorating when used in a high-temperature environment. These batteries further have high capacity and are excellent in storability and cycle characteristics. Consequently, these batteries are suitable for use in various fields where nonaqueous-electrolyte secondary batteries are used, e.g., in the field of electronic appliances.

<Nonaqueous Electrolyte 3 and Nonaqueous-Electrolyte Secondary Battery 3>

According to nonaqueous electrolyte 3 of the invention, a nonaqueous electrolyte and a nonaqueous-electrolyte secondary battery can be produced which are excellent in cycle characteristics, storability, inhibition of gas evolution during continuous charge, and battery characteristics. Consequently, this battery is suitable for use in various fields where nonaqueous-electrolyte secondary batteries are used, e.g., in the field of electronic appliances.

<Nonaqueous Electrolyte 4 and Nonaqueous-Electrolyte Secondary Battery 4>

Nonaqueous-electrolyte secondary battery 4, which employs nonaqueous electrolyte 4 of the invention, retains high capacity and is excellent in safety, etc. This battery can hence be used in various known applications.

<Nonaqueous Electrolyte 5 and Nonaqueous-Electrolyte Secondary Battery 5>

Nonaqueous-electrolyte secondary battery 5, which employs nonaqueous electrolyte 5 of the invention, retains high capacity and is excellent in continuous-charge characteristics, etc. This battery can hence be used in various known applications.

<Nonaqueous Electrolyte 6 and Nonaqueous-Electrolyte Secondary Battery 6>

According to nonaqueous electrolyte 6 of the invention, a nonaqueous-electrolyte secondary battery having a high energy density can be produced in which the nonaqueous electrolyte is inhibited from decomposing and which is inhibited from deteriorating when used in a high-temperature environment. This battery further has high capacity and is excellent in storability and cycle characteristics. Consequently, this battery is suitable for use in various fields where nonaqueous-electrolyte secondary batteries are used, e.g., in the field of electronic appliances.

Applications of nonaqueous electrolytes 1 to 6 for secondary batteries and nonaqueous-electrolyte secondary batteries 1 to 6 of the invention are not particularly limited, and these electrolytes and batteries can be used in various known applications. Examples thereof include notebook personal computers, pen-input personal computers, mobile personal computers, electronic-book players, portable telephones, portable facsimile telegraphs, portable copiers, portable printers, headphone stereos, video movie cameras, liquid-crystal TVs, handy cleaners, portable CD players, mini-disk players, transceivers, electronic pocketbooks, electronic calculators, memory cards, portable tape recorders, radios, backup power sources, motors, motor vehicles, motorbikes, bicycles fitted with a motor, bicycles, illuminators, toys, game machines, clocks and watches, power tools, stroboscopes, and cameras, and the like.

This application is based on the following Japanese patent applications, the entire contents thereof being herein incorporated as a disclosure of the description of the invention.

Nonaqueous electrolyte 1: Application No. 2007-116442 (filing date: Apr. 26, 2007)

Nonaqueous electrolyte 2: Application No. 2007-116445 (filing date: Apr. 26, 2007)

Nonaqueous electrolyte 3: Application No. 2007-116450 (filing date: Apr. 26, 2007)

Nonaqueous electrolyte 4: Application No. 2007-111961 (filing date: Apr. 20, 2007)

Nonaqueous electrolyte 5: Application No. 2007-099274 (filing date: Apr. 5, 2007)

Nonaqueous electrolyte 6: Application No. 2007-111931 (filing date: Apr. 20, 2007)

The invention claimed is:

1. A nonaqueous electrolyte solution comprising:
an electrolyte;
a nonaqueous solvent dissolving the electrolyte; and
from 0.001-0.5% by mass of at least one compound selected from the group consisting of a monofluorophosphate and a difluorophosphate;
wherein
the nonaqueous solvent comprises:
(A) a cyclic sulfone compound in an amount of 10-70% by volume, based on a total volume of the nonaqueous solvent; and
(B) a compound having a coefficient of viscosity at 25° C. of 1.5 mPa·s or lower in an amount of 30-90% by volume, based on a total volume of the nonaqueous solvent; and
wherein the compound (B) is at least one selected from the group consisting of an acyclic carbonate, an acyclic carboxylic acid ester, an acyclic ether, and a cyclic ether, and
the coefficient of viscosity is measured with an Ostwald viscometer.

2. The nonaqueous electrolyte solution according to claim 1, wherein the cyclic sulfone compound (A) is at least one selected from the group consisting of a sulfolane and a sulfolane derivative.

3. The nonaqueous electrolyte solution according to claim 1, wherein the compound (B) is at least one selected from the group consisting of a dimethyl carbonate, a diethyl carbonate, ethyl methyl carbonate, methyl acetate, methyl propionate, methyl butyrate, and 1,2-dimethoxyethane.

4. The nonaqueous electrolyte solution according to claim 1, wherein the monofluorophosphate is present and is at least one selected from the group consisting of $Li_2PO_3F$, $Na_2PO_3F$, $MgPO_3F$, $CaPO_3F$, $Al_2(PO_3F)_3$, $Ga_2(PO_3F)_3$.

5. The nonaqueous electrolyte solution according to claim 1, wherein the monofluorophosphate is present and is $Li_2PO_3F$.

6. The nonaqueous electrolyte solution according to claim 1, wherein the difluorophosphate is present and is at least one selected from the group consisting of $LiPO_2F_2$, $NaPO_2F_2$, $Mg(PO_2F_2)_2$, $Ca(PO_2F_2)_2$, $Al(PO_2F_2)_3$, and $Ga(PO_2F_2)_3$.

7. The nonaqueous electrolyte solution according to claim 1, wherein the difluorophosphate is present and is at least one selected from the group consisting of $LiPO_2F_2$, $NaPO_2F_2$, and $Mg(PO_2F_2)_2$.

8. A nonaqueous-electrolyte secondary battery comprising:
   a negative electrode and a positive electrode, which are capable of occluding/releasing lithium ions; and
   the nonaqueous electrolyte solution according to claim 1.

* * * * *